(12) United States Patent
Jersey et al.

(10) Patent No.: US 12,048,905 B2
(45) Date of Patent: Jul. 30, 2024

(54) CARBONATION CUP FOR CARBONATED BEVERAGE MAKER

(71) Applicant: PepsiCo, Inc., Purchase, NY (US)

(72) Inventors: Steven T. Jersey, Laguna Niguel, CA (US); Stephen Brown, Hatfield Broad Oak (GB); Farideh Goudarzi, Cambridge (GB); Steven Headen, Ann Arbor, MI (US); Miles Hember, Cambridge (GB); Alexander Norman, Cambridge (GB); Andrew Potter, Stapleford (GB); Gary Stacey, Cambridge (GB)

(73) Assignee: PepsiCo, Inc., Purchase, NY (US)

( * ) Notice: Subject to any disclaimer, the term of this patent is extended or adjusted under 35 U.S.C. 154(b) by 100 days.

(21) Appl. No.: 18/051,809

(22) Filed: Nov. 1, 2022

(65) Prior Publication Data
US 2023/0095141 A1    Mar. 30, 2023

Related U.S. Application Data

(63) Continuation of application No. 16/348,107, filed as application No. PCT/US2017/060591 on Nov. 8, 2017, now Pat. No. 11,524,268.

(Continued)

(51) Int. Cl.
*B01F 23/2361* (2022.01)
*A23L 2/40* (2006.01)
(Continued)

(52) U.S. Cl.
CPC ............ *B01F 23/2361* (2022.01); *A23L 2/40* (2013.01); *A23L 2/54* (2013.01); *A23L 2/56* (2013.01);
(Continued)

(58) Field of Classification Search
CPC ................ B01F 23/233; B01F 23/2361; B01F 23/2364; B01F 23/23311; B01F 23/23314;
(Continued)

(56) References Cited

U.S. PATENT DOCUMENTS

| 4,158,329 A | 6/1979 | McKnight |
| 4,429,623 A | 2/1984 | Illy |

(Continued)

FOREIGN PATENT DOCUMENTS

| EP | 214707 A2 | 3/1987 |
| EP | 126529 B1 | 9/1988 |

(Continued)

OTHER PUBLICATIONS

US 8,925,442 B2, 01/2015, Baudet et al. (withdrawn)

(Continued)

*Primary Examiner* — Anthony J Weier
(74) *Attorney, Agent, or Firm* — Sterne, Kessler, Goldstein & Fox P.L.L.C.

(57) ABSTRACT

A carbonated beverage maker includes a water reservoir, a carbon dioxide creation chamber, and a carbonation chamber. The water reservoir holds ice water and has a first impeller and a shroud surrounding the first impeller. The carbon dioxide creation chamber contains chemical elements and receives warm water. The chemical elements react with each other to create carbon dioxide when the warm water is introduced to the carbon dioxide creation chamber. The carbonation chamber is connected to the water reservoir and the carbon dioxide creation chamber. The carbonation chamber has a second impeller that includes a stem portion and blades. The stem portion and the blades define conduits therein. The blades create a low pressure region in a lower portion of the carbonation chamber such (Continued)

that carbon dioxide from the carbon dioxide creation chamber flows through the conduits to the low pressure region.

10 Claims, 103 Drawing Sheets

Related U.S. Application Data

(60) Provisional application No. 62/419,750, filed on Nov. 9, 2016, provisional application No. 62/462,116, filed on Feb. 22, 2017.

(51) Int. Cl.
*A23L 2/54* (2006.01)
*A23L 2/56* (2006.01)
*B01F 23/233* (2022.01)
*B01F 33/453* (2022.01)
*B01F 35/21* (2022.01)
*B01F 35/213* (2022.01)
*B01F 35/22* (2022.01)
*B01F 35/32* (2022.01)
*B01F 35/71* (2022.01)
*B01F 35/92* (2022.01)
*B01F 35/93* (2022.01)
*B65D 85/804* (2006.01)
*B01F 23/236* (2022.01)
*B01F 23/237* (2022.01)
*B01F 35/90* (2022.01)
*B01F 101/14* (2022.01)

(52) U.S. Cl.
CPC ........ *B01F 23/233* (2022.01); *B01F 33/4535* (2022.01); *B01F 35/2115* (2022.01); *B01F 35/213* (2022.01); *B01F 35/2209* (2022.01); *B01F 35/32025* (2022.01); *B01F 35/7131* (2022.01); *B01F 35/7137* (2022.01); *B01F 35/7139* (2022.01); *B01F 35/7173* (2022.01); *B01F 35/71745* (2022.01); *B01F 35/92* (2022.01); *B01F 35/93* (2022.01); *B65D 85/8061* (2020.05); *A23V 2002/00* (2013.01); *B01F 23/23311* (2022.01); *B01F 23/23314* (2022.01); *B01F 23/2364* (2022.01); *B01F 23/237621* (2022.01); *B01F 2035/98* (2022.01); *B01F 2035/99* (2022.01); *B01F 2101/14* (2022.01)

(58) Field of Classification Search
CPC .............. B01F 33/4535; B01F 2035/98; B01F 2035/99; B01F 2101/14; B65D 85/8061; A23L 2/40; A23L 2/54; A23L 2/56; A23V 2002/00
See application file for complete search history.

(56) References Cited

U.S. PATENT DOCUMENTS

| | | |
|---|---|---|
| 4,537,332 A | 8/1985 | Brown et al. |
| 4,576,826 A | 3/1986 | Liu et al. |
| 4,674,656 A | 6/1987 | Wiley et al. |
| 4,724,752 A | 2/1988 | Aliesch et al. |
| 4,744,491 A | 5/1988 | Bani et al. |
| 4,798,605 A | 1/1989 | Steiner et al. |
| 4,806,375 A | 2/1989 | Favre |
| 4,846,052 A | 7/1989 | Favre et al. |
| 4,859,473 A | 8/1989 | Arciszewski et al. |
| 4,938,980 A | 7/1990 | Arciszewski et al. |
| 5,000,352 A * | 3/1991 | Cleland ................ B67D 1/0016 222/66 |
| 5,008,013 A | 4/1991 | Favre et al. |
| 5,064,661 A | 11/1991 | Verduin |
| 5,192,513 A | 3/1993 | Stumphauzer et al. |
| 5,197,374 A | 3/1993 | Fond |
| 5,242,702 A | 9/1993 | Fond |
| 5,293,909 A | 3/1994 | Weiss |
| 5,327,815 A | 7/1994 | Fond et al. |
| 5,343,799 A | 9/1994 | Fond |
| 5,347,916 A | 9/1994 | Fond et al. |
| 5,385,764 A | 1/1995 | Andersen et al. |
| 5,398,595 A | 3/1995 | Fond et al. |
| 5,398,596 A | 3/1995 | Fond |
| 5,402,707 A | 4/1995 | Fond et al. |
| 5,417,146 A | 5/1995 | Zimmer et al. |
| 5,440,972 A | 8/1995 | English |
| 5,496,574 A | 3/1996 | Rushmore et al. |
| 5,506,046 A | 4/1996 | Andersen et al. |
| 5,531,152 A | 7/1996 | Gardosi |
| 5,567,461 A | 10/1996 | Lehrer |
| 5,580,624 A | 12/1996 | Andersen et al. |
| 5,597,595 A | 1/1997 | Dewille et al. |
| 5,616,617 A | 4/1997 | Moerkerken |
| 5,637,335 A | 6/1997 | Fond et al. |
| 5,649,472 A | 7/1997 | Fond et al. |
| 5,656,311 A | 8/1997 | Fond |
| 5,656,316 A | 8/1997 | Fond et al. |
| 5,693,356 A | 12/1997 | Mandava et al. |
| 5,705,237 A | 1/1998 | Andersen et al. |
| 5,705,242 A | 1/1998 | Andersen |
| 5,762,987 A | 6/1998 | Fond et al. |
| 5,826,492 A | 10/1998 | Fond et al. |
| 5,853,780 A | 12/1998 | Kumar |
| 5,880,441 A | 3/1999 | Hartman et al. |
| 5,897,899 A | 4/1999 | Fond |
| 5,919,502 A | 7/1999 | Manez et al. |
| 5,948,455 A | 9/1999 | Schaeffer et al. |
| RE36,516 E | 1/2000 | Lehrer |
| 6,017,573 A | 1/2000 | Baker et al. |
| 6,025,000 A | 2/2000 | Fond et al. |
| 6,026,732 A | 2/2000 | Kollep et al. |
| 6,042,866 A | 3/2000 | Greene et al. |
| 6,068,871 A | 5/2000 | Fond et al. |
| 6,079,315 A | 6/2000 | Beaulieu et al. |
| 6,142,063 A | 11/2000 | Beaulieu et al. |
| 6,164,191 A | 12/2000 | Liu et al. |
| 6,182,554 B1 | 2/2001 | Beaulieu et al. |
| 6,286,715 B1 | 9/2001 | Ziesel et al. |
| 6,345,570 B1 | 2/2002 | Santi |
| 6,378,730 B1 | 4/2002 | Reddy et al. |
| 6,440,256 B1 | 8/2002 | Gordon et al. |
| 6,490,966 B2 | 12/2002 | Mariller et al. |
| 6,550,269 B2 | 4/2003 | Rudick |
| 6,589,577 B2 | 7/2003 | Lazaris et al. |
| 6,606,938 B2 | 8/2003 | Taylor |
| 6,607,762 B2 | 8/2003 | Lazaris et al. |
| 6,644,173 B2 | 11/2003 | Lazaris et al. |
| 6,645,537 B2 | 11/2003 | Sweeney et al. |
| 6,655,260 B2 | 12/2003 | Lazaris et al. |
| 6,658,989 B2 | 12/2003 | Sweeney et al. |
| 6,666,130 B2 | 12/2003 | Taylor et al. |
| 6,672,200 B2 | 1/2004 | Duffy et al. |
| 6,698,333 B2 | 3/2004 | Halliday et al. |
| 6,708,600 B2 | 3/2004 | Winkler et al. |
| 6,725,762 B2 | 4/2004 | Kollep et al. |
| 6,740,345 B2 | 5/2004 | Cai |
| 6,751,525 B1 | 6/2004 | Crisp |
| 6,758,130 B2 | 7/2004 | Sargent et al. |
| 6,786,134 B2 | 9/2004 | Green |
| 6,799,503 B2 | 10/2004 | Kollep et al. |
| 6,810,788 B2 | 11/2004 | Hale |
| 6,820,535 B2 | 11/2004 | Fischer |
| 6,821,541 B2 | 11/2004 | Lee |
| 6,832,542 B2 | 12/2004 | Hu et al. |
| 6,843,165 B2 | 1/2005 | Stoner |
| 6,849,285 B2 | 2/2005 | Masek et al. |
| 6,854,378 B2 | 2/2005 | Jarisch et al. |
| 6,857,353 B2 | 2/2005 | Kollep et al. |
| D502,362 S | 3/2005 | Lazaris et al. |
| 6,877,635 B2 | 4/2005 | Stratton |

(56) References Cited

U.S. PATENT DOCUMENTS

| | | |
|---|---|---|
| 6,880,454 B2 | 4/2005 | Kollep |
| 6,904,840 B1 | 6/2005 | Pfeifer et al. |
| D506,926 S | 7/2005 | Halliday et al. |
| 6,941,855 B2 | 9/2005 | Denisart et al. |
| 6,948,420 B2 | 9/2005 | Kirschner et al. |
| 6,955,116 B2 | 10/2005 | Hale |
| 6,966,251 B2 | 11/2005 | Yoakim |
| 6,986,263 B2 | 1/2006 | Crisp |
| 6,990,891 B2 | 1/2006 | Tebo |
| 7,013,797 B2 | 3/2006 | Fischer |
| 7,017,472 B2 | 3/2006 | Grant et al. |
| 7,024,983 B2 | 4/2006 | Grant et al. |
| 7,032,780 B2 | 4/2006 | Crisp |
| 7,063,238 B2 | 6/2006 | Hale |
| 7,089,849 B2 | 8/2006 | Chen et al. |
| 7,093,530 B2 | 8/2006 | Meister et al. |
| 7,093,533 B2 | 8/2006 | Tebo et al. |
| 7,097,074 B2 | 8/2006 | Halliday et al. |
| 7,131,369 B2 | 11/2006 | Gantt et al. |
| 7,153,530 B2 | 12/2006 | Masek et al. |
| 7,165,488 B2 | 1/2007 | Bragg et al. |
| 7,203,572 B2 | 4/2007 | Crisp |
| 7,213,506 B2 | 5/2007 | Halliday et al. |
| 7,216,582 B2 | 5/2007 | Yoakim et al. |
| 7,219,598 B2 | 5/2007 | Halliday et al. |
| 7,231,869 B2 | 6/2007 | Halliday et al. |
| 7,241,832 B2 | 7/2007 | Khemani et al. |
| 7,243,598 B2 | 7/2007 | Halliday et al. |
| 7,255,039 B2 | 8/2007 | Halliday et al. |
| 7,258,884 B2 | 8/2007 | Albrecht |
| 7,279,188 B2 | 10/2007 | Arrick et al. |
| 7,287,461 B2 | 10/2007 | Halliday et al. |
| 7,308,851 B2 | 12/2007 | Halliday |
| 7,311,037 B2 | 12/2007 | Albrecht |
| 7,316,178 B2 | 1/2008 | Halliday et al. |
| 7,322,277 B2 | 1/2008 | Halliday et al. |
| 7,328,651 B2 | 2/2008 | Halliday et al. |
| 7,337,704 B2 | 3/2008 | Hammad et al. |
| 7,340,990 B2 | 3/2008 | Halliday et al. |
| 7,347,138 B2 | 3/2008 | Bragg et al. |
| 7,356,381 B2 | 4/2008 | Crisp |
| 7,387,729 B2 | 6/2008 | Vandenbelt et al. |
| 7,398,726 B2 | 7/2008 | Streeter et al. |
| D574,258 S | 8/2008 | Girard et al. |
| 7,412,921 B2 | 8/2008 | Hu et al. |
| 7,418,899 B2 | 9/2008 | Halliday et al. |
| 7,441,664 B2 | 10/2008 | Tanner et al. |
| 7,444,925 B2 | 11/2008 | Mahlich et al. |
| 7,469,628 B2 | 12/2008 | Mandralis et al. |
| 7,472,643 B2 | 1/2009 | Mitchell et al. |
| 7,503,253 B2 | 3/2009 | Ralm |
| 7,513,192 B2 | 4/2009 | Sullivan et al. |
| 7,523,695 B2 | 4/2009 | Streeter et al. |
| 7,533,603 B2 | 5/2009 | Halliday et al. |
| 7,533,604 B2 | 5/2009 | Halliday et al. |
| 7,540,232 B2 | 6/2009 | Bates et al. |
| 7,543,527 B2 | 6/2009 | Schmed |
| 7,562,618 B2 | 7/2009 | Jarisch et al. |
| 7,569,243 B2 | 8/2009 | Yoakim et al. |
| 7,581,490 B2 | 9/2009 | Grant et al. |
| 7,591,218 B2 | 9/2009 | Bunn et al. |
| 7,592,027 B2 | 9/2009 | Halliday et al. |
| 7,594,470 B2 | 9/2009 | Scarchilli et al. |
| 7,594,525 B2 | 9/2009 | Girard et al. |
| 7,604,826 B2 | 10/2009 | Denisart et al. |
| 7,607,385 B2 | 10/2009 | Halliday et al. |
| 7,614,524 B2 | 11/2009 | Girard et al. |
| 7,615,245 B2 | 11/2009 | Sweeney et al. |
| 7,615,246 B2 | 11/2009 | Sweeney et al. |
| 7,631,594 B2 | 12/2009 | Chen et al. |
| 7,640,843 B2 | 1/2010 | Halliday et al. |
| 7,644,653 B2 | 1/2010 | Halliday et al. |
| 7,650,831 B2 | 1/2010 | Denisart et al. |
| 7,651,015 B2 | 1/2010 | Girard et al. |
| 7,658,141 B2 | 2/2010 | Masek et al. |
| D611,298 S | 3/2010 | Freeman et al. |
| 7,670,479 B2 | 3/2010 | Arett et al. |
| 7,673,557 B2 | 3/2010 | Bienvenu et al. |
| 7,673,558 B2 | 3/2010 | Panesar et al. |
| 7,673,559 B2 | 3/2010 | Zurcher et al. |
| 7,677,158 B2 | 3/2010 | McDuffie et al. |
| 7,681,492 B2 | 3/2010 | Liverani et al. |
| 7,685,932 B2 | 3/2010 | Ralm et al. |
| 7,703,380 B2 | 4/2010 | Rvser et al. |
| 7,703,381 B2 | 4/2010 | Liverani et al. |
| 7,722,254 B2 | 5/2010 | Murray |
| 7,730,829 B2 | 6/2010 | Hammad |
| D618,963 S | 7/2010 | Freeman et al. |
| 7,770,512 B2 | 8/2010 | Albrecht |
| 7,775,152 B2 | 8/2010 | Kirschner et al. |
| 7,779,751 B2 | 8/2010 | Gilbert |
| 7,784,396 B2 | 8/2010 | Fai et al. |
| 7,793,797 B2 | 9/2010 | Jarisch et al. |
| 7,798,054 B2 | 9/2010 | Evers et al. |
| 7,798,055 B2 | 9/2010 | Mandralis et al. |
| 7,798,376 B2 | 9/2010 | Kirschner |
| 7,810,750 B2 | 10/2010 | Abreu |
| 7,819,284 B2 | 10/2010 | Hale |
| 7,828,020 B2 | 11/2010 | Girard et al. |
| 7,836,819 B2 | 11/2010 | Liverani et al. |
| 7,845,270 B2 | 12/2010 | Ralm et al. |
| 7,854,192 B2 | 12/2010 | Denisart et al. |
| 7,856,921 B2 | 12/2010 | Arrick et al. |
| 7,857,164 B2 | 12/2010 | Jarisch et al. |
| 7,863,546 B2 | 1/2011 | Hestekin et al. |
| 7,891,286 B2 | 2/2011 | Scarchilli et al. |
| 7,918,156 B2 | 4/2011 | Greenwald et al. |
| 7,921,766 B2 | 4/2011 | Halliday et al. |
| 7,926,415 B2 | 4/2011 | Yoakim et al. |
| 7,930,972 B2 | 4/2011 | Denisart et al. |
| D637,484 S | 5/2011 | Winkler |
| 7,947,316 B2 | 5/2011 | Kirschner et al. |
| 7,964,230 B2 | 6/2011 | Kirschner et al. |
| 7,966,927 B2 | 6/2011 | Yoakim et al. |
| 7,981,451 B2 | 7/2011 | Ozanne |
| 7,993,691 B2 | 8/2011 | Yoakim et al. |
| 8,003,146 B2 | 8/2011 | Albrecht |
| 8,010,211 B2 | 8/2011 | Hendrickson et al. |
| 8,016,166 B2 | 9/2011 | Kirschner |
| D647,398 S | 10/2011 | Winkler |
| D647,399 S | 10/2011 | Winkler |
| 8,028,502 B2 | 10/2011 | Murray |
| 8,033,211 B2 | 10/2011 | Halliday et al. |
| 8,039,029 B2 | 10/2011 | Ozanne |
| 8,039,034 B2 | 10/2011 | Ozanne |
| 8,047,126 B2 | 11/2011 | Majer |
| 8,047,401 B2 | 11/2011 | Holler |
| 8,051,381 B2 | 11/2011 | Ebrom et al. |
| 8,062,682 B2 | 11/2011 | Mandralis et al. |
| 8,087,347 B2 | 1/2012 | Halliday et al. |
| 8,088,423 B2 | 1/2012 | Ohresser et al. |
| 8,091,735 B2 | 1/2012 | Girard et al. |
| 8,109,200 B2 | 2/2012 | Hansen |
| 8,118,997 B2 | 2/2012 | Ebrom et al. |
| 8,133,525 B2 | 3/2012 | Skalski et al. |
| 8,146,485 B2 | 4/2012 | Ozanne et al. |
| 8,147,887 B2 | 4/2012 | Dogan et al. |
| 8,161,866 B2 | 4/2012 | Kollep et al. |
| 8,163,318 B2 | 4/2012 | Ozanne et al. |
| 8,166,867 B2 | 5/2012 | Skalski et al. |
| 8,166,868 B2 | 5/2012 | Skalski et al. |
| 8,168,247 B2 | 5/2012 | Halliday et al. |
| 8,176,714 B2 | 5/2012 | Abegglen et al. |
| 8,176,840 B2 | 5/2012 | Jarisch |
| 8,197,877 B2 | 6/2012 | Colarow |
| 8,202,560 B2 | 6/2012 | Yoakim et al. |
| 8,205,542 B2 | 6/2012 | Gilbert |
| 8,205,771 B2 | 6/2012 | Compton |
| 8,210,096 B2 | 7/2012 | Fin |
| 8,210,098 B2 | 7/2012 | Boussemart et al. |
| 8,210,396 B2 | 7/2012 | Girard et al. |
| 8,215,228 B2 | 7/2012 | Skalski et al. |
| 8,220,382 B2 | 7/2012 | Verbeek |
| 8,221,811 B2 | 7/2012 | Skalski et al. |

(56)  References Cited

U.S. PATENT DOCUMENTS

| | | |
|---|---|---|
| 8,227,000 B2 | 7/2012 | Skalski et al. |
| 8,231,918 B2 | 7/2012 | Ohresser et al. |
| 8,250,970 B2 | 8/2012 | Thomas |
| 8,250,971 B2 | 8/2012 | Righetti |
| 8,250,972 B2 | 8/2012 | Santoiemmo |
| 8,252,351 B2 | 8/2012 | Ozanne |
| 8,256,342 B2 | 9/2012 | Jarisch et al. |
| 8,257,766 B2 | 9/2012 | Yoakim et al. |
| 8,263,148 B2 | 9/2012 | Yoakim et al. |
| 8,272,317 B2 | 9/2012 | Minard et al. |
| 8,272,318 B2 | 9/2012 | Skalski et al. |
| 8,272,319 B2 | 9/2012 | Jarisch et al. |
| 8,291,812 B2 | 10/2012 | Rivera |
| 8,297,180 B2 | 10/2012 | Skalski et al. |
| 8,304,006 B2 | 11/2012 | Yoakim et al. |
| 8,308,942 B2 | 11/2012 | Swain |
| 8,312,806 B2 | 11/2012 | De Graaff et al. |
| 8,316,759 B2 | 11/2012 | Ozanne et al. |
| 8,322,271 B2 | 12/2012 | Glucksman et al. |
| 8,327,754 B2 | 12/2012 | Kirschner et al. |
| 8,336,447 B2 | 12/2012 | Jarisch et al. |
| 8,359,969 B2 | 1/2013 | Van Dillen et al. |
| 8,361,527 B2 | 1/2013 | Winkler et al. |
| 8,389,031 B2 | 3/2013 | Boghani et al. |
| 8,389,032 B2 | 3/2013 | Boghani et al. |
| 8,389,596 B2 | 3/2013 | Boyce et al. |
| 8,393,261 B2 | 3/2013 | Kollep et al. |
| 8,399,035 B2 | 3/2013 | Kirschner et al. |
| 8,402,883 B2 | 3/2013 | Kollep et al. |
| 8,408,118 B2 | 4/2013 | Skalski et al. |
| 8,409,646 B2 | 4/2013 | Yoakim et al. |
| 8,413,844 B2 | 4/2013 | Arett et al. |
| 8,420,139 B2 | 4/2013 | Richiger |
| 8,424,447 B2 | 4/2013 | Colantonio et al. |
| 8,425,963 B2 | 4/2013 | Ryser et al. |
| 8,425,964 B2 | 4/2013 | Majer |
| 8,431,175 B2 | 4/2013 | Yoakim et al. |
| 8,434,401 B2 | 5/2013 | Skalski et al. |
| 8,434,402 B2 | 5/2013 | Ralm et al. |
| 8,440,244 B2 | 5/2013 | Troplin et al. |
| 8,443,718 B2 | 5/2013 | Denisart et al. |
| 8,445,047 B2 | 5/2013 | Ozanne |
| 8,448,565 B2 | 5/2013 | Ralm |
| 8,455,033 B2 | 6/2013 | Boghani et al. |
| 8,459,179 B2 | 6/2013 | Ozanne et al. |
| 8,460,732 B2 | 6/2013 | Stalder et al. |
| 8,461,959 B2 | 6/2013 | Ebrom et al. |
| 8,464,630 B2 | 6/2013 | Liverani et al. |
| 8,464,631 B2 | 6/2013 | Liverani et al. |
| 8,464,632 B2 | 6/2013 | Liverani et al. |
| 8,468,934 B2 | 6/2013 | Epars et al. |
| 8,468,935 B2 | 6/2013 | Skalski et al. |
| 8,474,368 B2 | 7/2013 | Kilber et al. |
| 8,475,854 B2 | 7/2013 | Skalski et al. |
| 8,475,860 B2 | 7/2013 | Colantonio et al. |
| 8,479,639 B2 | 7/2013 | Levin |
| 8,479,640 B2 | 7/2013 | Gavillet et al. |
| 8,479,643 B2 | 7/2013 | Aemisegger et al. |
| 8,481,097 B2 | 7/2013 | Skalski et al. |
| 8,490,542 B2 | 7/2013 | Webster et al. |
| 8,491,948 B2 | 7/2013 | Ozanne et al. |
| 8,495,949 B2 | 7/2013 | Tinkler et al. |
| 8,499,682 B2 | 8/2013 | Zangerle |
| 8,505,440 B2 | 8/2013 | Kirschner et al. |
| 8,505,590 B2 | 8/2013 | Kernkamp et al. |
| 8,512,776 B2 | 8/2013 | Yoakim et al. |
| 8,512,784 B2 | 8/2013 | Denisart et al. |
| 8,512,886 B2 | 8/2013 | Ozanne |
| 8,516,946 B2 | 8/2013 | Skalski et al. |
| 8,516,948 B2 | 8/2013 | Zimmerman et al. |
| 8,522,669 B1 | 9/2013 | Rolfes et al. |
| 8,540,363 B2 | 9/2013 | Abreu |
| 8,549,824 B2 | 10/2013 | Boussemart et al. |
| 8,555,774 B2 | 10/2013 | Mitchell et al. |
| 8,556,127 B2 | 10/2013 | Olson et al. |
| 8,557,314 B2 | 10/2013 | Gerbaulet et al. |
| 8,561,838 B2 | 10/2013 | Jarisch et al. |
| 8,563,058 B2 | 10/2013 | Roulin et al. |
| 8,565,917 B2 | 10/2013 | Crisp |
| 8,567,304 B2 | 10/2013 | Saxton et al. |
| 8,573,114 B2 | 11/2013 | Huang et al. |
| 8,573,115 B2 | 11/2013 | Lai et al. |
| 8,573,116 B2 | 11/2013 | Etter et al. |
| 8,584,578 B2 | 11/2013 | Koopman et al. |
| 8,586,117 B2 | 11/2013 | Vastardis et al. |
| 8,590,753 B2 | 11/2013 | Marina et al. |
| 8,591,972 B2 | 11/2013 | Boghani et al. |
| 8,591,973 B2 | 11/2013 | Boghani et al. |
| 8,591,974 B2 | 11/2013 | Boghani et al. |
| 8,591,978 B2 | 11/2013 | Skalski et al. |
| D694,620 S | 12/2013 | Hansen |
| D695,111 S | 12/2013 | Hansen et al. |
| 8,600,223 B2 | 12/2013 | Etter et al. |
| 8,609,170 B2 | 12/2013 | Tinkler et al. |
| 8,613,246 B2 | 12/2013 | Ryser et al. |
| D697,797 S | 1/2014 | Hansen |
| 8,621,981 B2 | 1/2014 | Rivera |
| 8,627,760 B2 | 1/2014 | Kollep et al. |
| 8,635,945 B2 | 1/2014 | Verbeek |
| 8,646,379 B2 | 2/2014 | Lai et al. |
| 8,651,012 B2 | 2/2014 | Yoakim et al. |
| 8,658,232 B2 | 2/2014 | Yoakim et al. |
| D700,475 S | 3/2014 | Avigdor et al. |
| 8,661,967 B2 | 3/2014 | Gonen |
| 8,667,892 B2 | 3/2014 | Cominelli et al. |
| 8,671,827 B2 | 3/2014 | Skalski et al. |
| 8,671,828 B2 | 3/2014 | Denisart et al. |
| 8,673,379 B2 | 3/2014 | Skalski et al. |
| 8,677,888 B2 | 3/2014 | Santoiemmo |
| D703,039 S | 4/2014 | Hansen |
| 8,685,479 B2 | 4/2014 | Dogan et al. |
| 8,695,484 B2 | 4/2014 | Mori |
| 8,696,899 B2 | 4/2014 | Roulin et al. |
| 8,701,548 B2 | 4/2014 | Denisart et al. |
| 8,703,219 B2 | 4/2014 | Doleac et al. |
| 8,720,320 B1 | 5/2014 | Rivera |
| 8,722,124 B2 | 5/2014 | Ozanne |
| 8,728,313 B2 | 5/2014 | Swain |
| 8,733,229 B2 | 5/2014 | Jarisch et al. |
| 8,733,230 B2 | 5/2014 | Buhler et al. |
| 8,734,881 B2 | 5/2014 | Yoakim et al. |
| 8,739,686 B2 | 6/2014 | Ozanne et al. |
| 8,739,689 B2 | 6/2014 | Bombeck et al. |
| 8,740,020 B2 | 6/2014 | Marina et al. |
| 8,757,227 B2 | 6/2014 | Girard et al. |
| D708,057 S | 7/2014 | Hansen |
| 8,770,095 B2 | 7/2014 | Pecci et al. |
| 8,770,097 B2 | 7/2014 | McLean et al. |
| 8,771,768 B2 | 7/2014 | York et al. |
| 8,776,671 B2 | 7/2014 | van Os et al. |
| 8,784,915 B2 | 7/2014 | Evers et al. |
| 8,784,922 B2 | 7/2014 | Albrecht |
| 8,794,125 B1 | 8/2014 | Rivera |
| 8,794,126 B2 | 8/2014 | Skalski et al. |
| 8,795,748 B2 | 8/2014 | Kopel et al. |
| 8,800,431 B2 | 8/2014 | Sullivan et al. |
| 8,800,820 B2 | 8/2014 | Girard et al. |
| 8,807,018 B2 | 8/2014 | Doleac et al. |
| 8,808,775 B2 | 8/2014 | Novak et al. |
| 8,813,634 B2 | 8/2014 | Yoakim et al. |
| 8,820,215 B2 | 9/2014 | Bonacci et al. |
| 8,820,216 B2 | 9/2014 | Vuagniaux et al. |
| 8,833,238 B2 | 9/2014 | Hansen et al. |
| 8,833,241 B2 | 9/2014 | Santoiemmo |
| 8,834,948 B2 | 9/2014 | Estabrook et al. |
| 8,836,956 B2 | 9/2014 | Jarisch et al. |
| 8,844,427 B2 | 9/2014 | Beutlrock et al. |
| 8,844,428 B2 | 9/2014 | Kollep et al. |
| 8,846,121 B2 | 9/2014 | Hansen et al. |
| 8,852,659 B2 | 10/2014 | Halliday et al. |
| 8,857,317 B2 | 10/2014 | Manser et al. |
| 8,863,648 B2 | 10/2014 | Mori et al. |
| 8,863,987 B2 | 10/2014 | Jacobs et al. |
| 8,865,244 B2 | 10/2014 | Sweeney et al. |

(56) References Cited

U.S. PATENT DOCUMENTS

| | | |
|---|---|---|
| 8,869,678 B2 | 10/2014 | Epars et al. |
| 8,877,270 B2 | 11/2014 | Massey et al. |
| 8,877,276 B2 | 11/2014 | Cominelli et al. |
| 8,887,622 B2 | 11/2014 | Bentley et al. |
| 8,888,073 B2 | 11/2014 | Leung et al. |
| 8,889,203 B2 | 11/2014 | York |
| 8,893,927 B2 | 11/2014 | Olson et al. |
| 8,900,648 B2 | 12/2014 | Bunke et al. |
| 8,904,921 B2 | 12/2014 | Bonacci |
| 8,906,436 B2 | 12/2014 | Nowak |
| 8,910,563 B2 | 12/2014 | Hulett et al. |
| 8,916,215 B2 | 12/2014 | Yoakim et al. |
| 8,919,240 B2 | 12/2014 | Ozanne et al. |
| 8,919,241 B2 | 12/2014 | Hale |
| 8,919,242 B2 | 12/2014 | Perentes et al. |
| 8,920,858 B2 | 12/2014 | Yauk et al. |
| 8,927,037 B2 | 1/2015 | Kihnke |
| 8,936,819 B2 | 1/2015 | Perentes et al. |
| 8,945,647 B2 | 2/2015 | Majer |
| 8,950,315 B2 | 2/2015 | Lai et al. |
| 8,950,317 B2 | 2/2015 | Tanner et al. |
| 8,956,672 B2 | 2/2015 | Yoakim et al. |
| 8,960,075 B2 | 2/2015 | Traitler et al. |
| 8,960,076 B2 | 2/2015 | Epars et al. |
| 8,960,078 B2 | 2/2015 | Hristov et al. |
| 8,960,489 B2 | 2/2015 | Footz et al. |
| 8,962,048 B2 | 2/2015 | Gerbaulet et al. |
| 8,962,049 B2 | 2/2015 | Doleac et al. |
| 8,967,038 B2 | 3/2015 | Rivera |
| 8,973,486 B2 | 3/2015 | Frigeri et al. |
| 8,973,488 B2 | 3/2015 | Larzul et al. |
| 8,973,489 B2 | 3/2015 | Baudet et al. |
| 8,974,846 B2 | 3/2015 | Burton-Wilcock et al. |
| 8,978,541 B2 | 3/2015 | Lai et al. |
| 8,978,542 B2 | 3/2015 | Talon et al. |
| 8,978,543 B2 | 3/2015 | Baldo et al. |
| 8,978,544 B2 | 3/2015 | Leuzinger et al. |
| 8,978,545 B2 | 3/2015 | Yoakim et al. |
| 8,980,347 B2 | 3/2015 | Kaeser et al. |
| 8,985,395 B2 | 3/2015 | Tansey et al. |
| 8,986,762 B2 | 3/2015 | Eichler et al. |
| 8,986,764 B2 | 3/2015 | Yoakim et al. |
| 8,993,018 B2 | 3/2015 | Bucher et al. |
| D726,534 S | 4/2015 | Lo Faro et al. |
| 8,999,420 B2 | 4/2015 | Hansen |
| 8,999,421 B2 | 4/2015 | Clark |
| 9,010,237 B2 | 4/2015 | Ozanne et al. |
| 9,023,412 B2 | 5/2015 | Doleac et al. |
| 9,027,463 B2 | 5/2015 | Sullivan |
| 9,027,466 B2 | 5/2015 | Bucher et al. |
| 9,028,900 B2 | 5/2015 | Larzul et al. |
| 9,061,825 B2 | 6/2015 | Kopel et al. |
| 9,062,912 B2 | 6/2015 | Anselmino et al. |
| 9,066,622 B2 | 6/2015 | Denisart et al. |
| 9,066,623 B2 | 6/2015 | Lai et al. |
| 9,072,402 B2 | 7/2015 | Ryser |
| 9,072,404 B2 | 7/2015 | Bombeck et al. |
| 9,072,407 B2 | 7/2015 | Castellani et al. |
| 9,079,706 B2 | 7/2015 | Glucksman et al. |
| 9,084,509 B2 | 7/2015 | Tanner et al. |
| 9,095,236 B2 | 8/2015 | Perentes et al. |
| 9,101,163 B2 | 8/2015 | Massey et al. |
| 9,108,794 B2 | 8/2015 | Fu et al. |
| 9,113,654 B2 | 8/2015 | Massey et al. |
| 9,113,745 B2 | 8/2015 | Castellani |
| 9,113,747 B2 | 8/2015 | Rivera |
| 9,117,326 B2 | 8/2015 | Cerveny et al. |
| 9,119,503 B2 | 9/2015 | Gavillet et al. |
| 9,144,343 B2 | 9/2015 | Oh |
| 9,145,256 B2 | 9/2015 | Fisk et al. |
| 9,149,129 B2 | 10/2015 | Jarisch et al. |
| 9,149,147 B2 | 10/2015 | Perentes et al. |
| 9,149,148 B2 | 10/2015 | Jaccard et al. |
| 9,149,149 B2 | 10/2015 | Oh |
| 9,149,150 B2 | 10/2015 | Oh |
| 9,149,151 B2 | 10/2015 | Oh |
| 9,155,319 B1 | 10/2015 | Perlman |
| 9,155,417 B2 | 10/2015 | Girard et al. |
| 9,155,418 B2 | 10/2015 | Lai et al. |
| 9,161,654 B2 | 10/2015 | Belmont |
| 9,161,655 B2 | 10/2015 | De Graaff et al. |
| 9,162,815 B2 | 10/2015 | Yoakim et al. |
| 9,167,933 B2 | 10/2015 | Carr et al. |
| 9,167,935 B2 | 10/2015 | Scholvinck et al. |
| D743,252 S | 11/2015 | Hansen et al. |
| D743,785 S | 11/2015 | Raphaelson et al. |
| D743,786 S | 11/2015 | Hansen |
| 9,179,797 B2 | 11/2015 | Rivera |
| 9,198,455 B2 | 12/2015 | Hatherell |
| 9,198,533 B2 | 12/2015 | Ozanne et al. |
| 9,198,534 B2 | 12/2015 | Skalski et al. |
| 9,204,751 B2 | 12/2015 | Peterson |
| 2001/0047724 A1 | 12/2001 | Lazaris et al. |
| 2001/0048957 A1 | 12/2001 | Lazaris et al. |
| 2002/0020659 A1 | 2/2002 | Sweeney et al. |
| 2002/0048621 A1 | 4/2002 | Boyd et al. |
| 2002/0078831 A1 | 6/2002 | Cai |
| 2002/0144602 A1 | 10/2002 | Taylor et al. |
| 2002/0144603 A1 | 10/2002 | Taylor |
| 2002/0144604 A1 | 10/2002 | Winkler et al. |
| 2002/0148356 A1 | 10/2002 | Lazaris et al. |
| 2002/0148357 A1 | 10/2002 | Lazaris et al. |
| 2002/0148358 A1 | 10/2002 | Sweeney et al. |
| 2002/0152895 A1 | 10/2002 | Duffy et al. |
| 2003/0005826 A1 | 1/2003 | Sargent et al. |
| 2003/0024948 A1 | 2/2003 | Last |
| 2003/0033938 A1 | 2/2003 | Halliday et al. |
| 2003/0056661 A1 | 3/2003 | Hu et al. |
| 2003/0066431 A1 | 4/2003 | Fanzutti et al. |
| 2003/0071056 A1 | 4/2003 | Hale |
| 2003/0077359 A1 | 4/2003 | Fond et al. |
| 2003/0089245 A1 | 5/2003 | Kollep et al. |
| 2003/0096038 A1 | 5/2003 | Cai |
| 2003/0116029 A1 | 6/2003 | Kollep |
| 2003/0145736 A1 | 8/2003 | Green |
| 2003/0166779 A1 | 9/2003 | Khemani et al. |
| 2003/0172813 A1 | 9/2003 | Schifferle |
| 2003/0198465 A1 | 10/2003 | Cai |
| 2003/0202787 A1 | 10/2003 | Wu |
| 2003/0221563 A1 | 12/2003 | Lee |
| 2003/0222089 A1 | 12/2003 | Hale |
| 2004/0031394 A1 | 2/2004 | Yoakim et al. |
| 2004/0055472 A1 | 3/2004 | Stoner |
| 2004/0055473 A1 | 3/2004 | Stoner |
| 2004/0089158 A1 | 5/2004 | Mahlich |
| 2004/0112222 A1 | 6/2004 | Fischer |
| 2004/0124548 A1 | 7/2004 | Rona et al. |
| 2004/0129724 A1 | 7/2004 | Stratton |
| 2004/0149642 A1 | 8/2004 | Vandenbelt et al. |
| 2004/0168577 A1 | 9/2004 | Fischer |
| 2004/0173102 A1 | 9/2004 | Halliday et al. |
| 2004/0177764 A1 | 9/2004 | Halliday et al. |
| 2004/0177765 A1 | 9/2004 | Halliday |
| 2004/0180119 A1 | 9/2004 | Halliday et al. |
| 2004/0180123 A1 | 9/2004 | Halliday et al. |
| 2004/0182250 A1 | 9/2004 | Halliday et al. |
| 2004/0182251 A1 | 9/2004 | Halliday et al. |
| 2004/0187694 A1 | 9/2004 | Cai |
| 2004/0187695 A1 | 9/2004 | Halliday et al. |
| 2004/0187696 A1 | 9/2004 | Halliday et al. |
| 2004/0188459 A1 | 9/2004 | Halliday et al. |
| 2004/0191370 A1 | 9/2004 | Halliday et al. |
| 2004/0191371 A1 | 9/2004 | Halliday et al. |
| 2004/0191372 A1 | 9/2004 | Halliday et al. |
| 2004/0197444 A1 | 10/2004 | Halliday et al. |
| 2004/0206245 A1 | 10/2004 | Halliday et al. |
| 2004/0211210 A1 | 10/2004 | Crisp |
| 2004/0211322 A1 | 10/2004 | Halliday et al. |
| 2004/0215521 A1 | 10/2004 | Crisp |
| 2004/0217124 A1 | 11/2004 | Crisp |
| 2004/0232065 A1 | 11/2004 | Tanner et al. |
| 2004/0250686 A1 | 12/2004 | Hale |
| 2004/0255790 A1 | 12/2004 | Green |
| 2004/0261631 A1 | 12/2004 | Lee |

(56) References Cited

U.S. PATENT DOCUMENTS

| | | |
|---|---|---|
| 2005/0008754 A1 | 1/2005 | Sweeney et al. |
| 2005/0016383 A1 | 1/2005 | Kirschner et al. |
| 2005/0016384 A1 | 1/2005 | Tassinarv |
| 2005/0034604 A1 | 2/2005 | Halliday et al. |
| 2005/0034605 A1 | 2/2005 | Webster et al. |
| 2005/0072799 A1 | 4/2005 | Stratton |
| 2005/0076784 A1 | 4/2005 | Tebo et al. |
| 2005/0076785 A1 | 4/2005 | Tebo et al. |
| 2005/0076786 A1 | 4/2005 | Meister et al. |
| 2005/0076787 A1 | 4/2005 | Grant et al. |
| 2005/0076788 A1 | 4/2005 | Grant et al. |
| 2005/0076789 A1 | 4/2005 | Tebo |
| 2005/0084569 A1 | 4/2005 | Hu et al. |
| 2005/0095158 A1 | 5/2005 | Kirschner et al. |
| 2005/0103202 A1 | 5/2005 | Ralm et al. |
| 2005/0103204 A1 | 5/2005 | Halliday et al. |
| 2005/0118371 A1 | 6/2005 | Shi et al. |
| 2005/0126399 A1 | 6/2005 | Bragg et al. |
| 2005/0126400 A1 | 6/2005 | Bragg et al. |
| 2005/0126401 A1 | 6/2005 | Streeter et al. |
| 2005/0166761 A1 | 8/2005 | Jones et al. |
| 2005/0166763 A1 | 8/2005 | Scarchilli et al. |
| 2005/0166766 A1 | 8/2005 | Jones et al. |
| 2005/0178144 A1 | 8/2005 | Crisp |
| 2005/0183578 A1 | 8/2005 | Mandralis et al. |
| 2005/0183581 A1 | 8/2005 | Kirschner et al. |
| 2005/0188854 A1 | 9/2005 | Green et al. |
| 2005/0193892 A1 | 9/2005 | Ralm et al. |
| 2005/0205601 A1 | 9/2005 | Taylor |
| 2005/0238765 A1 | 10/2005 | Weaver et al. |
| 2005/0241489 A1 | 11/2005 | Kirschner et al. |
| 2005/0247205 A1 | 11/2005 | Chen et al. |
| 2005/0258082 A1 | 11/2005 | Lund et al. |
| 2005/0263007 A1 | 12/2005 | Akuzawa et al. |
| 2005/0271306 A1 | 12/2005 | Murray |
| 2005/0287251 A1 | 12/2005 | Lazaris et al. |
| 2006/0000363 A1 | 1/2006 | Streeter et al. |
| 2006/0000851 A1 | 1/2006 | Girard et al. |
| 2006/0006107 A1 | 1/2006 | Olson et al. |
| 2006/0011066 A1 | 1/2006 | Bunn et al. |
| 2006/0016347 A1 | 1/2006 | Girard et al. |
| 2006/0021514 A1 | 2/2006 | Gantt et al. |
| 2006/0021515 A1 | 2/2006 | Graviss et al. |
| 2006/0021919 A1 | 2/2006 | Olson et al. |
| 2006/0065127 A1 | 3/2006 | Dalton et al. |
| 2006/0073256 A1 | 4/2006 | Destaillats et al. |
| 2006/0090653 A1 | 5/2006 | McDuffie et al. |
| 2006/0102008 A1 | 5/2006 | Lin |
| 2006/0130664 A1 | 6/2006 | Doglioni et al. |
| 2006/0131332 A1 | 6/2006 | Khalaf |
| 2006/0137532 A1 | 6/2006 | Urio et al. |
| 2006/0144244 A1 | 7/2006 | Girard et al. |
| 2006/0150823 A1 | 7/2006 | Thomas |
| 2006/0151529 A1 | 7/2006 | Crisp |
| 2006/0157399 A1 | 7/2006 | Vandenbelt et al. |
| 2006/0174773 A1 | 8/2006 | Taylor |
| 2006/0180030 A1 | 8/2006 | Bates et al. |
| 2006/0191824 A1 | 8/2006 | Arett et al. |
| 2006/0196363 A1 | 9/2006 | Ralm et al. |
| 2006/0196364 A1 | 9/2006 | Kirschner |
| 2006/0230946 A1 | 10/2006 | Cheng |
| 2006/0249030 A1 | 11/2006 | Bienvenu et al. |
| 2006/0266222 A1 | 11/2006 | Hammad |
| 2006/0266223 A1 | 11/2006 | Hammad et al. |
| 2006/0266224 A1 | 11/2006 | Hammad et al. |
| 2006/0266225 A1 | 11/2006 | Hammad |
| 2006/0280841 A1 | 12/2006 | Cai |
| 2006/0288874 A1 | 12/2006 | Ziesel |
| 2006/0288875 A1 | 12/2006 | Kirschner et al. |
| 2007/0000390 A1 | 1/2007 | Albrecht |
| 2007/0012719 A1 | 1/2007 | Holler |
| 2007/0017374 A1 | 1/2007 | Chen et al. |
| 2007/0017375 A1 | 1/2007 | Chen et al. |
| 2007/0004210 A1 | 2/2007 | Troplin et al. |
| 2007/0039479 A1 | 2/2007 | Dalton et al. |
| 2007/0044665 A1 | 3/2007 | Kirschner et al. |
| 2007/0062375 A1 | 3/2007 | Liverani et al. |
| 2007/0068394 A1 | 3/2007 | Jarisch et al. |
| 2007/0068395 A1 | 3/2007 | Masek et al. |
| 2007/0110852 A1 | 5/2007 | Gouverneur |
| 2007/0157821 A1 | 7/2007 | Panesar et al. |
| 2007/0163446 A1 | 7/2007 | Halliday et al. |
| 2007/0175334 A1 | 8/2007 | Halliday et al. |
| 2007/0175335 A1 | 8/2007 | Liverani et al. |
| 2007/0181004 A1 | 8/2007 | Hale |
| 2007/0181005 A1 | 8/2007 | Kirschner et al. |
| 2007/0185434 A1 | 8/2007 | Denisart et al. |
| 2007/0186784 A1 | 8/2007 | Liverani et al. |
| 2007/0203587 A1 | 8/2007 | Erlandsson et al. |
| 2007/0210120 A1 | 9/2007 | Kirschner |
| 2007/0221066 A1 | 9/2007 | Sullivan et al. |
| 2007/0221069 A1 | 9/2007 | Ralm et al. |
| 2007/0224328 A1 | 9/2007 | Sweeney et al. |
| 2007/0246478 A1 | 10/2007 | Jarisch et al. |
| 2007/0246480 A1 | 10/2007 | Jarisch et al. |
| 2007/0248734 A1 | 10/2007 | Denisart et al. |
| 2007/0259073 A1 | 11/2007 | Scarchilli et al. |
| 2007/0259074 A1 | 11/2007 | Searchilli et al. |
| 2007/0289453 A1 | 12/2007 | Halliday et al. |
| 2007/0292584 A1 | 12/2007 | Arrick et al. |
| 2007/0295220 A1 | 12/2007 | Webster et al. |
| 2008/0020115 A1 | 1/2008 | Guerrero et al. |
| 2008/0028946 A1 | 2/2008 | Kirschner et al. |
| 2008/0028948 A1 | 2/2008 | Kirschner et al. |
| 2008/0038441 A1 | 2/2008 | Kirschner |
| 2008/0041232 A1 | 2/2008 | Fai et al. |
| 2008/0041236 A1 | 2/2008 | Raouf et al. |
| 2008/0050490 A1 | 2/2008 | Stalder et al. |
| 2008/0057171 A1 | 3/2008 | Albrecht |
| 2008/0095904 A1 | 4/2008 | Sullivan et al. |
| 2008/0105130 A1 | 5/2008 | Koeling et al. |
| 2008/0105711 A1 | 5/2008 | Kirimli et al. |
| 2008/0115674 A1 | 5/2008 | Huang et al. |
| 2008/0121111 A1 | 5/2008 | Paget et al. |
| 2008/0134902 A1 | 6/2008 | Zimmerman et al. |
| 2008/0143954 A1 | 6/2008 | Abreu et al. |
| 2008/0144854 A1 | 6/2008 | Abreu |
| 2008/0148948 A1 | 6/2008 | Evers et al. |
| 2008/0160153 A1 | 7/2008 | Hestekin et al. |
| 2008/0173705 A1 | 7/2008 | Girard et al. |
| 2008/0187638 A1 | 8/2008 | Hansen |
| 2008/0196593 A1 | 8/2008 | Shrader et al. |
| 2008/0223217 A1 | 9/2008 | Teller et al. |
| 2008/0260928 A1 | 10/2008 | Macmahon et al. |
| 2008/0276807 A1 | 11/2008 | Righetti et al. |
| 2008/0302123 A1 | 12/2008 | Mitchell et al. |
| 2008/0317931 A1 | 12/2008 | Mandralis et al. |
| 2009/0004335 A1 | 1/2009 | Macmahon et al. |
| 2009/0007792 A1 | 1/2009 | Glucksman et al. |
| 2009/0007793 A1 | 1/2009 | Glucksman et al. |
| 2009/0057341 A1 | 3/2009 | Girard et al. |
| 2009/0095164 A1 | 4/2009 | Celeste |
| 2009/0095369 A1 | 4/2009 | Murray |
| 2009/0101020 A1 | 4/2009 | Webster et al. |
| 2009/0104312 A1 | 4/2009 | Kamarei et al. |
| 2009/0117249 A1 | 5/2009 | Ozanne et al. |
| 2009/0136639 A1 | 5/2009 | Majer |
| 2009/0155422 A1 | 6/2009 | Ozanne |
| 2009/0158938 A1 | 6/2009 | Jarisch et al. |
| 2009/0165655 A1 | 7/2009 | Aonuma |
| 2009/0175986 A1 | 7/2009 | Majer |
| 2009/0178570 A1 | 7/2009 | Minard et al. |
| 2009/0183640 A1 | 7/2009 | Ozanne |
| 2009/0211456 A1 | 8/2009 | De Graaff et al. |
| 2009/0211458 A1 | 8/2009 | Denisart et al. |
| 2009/0217823 A1 | 9/2009 | De Graaff et al. |
| 2009/0220650 A1 | 9/2009 | Ozanne |
| 2009/0220668 A1 | 9/2009 | Gao et al. |
| 2009/0223373 A1 | 9/2009 | Kollep et al. |
| 2009/0223375 A1 | 9/2009 | Verbeek |
| 2009/0229470 A1 | 9/2009 | Dorfmueller |
| 2009/0232944 A1 | 9/2009 | Macmahon et al. |
| 2009/0235825 A1 | 9/2009 | De Graaff et al. |
| 2009/0241782 A1 | 10/2009 | Van Dillen et al. |

(56) References Cited

U.S. PATENT DOCUMENTS

| | | |
|---|---|---|
| 2009/0255410 A1 | 10/2009 | Jarisch et al. |
| 2009/0263545 A1 | 10/2009 | Ozanne |
| 2009/0272274 A1 | 11/2009 | De Graaff et al. |
| 2009/0272275 A1 | 11/2009 | De Graaff et al. |
| 2009/0280219 A1 | 11/2009 | Yoakim et al. |
| 2009/0282987 A1 | 11/2009 | Macmahon et al. |
| 2009/0293530 A1 | 12/2009 | Van Dillen et al. |
| 2009/0293733 A1 | 12/2009 | Martin et al. |
| 2009/0293735 A1 | 12/2009 | Van Dillen et al. |
| 2009/0293736 A1 | 12/2009 | Jarisch |
| 2009/0308258 A1 | 12/2009 | Boussemart et al. |
| 2009/0320693 A1 | 12/2009 | Ozanne |
| 2010/0003371 A1 | 1/2010 | Ozanne et al. |
| 2010/0005973 A1 | 1/2010 | Maier |
| 2010/0015289 A1 | 1/2010 | Sweeney et al. |
| 2010/0018406 A1 | 1/2010 | Koopman et al. |
| 2010/0021604 A1 | 1/2010 | Roulin et al. |
| 2010/0028495 A1 | 2/2010 | Novak et al. |
| 2010/0031825 A1 | 2/2010 | Kemp |
| 2010/0034929 A1 | 2/2010 | Dogan et al. |
| 2010/0037779 A1 | 2/2010 | Pecci et al. |
| 2010/0038380 A1 | 2/2010 | Compton |
| 2010/0043644 A1 | 2/2010 | Liverani et al. |
| 2010/0043645 A1 | 2/2010 | Liverani et al. |
| 2010/0043646 A1 | 2/2010 | Liverani et al. |
| 2010/0055252 A1 | 3/2010 | Marina et al. |
| 2010/0068354 A1 | 3/2010 | Roberson et al. |
| 2010/0071563 A1 | 3/2010 | Ryser et al. |
| 2010/0078446 A1 | 4/2010 | Halliday et al. |
| 2010/0083843 A1 | 4/2010 | Denisart et al. |
| 2010/0089944 A1 | 4/2010 | Girard et al. |
| 2010/0101428 A1 | 4/2010 | Fin |
| 2010/0102051 A1 | 4/2010 | Ebrom et al. |
| 2010/0102076 A1 | 4/2010 | Hendrickson et al. |
| 2010/0102082 A1 | 4/2010 | Ebrom et al. |
| 2010/0106265 A1 | 4/2010 | Ebrom et al. |
| 2010/0107887 A1 | 5/2010 | Bentley et al. |
| 2010/0107889 A1 | 5/2010 | Denisart et al. |
| 2010/0112166 A1 | 5/2010 | Levin |
| 2010/0015465 A1 | 6/2010 | Skalski et al. |
| 2010/0132564 A1 | 6/2010 | Ozanne et al. |
| 2010/0133297 A1 | 6/2010 | Arett et al. |
| 2010/0136183 A1 | 6/2010 | Gonus et al. |
| 2010/0139496 A1 | 6/2010 | Santoiemmo |
| 2010/0143549 A1 | 6/2010 | Hovt et al. |
| 2010/0154459 A1 | 6/2010 | Skalski et al. |
| 2010/0154644 A1 | 6/2010 | Skalski et al. |
| 2010/0154647 A1 | 6/2010 | Skalski et al. |
| 2010/0154649 A1 | 6/2010 | Skalski et al. |
| 2010/0154892 A1 | 6/2010 | Skalski et al. |
| 2010/0154906 A1 | 6/2010 | Skalski et al. |
| 2010/0159077 A1 | 6/2010 | Skalski et al. |
| 2010/0159078 A1 | 6/2010 | Skalski et al. |
| 2010/0161082 A1 | 6/2010 | Ebrom et al. |
| 2010/0170402 A1 | 7/2010 | Kirschner |
| 2010/0173053 A1 | 7/2010 | Ryser et al. |
| 2010/0173056 A1 | 7/2010 | Yoakim et al. |
| 2010/0178391 A1 | 7/2010 | Macmahon et al. |
| 2010/0178392 A1 | 7/2010 | Yoakim et al. |
| 2010/0178404 A1 | 7/2010 | Yoakim et al. |
| 2010/0186597 A1 | 7/2010 | Kernkamp et al. |
| 2010/0196545 A1 | 8/2010 | Buffet et al. |
| 2010/0218462 A1 | 9/2010 | Murray |
| 2010/0239717 A1 | 9/2010 | Yoakim et al. |
| 2010/0239733 A1 | 9/2010 | Yoakim et al. |
| 2010/0239734 A1 | 9/2010 | Yoakim et al. |
| 2010/0251901 A1 | 10/2010 | Santoiemmo |
| 2010/0260908 A1 | 10/2010 | Denisart et al. |
| 2010/0263545 A1 | 10/2010 | Morgan et al. |
| 2010/0263546 A1 | 10/2010 | Leuzinger et al. |
| 2010/0269706 A1 | 10/2010 | Denisart et al. |
| 2010/0275787 A1 | 11/2010 | Bonacci et al. |
| 2010/0282090 A1 | 11/2010 | Etter et al. |
| 2010/0288131 A1 | 11/2010 | Kilber et al. |
| 2010/0288132 A1 | 11/2010 | Gavillet et al. |
| 2010/0297299 A1 | 11/2010 | Epars et al. |
| 2010/0300299 A1 | 12/2010 | Epars et al. |
| 2010/0303964 A1 | 12/2010 | Beaulieu et al. |
| 2010/0307930 A1 | 12/2010 | Zangerle |
| 2010/0320225 A1 | 12/2010 | Kirschner |
| 2010/0326283 A1 | 12/2010 | Evers et al. |
| 2011/0000378 A1 | 1/2011 | Albrecht |
| 2011/0003038 A1 | 1/2011 | Colantonio et al. |
| 2011/0003040 A1 | 1/2011 | Graf et al. |
| 2011/0005399 A1 | 1/2011 | Epars et al. |
| 2011/0011271 A1 | 1/2011 | Kollep et al. |
| 2011/0017072 A1 | 1/2011 | Frigeri et al. |
| 2011/0020497 A1 | 1/2011 | Steven et al. |
| 2011/0020500 A1 | 1/2011 | Eichler et al. |
| 2011/0020508 A1 | 1/2011 | Santoiemmo |
| 2011/0027436 A1 | 2/2011 | Huynh-Ba et al. |
| 2011/0030732 A1 | 2/2011 | Boussemart |
| 2011/0036244 A1 | 2/2011 | Chatteriee et al. |
| 2011/0041698 A1 | 2/2011 | Mori |
| 2011/0041699 A1 | 2/2011 | Hale |
| 2011/0041700 A1 | 2/2011 | Epars et al. |
| 2011/0041701 A1 | 2/2011 | Chatterjee et al. |
| 2011/0045144 A1 | 2/2011 | Boussemart et al. |
| 2011/0051982 A1 | 3/2011 | Abreu et al. |
| 2011/0052773 A1 | 3/2011 | Denisart et al. |
| 2011/0056385 A1 | 3/2011 | McLean et al. |
| 2011/0070348 A1 | 3/2011 | Burton-Wilcock et al. |
| 2011/0076361 A1 | 3/2011 | Peterson et al. |
| 2011/0079551 A1 | 4/2011 | Olson et al. |
| 2011/0081455 A1 | 4/2011 | Kamarei et al. |
| 2011/0100228 A1 | 5/2011 | Rivera |
| 2011/0100229 A1 | 5/2011 | Rivera |
| 2011/0113969 A1 | 5/2011 | Rivera |
| 2011/0151075 A1 | 6/2011 | Peterson |
| 2011/0162530 A1 | 7/2011 | Castellani |
| 2011/0162532 A1 | 7/2011 | Gilbert et al. |
| 2011/0166910 A1 | 7/2011 | Marina et al. |
| 2011/0168029 A1 | 7/2011 | Fulco |
| 2011/0185910 A1 | 8/2011 | Ryser et al. |
| 2011/0185911 A1 | 8/2011 | Raooarini |
| 2011/0186450 A1 | 8/2011 | Bonacci |
| 2011/0189373 A1 | 8/2011 | Beeson et al. |
| 2011/0200725 A1 | 8/2011 | Kollep et al. |
| 2011/0200726 A1 | 8/2011 | Tinkler et al. |
| 2011/0210140 A1 | 9/2011 | Girard et al. |
| 2011/0226343 A1 | 9/2011 | Novak et al. |
| 2011/0236541 A1 | 9/2011 | Gerbaulet et al. |
| 2011/0243483 A1 | 10/2011 | Crump et al. |
| 2011/0244085 A1 | 10/2011 | Crump et al. |
| 2011/0244108 A1 | 10/2011 | Rabin |
| 2011/0250333 A1 | 10/2011 | Ozanne |
| 2011/0259204 A1 | 10/2011 | Kaeser et al. |
| 2011/0259205 A1 | 10/2011 | Delorme |
| 2011/0262597 A1 | 10/2011 | Kirschner et al. |
| 2011/0262601 A1 | 10/2011 | Manser et al. |
| 2011/0265658 A1 | 11/2011 | Talon et al. |
| 2011/0274794 A1 | 11/2011 | Gerbaulet et al. |
| 2011/0274802 A1 | 11/2011 | Rivera |
| 2011/0278207 A1 | 11/2011 | Swain |
| 2011/0293800 A1 | 12/2011 | Sher et al. |
| 2011/0300276 A1 | 12/2011 | Ozanne |
| 2011/0303095 A1 | 12/2011 | Fu et al. |
| 2011/0305801 A1 | 12/2011 | Beer |
| 2011/0305807 A1 | 12/2011 | Koeling et al. |
| 2011/0315021 A1 | 12/2011 | Eichler et al. |
| 2012/0009304 A1 | 1/2012 | Perentes et al. |
| 2012/0015080 A1 | 1/2012 | Roulin et al. |
| 2012/0015081 A1 | 1/2012 | Crump et al. |
| 2012/0024160 A1 | 2/2012 | van Os et al. |
| 2012/0031281 A1 | 2/2012 | Denisart et al. |
| 2012/0040064 A1 | 2/2012 | Albrecht |
| 2012/0052159 A1 | 3/2012 | Doleac et al. |
| 2012/0052163 A1 | 3/2012 | Doleac et al. |
| 2012/0052164 A1 | 3/2012 | Doleac et al. |
| 2012/0055342 A1 | 3/2012 | Traitler et al. |
| 2012/0058226 A1 | 3/2012 | Winkler et al. |
| 2012/0060697 A1 | 3/2012 | Ozanne |
| 2012/0060698 A1 | 3/2012 | Baldo et al. |
| 2012/0067222 A1 | 3/2012 | Beutlrock et al. |

(56) References Cited

U.S. PATENT DOCUMENTS

| | | |
|---|---|---|
| 2012/0067223 A1 | 3/2012 | Vuagniaux et al. |
| 2012/0070542 A1 | 3/2012 | Camera et al. |
| 2012/0093990 A1 | 4/2012 | Shrader et al. |
| 2012/0097041 A1 | 4/2012 | Bucher et al. |
| 2012/0097602 A1 | 4/2012 | Tedford et al. |
| 2012/0098526 A1 | 4/2012 | Bucher et al. |
| 2012/0100264 A1 | 4/2012 | Bucher et al. |
| 2012/0102999 A1 | 5/2012 | Anselmino et al. |
| 2012/0104023 A1 | 5/2012 | Anselmino et al. |
| 2012/0104025 A1 | 5/2012 | Anselmino et al. |
| 2012/0107463 A1 | 5/2012 | Santoiemmo |
| 2012/0121764 A1 | 5/2012 | Lai et al. |
| 2012/0121768 A1 | 5/2012 | Lai et al. |
| 2012/0121769 A1 | 5/2012 | Castellani et al. |
| 2012/0121779 A1 | 5/2012 | Lai et al. |
| 2012/0121780 A1 | 5/2012 | Lai et al. |
| 2012/0128847 A1 | 5/2012 | Skalski et al. |
| 2012/0128855 A1 | 5/2012 | Skalski et al. |
| 2012/0148721 A1 | 6/2012 | Halliday et al. |
| 2012/0160927 A1 | 6/2012 | Cerveny et al. |
| 2012/0171332 A1 | 7/2012 | Lai et al. |
| 2012/0171333 A1 | 7/2012 | Crump et al. |
| 2012/0171334 A1 | 7/2012 | Yoakim et al. |
| 2012/0177794 A1 | 7/2012 | Hansen |
| 2012/0180516 A1 | 7/2012 | Skalski et al. |
| 2012/0180670 A1 | 7/2012 | Yoakim et al. |
| 2012/0180789 A1 | 7/2012 | Tobia et al. |
| 2012/0183657 A1 | 7/2012 | Marina et al. |
| 2012/0183659 A1 | 7/2012 | Hulett et al. |
| 2012/0186293 A1 | 7/2012 | Skalski et al. |
| 2012/0189740 A1 | 7/2012 | Ozanne et al. |
| 2012/0199007 A1 | 8/2012 | Larzul et al. |
| 2012/0199227 A1 | 8/2012 | Manser et al. |
| 2012/0207894 A1 | 8/2012 | Webster et al. |
| 2012/0207895 A1 | 8/2012 | Rivera |
| 2012/0207896 A1 | 8/2012 | Rivera |
| 2012/0210876 A1 | 8/2012 | Glucksman et al. |
| 2012/0219686 A1 | 8/2012 | Bombeck et al. |
| 2012/0225168 A1 | 9/2012 | Kamerbeek et al. |
| 2012/0231126 A1 | 9/2012 | Lo Faro et al. |
| 2012/0231134 A1 | 9/2012 | Gonen |
| 2012/0240778 A1 | 9/2012 | Agon et al. |
| 2012/0240779 A1 | 9/2012 | Perentes et al. |
| 2012/0240780 A1 | 9/2012 | Delbreil et al. |
| 2012/0245732 A1 | 9/2012 | Yoakim |
| 2012/0251677 A1 | 10/2012 | Yoakim et al. |
| 2012/0251694 A1 | 10/2012 | Kamerbeek et al. |
| 2012/0255448 A1 | 10/2012 | Ozanne et al. |
| 2012/0260805 A1 | 10/2012 | Ozanne et al. |
| 2012/0263831 A1 | 10/2012 | Skalski et al. |
| 2012/0266755 A1 | 10/2012 | Baudet et al. |
| 2012/0276252 A1 | 11/2012 | Bunke et al. |
| 2012/0276255 A1 | 11/2012 | Verbeek |
| 2012/0276264 A1 | 11/2012 | Rivera |
| 2012/0285331 A1 | 11/2012 | Mori et al. |
| 2012/0292790 A1 | 11/2012 | Tatera |
| 2012/0294996 A1 | 11/2012 | Crump |
| 2012/0295234 A1 | 11/2012 | Rognon et al. |
| 2012/0298594 A1 | 11/2012 | Skalski et al. |
| 2012/0301581 A1 | 11/2012 | Abegglen et al. |
| 2012/0308688 A1 | 12/2012 | Peterson et al. |
| 2012/0308691 A1 | 12/2012 | Alvarez et al. |
| 2012/0312174 A1 | 12/2012 | Lambert |
| 2012/0312729 A1 | 12/2012 | Van Dillen et al. |
| 2012/0321756 A1 | 12/2012 | Estabrook et al. |
| 2013/0001251 A1 | 1/2013 | Mori |
| 2013/0001253 A1 | 1/2013 | Skalski et al. |
| 2013/0002108 A1 | 1/2013 | Girard et al. |
| 2013/0008520 A1 | 1/2013 | Skalski et al. |
| 2013/0011521 A1 | 1/2013 | Weiiers et al. |
| 2013/0011542 A1 | 1/2013 | Skalski et al. |
| 2013/0014647 A1 | 1/2013 | Mori et al. |
| 2013/0014648 A1 | 1/2013 | Rognon et al. |
| 2013/0017303 A1 | 1/2013 | Vu |
| 2013/0025465 A1 | 1/2013 | Schnyder |
| 2013/0025466 A1 | 1/2013 | Fu et al. |
| 2013/0032034 A1 | 2/2013 | Jarisch et al. |
| 2013/0041501 A1 | 2/2013 | Crisp |
| 2013/0043174 A1 | 2/2013 | Swain |
| 2013/0043304 A1 | 2/2013 | Agon et al. |
| 2013/0047863 A1 | 2/2013 | Larzul et al. |
| 2013/0061764 A1 | 3/2013 | Rivera |
| 2013/0062366 A1 | 3/2013 | Tansey |
| 2013/0064929 A1 | 3/2013 | Jarisch et al. |
| 2013/0064937 A1 | 3/2013 | Jarisch et al. |
| 2013/0064948 A1 | 3/2013 | Ozanne et al. |
| 2013/0068108 A1 | 3/2013 | Rivera |
| 2013/0068109 A1 | 3/2013 | Pribus et al. |
| 2013/0071532 A1 | 3/2013 | Pribus et al. |
| 2013/0089645 A1 | 4/2013 | Leung et al. |
| 2013/0095214 A1 | 4/2013 | Ozanne et al. |
| 2013/0095218 A1 | 4/2013 | De Graaff et al. |
| 2013/0095219 A1 | 4/2013 | De Graaff et al. |
| 2013/0099597 A1 | 4/2013 | Perentes et al. |
| 2013/0101715 A1 | 4/2013 | Geissler et al. |
| 2013/0101716 A1 | 4/2013 | Beaulieu et al. |
| 2013/0101717 A1 | 4/2013 | De Graaff et al. |
| 2013/0108752 A1 | 5/2013 | Kollep et al. |
| 2013/0108756 A1 | 5/2013 | Gonus et al. |
| 2013/0114089 A1 | 5/2013 | Jarisch et al. |
| 2013/0115340 A1 | 5/2013 | Doleac et al. |
| 2013/0115342 A1 | 5/2013 | van Os et al. |
| 2013/0115350 A1 | 5/2013 | Maier |
| 2013/0115351 A1 | 5/2013 | van Os et al. |
| 2013/0118360 A1 | 5/2013 | Dogan et al. |
| 2013/0122157 A1 | 5/2013 | Dogan et al. |
| 2013/0122167 A1 | 5/2013 | Winkler et al. |
| 2013/0125762 A1 | 5/2013 | Dogan et al. |
| 2013/0129870 A1 | 5/2013 | Novak et al. |
| 2013/0133522 A1 | 5/2013 | Denisart et al. |
| 2013/0133524 A1 | 5/2013 | Vastardis et al. |
| 2013/0133525 A1 | 5/2013 | Blanc et al. |
| 2013/0136833 A1 | 5/2013 | Vastardis et al. |
| 2013/0139699 A1 | 6/2013 | Rivera |
| 2013/0139700 A1 | 6/2013 | Fabozzi et al. |
| 2013/0142929 A1 | 6/2013 | Ozanne et al. |
| 2013/0152797 A1 | 6/2013 | Mori |
| 2013/0156897 A1 | 6/2013 | Goldstein |
| 2013/0156903 A1 | 6/2013 | Bombeck et al. |
| 2013/0164416 A1 | 6/2013 | Halliday et al. |
| 2013/0167728 A1 | 7/2013 | Mori |
| 2013/0167732 A1 | 7/2013 | Petersen |
| 2013/0167733 A1 | 7/2013 | Mahlich |
| 2013/0171311 A1 | 7/2013 | Clark |
| 2013/0171320 A1 | 7/2013 | Scholvinck et al. |
| 2013/0174743 A1 | 7/2013 | Kelly et al. |
| 2013/0174744 A1 | 7/2013 | Etter |
| 2013/0177677 A1 | 7/2013 | Ozanne et al. |
| 2013/0180408 A1 | 7/2013 | Eichler et al. |
| 2013/0180409 A1 | 7/2013 | Dogan et al. |
| 2013/0183130 A1 | 7/2013 | Etter |
| 2013/0186046 A1 | 7/2013 | Magniet et al. |
| 2013/0189400 A1 | 7/2013 | Pribus et al. |
| 2013/0192472 A1 | 8/2013 | Skalski et al. |
| 2013/0199378 A1 | 8/2013 | Yoakim et al. |
| 2013/0206011 A1 | 8/2013 | Ozanne et al. |
| 2013/0209619 A1 | 8/2013 | Mahlich |
| 2013/0209620 A1 | 8/2013 | Ozanne et al. |
| 2013/0209636 A1 | 8/2013 | Cominelli et al. |
| 2013/0216663 A1 | 8/2013 | Dogan et al. |
| 2013/0220137 A1 | 8/2013 | Bombeck et al. |
| 2013/0220139 A1 | 8/2013 | Skalski et al. |
| 2013/0233177 A1 | 9/2013 | Lambert |
| 2013/0233180 A1 | 9/2013 | Belmont |
| 2013/0233422 A1 | 9/2013 | Skalski et al. |
| 2013/0236618 A1 | 9/2013 | Tinkler et al. |
| 2013/0243911 A1 | 9/2013 | Abegglen et al. |
| 2013/0243919 A1 | 9/2013 | Shrader et al. |
| 2013/0247771 A1 | 9/2013 | Maisch |
| 2013/0247773 A1 | 9/2013 | Kristlbauer |
| 2013/0259982 A1 | 10/2013 | Abegglen et al. |
| 2013/0263423 A1 | 10/2013 | Clark |
| 2013/0263745 A1 | 10/2013 | Bombeck et al. |
| 2013/0264228 A1 | 10/2013 | Kollep et al. |

(56) References Cited

U.S. PATENT DOCUMENTS

| | | |
|---|---|---|
| 2013/0269535 A1 | 10/2013 | Colantonio et al. |
| 2013/0269536 A1 | 10/2013 | Gavillet et al. |
| 2013/0273210 A1 | 10/2013 | Sweeney et al. |
| 2013/0273215 A1 | 10/2013 | Skalski et al. |
| 2013/0276635 A1 | 10/2013 | Favero et al. |
| 2013/0276636 A1 | 10/2013 | Rithener et al. |
| 2013/0287914 A1 | 10/2013 | Fragniere |
| 2013/0291737 A1 | 11/2013 | Sims |
| 2013/0292404 A1 | 11/2013 | Jarisch et al. |
| 2013/0302476 A1 | 11/2013 | Abegglen et al. |
| 2013/0305932 A1 | 11/2013 | Epars et al. |
| 2013/0309364 A1 | 11/2013 | Gerbaulet et al. |
| 2013/0309371 A1 | 11/2013 | Abegglen et al. |
| 2013/0312619 A1 | 11/2013 | Spiegel et al. |
| 2013/0323366 A1 | 12/2013 | Gerbaulet et al. |
| 2013/0323370 A1 | 12/2013 | Gerbaulet et al. |
| 2013/0323371 A1 | 12/2013 | Kutcher et al. |
| 2013/0327222 A1 | 12/2013 | Mahlich |
| 2013/0333575 A1 | 12/2013 | Kamerbeek et al. |
| 2013/0340626 A1 | 12/2013 | Oh |
| 2013/0344205 A1 | 12/2013 | Oh |
| 2013/0344206 A1 | 12/2013 | Yoakim et al. |
| 2014/0000657 A1 | 1/2014 | Boussemart |
| 2014/0004231 A1 | 1/2014 | Norton et al. |
| 2014/0007776 A1 | 1/2014 | Mori et al. |
| 2014/0010916 A1 | 1/2014 | Pibarot et al. |
| 2014/0013958 A1 | 1/2014 | Krasne et al. |
| 2014/0020563 A1 | 1/2014 | Etter et al. |
| 2014/0022044 A1 | 1/2014 | Etter et al. |
| 2014/0023754 A1 | 1/2014 | Abegglen et al. |
| 2014/0023764 A1 | 1/2014 | Denisart et al. |
| 2014/0023765 A1 | 1/2014 | Ozanne et al. |
| 2014/0023766 A1 | 1/2014 | Ozanne et al. |
| 2014/0026759 A1 | 1/2014 | Etter et al. |
| 2014/0030404 A1 | 1/2014 | Sullivan et al. |
| 2014/0033927 A1 | 2/2014 | Hale |
| 2014/0037794 A1 | 2/2014 | Patera et al. |
| 2014/0037803 A1 | 2/2014 | Hansen |
| 2014/0053733 A1 | 2/2014 | Etter et al. |
| 2014/0053735 A1 | 2/2014 | Verbeek |
| 2014/0057033 A1 | 2/2014 | Lai et al. |
| 2014/0061238 A1 | 3/2014 | Olson et al. |
| 2014/0065266 A1 | 3/2014 | Shalev |
| 2014/0069281 A1 | 3/2014 | Ryser et al. |
| 2014/0072678 A1 | 3/2014 | Jenkins |
| 2014/0076167 A1 | 3/2014 | Boggavarapu |
| 2014/0076170 A1 | 3/2014 | Epars et al. |
| 2014/0079853 A1 | 3/2014 | Hansen |
| 2014/0079854 A1 | 3/2014 | Vastardis |
| 2014/0109772 A1 | 4/2014 | Denisart et al. |
| 2014/0113045 A1 | 4/2014 | Njaastad et al. |
| 2014/0120217 A1 | 5/2014 | O'Brien et al. |
| 2014/0120218 A1 | 5/2014 | O'Brien et al. |
| 2014/0120223 A1 | 5/2014 | Boubeddi et al. |
| 2014/0123859 A1 | 5/2014 | Verbeek |
| 2014/0137747 A1 | 5/2014 | Verbeek |
| 2014/0137748 A1 | 5/2014 | Perentes et al. |
| 2014/0141128 A1 | 5/2014 | Trombetta et al. |
| 2014/0141133 A1 | 5/2014 | Halliday et al. |
| 2014/0141142 A1 | 5/2014 | Cominelli et al. |
| 2014/0150665 A1 | 6/2014 | Pearson et al. |
| 2014/0150669 A1 | 6/2014 | Green et al. |
| 2014/0150670 A1 | 6/2014 | Green et al. |
| 2014/0154368 A1 | 6/2014 | Kolls et al. |
| 2014/0154369 A1 | 6/2014 | Kolls |
| 2014/0154380 A1 | 6/2014 | Brown et al. |
| 2014/0154382 A1 | 6/2014 | Green et al. |
| 2014/0154391 A1 | 6/2014 | Mehta et al. |
| 2014/0161940 A1 | 6/2014 | Aviles et al. |
| 2014/0166686 A1 | 6/2014 | Righetti |
| 2014/0170278 A1 | 6/2014 | Perentes et al. |
| 2014/0170279 A1 | 6/2014 | Kolls et al. |
| 2014/0174300 A1 | 6/2014 | Husband et al. |
| 2014/0178538 A1 | 6/2014 | Husband et al. |
| 2014/0178546 A1 | 6/2014 | Besson et al. |
| 2014/0186498 A1 | 7/2014 | Dogan et al. |
| 2014/0190863 A1 | 7/2014 | Fabozzi et al. |
| 2014/0199443 A1 | 7/2014 | Norton et al. |
| 2014/0199452 A1 | 7/2014 | Skalski et al. |
| 2014/0208951 A1 | 7/2014 | Yui |
| 2014/0208953 A1 | 7/2014 | Yui et al. |
| 2014/0212556 A1 | 7/2014 | Larzul et al. |
| 2014/0224130 A1 | 8/2014 | Castellani et al. |
| 2014/0227414 A1 | 8/2014 | Perentes et al. |
| 2014/0238245 A1 | 8/2014 | Yui et al. |
| 2014/0238247 A1 | 8/2014 | Ergican et al. |
| 2014/0242221 A1 | 8/2014 | Sweeney et al. |
| 2014/0242239 A1 | 8/2014 | Boggavarapu |
| 2014/0245893 A1 | 9/2014 | Vu |
| 2014/0245894 A1 | 9/2014 | Buhler et al. |
| 2014/0252093 A1 | 9/2014 | Jarisch et al. |
| 2014/0255573 A1 | 9/2014 | Larzul et al. |
| 2014/0260999 A1 | 9/2014 | Cardonick et al. |
| 2014/0261000 A1 | 9/2014 | Weflen |
| 2014/0263033 A1 | 9/2014 | Fu et al. |
| 2014/0263398 A1 | 9/2014 | Swerchesky et al. |
| 2014/0263432 A1 | 9/2014 | Jacobs et al. |
| 2014/0271791 A1 | 9/2014 | Mishra et al. |
| 2014/0272016 A1 | 9/2014 | Nowak |
| 2014/0272019 A1 | 9/2014 | Schuh et al. |
| 2014/0272048 A1 | 9/2014 | Hristov et al. |
| 2014/0272076 A1 | 9/2014 | Nevin et al. |
| 2014/0287116 A1 | 9/2014 | Mack |
| 2014/0287117 A1 | 9/2014 | York et al. |
| 2014/0290030 A1 | 10/2014 | Albrecht |
| 2014/0290493 A1 | 10/2014 | Rivera |
| 2014/0291426 A1 | 10/2014 | Herbert |
| 2014/0295032 A1 | 10/2014 | Magri et al. |
| 2014/0299000 A1 | 10/2014 | Hanneson et al. |
| 2014/0302204 A1 | 10/2014 | Evers et al. |
| 2014/0305314 A1 | 10/2014 | Perentes et al. |
| 2014/0305315 A1 | 10/2014 | Perentes et al. |
| 2014/0308406 A1 | 10/2014 | O'Brien et al. |
| 2014/0311353 A1 | 10/2014 | McLean et al. |
| 2014/0314919 A1 | 10/2014 | Perentes et al. |
| 2014/0318379 A1 | 10/2014 | Perentes et al. |
| 2014/0322409 A1 | 10/2014 | Kirschner et al. |
| 2014/0326142 A1 | 11/2014 | Etter et al. |
| 2014/0326144 A1 | 11/2014 | Novak et al. |
| 2014/0326361 A1 | 11/2014 | Larzul et al. |
| 2014/0326750 A1 | 11/2014 | Marina et al. |
| 2014/0328977 A1 | 11/2014 | Nordqvist et al. |
| 2014/0328980 A1 | 11/2014 | Novak et al. |
| 2014/0331867 A1 | 11/2014 | Novak et al. |
| 2014/0331868 A1 | 11/2014 | Novak et al. |
| 2014/0335239 A1 | 11/2014 | Novak et al. |
| 2014/0338541 A1 | 11/2014 | Jaccard et al. |
| 2014/0338542 A1 | 11/2014 | Smith et al. |
| 2014/0338543 A1 | 11/2014 | Smith et al. |
| 2014/0340078 A1 | 11/2014 | Jarisch et al. |
| 2014/0342067 A1 | 11/2014 | Sullivan et al. |
| 2014/0342068 A1 | 11/2014 | Smith et al. |
| 2014/0342069 A1 | 11/2014 | Tinkler et al. |
| 2014/0345468 A1 | 11/2014 | Talon et al. |
| 2014/0345473 A1 | 11/2014 | Albritton |
| 2014/0345652 A1 | 11/2014 | Meng |
| 2014/0346188 A1 | 11/2014 | Girard et al. |
| 2014/0348984 A1 | 11/2014 | Zeller et al. |
| 2014/0352547 A1 | 12/2014 | Leuzinger et al. |
| 2014/0356500 A1 | 12/2014 | Baudet et al. |
| 2014/0360327 A1 | 12/2014 | Dingle et al. |
| 2014/0360377 A1 | 12/2014 | Yoakim et al. |
| 2014/0370161 A1 | 12/2014 | Abegglen et al. |
| 2014/0370163 A1 | 12/2014 | Estabrook et al. |
| 2014/0370181 A1 | 12/2014 | Young et al. |
| 2014/0373722 A1 | 12/2014 | Talon et al. |
| 2014/0373723 A1 | 12/2014 | Vestreli et al. |
| 2015/0004287 A1 | 1/2015 | Crump et al. |
| 2015/0004303 A1 | 1/2015 | Gaea et al. |
| 2015/0013279 A1 | 1/2015 | Swerchesky |
| 2015/0017288 A1 | 1/2015 | Lo Faro et al. |
| 2015/0017293 A1 | 1/2015 | Carr et al. |
| 2015/0017297 A1 | 1/2015 | Vastardis et al. |
| 2015/0027318 A1 | 1/2015 | Dogan et al. |

(56) References Cited

U.S. PATENT DOCUMENTS

| | | |
|---|---|---|
| 2015/0034127 A1 | 2/2015 | Talon et al. |
| 2015/0037470 A1 | 2/2015 | Zweed et al. |
| 2015/0037473 A1 | 2/2015 | Epars et al. |
| 2015/0040768 A1 | 2/2015 | Leuzinger et al. |
| 2015/0040769 A1 | 2/2015 | Righetti |
| 2015/0040770 A1 | 2/2015 | Mori |
| 2015/0040771 A1 | 2/2015 | Mori et al. |
| 2015/0047509 A1 | 2/2015 | Trombetta et al. |
| 2015/0050392 A1 | 2/2015 | Stonehouse et al. |
| 2015/0056331 A1 | 2/2015 | Rivera |
| 2015/0056343 A1 | 2/2015 | Mori et al. |
| 2015/0056352 A1 | 2/2015 | Dogan et al. |
| 2015/0059588 A1 | 3/2015 | Castellani |
| 2015/0059591 A1 | 3/2015 | Hale |
| 2015/0064324 A1 | 3/2015 | Oh |
| 2015/0068403 A1 | 3/2015 | Bentley et al. |
| 2015/0068404 A1 | 3/2015 | Rivera |
| 2015/0069088 A1 | 3/2015 | Olson et al. |
| 2015/0071025 A1 | 3/2015 | Herbert |
| 2015/0072049 A1 | 3/2015 | Oh |
| 2015/0072053 A1 | 3/2015 | Dogan et al. |
| 2015/0079240 A1 | 3/2015 | Lo Foro et al. |
| 2015/0079244 A1 | 3/2015 | Oh |
| 2015/0082989 A1 | 3/2015 | Besson et al. |
| 2015/0090300 A1 | 4/2015 | Dver |
| 2015/0093483 A1 | 4/2015 | Hulett et al. |
| 2015/0099045 A1 | 4/2015 | Perentes et al. |
| 2015/0104547 A1 | 4/2015 | Yauk et al. |
| 2015/0104550 A1 | 4/2015 | Oh |
| 2015/0107461 A1 | 4/2015 | Webster |
| 2015/0110929 A1 | 4/2015 | Camera et al. |
| 2015/0118367 A1 | 4/2015 | van Os et al. |
| 2015/0125576 A1 | 5/2015 | Dogan |
| 2015/0125586 A1 | 5/2015 | Ergican |
| 2015/0132445 A1 | 5/2015 | Perentes et al. |
| 2015/0135962 A1 | 5/2015 | Jarisch et al. |
| 2015/0135964 A1 | 5/2015 | De Graaff et al. |
| 2015/0135965 A1 | 5/2015 | Lo Foro et al. |
| 2015/0135967 A1 | 5/2015 | Hoffman et al. |
| 2015/0136718 A1 | 5/2015 | Sabouniian |
| 2015/0140182 A1 | 5/2015 | Dogan et al. |
| 2015/0143999 A1 | 5/2015 | Cross et al. |
| 2015/0144000 A1 | 5/2015 | Burton-Wilcock et al. |
| 2015/0144001 A1 | 5/2015 | Lo Foro et al. |
| 2015/0144002 A1 | 5/2015 | Tanner et al. |
| 2015/0144003 A1 | 5/2015 | Talon et al. |
| 2015/0144650 A1 | 5/2015 | Kline et al. |
| 2015/0144652 A1 | 5/2015 | Kline et al. |
| 2015/0144653 A1 | 5/2015 | Kline et al. |
| 2015/0147448 A1 | 5/2015 | Lo Foro et al. |
| 2015/0151905 A1 | 6/2015 | Yoakim et al. |
| 2015/0151956 A1 | 6/2015 | Tansey |
| 2015/0157165 A1 | 6/2015 | Talon |
| 2015/0157166 A1 | 6/2015 | van Os et al. |
| 2015/0157170 A1 | 6/2015 | Norton et al. |
| 2015/0164262 A1 | 6/2015 | Dingle et al. |
| 2015/0164263 A1 | 6/2015 | Cross et al. |
| 2015/0166257 A1 | 6/2015 | Trombetta |
| 2015/0166258 A1 | 6/2015 | Gmder |
| 2015/0173558 A1 | 6/2015 | Cross et al. |
| 2015/0173561 A1 | 6/2015 | Foster |
| 2015/0182060 A1 | 7/2015 | McLean et al. |
| 2015/0183577 A1 | 7/2015 | Talon et al. |
| 2015/0183627 A1 | 7/2015 | Tansey, Jr. |
| 2015/0191302 A1 | 7/2015 | Gerbaulet et al. |
| 2015/0196159 A1 | 7/2015 | Spiegel et al. |
| 2015/0201789 A1 | 7/2015 | Smith et al. |
| 2015/0201790 A1 | 7/2015 | Smith et al. |
| 2015/0201791 A1 | 7/2015 | Tinkler et al. |
| 2015/0203285 A1 | 7/2015 | Baldo |
| 2015/0216350 A1 | 8/2015 | Talon et al. |
| 2015/0216352 A1 | 8/2015 | Agon et al. |
| 2015/0217986 A1 | 8/2015 | Tansey, Jr. |
| 2015/0223631 A1 | 8/2015 | Bentley et al. |
| 2015/0223635 A1 | 8/2015 | Mulvaney |
| 2015/0225099 A1 | 8/2015 | Villain et al. |
| 2015/0225148 A1 | 8/2015 | Kaeser et al. |
| 2015/0225169 A1 | 8/2015 | Jarisch |
| 2015/0225221 A1 | 8/2015 | Wilder et al. |
| 2015/0230493 A1 | 8/2015 | Rodriguez et al. |
| 2015/0232263 A1 | 8/2015 | Talon |
| 2015/0238038 A1 | 8/2015 | Brinson et al. |
| 2015/0238043 A1 | 8/2015 | Agon et al. |
| 2015/0239653 A1 | 8/2015 | Dogan et al. |
| 2015/0239654 A1 | 8/2015 | Ayoub |
| 2015/0239723 A1 | 8/2015 | Anselmino et al. |
| 2015/0245733 A1 | 9/2015 | Castellani |
| 2015/0246741 A1 | 9/2015 | Hansen et al. |
| 2015/0246768 A1 | 9/2015 | Talon |
| 2015/0250214 A1 | 9/2015 | Massey et al. |
| 2015/0250347 A1 | 9/2015 | Fu et al. |
| 2015/0251143 A1 | 9/2015 | Shalev |
| 2015/0251847 A1 | 9/2015 | Talon |
| 2015/0257578 A1 | 9/2015 | Windler et al. |
| 2015/0257579 A1 | 9/2015 | Dammermann et al. |
| 2015/0257580 A1 | 9/2015 | Crarer et al. |
| 2015/0257582 A1 | 9/2015 | Oh |
| 2015/0257585 A1 | 9/2015 | Windler et al. |
| 2015/0257586 A1 | 9/2015 | DiNucci et al. |
| 2015/0265091 A1 | 9/2015 | Flick et al. |
| 2015/0266665 A1 | 9/2015 | Flick |
| 2015/0272373 A1 | 10/2015 | Pirone |
| 2015/0272374 A1 | 10/2015 | Kollep et al. |
| 2015/0272375 A1 | 10/2015 | Flick et al. |
| 2015/0272376 A1 | 10/2015 | Flick et al. |
| 2015/0272379 A1 | 10/2015 | Perentes et al. |
| 2015/0272380 A1 | 10/2015 | Flick |
| 2015/0272381 A1 | 10/2015 | Tanner |
| 2015/0282663 A1 | 10/2015 | Talon |
| 2015/0282664 A1 | 10/2015 | Savage et al. |
| 2015/0284179 A1 | 10/2015 | Kohli et al. |
| 2015/0289706 A1 | 10/2015 | Flick et al. |
| 2015/0289707 A1 | 10/2015 | Kaeser et al. |
| 2015/0289708 A1 | 10/2015 | Ezaz-Nikoay et al. |
| 2015/0289709 A1 | 10/2015 | Picozza et al. |
| 2015/0296827 A1 | 10/2015 | Cross et al. |
| 2015/0297017 A1 | 10/2015 | Zingg et al. |
| 2015/0314955 A1 | 11/2015 | Savage |
| 2015/0320254 A1 | 11/2015 | Perentes et al. |
| 2015/0320256 A1 | 11/2015 | Kollep |
| 2015/0321833 A1 | 11/2015 | Temple et al. |
| 2015/0327710 A1 | 11/2015 | Bachmann et al. |
| 2015/0327711 A1 | 11/2015 | Bachmann et al. |
| 2015/0327713 A1 | 11/2015 | Pruitt |
| 2015/0327717 A1 | 11/2015 | Burrows |
| 2015/0327718 A1 | 11/2015 | Burrows |
| 2015/0327719 A1 | 11/2015 | Burrows |
| 2015/0335193 A1 | 11/2015 | Jarisch et al. |
| 2015/0342213 A1 | 12/2015 | Dixey et al. |
| 2015/0342394 A1 | 12/2015 | Bonacci et al. |
| 2015/0344221 A1 | 12/2015 | Penner et al. |
| 2015/0344285 A1 | 12/2015 | Joseph |
| 2015/0352044 A1 | 12/2015 | Benson et al. |
| 2015/0353276 A1 | 12/2015 | Fisk et al. |
| 2015/0353335 A1 | 12/2015 | Breault |
| 2015/0353336 A1 | 12/2015 | Crisp |
| 2016/0106136 A1 | 4/2016 | Gordon et al. |
| 2019/0275478 A1 | 9/2019 | Jersey et al. |

FOREIGN PATENT DOCUMENTS

| | | |
|---|---|---|
| EP | 286723 A1 | 10/1988 |
| EP | 1761136 A1 | 3/2007 |
| EP | 1833310 B1 | 1/2010 |
| EP | 2549885 A2 | 1/2013 |
| EP | 1761136 B1 | 4/2014 |
| GB | 2408467 A | 6/2005 |
| JP | 2002143867 A | 5/2002 |
| JP | 2004176640 A | 6/2004 |
| JP | 2011173076 A | 9/2011 |
| RU | 2010543 C1 | 4/1994 |
| WO | WO1997037841 A1 | 10/1997 |
| WO | WO1997047556 A2 | 12/1997 |
| WO | WO1998051628 A1 | 11/1998 |

(56) References Cited

FOREIGN PATENT DOCUMENTS

| | | |
|---|---|---|
| WO | WO2000026638 A1 | 5/2000 |
| WO | WO2000042891 A1 | 7/2000 |
| WO | WO2001049154 A1 | 7/2001 |
| WO | WO2001058786 A1 | 8/2001 |
| WO | WO2001060219 A1 | 8/2001 |
| WO | WO2001060220 A1 | 8/2001 |
| WO | WO2001060712 A1 | 8/2001 |
| WO | WO2002024845 A2 | 3/2002 |
| WO | WO2002028241 A1 | 4/2002 |
| WO | WO2002049458 A1 | 6/2002 |
| WO | WO2002058522 A2 | 8/2002 |
| WO | WO2002074106 A1 | 9/2002 |
| WO | WO2002074143 A2 | 9/2002 |
| WO | WO2002080742 A2 | 10/2002 |
| WO | WO2002080743 A2 | 10/2002 |
| WO | WO2002080745 A1 | 10/2002 |
| WO | WO2002082961 A1 | 10/2002 |
| WO | WO2002082962 A1 | 10/2002 |
| WO | WO2002082963 A1 | 10/2002 |
| WO | WO2002085170 A2 | 10/2002 |
| WO | WO2003030696 A1 | 4/2003 |
| WO | WO2003065859 A2 | 8/2003 |
| WO | WO2003082065 A1 | 10/2003 |
| WO | WO2003101263 A1 | 12/2003 |
| WO | WO2004000027 A1 | 12/2003 |
| WO | WO2004/030438 A2 | 4/2004 |
| WO | WO2004026091 A1 | 4/2004 |
| WO | WO2004030499 A1 | 4/2004 |
| WO | WO2004030500 A1 | 4/2004 |
| WO | WO2004036509 A2 | 4/2004 |
| WO | WO2004041496 A1 | 5/2004 |
| WO | WO2004041656 A2 | 5/2004 |
| WO | WO2004052789 A2 | 6/2004 |
| WO | WO2004064582 A2 | 8/2004 |
| WO | WO2004064584 A1 | 8/2004 |
| WO | WO2004064585 A1 | 8/2004 |
| WO | WO2004065225 A2 | 8/2004 |
| WO | WO2004065256 A1 | 8/2004 |
| WO | WO2004065257 A1 | 8/2004 |
| WO | WO2004065258 A2 | 8/2004 |
| WO | WO2004065259 A1 | 8/2004 |
| WO | WO2004071259 A1 | 8/2004 |
| WO | WO2004078009 A2 | 9/2004 |
| WO | WO2004091305 A1 | 10/2004 |
| WO | WO2004110951 A1 | 12/2004 |
| WO | WO2004112514 A2 | 12/2004 |
| WO | WO2005004683 A1 | 1/2005 |
| WO | WO2005011394 A2 | 2/2005 |
| WO | WO2005011451 A2 | 2/2005 |
| WO | WO2005016094 A1 | 2/2005 |
| WO | WO2005018395 A1 | 3/2005 |
| WO | WO2005020768 A1 | 3/2005 |
| WO | WO2005020770 A2 | 3/2005 |
| WO | WO2005026018 A1 | 3/2005 |
| WO | WO2005054080 A1 | 6/2005 |
| WO | WO2005060800 A1 | 7/2005 |
| WO | WO2005060801 A1 | 7/2005 |
| WO | WO2005063091 A1 | 7/2005 |
| WO | WO2005063594 A2 | 7/2005 |
| WO | WO2005074768 A1 | 8/2005 |
| WO | WO2005077231 A1 | 8/2005 |
| WO | WO2005077232 A2 | 8/2005 |
| WO | WO2005077811 A2 | 8/2005 |
| WO | WO2005079361 A2 | 9/2005 |
| WO | WO2005079637 A1 | 9/2005 |
| WO | WO2005079638 A1 | 9/2005 |
| WO | WO2005079639 A2 | 9/2005 |
| WO | WO2005080222 A1 | 9/2005 |
| WO | WO2005080223 A1 | 9/2005 |
| WO | WO2005092160 A1 | 10/2005 |
| WO | WO2005092162 A1 | 10/2005 |
| WO | WO2005099534 A1 | 10/2005 |
| WO | WO2005104908 A2 | 11/2005 |
| WO | WO2005104910 A1 | 11/2005 |
| WO | WO2005104911 A1 | 11/2005 |
| WO | WO2005107540 A1 | 11/2005 |
| WO | WO2005117670 A2 | 12/2005 |
| WO | WO2005122851 A1 | 12/2005 |
| WO | WO2006002741 A1 | 1/2006 |
| WO | WO2006014873 A2 | 2/2006 |
| WO | WO2006014874 A2 | 2/2006 |
| WO | WO2006014936 A2 | 2/2006 |
| WO | WO2006021405 A2 | 3/2006 |
| WO | WO2006029109 A2 | 3/2006 |
| WO | WO2006043096 A1 | 4/2006 |
| WO | WO2006043098 A1 | 4/2006 |
| WO | WO2006043102 A1 | 4/2006 |
| WO | WO2006043103 A1 | 4/2006 |
| WO | WO2006043104 A2 | 4/2006 |
| WO | WO2006043106 A2 | 4/2006 |
| WO | WO2006043108 A1 | 4/2006 |
| WO | WO2006043109 A1 | 4/2006 |
| WO | WO2006045515 A2 | 5/2006 |
| WO | WO2006045536 A1 | 5/2006 |
| WO | WO2006045537 A1 | 5/2006 |
| WO | WO2006058713 A1 | 6/2006 |
| WO | WO2006077259 A1 | 7/2006 |
| WO | WO2006082064 A1 | 8/2006 |
| WO | WO2006090183 A2 | 8/2006 |
| WO | WO2006102980 A2 | 10/2006 |
| WO | WO2006121520 A2 | 11/2006 |
| WO | WO2006127108 A2 | 11/2006 |
| WO | WO2006127113 A1 | 11/2006 |
| WO | WO2006127114 A2 | 11/2006 |
| WO | WO2006127118 A1 | 11/2006 |
| WO | WO2006130813 A2 | 12/2006 |
| WO | WO2007001488 A1 | 1/2007 |
| WO | WO2007001489 A2 | 1/2007 |
| WO | WO2007001579 A1 | 1/2007 |
| WO | WO2007014018 A1 | 2/2007 |
| WO | WO2007020610 A1 | 2/2007 |
| WO | WO2007027515 A1 | 3/2007 |
| WO | WO2007042414 A1 | 4/2007 |
| WO | WO2007042415 A1 | 4/2007 |
| WO | WO2007043994 A1 | 4/2007 |
| WO | WO2007054479 A1 | 5/2007 |
| WO | WO2007056097 A2 | 5/2007 |
| WO | WO2007060694 A1 | 5/2007 |
| WO | WO2007070028 A1 | 6/2007 |
| WO | WO2007088523 A2 | 8/2007 |
| WO | WO2007096196 A2 | 8/2007 |
| WO | WO2007105944 A2 | 9/2007 |
| WO | WO2007110768 A2 | 10/2007 |
| WO | WO2007111884 A2 | 10/2007 |
| WO | WO2007113100 A2 | 10/2007 |
| WO | WO2007120045 A2 | 10/2007 |
| WO | WO2007120047 A2 | 10/2007 |
| WO | WO2007120049 A2 | 10/2007 |
| WO | WO2007120050 A2 | 10/2007 |
| WO | WO2007120051 A2 | 10/2007 |
| WO | WO2007122206 A1 | 11/2007 |
| WO | WO2007122208 A1 | 11/2007 |
| WO | WO2007125337 A1 | 11/2007 |
| WO | WO2007131559 A1 | 11/2007 |
| WO | WO2007134960 A1 | 11/2007 |
| WO | WO2007135135 A1 | 11/2007 |
| WO | WO2007135136 A1 | 11/2007 |
| WO | WO2007136958 A2 | 11/2007 |
| WO | WO2007141202 A1 | 12/2007 |
| WO | WO2007141334 A1 | 12/2007 |
| WO | WO2008006682 A1 | 1/2008 |
| WO | WO2008012202 A1 | 1/2008 |
| WO | WO2008012203 A1 | 1/2008 |
| WO | WO2008012314 A1 | 1/2008 |
| WO | WO2008014830 A1 | 2/2008 |
| WO | WO2008019203 A2 | 2/2008 |
| WO | WO2008022811 A2 | 2/2008 |
| WO | WO2008025715 A1 | 3/2008 |
| WO | WO2008025730 A1 | 3/2008 |
| WO | WO2008025785 A2 | 3/2008 |
| WO | WO2008030095 A1 | 3/2008 |
| WO | WO2008030577 A2 | 3/2008 |
| WO | WO2008033658 A1 | 3/2008 |
| WO | WO2008037642 A2 | 4/2008 |

(56) References Cited

FOREIGN PATENT DOCUMENTS

| | | |
|---|---|---|
| WO | WO2008057967 A2 | 5/2008 |
| WO | WO2008072295 A1 | 6/2008 |
| WO | WO2008079462 A1 | 7/2008 |
| WO | WO2008090122 A2 | 7/2008 |
| WO | WO2008096385 A1 | 8/2008 |
| WO | WO2008100597 A1 | 8/2008 |
| WO | WO2008102407 A1 | 8/2008 |
| WO | WO2008104751 A1 | 9/2008 |
| WO | WO2008107281 A2 | 9/2008 |
| WO | WO2008107348 A1 | 9/2008 |
| WO | WO2008107645 A2 | 9/2008 |
| WO | WO2008113779 A2 | 9/2008 |
| WO | WO2008116818 A1 | 10/2008 |
| WO | WO2008121489 A1 | 10/2008 |
| WO | WO2008124851 A1 | 10/2008 |
| WO | WO2008129053 A1 | 10/2008 |
| WO | WO2008144462 A1 | 11/2008 |
| WO | WO2008144468 A1 | 11/2008 |
| WO | WO2008144469 A2 | 11/2008 |
| WO | WO2008144470 A1 | 11/2008 |
| WO | WO2008144471 A1 | 11/2008 |
| WO | WO2008148601 A1 | 12/2008 |
| WO | WO2008148604 A1 | 12/2008 |
| WO | WO2008148646 A1 | 12/2008 |
| WO | WO2008148650 A1 | 12/2008 |
| WO | WO2008148656 A1 | 12/2008 |
| WO | WO2008148834 A1 | 12/2008 |
| WO | WO2008150627 A1 | 12/2008 |
| WO | WO2009000810 A1 | 12/2008 |
| WO | WO2009006374 A2 | 1/2009 |
| WO | WO2009006379 A2 | 1/2009 |
| WO | WO2009017927 A1 | 2/2009 |
| WO | WO2009022365 A2 | 2/2009 |
| WO | WO2009027131 A1 | 3/2009 |
| WO | WO2009032686 A1 | 3/2009 |
| WO | WO2009043630 A2 | 4/2009 |
| WO | WO2009043851 A2 | 4/2009 |
| WO | WO2009043865 A2 | 4/2009 |
| WO | WO2009058774 A2 | 5/2009 |
| WO | WO2009058839 A1 | 5/2009 |
| WO | WO2009059080 A2 | 5/2009 |
| WO | WO2009059135 A2 | 5/2009 |
| WO | WO2009059136 A2 | 5/2009 |
| WO | WO2009069167 A1 | 6/2009 |
| WO | WO2009077486 A1 | 6/2009 |
| WO | WO2009077488 A2 | 6/2009 |
| WO | WO2009077489 A1 | 6/2009 |
| WO | WO2009090201 A1 | 7/2009 |
| WO | WO2009092628 A1 | 7/2009 |
| WO | WO2009092629 A1 | 7/2009 |
| WO | WO2009092774 A1 | 7/2009 |
| WO | WO2009103592 A1 | 8/2009 |
| WO | WO2009106175 A1 | 9/2009 |
| WO | WO2009106598 A1 | 9/2009 |
| WO | WO2009112291 A1 | 9/2009 |
| WO | WO2009114119 A1 | 9/2009 |
| WO | WO2009115474 A1 | 9/2009 |
| WO | WO2009115475 A1 | 9/2009 |
| WO | WO2009124786 A1 | 10/2009 |
| WO | WO2009133134 A1 | 11/2009 |
| WO | WO2009133569 A2 | 11/2009 |
| WO | WO2009133570 A2 | 11/2009 |
| WO | WO2009135869 A2 | 11/2009 |
| WO | WO2009137915 A1 | 11/2009 |
| WO | WO2009150030 A1 | 12/2009 |
| WO | WO2009153298 A1 | 12/2009 |
| WO | WO2010003878 A1 | 1/2010 |
| WO | WO2010006936 A1 | 1/2010 |
| WO | WO2010006953 A1 | 1/2010 |
| WO | WO2010019223 A1 | 2/2010 |
| WO | WO2010025382 A2 | 3/2010 |
| WO | WO2010025392 A2 | 3/2010 |
| WO | WO2010026045 A1 | 3/2010 |
| WO | WO2010026053 A1 | 3/2010 |
| WO | WO2010028282 A1 | 3/2010 |
| WO | WO2010032271 A1 | 3/2010 |
| WO | WO2010063644 A1 | 6/2010 |
| WO | WO2010066705 A1 | 6/2010 |
| WO | WO2010066736 A1 | 6/2010 |
| WO | WO2010076048 A1 | 7/2010 |
| WO | WO2010076263 A1 | 7/2010 |
| WO | WO2010076264 A1 | 7/2010 |
| WO | WO2010081791 A2 | 7/2010 |
| WO | WO2010095937 A1 | 8/2010 |
| WO | WO2010108700 A1 | 9/2010 |
| WO | WO2010111692 A2 | 9/2010 |
| WO | WO2010112353 A1 | 10/2010 |
| WO | WO2010115946 A1 | 10/2010 |
| WO | WO2010121880 A1 | 10/2010 |
| WO | WO2010125329 A1 | 11/2010 |
| WO | WO2010128028 A1 | 11/2010 |
| WO | WO2010128031 A1 | 11/2010 |
| WO | WO2010128051 A1 | 11/2010 |
| WO | WO2010129835 A2 | 11/2010 |
| WO | WO2010134054 A2 | 11/2010 |
| WO | WO2010137946 A1 | 12/2010 |
| WO | WO2010137954 A1 | 12/2010 |
| WO | WO2010137957 A1 | 12/2010 |
| WO | WO2010138563 A1 | 12/2010 |
| WO | WO2010142417 A2 | 12/2010 |
| WO | WO2010146101 A1 | 12/2010 |
| WO | WO2011000723 A2 | 1/2011 |
| WO | WO2011000724 A1 | 1/2011 |
| WO | WO2011000725 A1 | 1/2011 |
| WO | WO2011023711 A1 | 3/2011 |
| WO | WO2011031294 A2 | 3/2011 |
| WO | WO2011041221 A2 | 4/2011 |
| WO | WO2011042400 A2 | 4/2011 |
| WO | WO2011042401 A2 | 4/2011 |
| WO | WO2011042489 A1 | 4/2011 |
| WO | WO2011048377 A1 | 4/2011 |
| WO | WO2011053890 A2 | 5/2011 |
| WO | WO2011054402 A1 | 5/2011 |
| WO | WO2011058329 A1 | 5/2011 |
| WO | WO2011061126 A2 | 5/2011 |
| WO | WO2011067156 A1 | 6/2011 |
| WO | WO2011067188 A1 | 6/2011 |
| WO | WO2011067227 A1 | 6/2011 |
| WO | WO2011067232 A1 | 6/2011 |
| WO | WO2011067264 A1 | 6/2011 |
| WO | WO2011069829 A1 | 6/2011 |
| WO | WO2011069830 A1 | 6/2011 |
| WO | WO2011075638 A1 | 6/2011 |
| WO | WO2011076748 A1 | 6/2011 |
| WO | WO2011076750 A1 | 6/2011 |
| WO | WO2011083103 A2 | 7/2011 |
| WO | WO2011086087 A1 | 7/2011 |
| WO | WO2011086088 A1 | 7/2011 |
| WO | WO2011089048 A1 | 7/2011 |
| WO | WO2011089049 A1 | 7/2011 |
| WO | WO2011092301 A1 | 8/2011 |
| WO | WO2011094677 A2 | 8/2011 |
| WO | WO2011095518 A2 | 8/2011 |
| WO | WO2011100418 A1 | 8/2011 |
| WO | WO2011102714 A2 | 8/2011 |
| WO | WO2011102715 A2 | 8/2011 |
| WO | WO2011102716 A1 | 8/2011 |
| WO | WO2011102720 A2 | 8/2011 |
| WO | WO2011102721 A2 | 8/2011 |
| WO | WO2011106474 A1 | 9/2011 |
| WO | WO2011107488 A1 | 9/2011 |
| WO | WO2011113854 A2 | 9/2011 |
| WO | WO2011123298 A2 | 10/2011 |
| WO | WO2011123308 A2 | 10/2011 |
| WO | WO2011124484 A1 | 10/2011 |
| WO | WO2011133854 A2 | 10/2011 |
| WO | WO2011138368 A1 | 11/2011 |
| WO | WO2011141532 A1 | 11/2011 |
| WO | WO2011141535 A1 | 11/2011 |
| WO | WO2011143100 A1 | 11/2011 |
| WO | WO2011144479 A2 | 11/2011 |
| WO | WO2011144719 A1 | 11/2011 |
| WO | WO2011147791 A1 | 12/2011 |
| WO | WO2011151626 A2 | 12/2011 |

(56) References Cited

FOREIGN PATENT DOCUMENTS

| | | |
|---|---|---|
| WO | WO2011153065 A1 | 12/2011 |
| WO | WO2011154203 A1 | 12/2011 |
| WO | WO2011156200 A1 | 12/2011 |
| WO | WO2012000878 A2 | 1/2012 |
| WO | WO2012001106 A2 | 1/2012 |
| WO | WO2012001115 A1 | 1/2012 |
| WO | WO2012003891 A1 | 1/2012 |
| WO | WO2012004133 A1 | 1/2012 |
| WO | WO2012004430 A1 | 1/2012 |
| WO | WO2012008825 A1 | 1/2012 |
| WO | WO2012010470 A1 | 1/2012 |
| WO | WO2012010630 A1 | 1/2012 |
| WO | WO2012010634 A1 | 1/2012 |
| WO | WO2012012393 A1 | 1/2012 |
| WO | WO2012013556 A1 | 2/2012 |
| WO | WO2012019903 A1 | 2/2012 |
| WO | WO2012019993 A1 | 2/2012 |
| WO | WO2012025258 A1 | 3/2012 |
| WO | WO2012025259 A1 | 3/2012 |
| WO | WO2012031106 A1 | 3/2012 |
| WO | WO2012031593 A1 | 3/2012 |
| WO | WO2012034819 A1 | 3/2012 |
| WO | WO2012035012 A1 | 3/2012 |
| WO | WO2012037409 A1 | 3/2012 |
| WO | WO2012041605 A1 | 4/2012 |
| WO | WO2012048730 A1 | 4/2012 |
| WO | WO2012049052 A1 | 4/2012 |
| WO | WO2012055751 A2 | 5/2012 |
| WO | WO2012055765 A1 | 5/2012 |
| WO | WO2012062842 A1 | 5/2012 |
| WO | WO2012064885 A1 | 5/2012 |
| WO | WO2012066313 A2 | 5/2012 |
| WO | WO2012072508 A1 | 6/2012 |
| WO | WO2012072509 A1 | 6/2012 |
| WO | WO2012072766 A1 | 6/2012 |
| WO | WO2012072767 A1 | 6/2012 |
| WO | WO2012076483 A2 | 6/2012 |
| WO | WO2012077066 A1 | 6/2012 |
| WO | WO2012080112 A1 | 6/2012 |
| WO | WO2012092292 A2 | 7/2012 |
| WO | WO2012093107 A1 | 7/2012 |
| WO | WO2012093108 A1 | 7/2012 |
| WO | WO2012093157 A1 | 7/2012 |
| WO | WO2012094244 A2 | 7/2012 |
| WO | WO2012098092 A1 | 7/2012 |
| WO | WO2012100836 A1 | 8/2012 |
| WO | WO2012100975 A1 | 8/2012 |
| WO | WO2012100976 A1 | 8/2012 |
| WO | WO2012100977 A1 | 8/2012 |
| WO | WO2012102814 A1 | 8/2012 |
| WO | WO2012104173 A1 | 8/2012 |
| WO | WO2012104301 A1 | 8/2012 |
| WO | WO2012110323 A1 | 8/2012 |
| WO | WO2012116256 A1 | 8/2012 |
| WO | WO2012122329 A1 | 9/2012 |
| WO | WO2012123440 A1 | 9/2012 |
| WO | WO2012123462 A1 | 9/2012 |
| WO | WO2012125032 A2 | 9/2012 |
| WO | WO2012126971 A1 | 9/2012 |
| WO | WO2012127233 A2 | 9/2012 |
| WO | WO2012128808 A2 | 9/2012 |
| WO | WO2012130926 A1 | 10/2012 |
| WO | WO2012130928 A1 | 10/2012 |
| WO | WO2012134653 A1 | 10/2012 |
| WO | WO2012135204 A1 | 10/2012 |
| WO | WO2012146470 A1 | 11/2012 |
| WO | WO2012160190 A1 | 11/2012 |
| WO | WO2012160342 A1 | 11/2012 |
| WO | WO2012174326 A1 | 12/2012 |
| WO | WO2012174331 A1 | 12/2012 |
| WO | WO2012178106 A2 | 12/2012 |
| WO | WO2013007776 A1 | 1/2013 |
| WO | WO2013007779 A1 | 1/2013 |
| WO | WO2013007780 A1 | 1/2013 |
| WO | WO2013012971 A2 | 1/2013 |
| WO | WO2013016277 A1 | 1/2013 |
| WO | WO2013017842 A1 | 2/2013 |
| WO | WO2013018066 A1 | 2/2013 |
| WO | WO2013019963 A2 | 2/2013 |
| WO | WO2013020939 A1 | 2/2013 |
| WO | WO2013026650 A1 | 2/2013 |
| WO | WO2013026651 A1 | 2/2013 |
| WO | WO2013026843 A1 | 2/2013 |
| WO | WO2013026844 A1 | 2/2013 |
| WO | WO2013026845 A1 | 2/2013 |
| WO | WO2013026856 A1 | 2/2013 |
| WO | WO2013029184 A1 | 3/2013 |
| WO | WO2013032330 A1 | 3/2013 |
| WO | WO2013032331 A1 | 3/2013 |
| WO | WO2013036564 A2 | 3/2013 |
| WO | WO2013037678 A2 | 3/2013 |
| WO | WO2013038165 A1 | 3/2013 |
| WO | WO2013039585 A1 | 3/2013 |
| WO | WO2013039588 A1 | 3/2013 |
| WO | WO2013039591 A1 | 3/2013 |
| WO | WO2013043595 A1 | 3/2013 |
| WO | WO2013046149 A1 | 4/2013 |
| WO | WO2013052596 A2 | 4/2013 |
| WO | WO2013060654 A1 | 5/2013 |
| WO | WO2013060655 A1 | 5/2013 |
| WO | WO2013060656 A1 | 5/2013 |
| WO | WO2013063463 A1 | 5/2013 |
| WO | WO2013064456 A1 | 5/2013 |
| WO | WO2013067020 A1 | 5/2013 |
| WO | WO2013068242 A1 | 5/2013 |
| WO | WO2013072239 A1 | 5/2013 |
| WO | WO2013072297 A1 | 5/2013 |
| WO | WO2013072326 A1 | 5/2013 |
| WO | WO2013072351 A1 | 5/2013 |
| WO | WO2013080073 A1 | 6/2013 |
| WO | WO2013087474 A1 | 6/2013 |
| WO | WO2013098173 A1 | 7/2013 |
| WO | WO2013101302 A1 | 7/2013 |
| WO | WO2013102557 A1 | 7/2013 |
| WO | WO2013103589 A1 | 7/2013 |
| WO | WO2013103793 A1 | 7/2013 |
| WO | WO2013106742 A1 | 7/2013 |
| WO | WO2013106751 A1 | 7/2013 |
| WO | WO2013106768 A1 | 7/2013 |
| WO | WO2013111128 A1 | 8/2013 |
| WO | WO2013114200 A1 | 8/2013 |
| WO | WO2013114202 A1 | 8/2013 |
| WO | WO2013117990 A1 | 8/2013 |
| WO | WO2013119493 A1 | 8/2013 |
| WO | WO2013119495 A1 | 8/2013 |
| WO | WO2013119497 A1 | 8/2013 |
| WO | WO2013119534 A1 | 8/2013 |
| WO | WO2013119538 A1 | 8/2013 |
| WO | WO2013119543 A1 | 8/2013 |
| WO | WO2013127476 A1 | 9/2013 |
| WO | WO2013127696 A1 | 9/2013 |
| WO | WO2013127906 A1 | 9/2013 |
| WO | WO2013127907 A1 | 9/2013 |
| WO | WO2013135901 A1 | 9/2013 |
| WO | WO2013137728 A1 | 9/2013 |
| WO | WO2013138703 A1 | 9/2013 |
| WO | WO2013139864 A1 | 9/2013 |
| WO | WO2013144363 A1 | 10/2013 |
| WO | WO2013144761 A1 | 10/2013 |
| WO | WO2013153473 A1 | 10/2013 |
| WO | WO2013153526 A1 | 10/2013 |
| WO | WO2013154663 A1 | 10/2013 |
| WO | WO2013154716 A1 | 10/2013 |
| WO | WO2013157924 A1 | 10/2013 |
| WO | WO2013160091 A1 | 10/2013 |
| WO | WO2013160268 A1 | 10/2013 |
| WO | WO2013160269 A1 | 10/2013 |
| WO | WO2013160278 A1 | 10/2013 |
| WO | WO2013160318 A1 | 10/2013 |
| WO | WO2013163436 A2 | 10/2013 |
| WO | WO2013167434 A1 | 11/2013 |
| WO | WO2013167435 A1 | 11/2013 |
| WO | WO2013167437 A1 | 11/2013 |
| WO | WO2013171238 A1 | 11/2013 |

(56) References Cited

FOREIGN PATENT DOCUMENTS

| | | |
|---|---|---|
| WO | WO2013174789 A1 | 11/2013 |
| WO | WO2013177352 A1 | 11/2013 |
| WO | WO2013192625 A1 | 12/2013 |
| WO | WO2014005872 A1 | 1/2014 |
| WO | WO2014005873 A1 | 1/2014 |
| WO | WO2014011324 A1 | 1/2014 |
| WO | WO2014016208 A1 | 1/2014 |
| WO | WO2014029628 A1 | 2/2014 |
| WO | WO2014029803 A1 | 2/2014 |
| WO | WO2014029884 A1 | 2/2014 |
| WO | WO2014033705 A2 | 3/2014 |
| WO | WO2014037299 A2 | 3/2014 |
| WO | WO2014037339 A1 | 3/2014 |
| WO | WO2014037341 A1 | 3/2014 |
| WO | WO2014037473 A1 | 3/2014 |
| WO | WO2014037474 A1 | 3/2014 |
| WO | WO2014043102 A1 | 3/2014 |
| WO | WO2014043106 A1 | 3/2014 |
| WO | WO20114043652 A1 | 3/2014 |
| WO | WO2014053614 A1 | 4/2014 |
| WO | WO2014053638 A1 | 4/2014 |
| WO | WO2014056641 A1 | 4/2014 |
| WO | WO2014056642 A1 | 4/2014 |
| WO | WO2014056716 A1 | 4/2014 |
| WO | WO2014056730 A1 | 4/2014 |
| WO | WO2014056802 A1 | 4/2014 |
| WO | WO2014056810 A1 | 4/2014 |
| WO | WO2014056821 A1 | 4/2014 |
| WO | WO2014056862 A1 | 4/2014 |
| WO | WO2014057094 A1 | 4/2014 |
| WO | WO2014057098 A1 | 4/2014 |
| WO | WO2014060370 A1 | 4/2014 |
| WO | WO2014060724 A1 | 4/2014 |
| WO | WO2014060838 A1 | 4/2014 |
| WO | WO2014066901 A1 | 5/2014 |
| WO | WO2014071101 A1 | 5/2014 |
| WO | WO2014076041 A1 | 5/2014 |
| WO | WO2014082924 A1 | 6/2014 |
| WO | WO2014082940 A1 | 6/2014 |
| WO | WO2014086915 A1 | 6/2014 |
| WO | WO2014090965 A1 | 6/2014 |
| WO | WO2014093321 A1 | 6/2014 |
| WO | WO2014096120 A1 | 6/2014 |
| WO | WO2014096121 A1 | 6/2014 |
| WO | WO2014096122 A1 | 6/2014 |
| WO | WO2014096123 A1 | 6/2014 |
| WO | WO2014102048 A1 | 7/2014 |
| WO | WO2014108451 A1 | 7/2014 |
| WO | WO2014116976 A1 | 7/2014 |
| WO | WO2014121520 A1 | 8/2014 |
| WO | WO2014127467 A1 | 8/2014 |
| WO | WO2014135677 A1 | 9/2014 |
| WO | WO2014144873 A1 | 9/2014 |
| WO | WO2014146952 A1 | 9/2014 |
| WO | WO2014147128 A1 | 9/2014 |
| WO | WO2014147256 A1 | 9/2014 |
| WO | WO2014150967 A1 | 9/2014 |
| WO | WO2014158841 A1 | 10/2014 |
| WO | WO2014159458 A1 | 10/2014 |
| WO | WO2014159624 A1 | 10/2014 |
| WO | WO2014161089 A1 | 10/2014 |
| WO | WO2014164086 A1 | 10/2014 |
| WO | WO2014164088 A1 | 10/2014 |
| WO | WO2014164089 A1 | 10/2014 |
| WO | WO2014164091 A1 | 10/2014 |
| WO | WO2014167062 A1 | 10/2014 |
| WO | WO2014168940 A2 | 10/2014 |
| WO | WO2014169248 A1 | 10/2014 |
| WO | WO2014184651 A1 | 11/2014 |
| WO | WO2014184652 A1 | 11/2014 |
| WO | WO2014184653 A1 | 11/2014 |
| WO | WO2014184654 A2 | 11/2014 |
| WO | WO2014191456 A1 | 12/2014 |
| WO | WO2014195351 A1 | 12/2014 |
| WO | WO2014197619 A1 | 12/2014 |
| WO | WO2014198586 A1 | 12/2014 |
| WO | WO2014202383 A1 | 12/2014 |
| WO | WO2014202694 A1 | 12/2014 |
| WO | WO2014206799 A1 | 12/2014 |
| WO | WO2014206814 A1 | 12/2014 |
| WO | WO2015000775 A1 | 1/2015 |
| WO | WO2015001340 A1 | 1/2015 |
| WO | WO2015004259 A1 | 1/2015 |
| WO | WO2015005930 A1 | 1/2015 |
| WO | WO2015006367 A2 | 1/2015 |
| WO | WO2015006443 A1 | 1/2015 |
| WO | WO2015007747 A1 | 1/2015 |
| WO | WO2015009580 A1 | 1/2015 |
| WO | WO2015018628 A1 | 2/2015 |
| WO | WO2015022342 A1 | 2/2015 |
| WO | WO2015022344 A1 | 2/2015 |
| WO | WO2015022345 A1 | 2/2015 |
| WO | WO2015032651 A1 | 3/2015 |
| WO | WO2015032787 A1 | 3/2015 |
| WO | WO2015036850 A1 | 3/2015 |
| WO | WO2015044400 A1 | 4/2015 |
| WO | WO2015052276 A1 | 4/2015 |
| WO | WO2015056188 A1 | 4/2015 |
| WO | WO2015059022 A1 | 4/2015 |
| WO | WO2015063577 A1 | 5/2015 |
| WO | WO2015067739 A1 | 5/2015 |
| WO | WO2015075020 A1 | 5/2015 |
| WO | WO2015075543 A1 | 5/2015 |
| WO | WO2015082662 A1 | 6/2015 |
| WO | WO2015082663 A1 | 6/2015 |
| WO | WO2015082664 A1 | 6/2015 |
| WO | WO2015086371 A1 | 6/2015 |
| WO | WO2015089660 A1 | 6/2015 |
| WO | WO2015091069 A1 | 6/2015 |
| WO | WO2015091193 A1 | 6/2015 |
| WO | WO2015091301 A1 | 6/2015 |
| WO | WO2015100250 A1 | 7/2015 |
| WO | WO2015101490 A2 | 7/2015 |
| WO | WO2015101557 A1 | 7/2015 |
| WO | WO2015104165 A1 | 7/2015 |
| WO | WO2015104171 A1 | 7/2015 |
| WO | WO2015104172 A1 | 7/2015 |
| WO | WO2015109042 A1 | 7/2015 |
| WO | WO2015109052 A1 | 7/2015 |
| WO | WO2015109062 A1 | 7/2015 |
| WO | WO2015117892 A1 | 8/2015 |
| WO | WO2015123612 A1 | 8/2015 |
| WO | WO2015124218 A1 | 8/2015 |
| WO | WO2015124619 A1 | 8/2015 |
| WO | WO2015124627 A1 | 8/2015 |
| WO | WO2015132131 A1 | 9/2015 |
| WO | WO2015132203 A1 | 9/2015 |
| WO | WO2015132320 A1 | 9/2015 |
| WO | WO2015135826 A1 | 9/2015 |
| WO | WO2015138291 A1 | 9/2015 |
| WO | WO2015138292 A1 | 9/2015 |
| WO | WO2015138293 A2 | 9/2015 |
| WO | WO2015138299 A1 | 9/2015 |
| WO | WO2015138310 A1 | 9/2015 |
| WO | WO2015140091 A1 | 9/2015 |
| WO | WO2015144347 A1 | 10/2015 |
| WO | WO2015144356 A1 | 10/2015 |
| WO | WO2015148089 A1 | 10/2015 |
| WO | WO2015148710 A1 | 10/2015 |
| WO | WO2015155144 A1 | 10/2015 |
| WO | WO2015155145 A1 | 10/2015 |
| WO | WO2015157475 A1 | 10/2015 |
| WO | WO2015170165 A2 | 11/2015 |
| WO | WO2015173100 A1 | 11/2015 |
| WO | WO2015173123 A1 | 11/2015 |
| WO | WO2015173124 A1 | 11/2015 |
| WO | WO2015173125 A1 | 11/2015 |
| WO | WO2015173127 A2 | 11/2015 |
| WO | WO2015173128 A1 | 11/2015 |
| WO | WO2015174967 A1 | 11/2015 |
| WO | WO2015197371 A1 | 12/2015 |

(56) References Cited

OTHER PUBLICATIONS

Bonne 0, "How Does Bonne O's Tank-Free Carbonation Work?" Does Bonne O's Tank-Free Carbonation Work?, Aug. 15, 2015 (Aug. 15, 2015) [retrieved on Dec. 22, 2017], htttps://www.bonneo.com/blogs/our-creations/57075459-how-does-bonne-os-tank-free-carbonation-work.

International Search Report and Written Opinion of the International Searching Authority directed to related International Patent Application No. PCT/US2017/060591, mailed Jan. 18, 2018; 11 pages.

\* cited by examiner

CARBONATION CUP FOR CARBONATED BEVERAGE MAKER

CROSS REFERENCE TO RELATED APPLICATIONS

This application is a continuation of U.S. application Ser. No. 16/348,107, filed May 7, 2019, now U.S. Pat. No. 11,524,268, which is a national phase of International Application No. PCT/US17/60591, filed Nov. 8, 2017, which claims the benefit of and priority to U.S. Provisional App. No. 62/419,750, filed Nov. 9, 2016, and U.S. Provisional App. No. 62/462,116, filed Feb. 22, 2017, which are incorporated herein by reference in their entireties.

BACKGROUND

Field of the Invention

Embodiments of the present invention relate generally to carbonated beverage makers, and more specifically to make-my-own carbonated beverage makers that generate $CO_2$ and utilize a pod system to carbonate and deliver individual, customizable beverages.

Background

Household appliances may be used to create beverages. However, creating homemade carbonated beverages presents difficulties beyond those of creating non-carbonated beverages. Some of these difficulties are directly related to the process of carbonation. Other difficulties are byproducts of the carbonation process.

The difficulties directly related to the process of carbonation include carbonation quality and efficiency. For example, the quality of the carbonation greatly affects the beverage taste and user experience. Drinks having low-quality carbonation are therefore undesirable and may lead to customer dissatisfaction. As a further example, efficiency of the carbonation process may be important to users. Inefficient carbonation can be costly and wasteful. Because a user needs to replenish the carbonation source, such as a $CO_2$ tank, it is desirable to increase the number of drinks that may be created with the same amount of the carbonation source. Finally, the carbonation process leads to pressurized beverages that may result in overflowing drinks and spills if not properly controlled. Not only is this wasteful, but it also negatively affects the user experience.

Additional difficulties with the carbonation process relate to the use of a $CO_2$ tank. For example, $CO_2$ tanks may require special handling and disposal. Accordingly, $CO_2$ tanks cannot be shipped to a consumer. Furthermore, $CO_2$ tanks may be costly and large, thus increasing the cost and size of the carbonated beverage maker.

In addition to difficulties directly related to the carbonation process, there are difficulties that are byproducts of carbonating beverages. For example, while users desire the ability to customize their drinks (i.e., to be healthier, to adjust carbonation, or to provide different flavors, additives, etc.), this can be difficult when carbonating the beverage. Existing systems are limited in what can be carbonated (e.g., many only carbonate water) and do not offer customizability, particularly when the system is pod-based. As such, existing systems do not provide a user experience that conveys a freshly-made drink, nor do they inspire creativity in the user's beverage-making experience. Another byproduct difficulty is that, while carbonated beverages are most enjoyable at cold temperatures, the carbonation process may increase the temperature of the beverage.

Finally, because carbonated beverages may be inexpensively purchased from a store, a household appliance that creates carbonated beverages may be too costly for users. Furthermore, a household appliance that creates carbonated beverages may be too large, taking up too much countertop space in the user's home. In light of the foregoing, further improvements in carbonated beverage makers are desirable.

BRIEF SUMMARY OF THE INVENTION

Embodiments of the present invention provide make-my-own carbonated beverage makers that address the need for improvements in single-serve carbonation devices and processes, such as generating and/or supplying $CO_2$ for carbonating beverages.

In some embodiments, a carbonated beverage maker includes a water reservoir, a carbon dioxide creation chamber, and a carbonation chamber. In some embodiments, the water reservoir holds ice water and has a first impeller and a shroud surrounding the first impeller. In some embodiments, the carbon dioxide creation chamber contains chemical elements and receives warm water. In some embodiments, the dry chemical elements react with each other to create carbon dioxide when the warm water is introduced to the carbon dioxide creation chamber. In some embodiments, the carbonation chamber is connected to the water reservoir and the carbon dioxide creation chamber. In some embodiments, the carbonation chamber has a second impeller that includes a stem portion and blades. In some embodiments, the stem portion and the blades define conduits therein. In some embodiments, the blades create a low pressure region in a lower portion of the carbonation chamber such that carbon dioxide from the carbon dioxide creation chamber flows through the conduits to the low pressure region.

In some embodiments, the chemical elements comprise potassium carbonate and citric acid. In some embodiments, the chemical elements comprise dry chemical elements. In some embodiments, the chemical elements comprise a tablet. In some embodiments, the chemical elements are disposed in a pod. In some embodiments, the carbonated beverage maker also includes a needle to deliver the warm water to the carbon dioxide creation chamber.

In some embodiments, a method of creating a carbonated beverage includes delivering cold water to a carbonation chamber, adding warm water to a mixture of potassium carbonate and citric acid in a carbon dioxide creation chamber to create carbon dioxide, delivering the carbon dioxide to the carbonation chamber, and entraining the carbon dioxide into the cold water via an impeller disposed in the carbonation chamber to create carbonated water.

In some embodiments, the method also includes dispensing the carbonated water into a cup. In some embodiments, the method also includes mixing a flavor source with the carbonated water. In some embodiments, the flavor source is a syrup. In some embodiments, mixing the flavor source with the carbonated water includes simultaneously dispensing the carbonated water and the flavor source into a cup. In some embodiments, the flavor source includes a single serve pod.

In some embodiments, the method also includes, simultaneously with the cold water beginning to be delivered to the carbonation chamber, sending a signal to the carbon dioxide creation chamber to trigger a pre-determined time delay. In some embodiments, the warm water is added to the mixture of potassium carbonate and citric acid after the pre-determined time delay. In some embodiments, the warm water is added to the mixture of potassium carbonate and citric acid for a pre-determined amount of time beginning after the pre-determined time delay.

In some embodiments, a carbonated beverage making system includes a reservoir to hold a diluent, a carbon dioxide creation chamber to produce carbon dioxide via a chemical reaction, and a carbonation chamber to receive the diluent from the reservoir and the carbon dioxide from the carbon dioxide creation chamber and to mix the diluent and the carbon dioxide to form a carbonated beverage. In some embodiments, the chemical reaction is isolated from the carbonated beverage.

In some embodiments, the carbon dioxide produced via the chemical reaction is at room temperature. In some embodiments, the chemical reaction is initiated by introducing water to a mixture of chemical elements. In some embodiments, the chemical reaction is a reaction between potassium carbonate and citric acid. In some embodiments, the carbonated beverage making system receives carbon dioxide from a gas tank in place of the carbon dioxide creation chamber.

In some embodiments, a carbonated beverage maker includes a carbonation source, a flavor source, a removable carbonation chamber configured to contain a liquid, and an impeller disposed at a bottom of the removable carbonation chamber. In some embodiments, the liquid is carbonated, cooled, and flavored in the removable carbonation chamber.

In some embodiments, a carbonation cup includes a transparent plastic layer forming a base and a cylinder, a metal sheath disposed outside the transparent plastic layer, a magnetically-driven impeller disposed at an inner side of the base of the transparent plastic layer, and an attachment member disposed at an end of the cylinder opposite the base. In some embodiments, the attachment member is configured to seal the carbonation cup when attached to a carbonated beverage maker having a carbonation source. In some embodiments, the metal sheath defines a plurality of holes so that a portion of the transparent plastic layer is visible from outside the carbonation cup.

In some embodiments, a carbonated beverage maker includes a water reservoir configured to hold ice water, a carbonation chamber connected to the water reservoir and a carbonation source. In some embodiments, the water reservoir has a first impeller and a shroud surrounding the first impeller. In some embodiments, the carbonation chamber has a second impeller. In some embodiments, the second impeller includes a stem portion and blades. In some embodiments, the stem portion and the blades define conduits therein. In some embodiments, the blades are configured to create a low pressure region in a lower portion of the carbonation chamber such that carbon-dioxide from the carbonation source flows through the conduits to the low pressure region.

In some embodiments, a water reservoir for a carbonated beverage maker includes a double-walled tank configured to hold ice water, an impeller disposed in the tank and configured to agitate the ice water, a shroud disposed around the impeller and configured to protect the impeller from ice, a cold plate disposed underneath the tank, a thermoelectric cooler disposed on the cold plate, and a heat pipe assembly configured to remove heat from the thermoelectric cooler.

Further features and advantages of embodiments of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to a person skilled in the relevant art(s) based on the teachings contained herein.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the relevant art(s) to make and use the invention.

DETAILED DESCRIPTION OF THE INVENTION

The present invention(s) will now be described in detail with reference to embodiments thereof as illustrated in the accompanying drawings. References to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Consumers may use household appliances to prepare beverages at home. For preparing carbonated beverages, a particular device (i.e., a carbonated beverage maker) may be required. It is desirable to provide an inexpensive, compact carbonated beverage maker that allows users to create customized individual beverages according to their own preferences. It is further desirable that such carbonated beverage makers efficiently produce high quality carbonated beverages.

The following disclosure relates to carbonated beverage makers. Carbonated beverage makers, according to some embodiments, may be used in a home, office, school, or other similar setting, including a small commercial setting. In some embodiments, carbonated beverage makers may be used on a countertop or tabletop, for example, in a user's kitchen.

Figure 1:
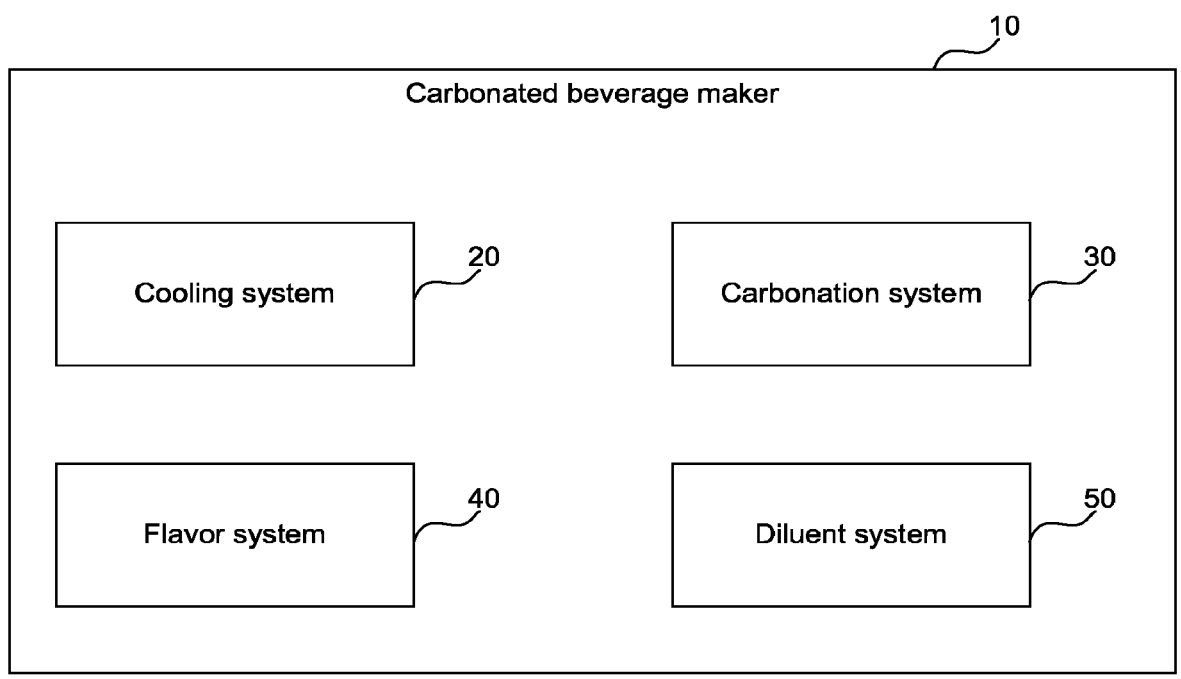
FIG. 1 shows a functional diagram of a carbonated beverage maker according to some embodiments.

In some embodiments, as shown, for example, in FIG. 1, a carbonated beverage maker 10 includes each of a cooling system 20, a carbonation system 30, a flavor system 40, and a diluent system 50. In some embodiments, a carbonated beverage maker may not have all four of these systems. In some embodiments, a carbonated beverage maker may include additional systems. Furthermore, in some embodiments, the systems may vary in the level of manual operation required to perform the function associated with the system.

Cooling system 20, in some embodiments, cools a diluent from room temperature to a desired beverage temperature. In some embodiments, cooling system 20 cools the diluent prior to adding concentrate or other flavoring from flavor system 40. In some embodiments, cooling system 20 cools the beverage created with the diluent and the concentrate. In some embodiments, cooling system 20 primarily maintains a desired beverage temperature. In some embodiments, ice is used in cooling system 20.

Carbonation system 30, in some embodiments, carbonates a diluent. In some embodiments, carbonation system 30 carbonates the diluent prior to adding concentrate or flavoring from flavor system 40. In some embodiments, carbonation system 30 carbonates the beverage created with the diluent and the concentrate. In some embodiments, carbonation system 30 uses an impeller to encourage carbonation of a beverage. In some embodiments, carbonation system 30 carbonates the diluent or beverage using a $CO_2$ cylinder as a carbonation source. In some embodiments, other carbonation sources may be used, as described in more detail below.

Flavor system 40, in some embodiments, delivers a flavor, for example, in the form of a concentrate, into a diluent. In some embodiments, flavor system 40 delivers the flavor prior to carbonation. In some embodiments, flavor system 40 delivers the flavor after the diluent is carbonated. In some embodiments, flavor system 40 uses pods to contain and deliver the flavor concentrate. While flavor is primarily referred to here, flavor system 40 is not limited solely to flavor, but instead, may include, for example, additives, nutrients, colorants, and so on. Flavor system 40 may provide the flavor as liquid, syrup, powder, gel, beads, or other medium.

Diluent system 50, in some embodiments, delivers a diluent to be carbonated. In some embodiments, diluent system 50 includes a reservoir in beverage maker 10 to contain an amount of the diluent. In some embodiments, diluent system 50 may include a connection to a remote source that contains the diluent. In some embodiments, the diluent may be added manually. In some embodiments, the diluent is water. Other possible diluents include juice, milk, or other consumable liquid.

As already noted in the descriptions above, the order of these functions (cooling, carbonation, flavoring, providing diluent, etc.) may vary in some embodiments. For example, in some embodiments, flavor system 40 may deliver a flavor into diluent after the diluent is cooled, while in other embodiments, flavor system 40 may deliver a flavor into diluent before the diluent is cooled.

Figure 2:
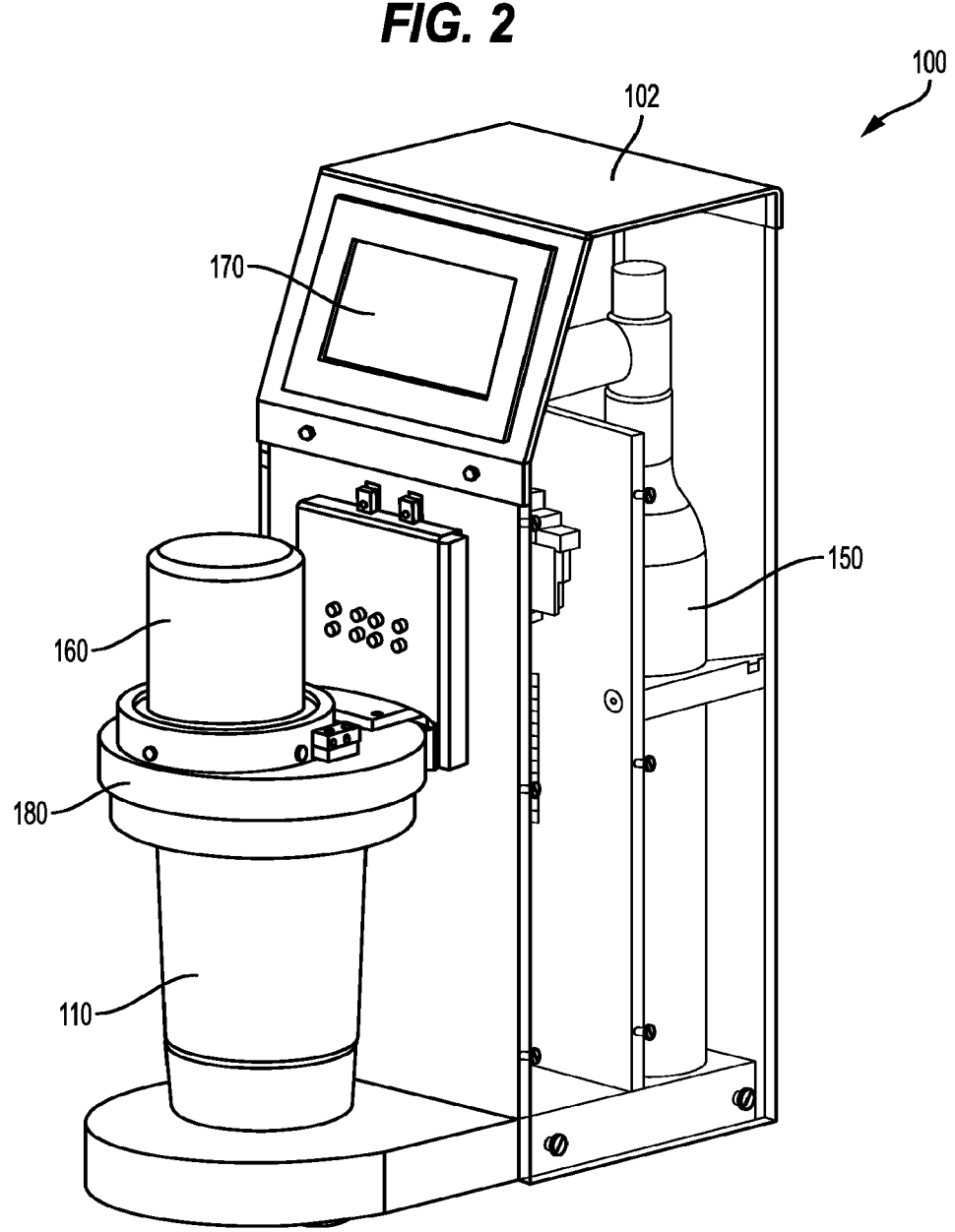
FIG. 2 shows a perspective view of a carbonated beverage maker according to some embodiments.

Some embodiments of a carbonated beverage maker will now be described with reference to FIGS. 2-13. In some embodiments, as shown, for example, in FIG. 2, a carbonated beverage maker 100 includes a housing 102, a carbonation source 150, a flavor source 160, a user interface (such as a touch screen 170), a cup docking module 180, and a carbonation cup 110. In some embodiments, housing 102 provides the infrastructure to contain and/or support each of the systems of carbonated beverage maker 100. In some embodiments, carbonation source 150 is disposed within a main portion of housing 102. In FIG. 2, a portion of housing 102 is removed to show carbonation source 150 within housing 102. In some embodiments, touch screen 170 (or other types of user interfaces) is disposed on housing 102. In some embodiments, cup docking module 180 attaches to housing 102. In some embodiments, cup docking module 180 supports flavor source 160 and carbonation cup 110.

In some embodiments, carbonation cup 110 is removable from cup docking module 180. Thus, carbonation cup 110, in some embodiments, may be manually removed and filled with a diluent, such as water. In some embodiments, carbonation cup 110 may be filled with ice in addition to a diluent. In some embodiments, carbonation cup 110 may be manually removed and washed after any use. This arrangement may increase the versatility and customization possible in beverage creation using carbonated beverage maker 100. More specifically, carbonated beverage maker 100 is capable of carbonating a wide variety of beverages, such as water, milk, juice, or other drink.

In some embodiments, carbonation source 150 and flavor source 160 are operatively connected with carbonation cup 110. For example, housing 102 and/or cup docking module 180 may provide channels for directing $CO_2$ from carbonation source 150 and concentrate from flavor source 160 into carbonation cup 110.

Thus, in some embodiments, carbonated beverage maker 100 provides a single chamber—carbonation cup 110—for the cooling, carbonation, flavoring, and providing diluent for a beverage. In some embodiments, both the diluent (e.g., water) and the flavor are provided to carbonation cup 110 prior to carbonation. This arrangement may lower the operating pressure and reduce the $CO_2$ consumption of carbonated beverage maker 100. In some embodiments, carbonated beverage maker 100 is capable of carbonating a wide variety of beverages.

Figure 3:
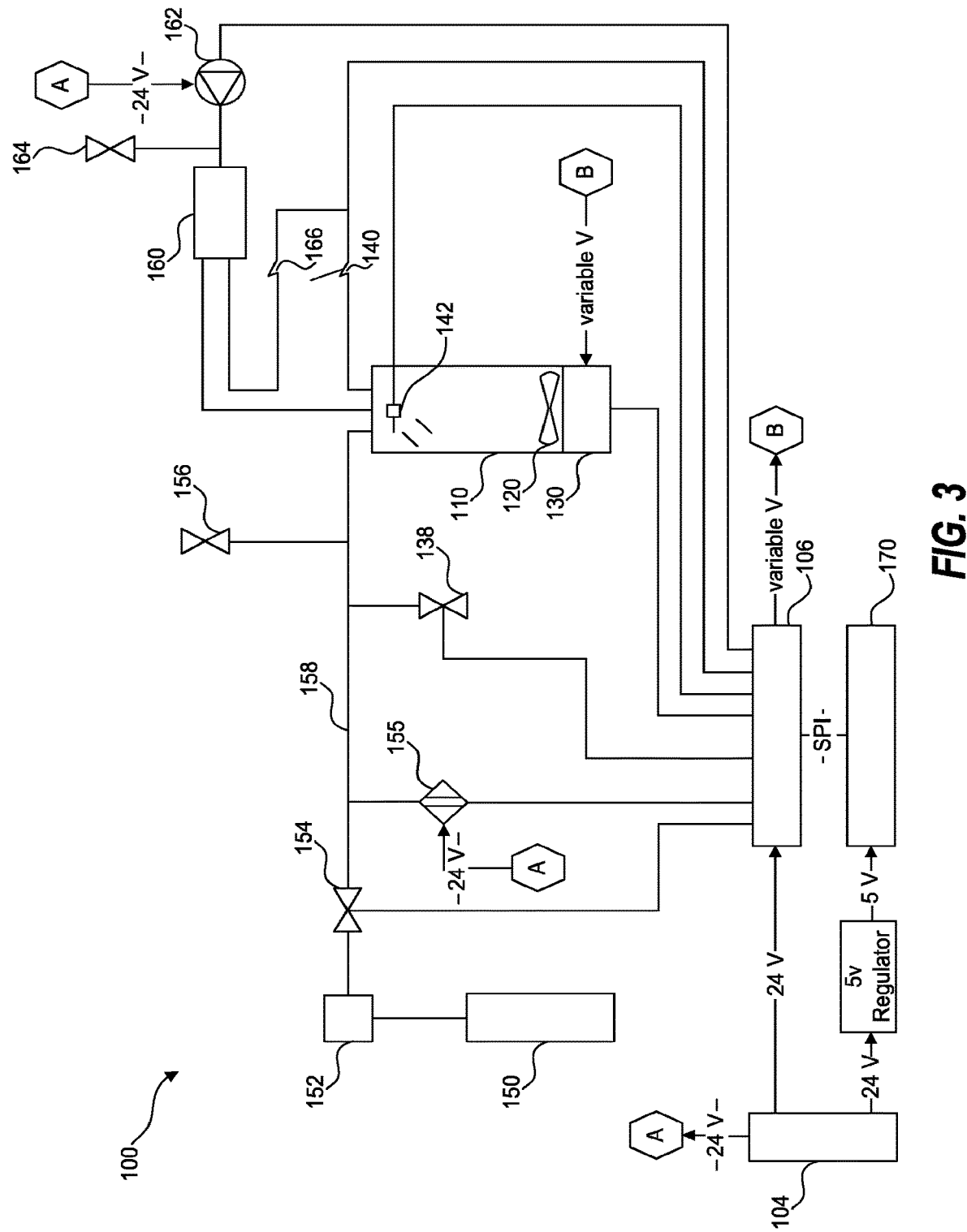
FIG. 3 shows a schematic of a carbonated beverage maker according to some embodiments.

FIG. 3 illustrates a schematic that provides an overview of key components of carbonated beverage maker 100 according to some embodiments. In some embodiments, carbonated beverage maker 100 comprises a power supply 104 and a control unit 106. Power supply 104 provides adequate power to control unit 106 and all other components of carbonated beverage maker 100 in need of power. In some embodiments, power supply 104 provides a constant voltage to one or more components of carbonated beverage maker 100 (e.g., 24 volts to control unit 106). In some embodiments, power supply 104 provides a varying voltage to one or more components of carbonated beverage maker 100 (e.g., varying voltage to an impeller motor 130). In some embodiments, power supply 104 provides the varying voltage indirectly to one or more components of carbonated beverage maker 100 (e.g., constant 24 volts to control unit 106; varying voltage from control unit 106 to impeller motor 130). In some embodiments, power supply 104 provides a constant voltage (e.g., 24 volts) which may be reduced (e.g., 5 volts) before providing power to one or more components of carbonated beverage maker 100 (e.g., touch screen 170). In some embodiments, power source 104 comprises a battery. For example, carbonated beverage maker 100 may operate solely by battery power. In some embodiments, power source 104 comprises a plug to be inserted into an electrical outlet of a user's home.

In some embodiments, control unit 106 controls the operation of carbonated beverage maker 100. In some embodiments, control unit 106 is operably connected to each of the components of carbonated beverage maker 100 to control the beverage creation process. As noted above, control unit 106 utilizes power from power source 104. In some embodiments, control unit 106 supplies power to other components of carbonated beverage maker 100. In some embodiments, control unit 106 receives inputs from touch screen 170. In some embodiments, control unit 106 communicates with touch screen 170 through a serial peripheral interface. In some embodiments, control unit 106 uses inputs from touch screen 170 to determine the operation of other components of carbonated beverage maker 100. In some embodiments, control unit 106 communicates with components of carbonated beverage maker 100 with digital inputs and outputs. In some embodiments, control unit 106 communicates with components of carbonated beverage maker 100 through analog communication. In some embodiments, both digital and analog communication are utilized. Control unit 106 may communicate with one or more of a $CO_2$ supply solenoid valve 154, a pressure sensor 155, a solenoid vent valve 138, an impeller motor 130, a light emitting diode 142 at carbonation cup 110, a micro switch 140, a micro switch 166, and an air pump 162. In some embodiments, control unit 106 comprises a microcontroller.

Figure 4:
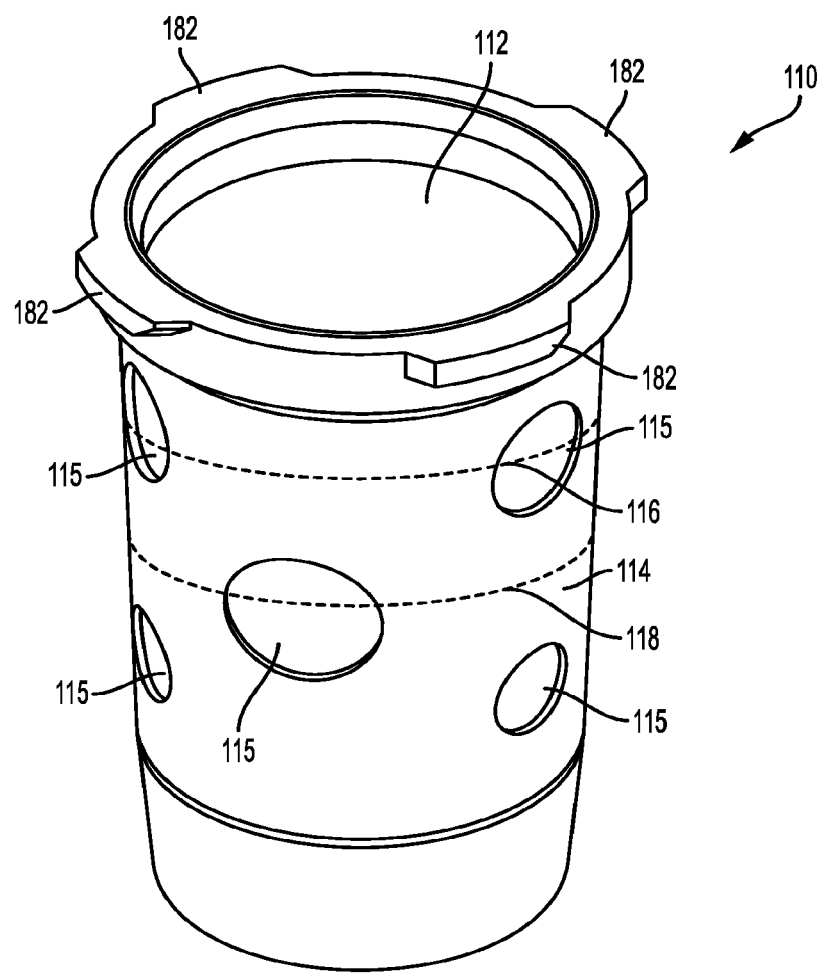
FIG. 4 shows a carbonation cup for a carbonated beverage maker according to some embodiments.
Figure 5:
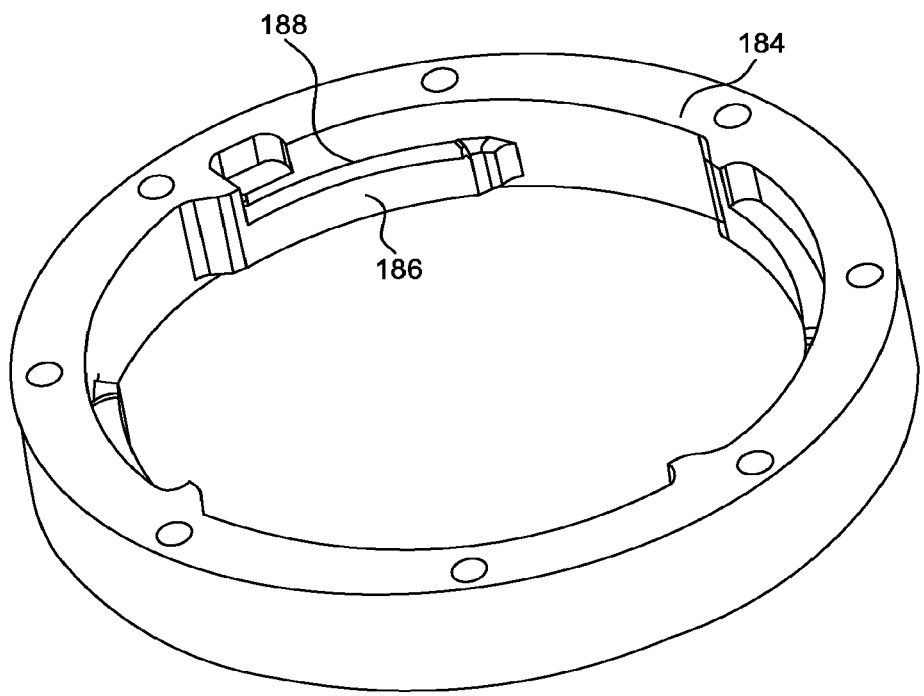
FIG. 5 shows a portion of a docking module for a carbonated beverage maker according to some embodiments.
Figure 6:
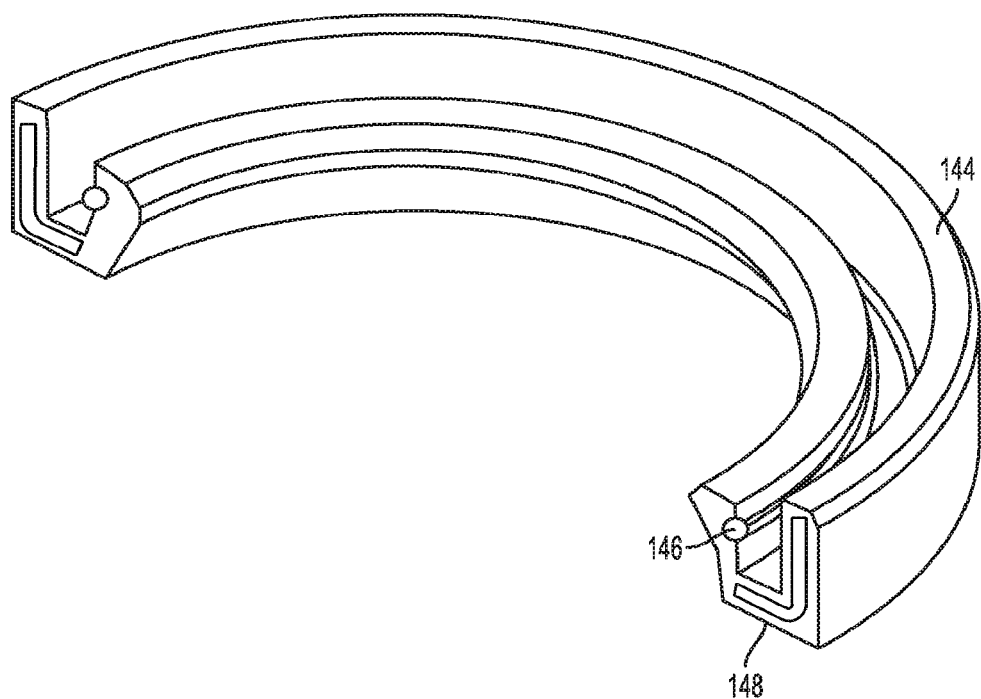
FIG. 6 shows a perspective cross-section view of a lip seal for a carbonated beverage maker according to some embodiments.
Figure 7:
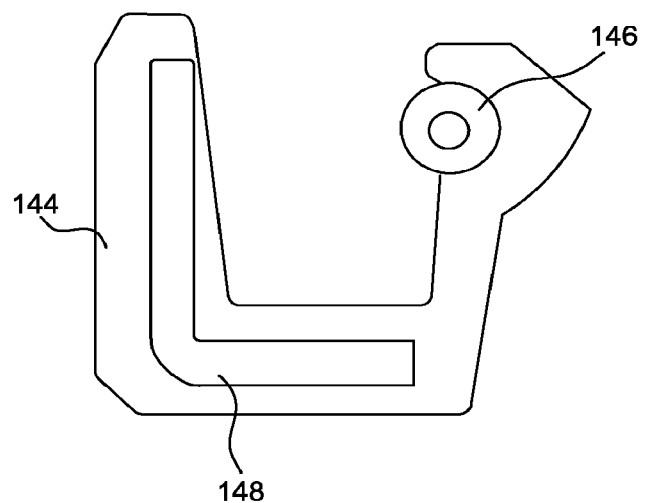
FIG. 7 shows a cross-sectional view of a lip seal for a carbonated beverage maker according to some embodiments.
Figure 8:
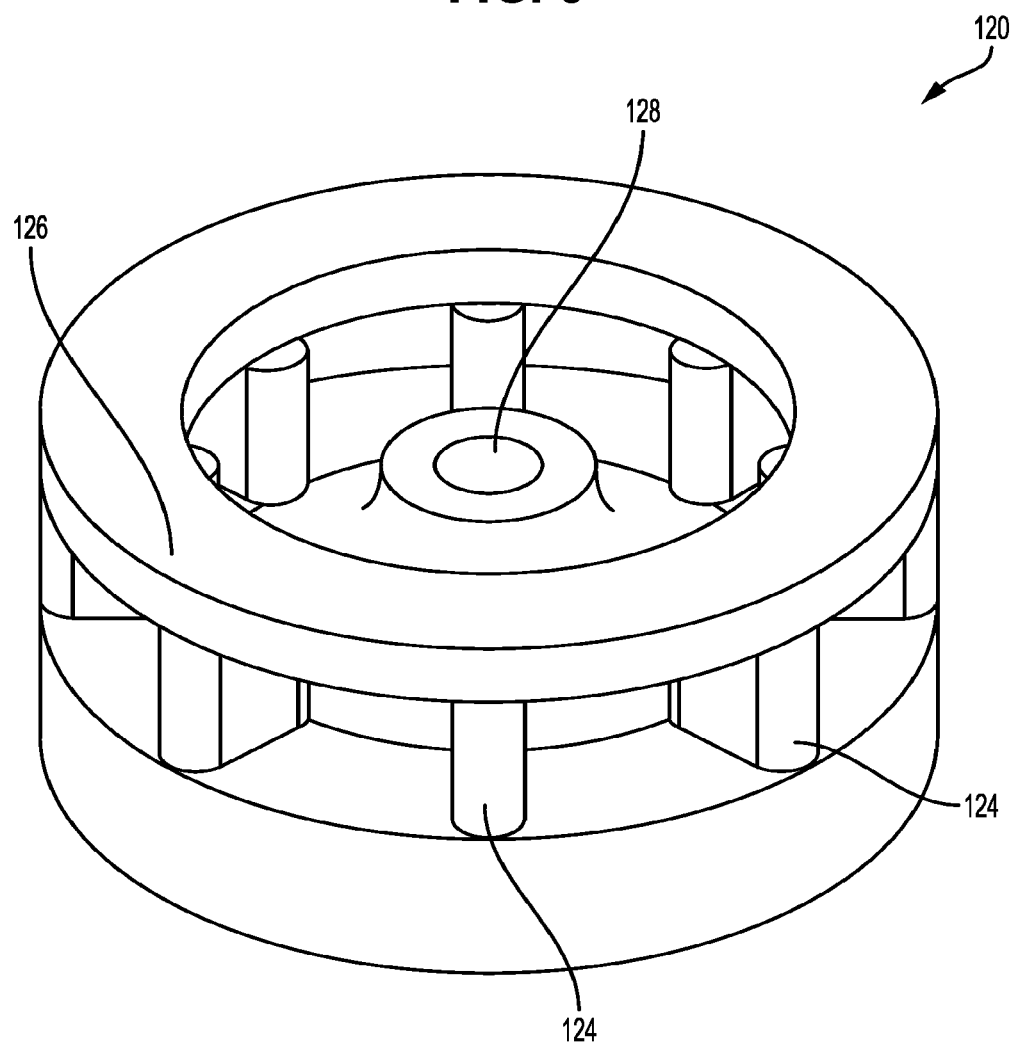
FIG. 8 shows an impeller for a carbonated beverage maker according to some embodiments.
Figure 9:
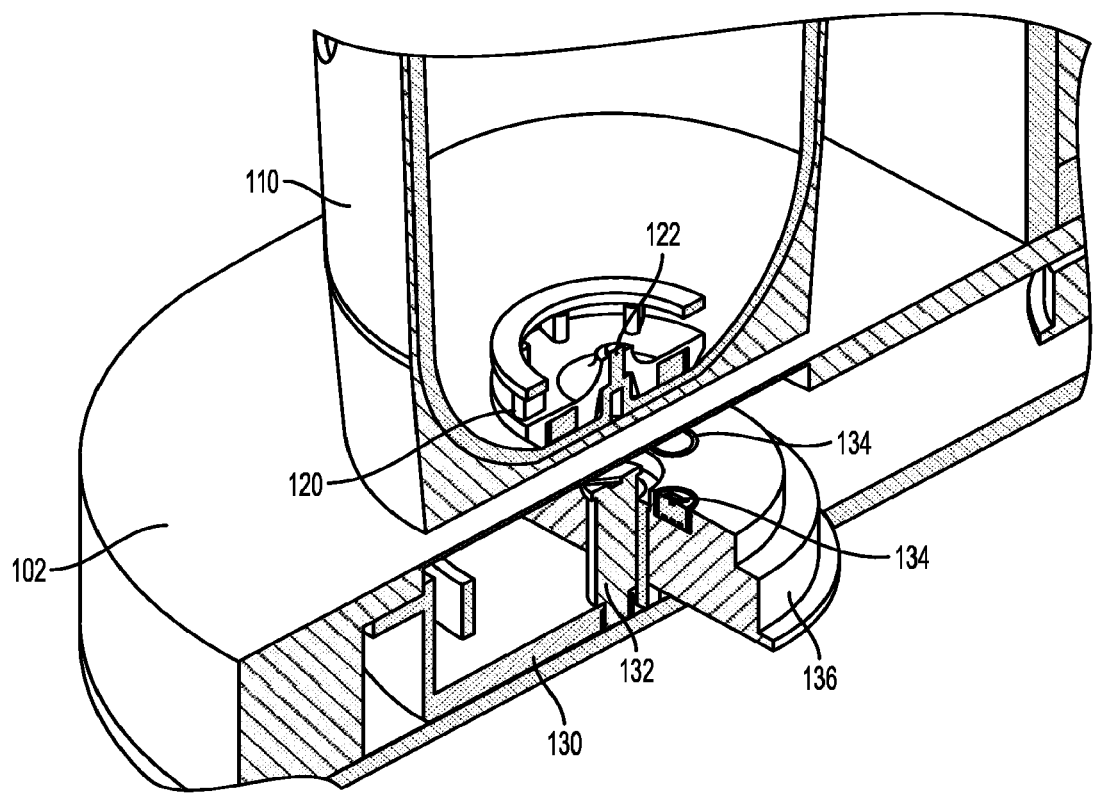
FIG. 9 shows a perspective cross-sectional view of a carbonation cup on a carbonated beverage maker according to some embodiments.

As noted above, and as shown in the schematic of FIG. 3, channels from carbonation source 150 and flavor source 160 lead to carbonation cup 110. Thus, carbonation cup 110, in some embodiments, is designed to accommodate the various systems of carbonated beverage maker 100. In some embodiments, carbonation cup 110, as shown, for example, in FIG. 4, is used to provide the diluent, flavor the diluent, cool the diluent/beverage, and carbonate the beverage. In some embodiments, one or more of these functions may be accomplished simultaneously.

In some embodiments, a user fills carbonation cup 110 with a diluent. In some embodiments, carbonation cup 110 is removable from carbonated beverage maker 100, which allows a user to more easily fill carbonation cup 110 with a diluent. In some embodiments, the diluent is water. Other diluents may also be used, including, but not limited to, milk, juice, or other drinks. In some embodiments, carbonation cup 110 may include a fill line indicator 116 for the diluent. In some embodiments, ice may be provided with the diluent. Thus, in some embodiments, fill line indicator 116 provides the fill line for the combination of diluent and ice. In some embodiments, carbonation cup 110 comprises two fill line indicators 116, 118—one for diluent and one for ice. In some embodiments, as shown, for example, in FIG. 4, ice fill line indicator 118 is below diluent fill line indicator 116. In some embodiments, ice fill line indicator 118 is above diluent fill line indicator 116. Fill line indicators 116, 118 may include visual markings, tactile markings, or a combination of both. Fill line indicators 116, 118 may include words, symbols, colors, solid lines, and/or dashed lines. In some embodiments, fill line indicators 116, 118 are only suggestions for optimal performance. A user may elect to fill carbonation cup 110 in a different manner to produce a customized beverage.

As noted above, ice may also be added to carbonation cup 110. In some embodiments, ice is a main aspect of the cooling system of carbonated beverage maker 100. In some embodiments, carbonation cup 110 comprises a material that has thermal insulation properties. For example, carbonation cup 110 may comprise plastic. In some embodiments, carbonation cup 110 includes a plastic cup 112. In some embodiments, plastic cup 112 is transparent or semi-transparent. Additional aspects of the cooling system provided by carbonation cup 110 will be discussed below.

In some embodiments, carbonation cup 110 comprises a carbonation chamber for carbonated beverage maker 100. Thus, carbonation cup 110 may be a pressure vessel capable of safely maintaining a pressure at which the beverage will be carbonated. In some embodiments, carbonation cup 110 comprises a material that can withstand high pressure. For example, carbonation cup 110 may comprise steel. In some embodiments, carbonation cup 110 includes a steel sheath 114 that surrounds plastic cup 112. In some embodiments, steel sheath 114 completely surrounds plastic cup 112 so that plastic cup 112 is not visible from outside carbonation cup 110. In some embodiments, steel sheath 114 defines one or more holes 115 therein. Thus, holes 115 in steel sheath 114 allow a user to see plastic cup 112 from outside carbonation cup 110. Fill line indicators 116, 118 may be disposed only on plastic cup 112, only on steel sheath 114, or both. When plastic cup 112 is transparent or semi-transparent, holes 115 in steel sheath 114 allow a user to see the beverage within carbonation cup 110. Moreover, a user can view the process of creating the beverage through holes 115. Holes 115 may comprise a variety of shapes, sizes, and patterns. In some embodiments, holes 115 are circular. In some embodiments, holes 115 approximate bubbles.

Carbonation cup 110 may attach to carbonated beverage maker 100 at cup docking module 180 (see FIG. 2). In some embodiments, carbonation cup 110 includes one or more attachment projections 182 around a top lip. For example, as shown in FIG. 4, carbonation cup may include four attachment projections 182. Attachment projections 182 may be configured to support carbonation cup 110 within cup docking module 180. In some embodiments, cup docking module 180 includes a support ring 184, as shown, for example in FIG. 5. In some embodiments, at an inner portion of support ring 184 are located projection mating interfaces 186 corresponding to attachment projections 182. In between each projection mating interface 186 is a gap big enough for attachment projection 182 to extend through. Thus, to attach carbonation cup 110 to cup docking module 180, a user orients carbonation cup 110 so that attachment projections 182 align with the gaps and inserts carbonation cup 110 into support ring 184 until attachment projections 182 are above projection mating interfaces 186. A user then rotates carbonation cup 110 so that attachment projections 182 are resting on projection mating interfaces 186. In some embodiments, projection mating interfaces 186 include a detent 188 to prevent accidental removal of carbonation cup 110 from cup docking module 180. For example, detent 188 may prevent early removal of carbonation cup 110 from docking module 180 while carbonation cup 110 is still pressurized. This configuration also serves to ensure that only a proper carbonation cup 110 is used with carbonated beverage maker 100.

In some embodiments, when carbonation cup 110 is attached to carbonated beverage maker 100, a sealed, pressure-tight chamber is formed. In some embodiments, an internal lip seal 144 is used to seal carbonation cup 110 with cup docking module 180. Internal lip seal 144, as shown, for example, in FIGS. 6 and 7, may be made of rubber. In some embodiments, internal lip seal 144 includes spring 146 and inner metal case 148. Spring 146 may adjust for any non-concentric aspect of carbonation cup 110. Internal lip seal 144 may expand under pressure, thus, further sealing carbonation cup 110 with cup docking module 180. In some embodiments, internal lip seal 144 is disposed in cup docking module 180 such that when carbonation cup 110 is attached to cup docking module 180, internal lip seal 144 is disposed within carbonation cup 110 around its lip.

In some embodiments, cup docking module 180 includes a micro switch 140, as shown in FIG. 3, which may detect the presence of carbonation cup 110. When carbonation cup 110 is detected, micro switch 140 closes to complete a circuit. If carbonation cup 110 is not detected, micro switch 140 remains open. An open circuit condition prevents carbonated beverage maker 100 from operating. In some embodiments, carbonation cup 110 is detected with use of light emitting diode 142.

In some embodiments, when carbonation cup 110 is attached to carbonated beverage maker 100, carbonation source 150 is operably connected with carbonation cup 110, as shown in FIG. 3. In some embodiments, carbonation source 150 comprises a $CO_2$ tank or cylinder. However, other carbonation sources may be used, which are described in further detail below. In some embodiments, a pressure regulator 152 is attached to carbonation source 150. Pressure regulator 152 may keep carbonation source 150 at a particular pressure. In some embodiments, pressure regulator 152 keeps carbonation source 150 at a pressure of 3.5 bars.

In some embodiments a supply line 158 runs from carbonation source 150 to carbonation cup 110. Supply line 158 may include $CO_2$ supply solenoid valve 154. In some embodiments, $CO_2$ supply solenoid valve 154 is controlled by control unit 106. For example, at an appropriate time during the operation of carbonated beverage maker 100, control unit 106 may communicate with $CO_2$ supply solenoid valve 154, causing $CO_2$ supply solenoid valve 154 to open and allow flow of $CO_2$ to carbonation cup 110 through supply line 158. Supply line 158 runs through cup docking module 180 and ends at an inlet into carbonation cup 110. After the desired amount of $CO_2$ has been used, control unit 106 communicates with $CO_2$ supply solenoid valve 154, causing $CO_2$ supply solenoid valve 154 to close. In some embodiments, supply line 158 may also include a pressure relief valve 156. Pressure relief valve 156 senses pressure within carbonation cup 110 and supply line 158 and is configured to open when the pressure is too high. For example, if the chamber reaches a predetermined pressure, pressure relief valve 156 may open to lower the pressure. In some embodiments, the predetermined pressure is 4.5 bars.

In some embodiments, carbonated beverage maker 100 includes a solenoid vent valve 138, as shown, for example, in the schematic of FIG. 3. After carbonation of the beverage is completed, solenoid vent valve 138 may be used to release the pressure from carbonation cup 110 through a venting process. In some embodiments, the venting process through solenoid vent valve 138 is a stepped process to reduce expansion of the foam from the carbonated beverage. The venting process may vary based on the level of carbonation, the type of flavor or diluent, and other properties of the beverage. In some embodiments, the venting process reduces spills that may occur when removing carbonation cup 110 from carbonated beverage maker 100. In some embodiments, solenoid vent valve 138 is controlled by control unit 106. Additional aspects of the carbonation system provided by carbonation cup 110 will be discussed below.

In addition to providing a connection to carbonation source 150, cup docking module 180 may also provide a connection to flavor source 160. Flavor source 160 may contain a powder, syrup, gel, liquid, beads, or other form of concentrate. In some embodiments, flavor source 160 is disposed within cup docking module 180. In some embodiments, flavor source 160 comprises a pod. In some embodiments, flavor source 160 comprises a single-serving of flavor. In some embodiments, flavor source 160 contains sufficient flavoring for multiple servings. Cup docking module 180 may be configured to receive flavor source 160. In some embodiments, carbonated beverage maker 100 is configured to open flavor source 160. Variations of pods and other flavor sources, and how carbonated beverage makers may open them, are described in more detail below.

In some embodiments, carbonated beverage maker 100 is configured to deliver the contents of flavor source 160 into carbonation cup 110, as shown, for example, in the schematic of FIG. 3. For example, carbonated beverage maker 100 may include an air pump 162. Air pump 162 may be operated by control unit 106 to pump the contents of flavor source 160 into carbonation cup 110. In some embodiments, carbonated beverage maker 100 includes a pressure relief valve 164. Pressure relief valve 164 senses the pressure related to air pump 162 and is configured to open when the pressure is too high. For example, if a predetermined pressure is reached, pressure relief valve 164 may open to lower the pressure. In some embodiments, the predetermined pressure is 1 bar.

The contents of flavor source 160 may be provided into carbonation cup 110 prior to carbonation of the beverage. Providing the contents of flavor source 160 into carbonation cup 110 prior to carbonation of the beverage may assist in producing a beverage having a desirable temperature. In some embodiments, the contents of flavor source 160 may be provided into carbonation cup 110 during or after carbonation of the beverage. In some embodiments, cup docking module 180 includes a micro switch 166, which may detect the presence of flavor source 160. When flavor source 160 is detected, micro switch 166 closes to complete a circuit. If flavor source 160 is not detected, micro switch 166 remains open. An open circuit condition prevents carbonated beverage maker 100 from operating. Additional aspects of the flavor system provided by carbonation cup 110 will be discussed below.

As noted above, aspects of the cooling system, carbonation system, and flavor system, will now be discussed further. In some embodiments, carbonation cup 110 includes an impeller 120, as shown, for example, in FIG. 8. In some embodiments, impeller 120 includes a base 121 and a plurality of blades 124 that protrude from base 121. In some embodiments, blades 124 protrude upwardly from the top of base 121. In some embodiments, blades 124 may protrude outwardly. In some embodiments, impeller 120 includes a ring 126. Ring 126 may have an outer circumference equal to the circumference of impeller 120. Ring 126 is disposed at a top portion of impeller 120, for example, above the blades 124. In some embodiments, ring 126 is attached to each of the plurality of blades 124. Thus, ring 126 may strengthen blades 124 so that ice moving within the beverage during operation of impeller 120 does not damage blades 124.

Impeller 120 may assist in cooling, carbonating, and/or flavoring a beverage. In some embodiments, impeller 120 is disposed in a bottom of carbonation cup 110, as shown, for example, in FIG. 9. In some embodiments, impeller 120 attaches to carbonation cup 110 at a spindle 122 that projects from the bottom of carbonation cup 110. Impeller 120 may include a hole 128 that interfaces with spindle 122. In some embodiments, impeller 120 is removable from carbonation cup 110. For example, hole 128 may interface with spindle 122 in such a way that secures impeller 120 to carbonation cup 110 to prevent unintentional detachment of impeller 120, but that also allows removing impeller 120, for example, for cleaning purposes.

Impeller 120 may be driven by an impeller motor 130. In some embodiments, impeller motor 130 rotates around a spindle 132. In some embodiments, impeller motor 130 includes magnets 134 to drive impeller 120, which may include a magnetic material. Magnets 134 may be embedded within a pulley wheel 136. Thus, as pulley wheel 136 rotates around spindle 132, magnets 135 drive impeller 120 to also rotate. Because impeller 120 is magnetically driven, the pressure seal of carbonation cup 110 is maintained.

Figure 10:
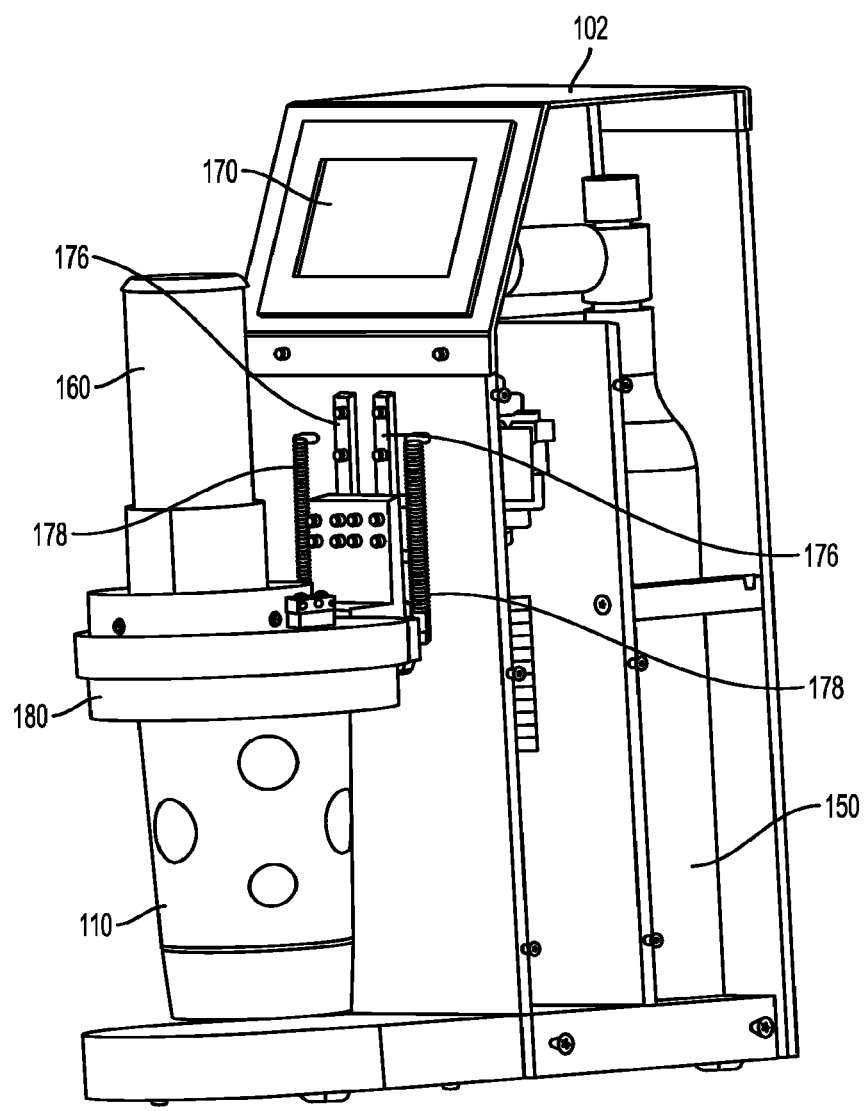
FIG. 10 shows a carbonated beverage maker according to some embodiments.

In some embodiments, cup docking module 180 attaches to carbonated beverage maker 100 via vertical rails 176, as shown, for example, in FIG. 10. In some embodiments, cup docking module 180 moves relative to vertical rails 176. In some embodiments, springs 178 are disposed adjacent to vertical rails 176. Cup docking module 180 may be attached to springs 178. In this configuration, springs 178 operate to locate cup docking module 180 along vertical rails 176. Thus, without the weight of carbonation cup 110, cup docking module 180 is disposed along vertical rails 176 at a location that provides enough room underneath cup docking module to easily insert carbonation cup 110 into cup docking module 180. When carbonation cup 110 is attached to cup docking module 180, its weight pulls cup docking module 180 down to a lower position along vertical rails 176 so that impeller 120 is close enough to magnets 134 to be driven by impeller motor 130.

In operation, impeller 120 serves the function of agitating the ice/water/flavor/$CO_2$ mixture. As a result, impeller 120 assists in cooling the beverage, mixing the beverage so that the flavor is homogenous in the beverage, and carbonating the beverage. In some embodiments, impeller 120 creates a vortex that draws the pressurized $CO_2$ near the bottom of carbonation cup 110. In some embodiments, ring 126 of impeller 120 may assist in creating smaller gas bubbles that carbonate the beverage in carbonation cup 110, thus improving the quality of carbonation. For example, the smaller gas bubbles may lead to a drink that maintains its carbonation for a longer period of time. As noted, the vortex also mixes the ice and water to produce a beverage at a cool temperature. In some embodiments, the ice counteracts the heat generated by the carbonation process. In some embodiments, most or all of the ice melts during the operation of impeller 120.

In some embodiments, carbonated beverage maker 100 includes a user interface that allows a user to operate the device to make a carbonated beverage. The user interface may include, for example, dials, push buttons, switches, knobs, touch screens, display screens, lights, or a combination of these and other controls. In some embodiments, the user interface allows the user to customize the beverage. For example, the user may select a level of carbonation for the beverage (e.g., low carbonation, medium carbonation, high carbonation).

Carbonated beverage maker 100 may include a memory that stores recipes for producing particular beverages. For example, the recipe for low carbonation may be stored in memory such that when a user selects low carbonation on the user interface, control unit controls the functions of carbonated beverage maker 100 based on the recipe stored in the memory. In some embodiments, a recipe may be associated with flavor source 160 that is inserted into carbonated beverage maker 100. In some embodiments, carbonated beverage maker 100 is configured to identify flavor source 160 and use the corresponding recipe.

Figure 11:
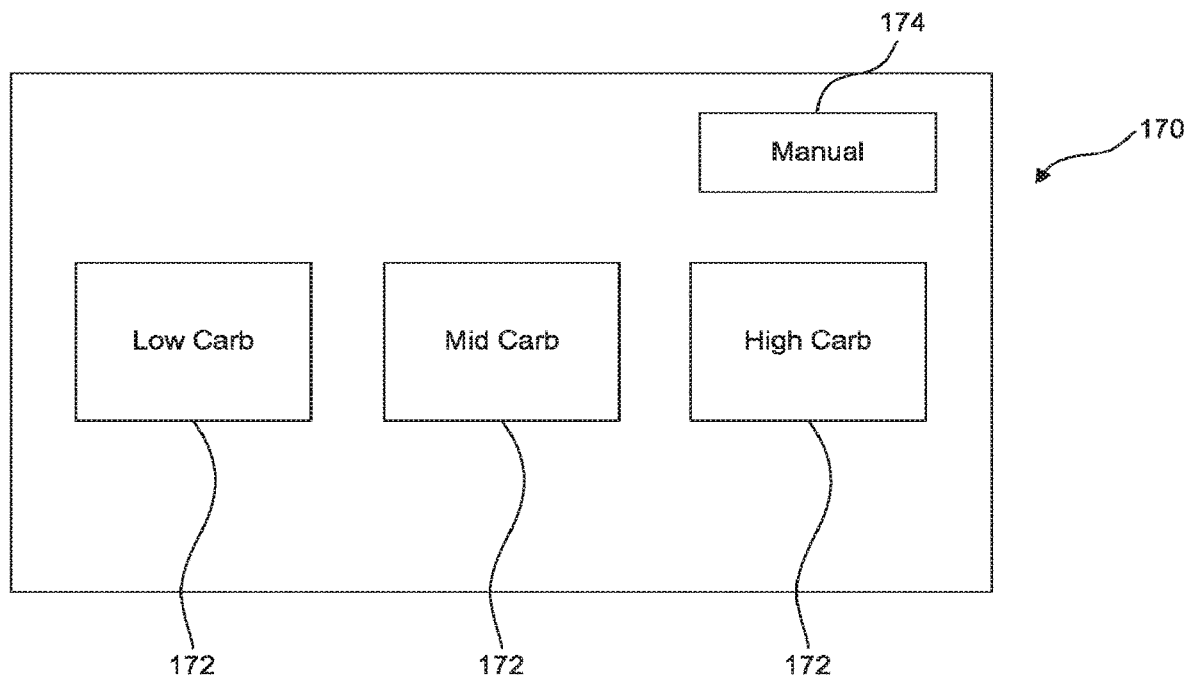
FIG. 11 shows a user interface for a carbonated beverage maker according to some embodiments.
Figure 12:
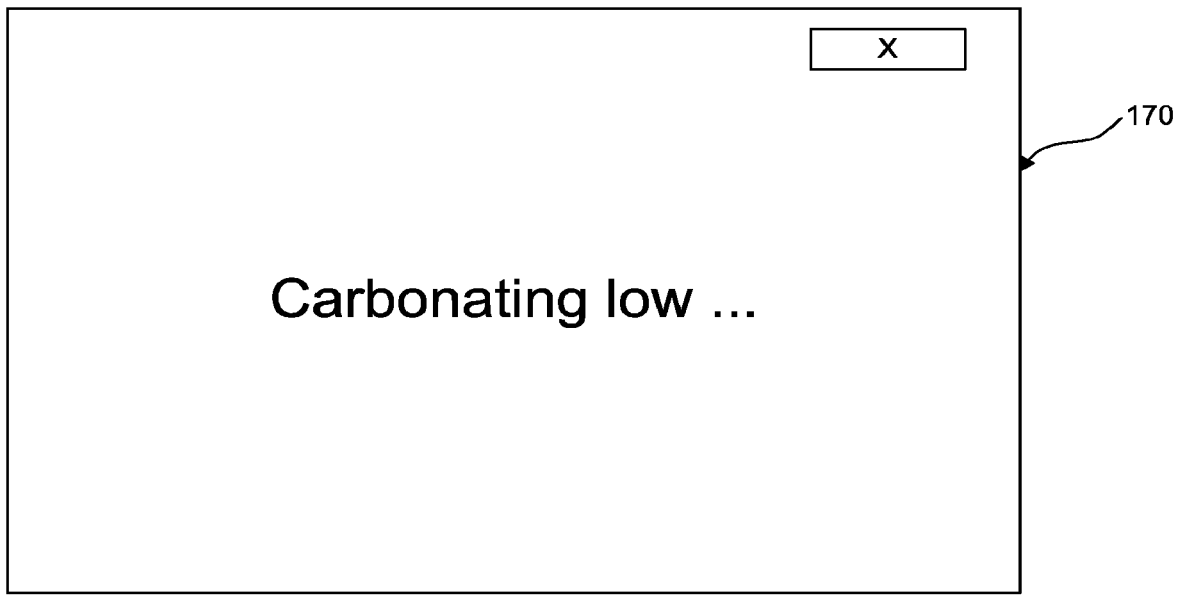
FIG. 12 shows a user interface for a carbonated beverage maker according to some embodiments.

In some embodiments, the user interface comprises a touch screen 170. Touch screen 170 receives input from a user. In some embodiments, touch screen 170 is operably connected to control unit 106. Thus, control unit 106 may control the components of carbonated beverage maker 100 based on input received at touch screen 170. For example, as shown in FIG. 11, touch screen 170 may display selectable options 172 for making a beverage. Selectable options 172 may include, for example, an option for low carbonation (e.g., low carb), medium carbonation (e.g., mid carb), and high carbonation (e.g., high carb). Selectable options 172 may include an option for manual operation of carbonated beverage maker 100. In some embodiments, manual operation allows a user to specifically control the carbonation process rather than relying on a recipe stored in the memory of carbonated beverage maker 100. In some embodiments, when a selectable option 172 is chosen, touch screen 170 may change to communicate the selected option. For example, as shown in FIG. 12, when a user selects low carbonation, touch screen 170 may communicate that carbonated beverage maker 100 is carbonating the beverage at a low setting. In some embodiments, touch screen 170 includes a separate start button. In some embodiments, selectable options 172 operate simultaneously as a selection button and a start button.

In some embodiments, additional levels of carbonation may be options. For example, a user may select the level of carbonation on a scale from one to ten. In some embodiments, the user interface provides a continuous scale of carbonation rather than discrete options. For example, a rotating knob may be used to select a carbonation level.

Figure 13:
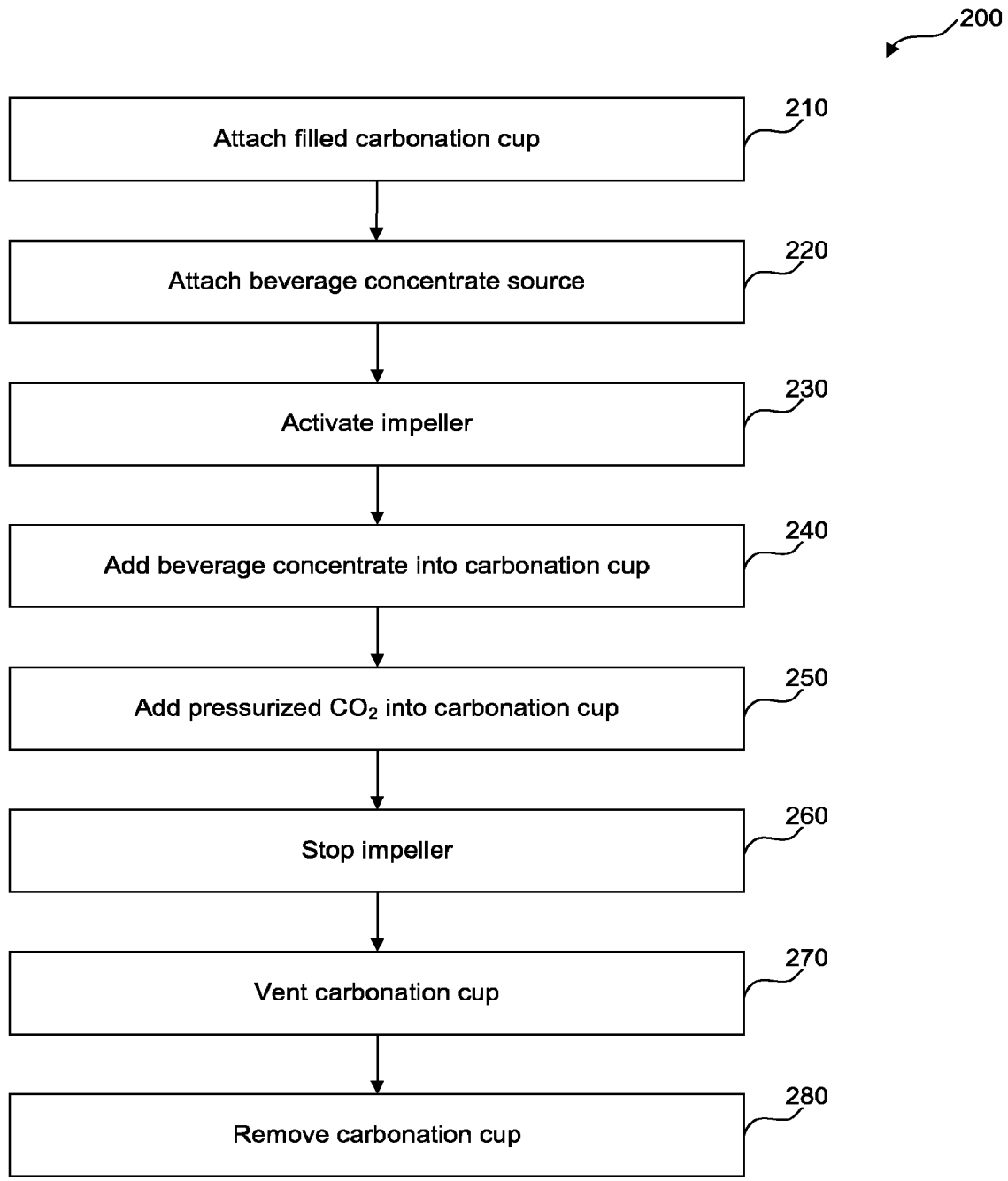
FIG. 13 shows a method of using a carbonated beverage maker according to some embodiments.

A method 200 of using carbonated beverage maker 100, as shown, for example, in FIG. 13, will now be described in more detail. At operation 210, filled carbonation cup 110 is attached to carbonated beverage maker 100. In some embodiments, a user may fill carbonation cup 110 with a diluent. In some embodiments, a user may add ice with the diluent. For example, in some embodiments, the user may add a pre-determined amount of ice and water to carbonation cup 110. Other diluents may be used. For example, a user may fill carbonation cup 110 with water, juice, milk, or any other drink. In some embodiments, the user may also add other additives to carbonation cup 110, such as fruit. To attach filled carbonation cup 110 to carbonated beverage maker at operation 210, the user may fit carbonation cup 110 to cup docking module 180 and twist carbonation cup 110 to lock it into position.

At operation 220, concentrate may be added to carbonated beverage maker 100. In some embodiments, concentrate is added by attaching a beverage concentrate source (e.g., flavor source 160) to carbonated beverage maker 100. In some embodiments, carbonated beverage maker 100 includes a receptacle for directly containing concentrate. The concentrate may be in the form of powder, liquid, gel, syrup, or beads, for example. After flavor source 160 and carbonation cup 110 are attached to carbonated beverage maker 100, micro switches 140 and 166 will be in a closed position, thus allowing carbonated beverage maker 100 to operate.

In some embodiments, a user may start carbonated beverage maker 100 via the user interface (e.g., touch screen 170). For example, the user may select the carbonation level and push start. At operation 230 (after the user starts the device), impeller 120 is activated. In some embodiments, impeller 120 agitates the ice and water. In some embodiments, the ice melts to produce water at about 1° C. As described above, impeller 120 is magnetically coupled to impeller motor 130 to avoid compromising the pressure envelope of carbonation cup 110.

At operation 240, the beverage concentrate is added into carbonation cup 100. In some embodiments, the concentrate from flavor source 160 is deposited into the ice/water mixture. In some embodiments, this is accomplished with use of air pump 162. In some embodiments, operation 230 and operation 240 occur simultaneously (i.e., the concentrate is deposited at the same time that impeller 120 begins rotating).

At operation 250, pressurized $CO_2$ is added into carbonation cup 110. In some embodiments, $CO_2$ supply solenoid valve 154 is opened to add $CO_2$ into carbonation cup. In some embodiments, the headspace (the space above the beverage mixture) is filled with $CO_2$ at pressure. In some embodiments, as the temperature drops and the pressure is maintained, the beverage is carbonated. In some embodiments, impeller 120 creates a vortex, thus bringing the $CO_2$ to the bottom of carbonation cup 110 and further encouraging carbonation of the beverage. Carbonated beverage maker 100 may run (i.e., $CO_2$ supply solenoid valve 154 is open and impeller 120 is rotating) for a fixed time period. In some embodiments, carbonated beverage maker 100 may run for between 15 and 120 seconds. In some embodiments, carbonated beverage maker 100 may run for between 30 and 60 seconds. In some embodiments, carbonated beverage maker 100 may run for 45 seconds. The length of time carbonated beverage maker 100 runs is based, at least partially, on the desired level of carbonation. Thus, the length of time carbonated beverage maker 100 runs may depend on the option selected by the user with the user interface. In manual operation, the user may directly start and stop carbonated beverage maker 100 at whatever length of time the user desires.

At operation 260, impeller 120 is stopped. In some embodiments, at or near the same time as stopping the impeller, the gas supply is isolated, for example by closing $CO_2$ supply solenoid valve 154.

At operation 270, carbonation cup 110 is vented. As noted above, the venting process may be a stepped process. In some embodiments, carbonation cup 110 is vented through solenoid vent valve 138. Control unit 106 may open and close solenoid vent valve 138 repeatedly to keep the foam in carbonation cup 110 from expanding. This process reduces the likelihood of the beverage from overflowing and/or spilling upon removal of carbonation cup 110 from carbonated beverage maker 100.

At operation 280, carbonation cup 110 is removed from carbonated beverage maker 100. In some embodiments, the carbonated beverage may be poured from carbonation cup 110 into a serving cup. In some embodiments, the carbonated beverage may be consumed directly from carbonation cup 110. To repeat the process, carbonation cup 110 may be rinsed and washed. Thus, carbonated beverage maker 100 is capable of providing back-to-back drinks.

Although the operations of method 200 have been described in a particular order, the order is not essential to method 200. In addition, some of the described operations are not necessary. For example, in some embodiments, a user may desire to simply carbonate water, or some other diluent, in which case, there may not be a beverage concentrate to add into carbonation cup 110. Finally, there may be additional operations not described here that may constitute part of method 200.

Figure 14:
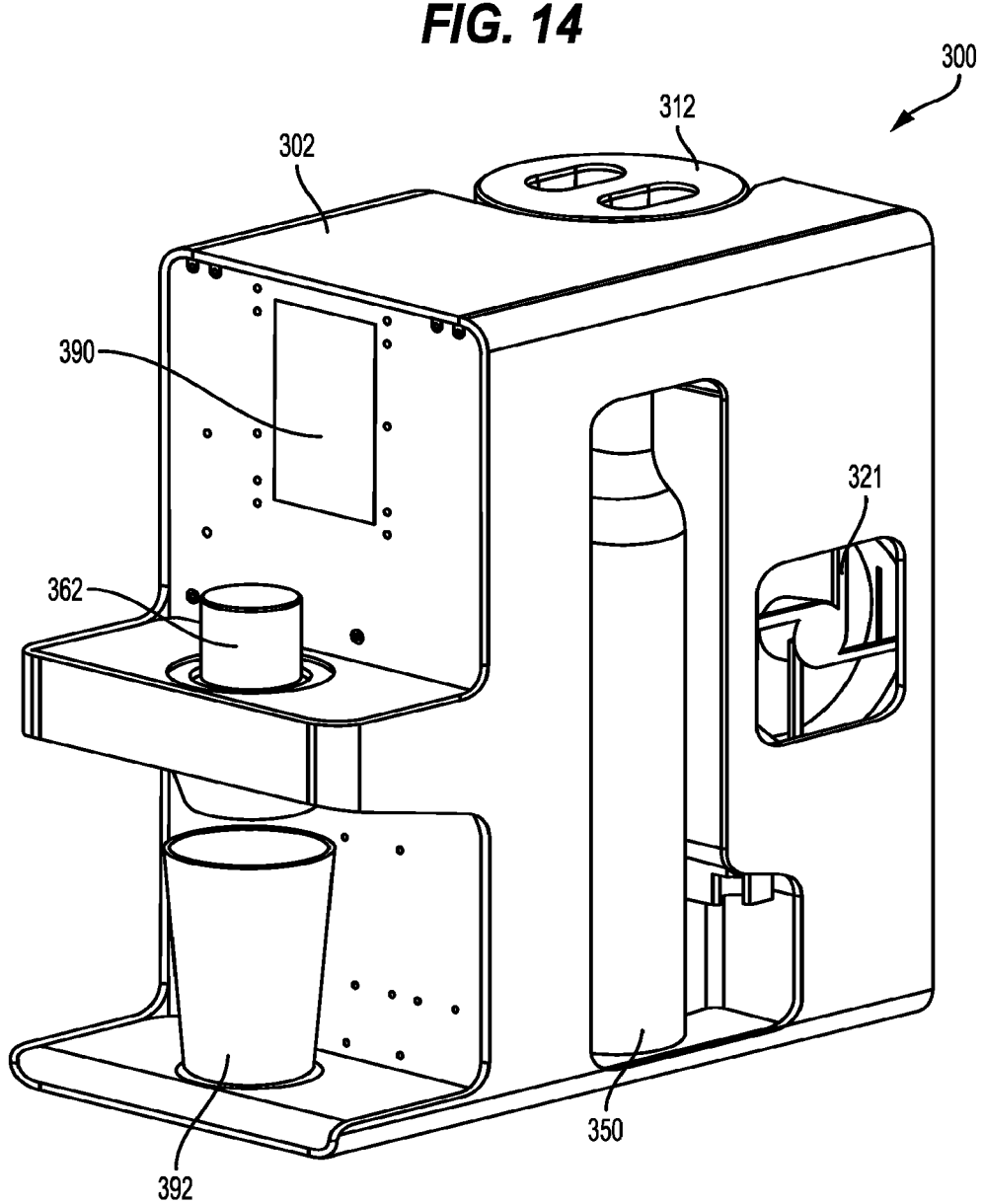
FIG. 14 shows a perspective view of a carbonated beverage maker according to some embodiments.
Figure 15:
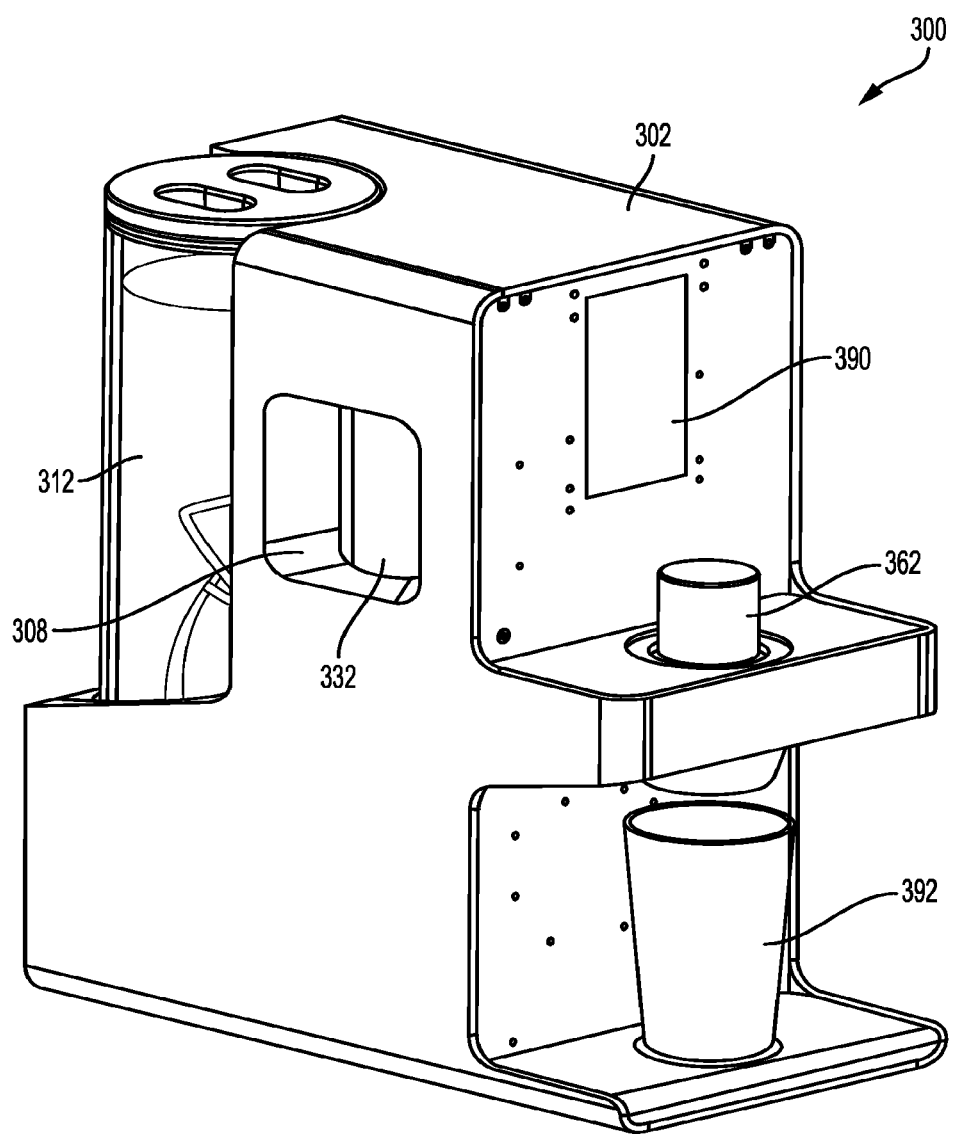
FIG. 15 shows a perspective view of a carbonated beverage maker according to some embodiments.

Some embodiments of a carbonated beverage maker will now be described with reference to FIGS. 14-36. In some embodiments, as shown, for example, in FIGS. 14 and 15, a carbonated beverage maker 300 includes a diluent system, a cooling system, a carbonation system, and a flavor system. In some embodiments, carbonated beverage maker 300 includes a housing 302. In some embodiments, housing 302 provides the infrastructure to contain and/or support each of the systems of carbonated beverage maker 300.

Components of these systems and other aspects of carbonated beverage maker 300 may be visible from outside carbonated beverage maker 300. For example, in some embodiments, a carbonation source 350 (see FIG. 14) and a carbonation chamber 332 (see FIG. 15) of the carbonation system are disposed within a main portion of housing 302 and may be visible from outside carbonated beverage maker 300. In some embodiments, housing 302 includes a viewing window 308. In some embodiments, viewing window 308 allows a user to see the carbonation process, for example, in carbonation chamber 332. In some embodiments, viewing window 308 comprises a transparent material, such as plastic or glass. In some embodiments, viewing window 308 is simply a lack of material (i.e., a hole in housing 302). In some embodiments, a water reservoir 312 and a fan 321 of the diluent system and the cooling system are disposed within the main portion of housing 302 and may be visible from outside carbonated beverage maker 300. In some embodiments, housing 302 supports flavor source 362 of the flavor system.

Thus, in some embodiments, carbonated beverage maker 300 includes an onboard water reservoir 312 that allows carbonated beverage maker 300 to make multiple drinks. Water may be stored and maintained at a cool temperature in water reservoir 312. In some embodiments, water reservoir 312 may supply water to carbonation chamber 332, which is disposed within carbonated beverage maker 300, where it is carbonated. In some embodiments, carbonation chamber 332 then supplies carbonated water to be dispensed directly into a drinking cup 392 along with concentrate from flavor source 362. In some embodiments, a user interface, such as touch screen 390, is disposed on housing 302 to allow a user to operate carbonated beverage maker 300.

Figure 16:
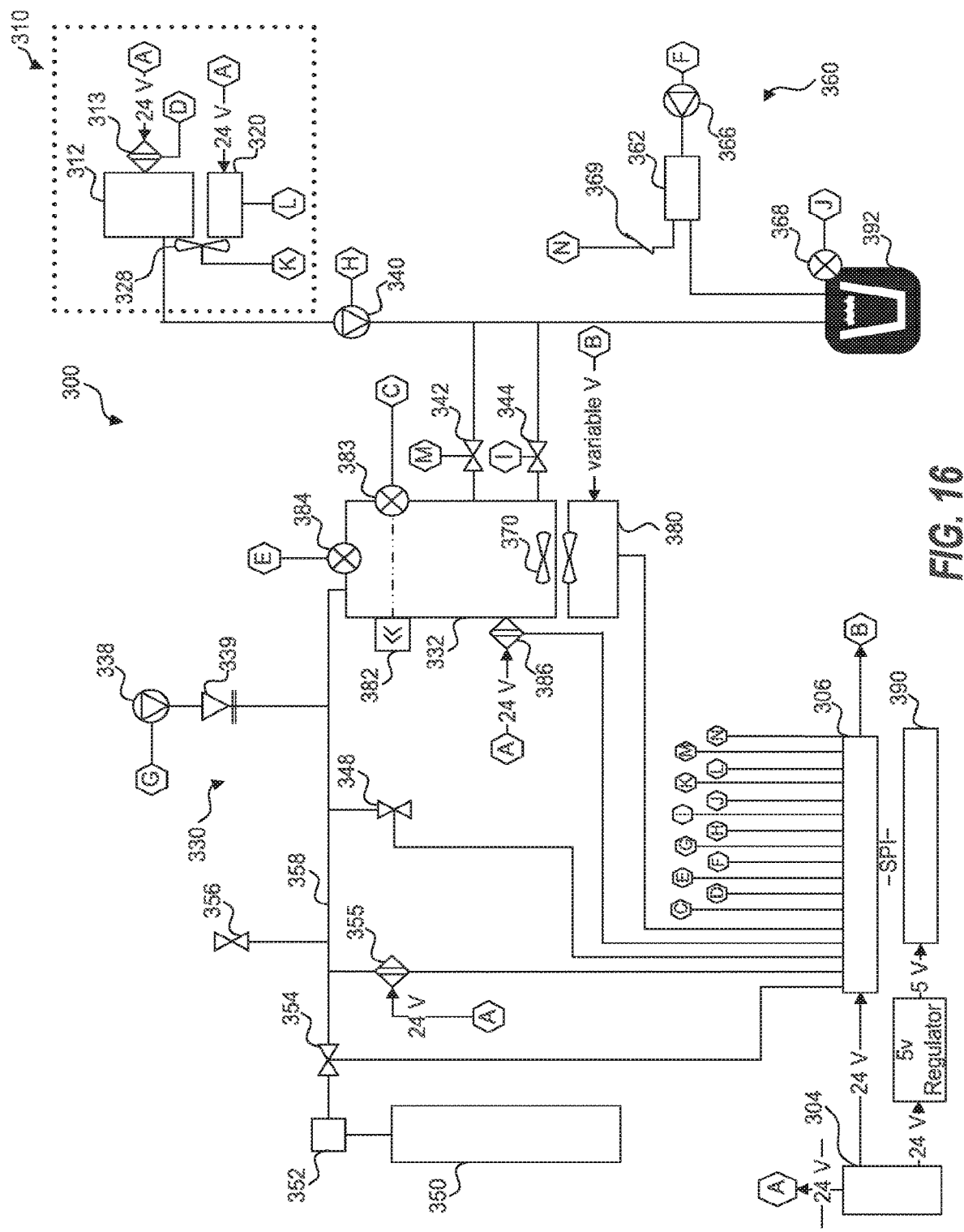
FIG. 16 shows a schematic of a carbonated beverage maker according to some embodiments.

FIG. 16 illustrates a schematic that provides an overview of key components of carbonated beverage maker 300 according to some embodiments. In some embodiments, carbonated beverage maker 300 comprises a power supply 304 and a control unit 306. Power supply 304 provides adequate power to control unit 306 and all other components of carbonated beverage maker 300 in need of power. In some embodiments, power supply 304 provides a constant voltage to one or more components of carbonated beverage maker 300 (e.g. 24 volts to control unit 306). In some embodiments, power supply 304 provides a varying voltage to one or more components of carbonated beverage maker 300 (e.g., varying voltage to an impeller motor 380). In some embodiments, power supply 304 provides the varying voltage indirectly to one or more components of carbonated beverage maker 300 (e.g., constant 24 volts to control unit 306; varying voltage from control unit 306 to impeller motor 380). In some embodiments, power supply 304 provides a constant voltage (e.g., 24 volts) which may be reduced (e.g., 5 volts) before providing power to one or more components of carbonated beverage maker 300 (e.g., touch screen 390). In some embodiments, power source 304 comprises a battery. For example, carbonated beverage maker 300 may operate solely by battery power. In some embodiments, power source 304 comprises a plug to be inserted into an electrical outlet of a user's home.

In some embodiments, control unit 306 controls the operation of carbonated beverage maker 300. In some embodiments, control unit 306 is operably connected to each of the components of carbonated beverage maker 300 to control the beverage creation process. As noted above, control unit 306 utilizes power from power source 304. In some embodiments, control unit 306 supplies power to other components of carbonated beverage maker 300. In some embodiments, control unit 306 receives inputs from touch screen 390. In some embodiments, control unit 306 communicates with touch screen 390 through a serial peripheral interface. In some embodiments, control unit 306 uses inputs from touch screen 390 to determine the operation of other components of carbonated beverage maker 300. In some embodiments, control unit 306 communicates with components of carbonated beverage maker 300 with digital inputs and outputs. In some embodiments, control unit 306 communicates with components of carbonated beverage maker 300 through analog communication. In some embodiments, both digital and analog communication are utilized. Control unit 306 may communicate with one or more of a $CO_2$ supply solenoid valve 354, a pressure sensor 355, a solenoid vent valve 348, a carbonation monitor thermistor 386, an impeller motor 380, a level sensor 382, a reservoir temperature sensor 313, a light emitting diode 384 at carbonation chamber 332, an air pump 366 for pumping concentrate from flavor source 362, an air pump 338 for pumping carbonated water from carbonation chamber 332, a water fill pump 340, a dispense valve 344, a light emitting diode 368 at drinking cup 392, a fan 328, a cooling module 320, a water fill valve 342, and a micro switch 369. In some embodiments, control unit 106 comprises a microcontroller.

As shown in FIG. 16, carbonated beverage maker 300 includes a diluent and cooling system 310, a carbonation system 330, and a flavor system 360. In some embodiments, these systems may overlap. For example, one component, such as water fill valve 342, may be considered part of diluent and cooling system 310 and part of carbonation system 330.

Figure 17:
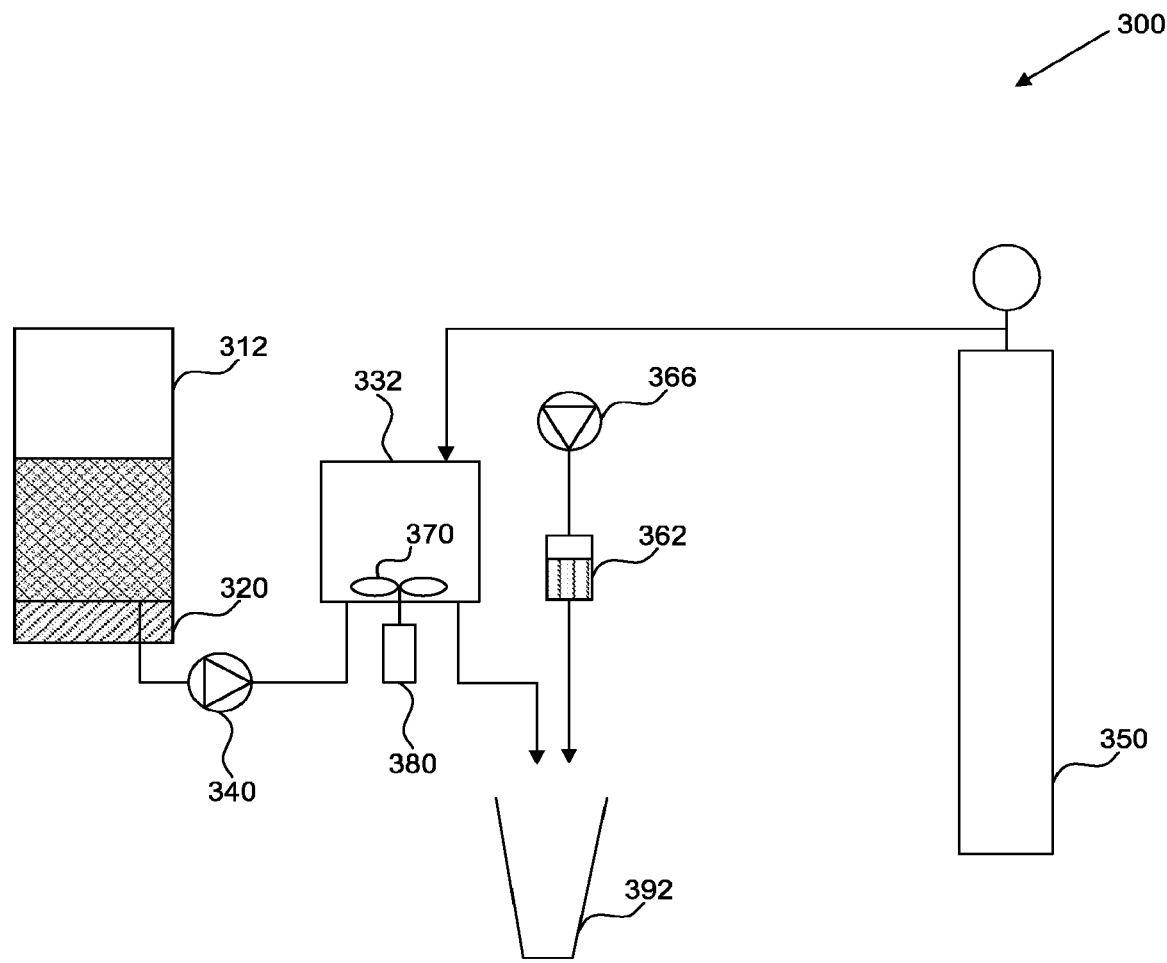
FIG. 17 shows a simplified schematic of a carbonated beverage maker according to some embodiments.

Diluent and cooling system 310, carbonation system 330, and flavor system 360 work together to create carbonated beverages. For example, a simplified schematic of carbonated beverage maker 300 is shown in FIG. 17. Water reservoir 312 stores water, which may be maintained at a cool temperature by cooling module 320. In some embodiments, a water fill pump 340 pumps water from water reservoir 312 into carbonation chamber 332, where the water is carbonated. In some embodiments, carbonation source 350 supplies $CO_2$ to carbonation chamber 332. In some embodiments, an impeller 370, magnetically driven by an impeller motor 380, is disposed in carbonation chamber 332 and operates to encourage carbonation of water. In some embodiments, the carbonated water is dispensed into drinking cup 392 along with concentrate from flavor source 362, which may be pumped by air pump 366. Further details of embodiments of carbonated beverage maker 300 are described below.

Figure 18:
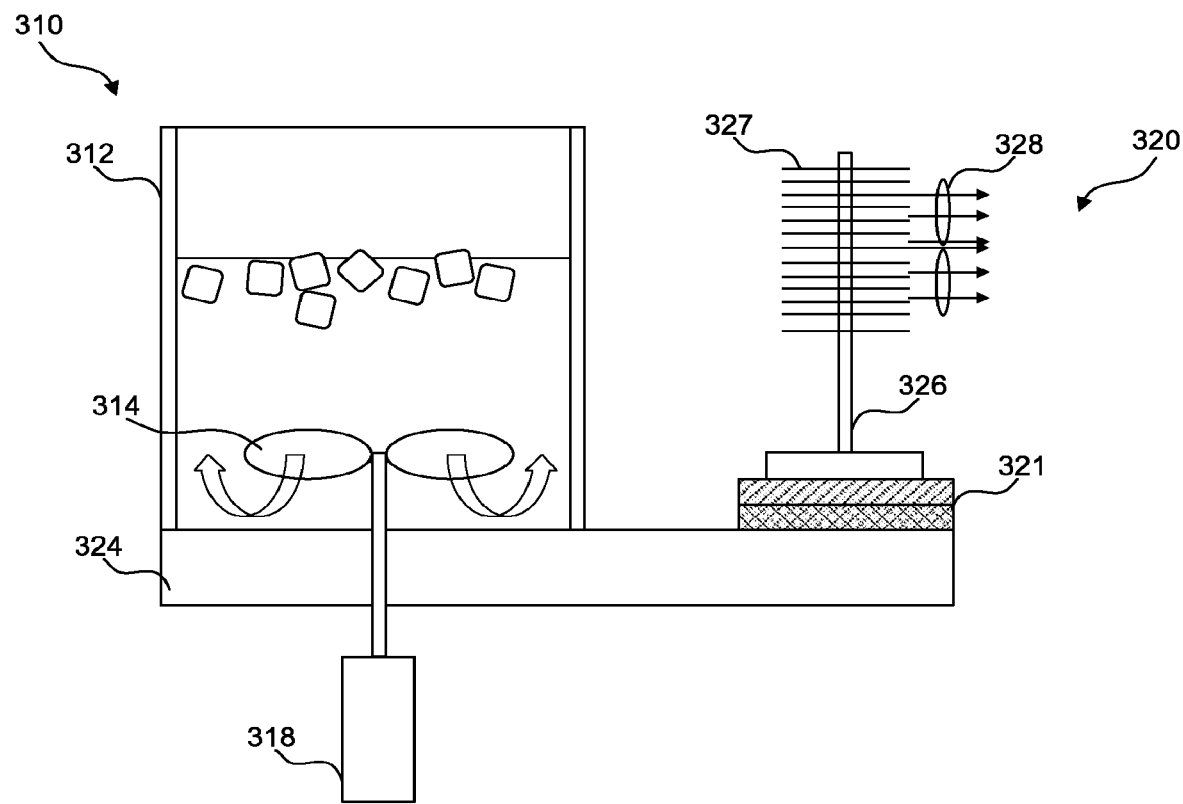
FIG. 18 shows a cooling system and a diluent system of a carbonated beverage maker according to some embodiments.
Figure 19:
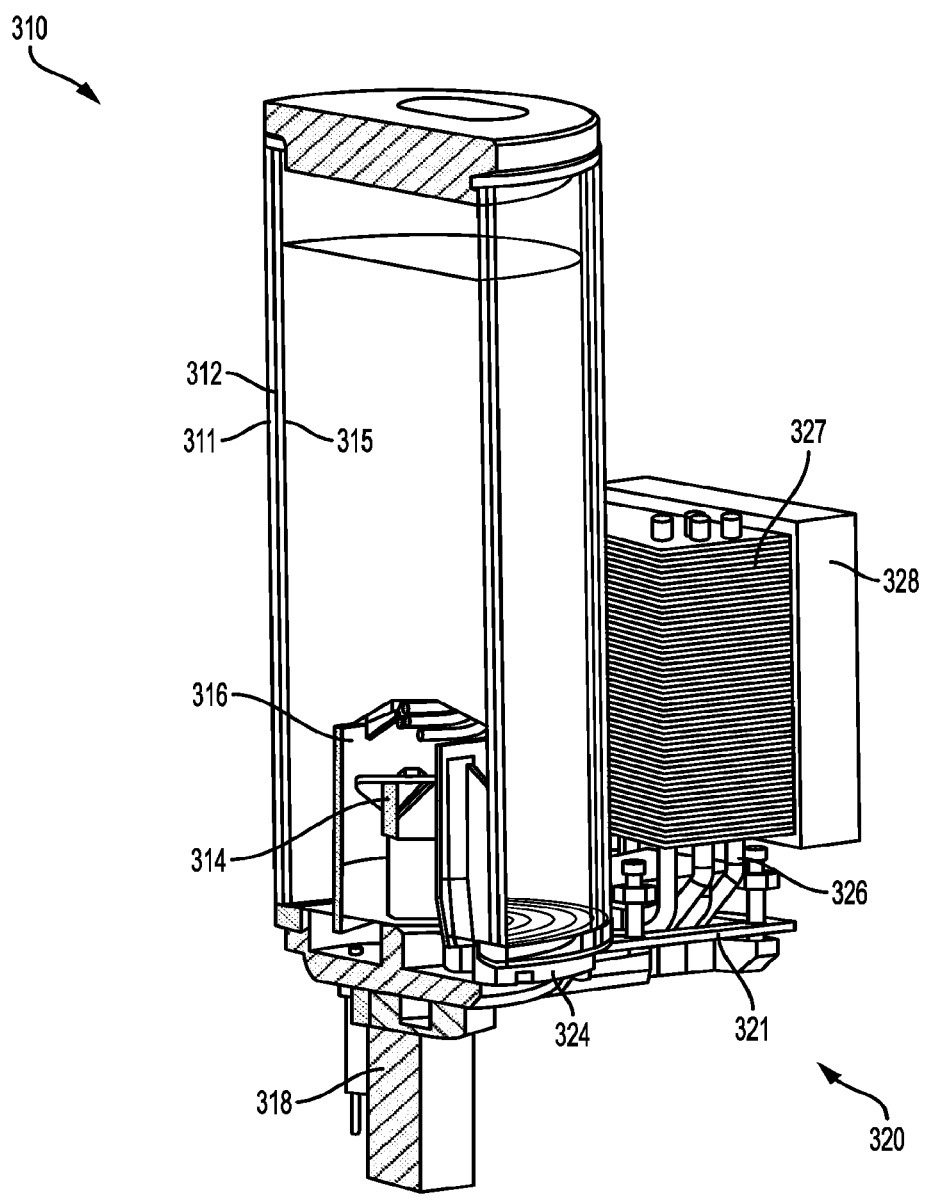
FIG. 19 shows a perspective cross-sectional view of a cooling system and a diluent system of a carbonated beverage maker according to some embodiments.

In some embodiments, diluent and cooling system 310, as shown, for example in FIGS. 18 and 19, comprises water reservoir 312, reservoir temperature sensor 313 (see FIG. 16), an impeller 314, a shroud or flow conditioner 316, an impeller motor 318, and cooling module 320. Components of cooling module 320 will be discussed further below.

In some embodiments, water reservoir 312 is configured to store water. In some embodiments, water reservoir 312 is configured to store enough water to prepare multiple beverages. For example, water reservoir 312 may be able to store enough water to prepare at least six beverages. In some embodiments, water reservoir 312 may be able to store at least two and a half liters of water. In some embodiments, water reservoir 312 is configured to store water and ice. In some embodiments, the ice cools the water down to a desirable drinking temperature. In some embodiments, a user may fill water reservoir 312 with water and/or ice. In some embodiments, water reservoir 312 is fixed relative to carbonated beverage maker 300. In some embodiments, water reservoir 312 is removable from carbonated beverage maker 300, which may make it easier for a user to fill water reservoir 312.

In some embodiments, water reservoir 312 is double walled, as shown, for example, in FIG. 19, with an outer wall 311 and an inner wall 315. In some embodiments, inner wall 315 contains water in water reservoir 312 and outer wall 311 traps air between inner wall 315 and outer wall 315. Thus, outer wall 311 and inner wall 315 may operate to insulate water reservoir 312 and limit heat exchange between the water and/or ice within water reservoir 312 and the outside environment.

In some embodiments, water reservoir 312 comprises an impeller 314 disposed therein. In some embodiments, impeller 314 is disposed at a bottom of water reservoir 312. In some embodiments, impeller 314 is magnetically coupled to and driven by an impeller motor 318, similar to the relationship between impeller 120 and impeller motor 130 described above. In some embodiments, impeller 314 operates to agitate the water and/or ice within water reservoir 312. In some embodiments, impeller 314 keeps ice from forming at the bottom of water reservoir 312 by circulating the water within water reservoir 312. In some embodiments, flow conditioner 316 is disposed at a bottom of water reservoir 312, as shown, for example, in FIGS. 19 and 20. In some embodiments, flow conditioner 316 surrounds impeller 314. In some embodiments, flow conditioner 316 is configured to assist impeller 314 in achieving a good flow over the bottom of reservoir 312 to reduce ice formation. In some embodiments, flow conditioner 316 is configured to prevent a vortex from forming within water reservoir 312. Flow conditioner 314 may also protect impeller 314 from ice moving within water reservoir 312 that could damage impeller 314.

Figure 20:
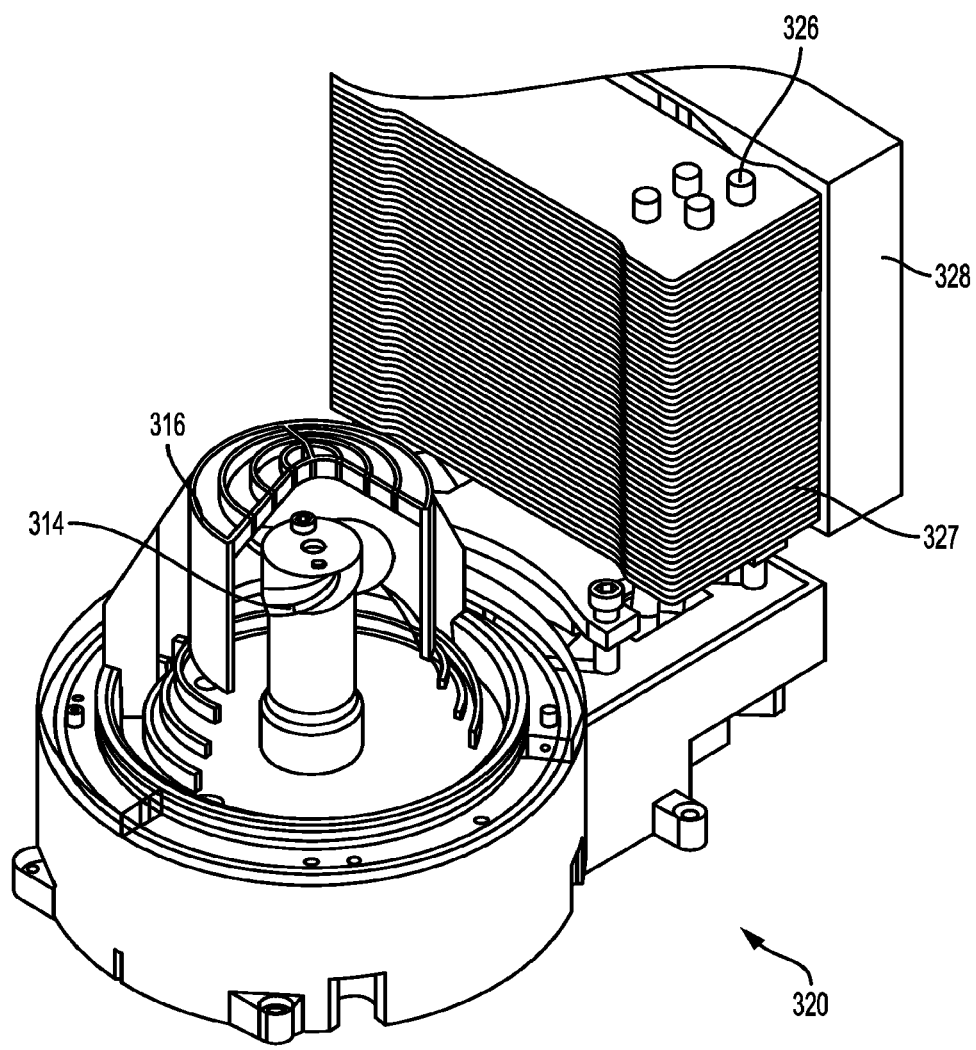
FIG. 20 shows a perspective view of a portion of a cooling system and a diluent system of a carbonated beverage maker according to some embodiments.

In some embodiments, water reservoir 312 is operatively connected to cooling module 320, as shown, for example, in FIGS. 18-20. In some embodiments, cooling module 320 lowers the temperature of water within water reservoir 312. In some embodiments, cooling module 320 simply maintains the temperature of water in water reservoir 312. In some embodiments, reservoir temperature sensor 313 is disposed on or within water reservoir 312 and configured to measure the temperature of the water within water reservoir 312. In some embodiments, results from reservoir temperature sensor 313 may affect the operation of carbonated beverage maker 300. For example, the results from reservoir temperature sensor 313 may lead to carbonated beverage maker 300 turning cooling module 320 on or off to ensure the water is at a desirable drinking temperature. In some embodiments, the results from reservoir temperature sensor 313 may cause carbonated beverage maker 300 to display a message on touch screen 390 regarding the temperature of the water in water reservoir 312. For example, touch screen 390 may inform the user that more ice needs to be added to water reservoir 312.

In some embodiments, cooling module 320 may include a thermoelectric cooler 321, a cold plate 324, a heat pipe assembly 326, fins 327, and a fan 328. In some embodiments, cold plate 324 forms a base of water reservoir 312. In some embodiments, thermoelectric cooler 321 is disposed on cold plate 324. In some embodiments, cold plate 324 extends beyond water reservoir 312 and thermoelectric cooler 321 is disposed on that portion of cold plate 324 adjacent to water reservoir 312, as shown, for example, in FIGS. 18-20.

Figure 21:
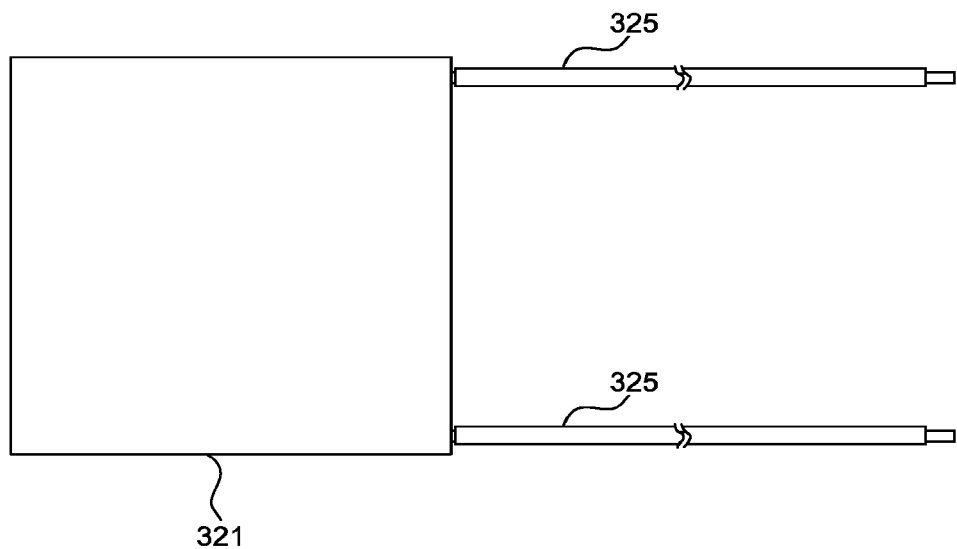
FIG. 21 shows a top view of a thermoelectric cooler for a carbonated beverage maker according to some embodiments.
Figure 22:
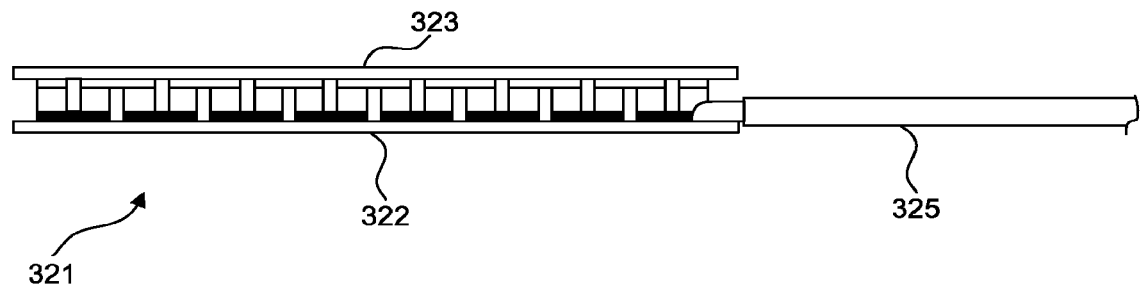
FIG. 22 shows a side view of a thermoelectric cooler for a carbonated beverage maker according to some embodiments.
Figure 23:
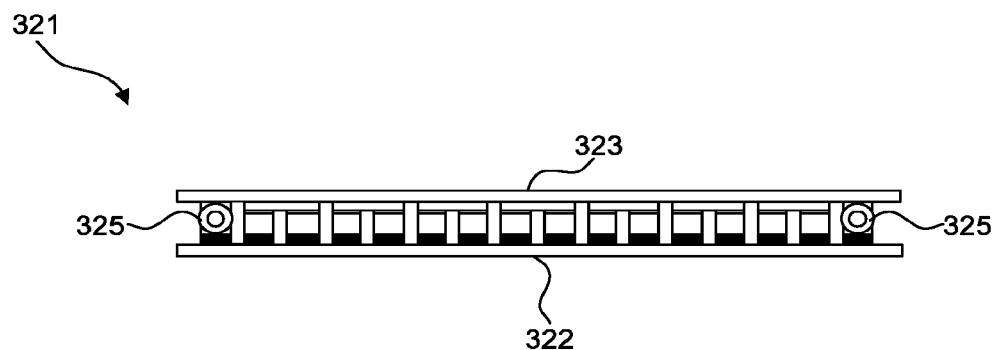
FIG. 23 shows a side view of a thermoelectric cooler for a carbonated beverage maker according to some embodiments.
Figure 24:
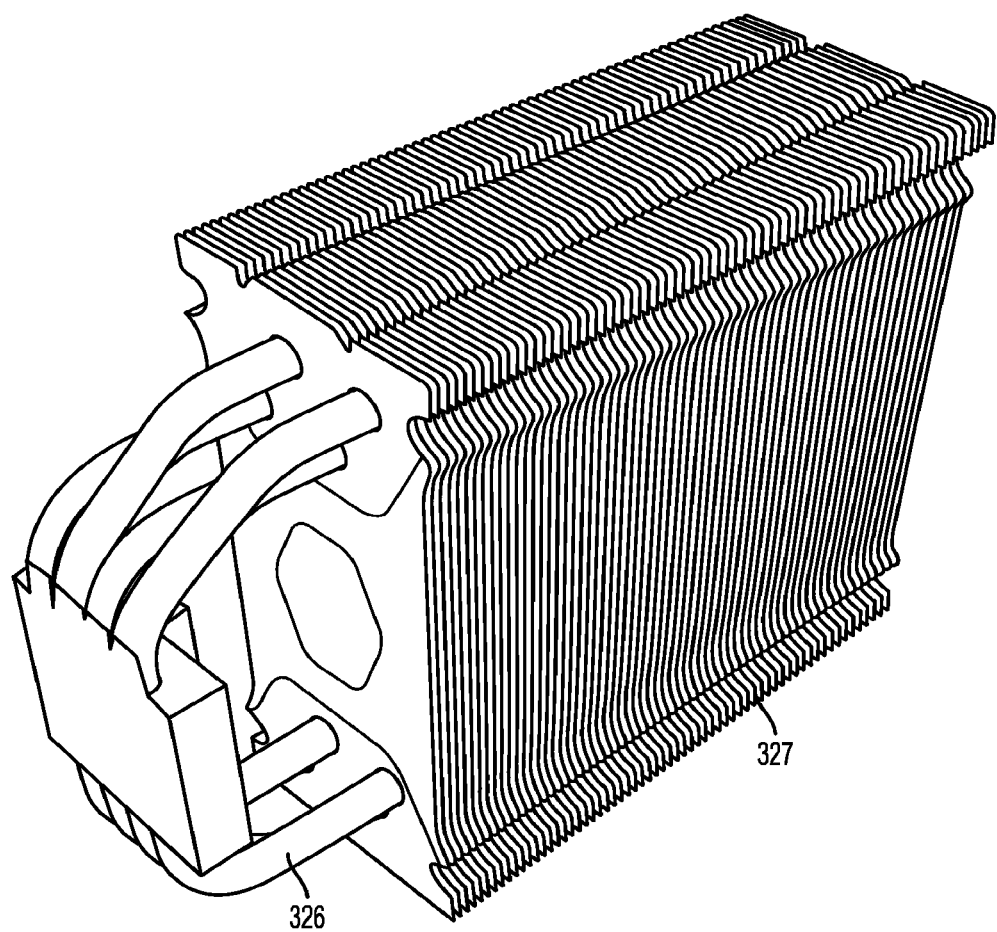
FIG. 24 shows a perspective view of a heat pipe assembly and fins for a carbonated beverage maker according to some embodiments.
Figure 25:
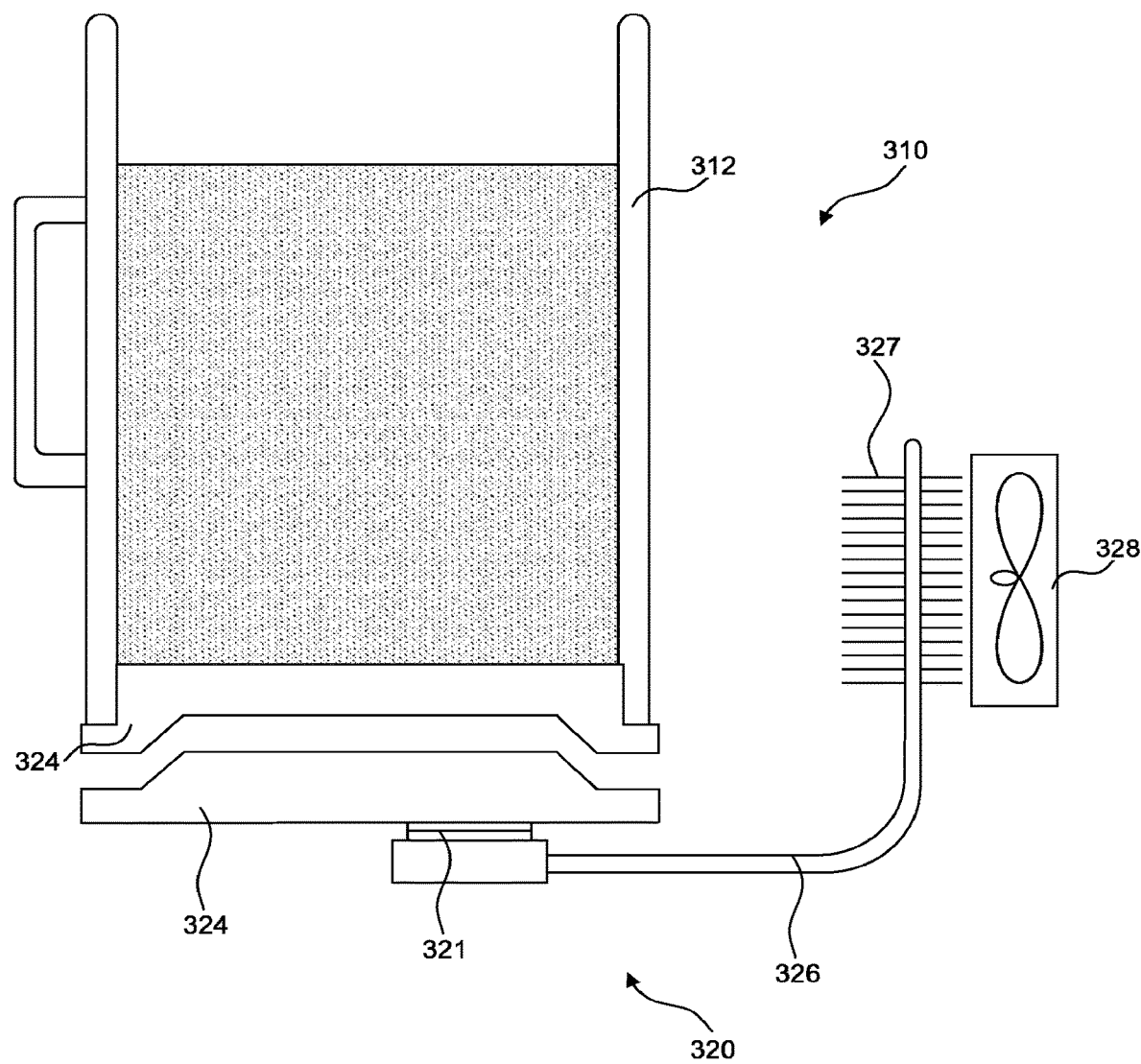
FIG. 25 shows a schematic view of a cooling system and a diluent system of a carbonated beverage maker according to some embodiments.
Figure 26:
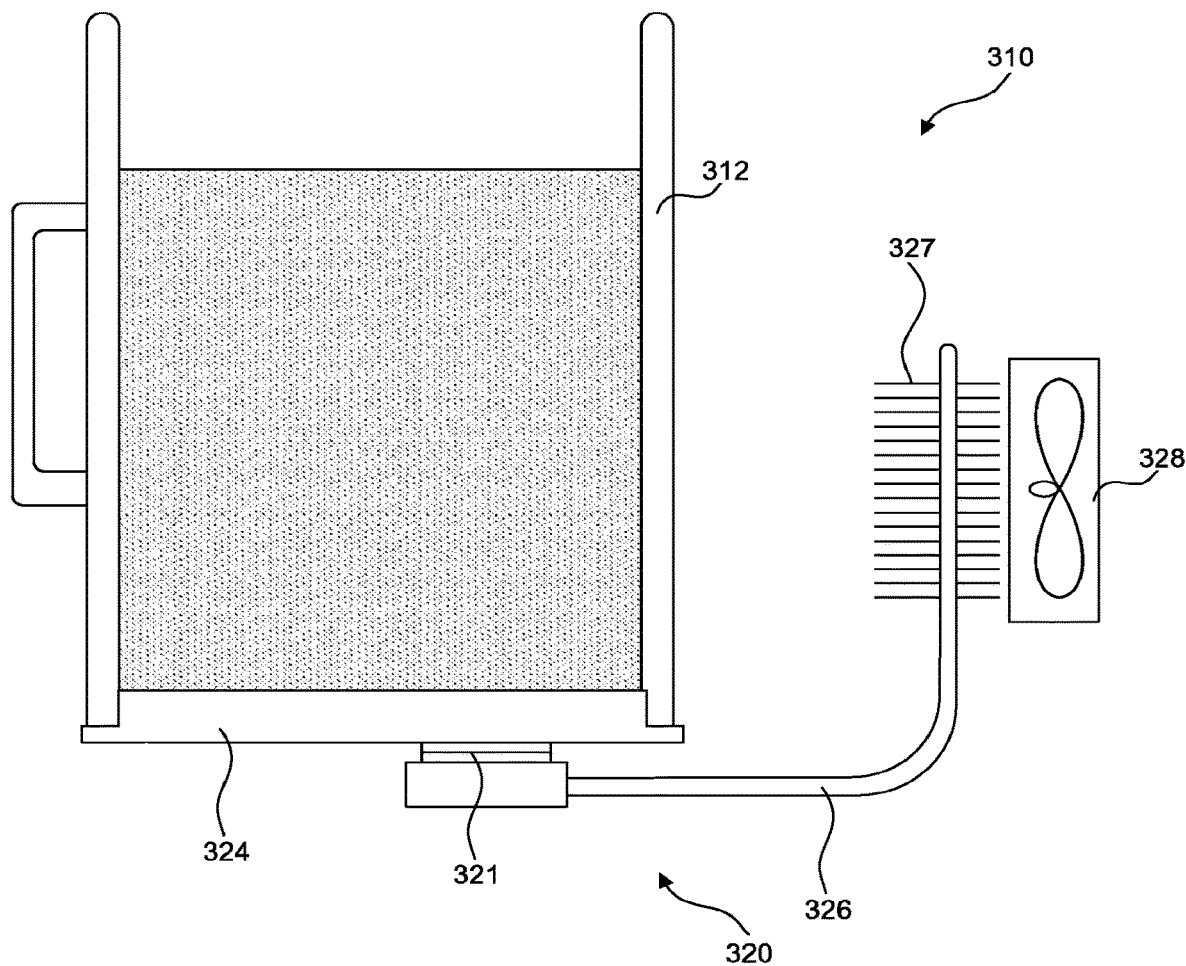
FIG. 26 shows a schematic view of a cooling system and a diluent system of a carbonated beverage maker according to some embodiments.

In some embodiments, thermoelectric cooler 321, as shown, for example in FIGS. 21-23, includes two terminals 325. When a voltage is applied across terminals 325, one side of thermoelectric cooler 321 becomes cold (i.e., cold side 323) while the other side of thermoelectric cooler becomes hot (i.e., hot side 322). In some embodiments, cold side 322 is disposed closest to cold plate 324 (see FIGS. 18-20) and may operate to cool cold plate 324, which in turn cools and/or maintains a cool temperature of water in water reservoir 312.

In some embodiments, hot side 322 of thermoelectric cooler 321 is operably connected to heat pipe assembly 326 (see FIGS. 18-20). In some embodiments, heat pipe assembly 326, as shown, for example, in FIG. 24, moves heat energy away from hot side 322. For example, heat pipe assembly 326 may move heat energy away from hot side 322 by maintaining a thermal gradient across heat pipe assembly 326. In some embodiments, the end of heat pipe assembly 326 opposite from thermoelectric cooler 321 includes an array of heat exchanger fins 327. In some embodiments, heat exchanger fins 327 are part of heat pipe assembly 326 and are not removable. In some embodiments, fan 328 is disposed near heat exchanger fins 327 to remove excess heat and maintain the thermal gradient across heat pipe assembly 326 (see FIGS. 18-20).

As noted above, in some embodiments, water reservoir 312 is removable. In some embodiments, a portion of cooling module 320 is a part of water reservoir 312 and therefore also removable from carbonated beverage maker 300. In some embodiments, as shown, for example, in FIG. 25, only a portion of cold plate 324 is removable with water reservoir 312, while the rest of cold plate 324, and the remainder of cooling module 320 is not removable from carbonated beverage maker 300. In some embodiments, as shown, for example, in FIG. 26, cold plate 324, thermoelectric cooler 321, heat pipe assembly 326, and heat exchanger fins 327 are all removable with water reservoir 312. In some embodiments, fan 328 is not removable from carbonated beverage maker 300 with water reservoir 312.

In some embodiments, as shown, for example, in FIG. 16, water is fed into carbonation system 330 (e.g., into carbonation chamber 332) from diluent and cooling system 310. In some embodiments, diluent and cooling system 310 further comprises water fill pump 340. In some embodiments, water fill pump 340 is configured to pump water from water reservoir 312 through a water fill valve 342 into carbonation system 330.

In some embodiments, carbonation system 330 comprises carbonation chamber 332 disposed within carbonated beverage maker 300 and operatively connected to carbonation source 350 and diluent and cooling system 310. In some embodiments, carbonation source 350 comprises a $CO_2$ tank or cylinder. However, other carbonation sources may be used, which are described in further detail below. In some embodiments, a pressure regulator 352 is attached to carbonation source 350. Pressure regulator 352 may keep carbonation source 350 at a particular pressure. In some embodiments, pressure regulator 352 keeps carbonation source 350 at a pressure of 3.5 bars. In some embodiments, the water and $CO_2$ gas enter carbonation chamber 332 simultaneously. In some embodiments, water enters carbonation chamber 332 before the $CO_2$ gas.

In some embodiments a supply line 358 runs from carbonation source 350 to carbonation chamber 332. Supply line 358 may include $CO_2$ supply solenoid valve 354. In some embodiments, $CO_2$ supply solenoid valve 354 is controlled by control unit 306. For example, at an appropriate time during the operation of carbonated beverage maker 300, control unit 306 may communicate with $CO_2$ supply solenoid valve 354, causing $CO_2$ supply solenoid valve 354 to open and allow flow of $CO_2$ to carbonation chamber 332 through supply line 358. After the desired amount of $CO_2$ has been used, control unit 306 communicates with $CO_2$ supply solenoid valve 354, causing $CO_2$ supply solenoid valve 354 to close. In some embodiments, supply line 358 may also include a pressure relief valve 356. Pressure relief valve 356 senses pressure within carbonation chamber 332 and supply line 358 and is configured to open when the pressure is too high. For example, if carbonation chamber 332 reaches a predetermined pressure, pressure relief valve 356 may open to lower the pressure. In some embodiments, the predetermined pressure is 4.5 bars.

In some embodiments, carbonated beverage maker 300 includes a solenoid vent valve 348, as shown, for example, in the schematic of FIG. 16. After carbonation of the water is completed, solenoid vent valve 348 may be used to release the pressure from carbonation chamber 332 through a venting process. In some embodiments, the venting process through solenoid vent valve 348 is a stepped process. The venting process may vary based on the level of carbonation and other properties of the beverage. In some embodiments, solenoid vent valve 348 is controlled by control unit 306.

In some embodiments, carbonation chamber 332 includes one or more sensors to detect an appropriate level of water within carbonation chamber 332. In some embodiments, water fill pump 340 operates and water fill valve 342 remains open until the sensor detects the appropriate level of water is within carbonation chamber 332. In some embodiments, as shown, for example, in FIG. 16, the sensor may be an optical sensor 382. In some embodiments, optical sensor 382 receives a signal from a light emitting diode 383 disposed on an opposite side of carbonation chamber 332. Thus, when water reaches the appropriate level, it interrupts the beam of light passing between light emitting diode 383 and optical sensor 382. In some embodiments, optical sensor 382 communicates with control unit 306 that carbonation chamber 332 is full and control unit 306 may then communicate with water fill valve 342 and water fill pump 340 to cause water fill valve 342 to close and to cause water fill pump 340 to stop pumping.

Other types of sensors may also be used. For example, in some embodiments, a pressure sensor may be used to detect the water level. A pressure sensor may operate by, after closing solenoid vent valve 348 to fix the volume of a headspace 346 in carbonation chamber 332, monitoring the pressure of headspace 346 as carbonation chamber 332 is filled with water. Once the pressure associated with the appropriate level of water has been reached, the pressure sensor may communicate with control unit 306 so that control unit 306 may close water fill valve 342 and stop water fill pump 340.

Figure 27:
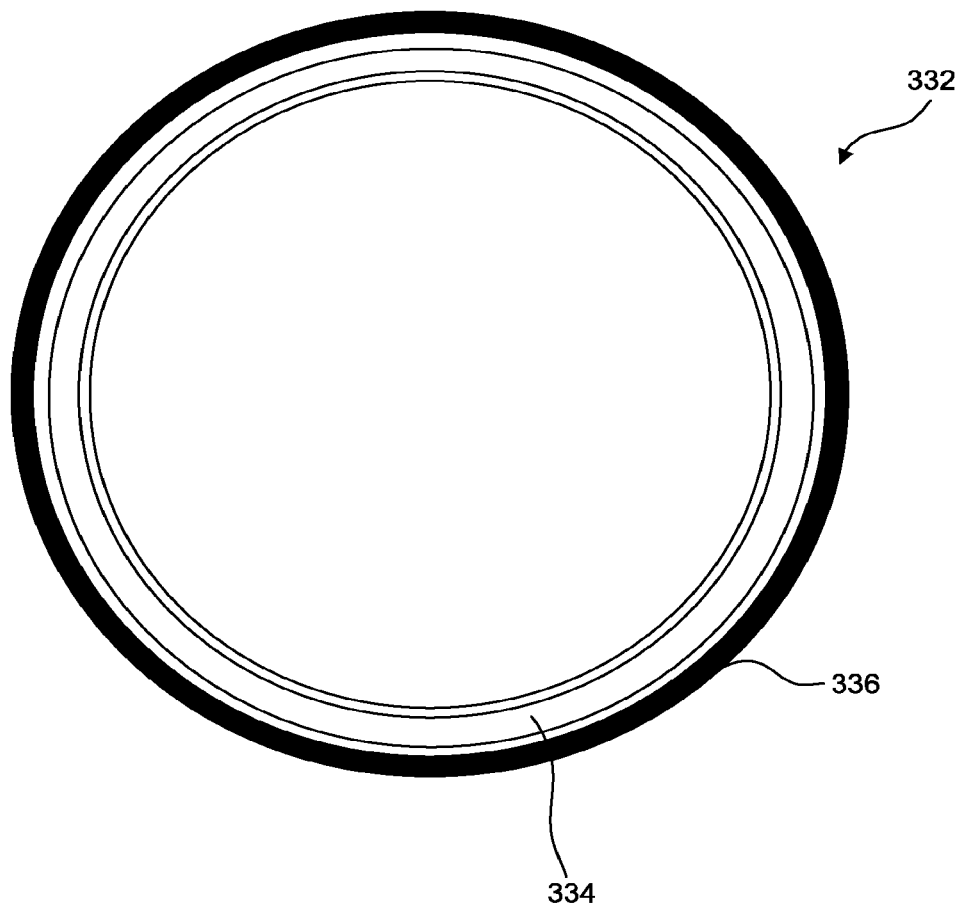
FIG. 27 shows a cross-sectional view of a carbonation chamber for a carbonated beverage maker according to some embodiments.

In some embodiments, carbonation chamber 332 is double walled, as shown, for example, in FIG. 27, with an outer wall 336 and an inner wall 334. In some embodiments, inner wall 334 contains water and $CO_2$ in carbonation chamber 332, thus maintaining the pressure of carbonation chamber 332. In some embodiments, outer wall 336 traps air between inner wall 334 and outer wall 336. Thus, outer wall 336 and inner wall 334 may operate to insulate carbonation chamber 332 and limit heat exchange between the water $CO_2$ within carbonation chamber 332 and the outside environment. This insulation assists in preparing a carbonated beverage that has a desirable drinking temperature. In some embodiments, carbonation chamber 332 may be pre-chilled. For example, water from water reservoir 312 may cycle through carbonation chamber 332 and back to water reservoir 312 to cool carbonation chamber 332.

In some embodiments, carbonation chamber 332 may have additional features. For example, in some embodiments, carbonation chambers may have additional monitoring sensors (see FIG. 16), such as, for example, a carbonation monitor thermistor 386 or a temperature sensor (not shown) for carbonation chamber 332. Such monitoring sensors may be used in some embodiments to check for the quality of carbonated beverage (e.g., carbonation level, temperature, etc.). In addition, in some embodiments, carbonation chamber 332 may include one or more light emitting diodes 384 disposed around carbonation chamber 332. In some embodiments, light emitting diodes 384 may be used to allow a user to better see the carbonation process in carbonation chamber 332 through viewing window 308.

In some embodiments, carbonation chamber 332 includes impeller 370. In some embodiments, impeller 370 is disposed at the bottom of carbonation chamber 332. In some embodiments, impeller 370 is magnetically coupled to and driven by an impeller motor 380, similar to the relationship between impeller 120 and impeller motor 130 described above.

Figure 28:
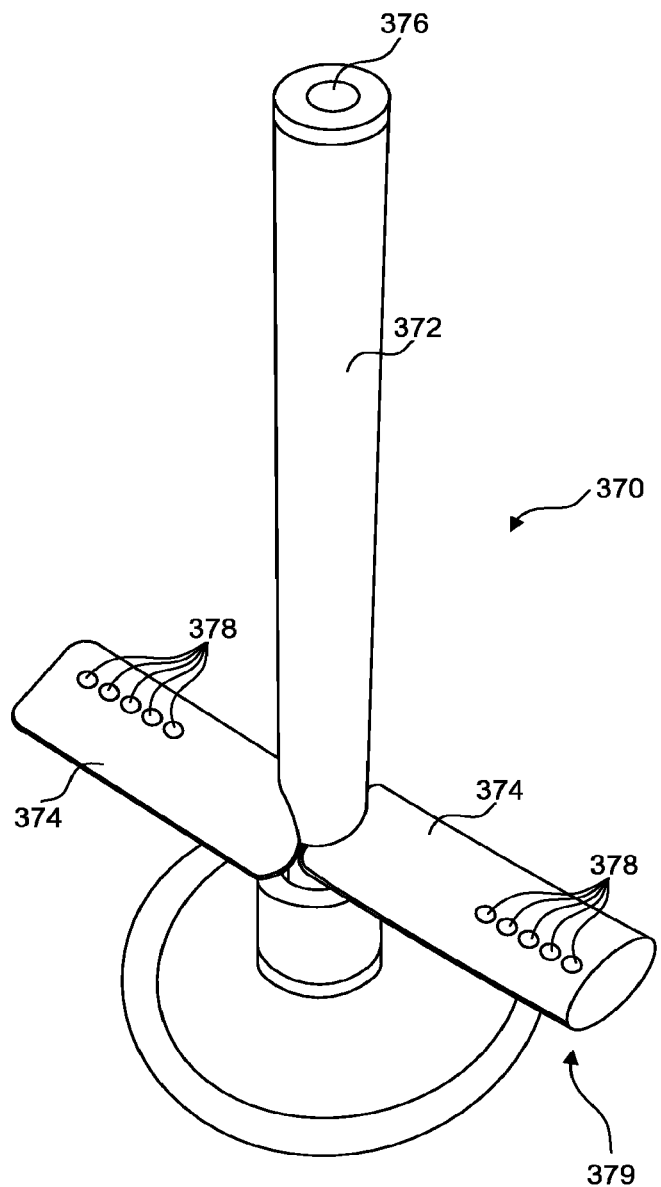
FIG. 28 shows a perspective view of an impeller for a carbonation system of a carbonated beverage maker according to some embodiments.
Figure 29:
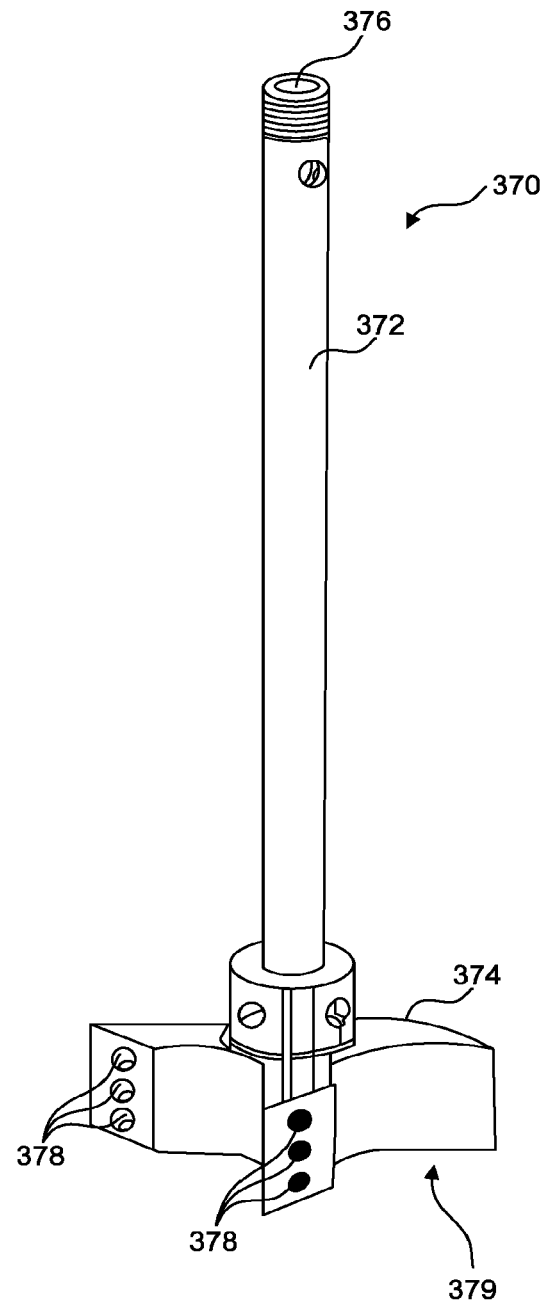
FIG. 29 shows a perspective view of an impeller for a carbonation system of a carbonated beverage maker according to some embodiments.

In some embodiments, impeller 370, as shown, for example, in FIGS. 28 and 29, includes a stem portion 372 and one or more blades 374. In some embodiments, impeller 370 has two blades (see FIG. 28). In some embodiments, impeller 370 has four blades (see FIG. 29). Impeller 370 may have a different number of blades. In some embodiments, stem portion 372 is hollow. In some embodiments, a conduit 376 extends through at least a portion of stem portion 372. In some embodiments, conduit 376 extends from a top portion of stem portion 372 to blades 374. In some embodiments, portions of blades 374 are also hollow. In some embodiments, blades 374 include one or more holes 378. Holes 378 may be fluidly connected to conduit 376.

In some embodiments, blades 374 are shaped aerodynamically. For example, blades 374 may be shaped such that when impeller 370 is rotating, blades 374 create a low pressure region 379 around blades 374. In some embodiments, impeller 370 draws pressurized $CO_2$ gas through conduit 376 and holes 378 into low pressure region 379. As $CO_2$ gas is drawn near the bottom of carbonation chamber 332 by low pressure region 379, the gas begins to carbonate the water (i.e., becomes entrained gas 371).

Figure 30:
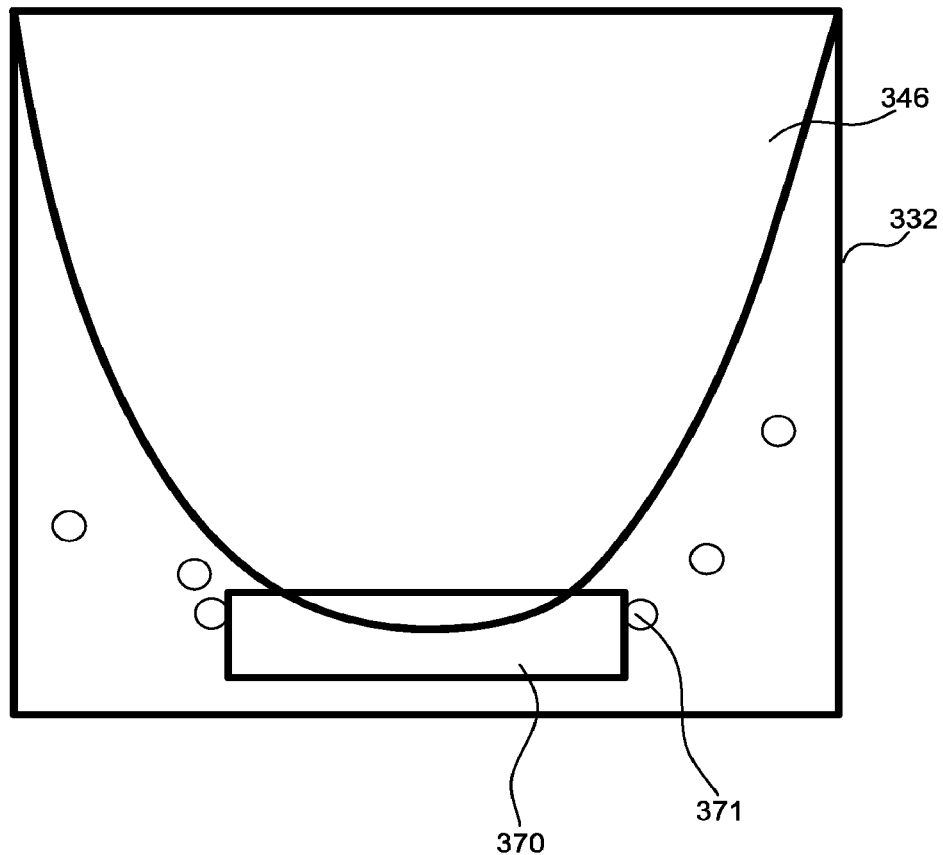
FIG. 30 shows a schematic view of a carbonation chamber in a carbonated beverage maker according to some embodiments.
Figure 31:
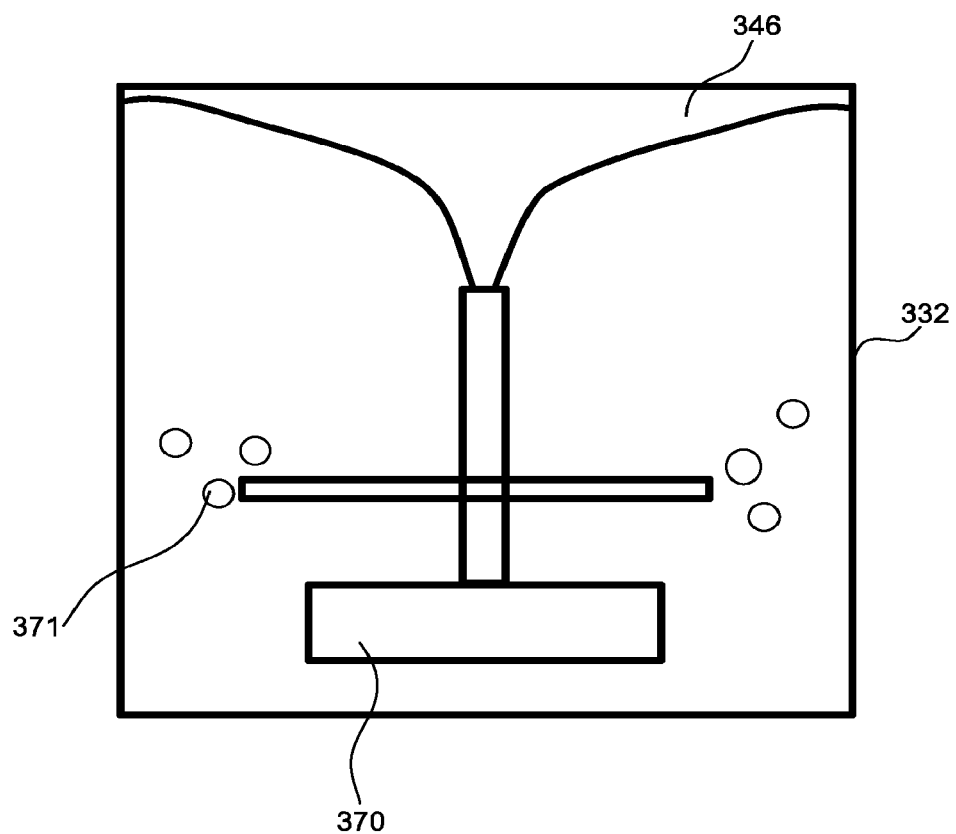
FIG. 31 shows a schematic view of a carbonation chamber in a carbonated beverage maker according to some embodiments.

One benefit of impeller 370 having stem portion 372 and aerodynamic blades 374 creating low pressure region 379 is shown in FIGS. 29 and 30. FIG. 29 illustrates carbonation chamber 332 using impeller 370 not having stem portion 372. In this embodiment, while impeller 370 leads to entrained gas 371, headspace 346 is large and a vortex is formed, which leads to higher and inefficient consumption of $CO_2$ gas. In contrast, FIG. 30 illustrates carbonation chamber 332 using impeller 370 having stem portion 372. In this embodiment, impeller 370 more efficiently produces entrained gas 371 because headspace 346 is smaller, thus consuming less $CO_2$ gas. Thus, in some embodiments, forming a vortex is not desirable because it may lead to less efficient use of carbonation source 350. In some embodiments, carbonation chamber 332 includes fixed baffles (not shown) within carbonation chamber 332 to discourage water rotation and thereby reduce the likelihood of a vortex forming.

In some embodiments, carbonation system 330 includes an air pump 338, a check valve 339, and a dispense valve 344. In some embodiments, after carbonation chamber 332 has carbonated the water, air pump 338 operates to pump the carbonated water out of carbonation chamber 332 and into drinking cup 392, as shown, for example, in the schematic of FIG. 16. In some embodiments, check valve 339 allows air pumped from air pump 338 into supply line 358 and/or carbonation chamber 332, but does not allow air to escape from supply line 358 and/or carbonation chamber 332. In some embodiments, dispense valve 344 opens while air pump 338 is pumping to allow the carbonated water to exit carbonation chamber 332 and dispense into drinking cup 392. In some embodiments, the flow path from carbonation chamber 332 to drinking cup 392 is configured to minimize decarbonation of the carbonated water. For example, the material and finishes of components forming the flow path are selected to be as gentle as possible. In some embodiments, the flow path may be made of nylon pipe formed into a shape that minimizes directional changes, sharp corners, and cross-sectional area steps to minimize decarbonation.

As shown in FIG. 16, and described thus far, in some embodiments, carbonated water may be dispensed into drinking cup 392 without any flavoring or other additives. Thus, in some embodiments, flavor system 360 may be separate from other systems of carbonated beverage maker 300. In some embodiments, flavor system 360 dispenses flavoring in the form of concentrate, such as syrup, for example, at the same time that carbonated water is being dispensed into drinking cup 392. In some embodiments, flavor system 360 includes a flavor source 362, an air pump 366, a light emitting diode 368, and a micro switch 369.

In some embodiments, flavor source 362 may contain a powder, syrup, gel, liquid, beads, or other form of concentrate. In some embodiments, flavor source 362 comprises a pod. In some embodiments, flavor source 362 is an integral part of carbonated beverage maker 300. In some embodiments, flavor source 362 comprises a single-serving of flavor. In some embodiments, flavor source 362 contains sufficient flavoring for multiple servings. Housing 302 of carbonated beverage maker 300 may be configured to receive flavor source 362. In some embodiments, carbonated beverage maker 300 is configured to open flavor source 362. Variations of pods and other flavor sources, and how carbonated beverage makers may open them, are described in more detail below.

In some embodiments, carbonated beverage maker 300 is configured to deliver the contents of flavor source 362 into drinking cup 392, as shown, for example, in the schematic of FIG. 16. For example, carbonated beverage maker 300 may include an air pump 366. Air pump 366 may be operated by control unit 306 to pump the contents of flavor source 362 into drinking cup 392.

Figure 32:
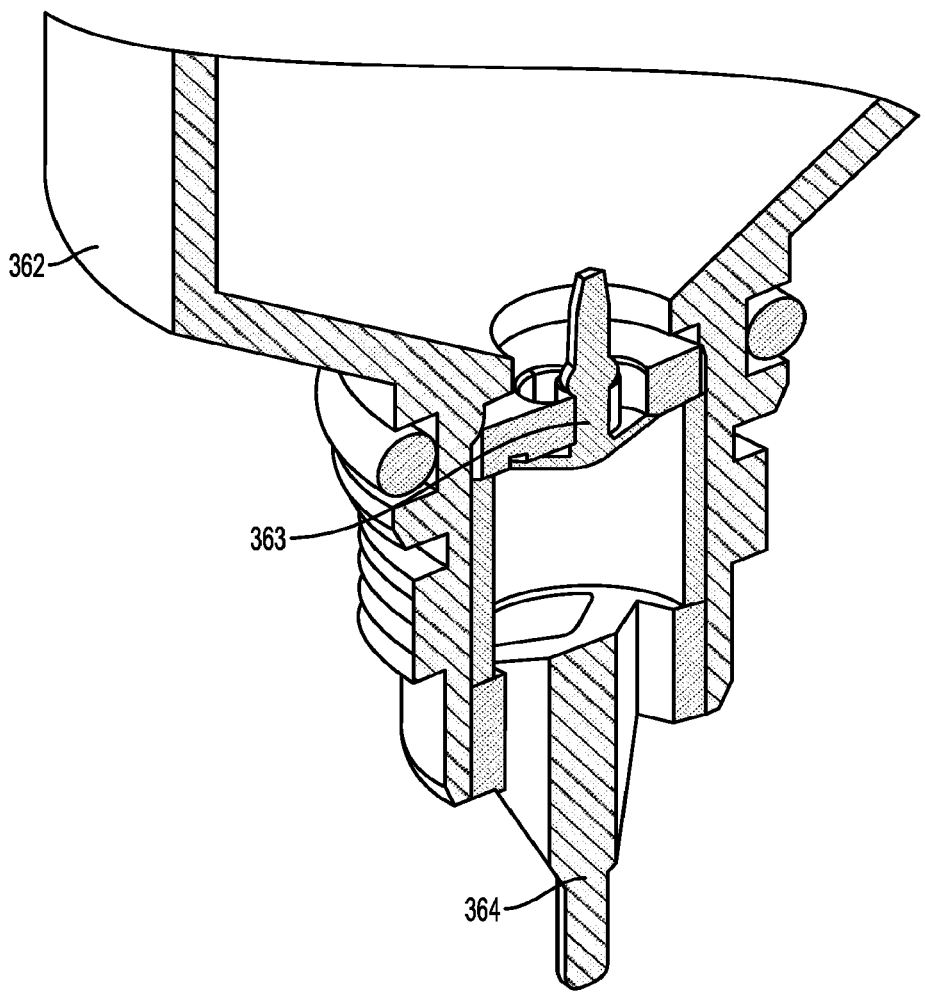
FIG. 32 shows a perspective cross-sectional view of a pod for a carbonated beverage maker according to some embodiments.
Figure 33:
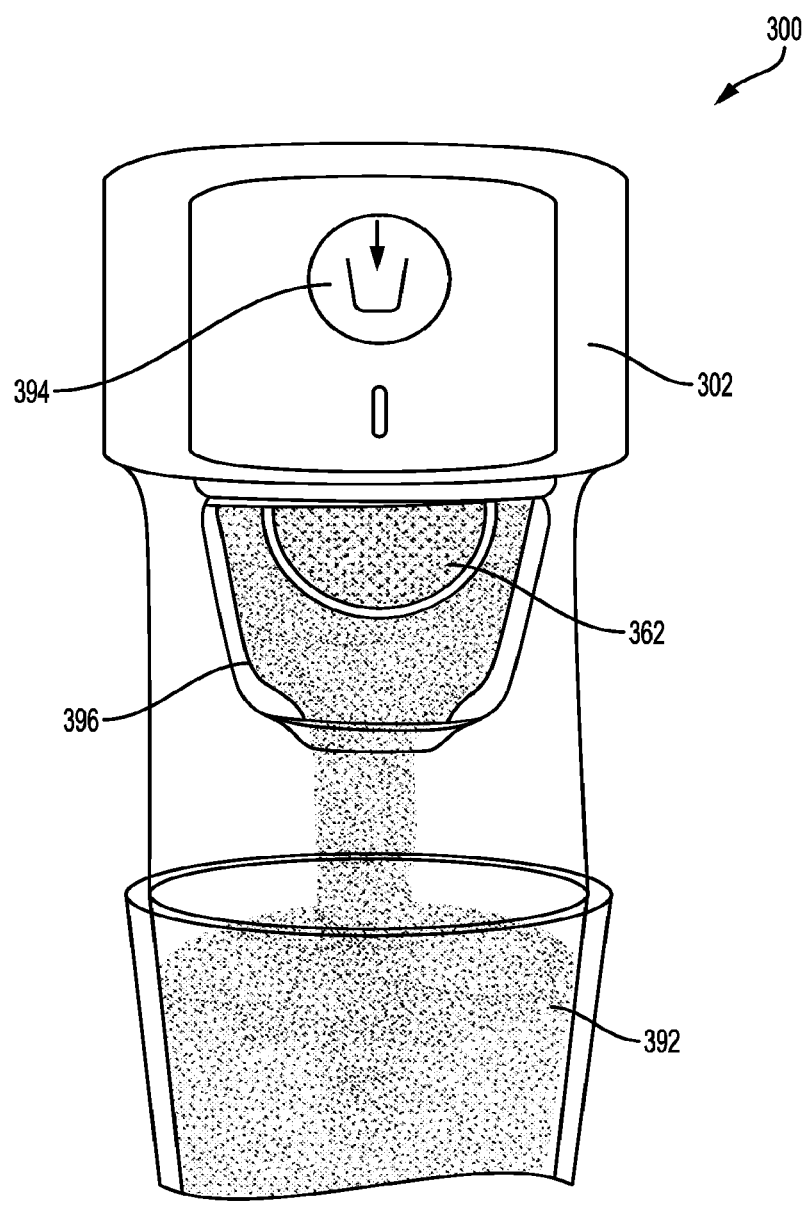
FIG. 33 shows a partial front view of a carbonated beverage maker according to some embodiments.

In some embodiments, as shown, for example, in FIG. 32, flavor source 362 includes an umbrella valve 363. In some embodiments, umbrella valve 363 prevents concentrate from leaking out of flavor source 362. In some embodiments, pressure from air pump 366 causes umbrella valve 363 to open to allow concentrate to flow from flavor source 362 into drinking cup 392. In some embodiments, flavor source 362 includes a flow conditioning element 364. In some embodiments, flow conditioning element 364 comprises a projection that extends from flavor source 362. Flow conditioning element 364 may cause the stream of flavor from flavor source 362 to be smooth as it dispenses into drinking cup 392. In some embodiments, flow conditioning element 364 is part of a pod. In some embodiments, flow conditioning element 364 is part of carbonated beverage maker 300 itself. In some embodiments, flavor system 360 dispenses concentrate from flavor source 362 directly into drinking cup 392, thus eliminating the need to flush carbonated beverage maker 300 when a different flavor is subsequently used.

In some embodiments, flavor system 360 includes a micro switch 369, which may detect the presence of flavor source 362. When flavor source 362 is detected, micro switch 369 closes to complete a circuit. If flavor source 362 is not detected, micro switch 369 remains open. An open circuit condition may prevent carbonated beverage maker 300 from operating.

In some embodiments, carbonated water from carbonation chamber 332 and concentrate from flavor source 362 are dispensed into drinking cup 392 to prepare carbonated beverage. In some embodiments, carbonated water and concentrate are dispensed simultaneously. In some embodiments, carbonated water and concentrate mix in drinking cup 392 after being dispensed.

In some embodiments, carbonated beverage maker 300 includes features that convey a feeling of a freshly made beverage to a user. For example, a user may feel that the carbonated beverage is more freshly made, and feel more involvement in the creation of the carbonated beverage, if the user can see at least a portion of the beverage creation process. Thus, in some embodiments, viewing window 308, as discussed above, is included in housing 302 to allow a user to see the carbonation process. In some embodiments, a light emitting diode 368 is disposed near drinking cup 392. Light emitting diode 368 may, for example, illuminate the mixing process within drinking cup 392. In some embodiments, light emitting diode 368 may illuminate other aspects of the dispensing area or other areas of carbonated beverage maker 300.

In some embodiments, carbonated beverage maker 300 provides other ways for a user to see aspects of the beverage creation process. In some embodiments, as shown, for example, in FIG. 33, carbonated beverage maker 300 includes a clear mixing nozzle 396. For example, clear mixing nozzle may be disposed on housing 302 just above the location of drinking cup 392. In some embodiments, flavor source 362 may be disposed within clear mixing nozzle 396. In some embodiments, flavor and carbonated water mix within clear mixing nozzle 396 before entering drinking cup 392. Thus, a user can see the mixing process through clear mixing nozzle 396. In some embodiments, carbonated beverage maker 300 includes a flush of clear mixing nozzle 396 as part of its dispensing process so that any residue of concentrate from flavor source 362 does not cross-contaminate the next drink that may include a different flavor.

Figure 34:
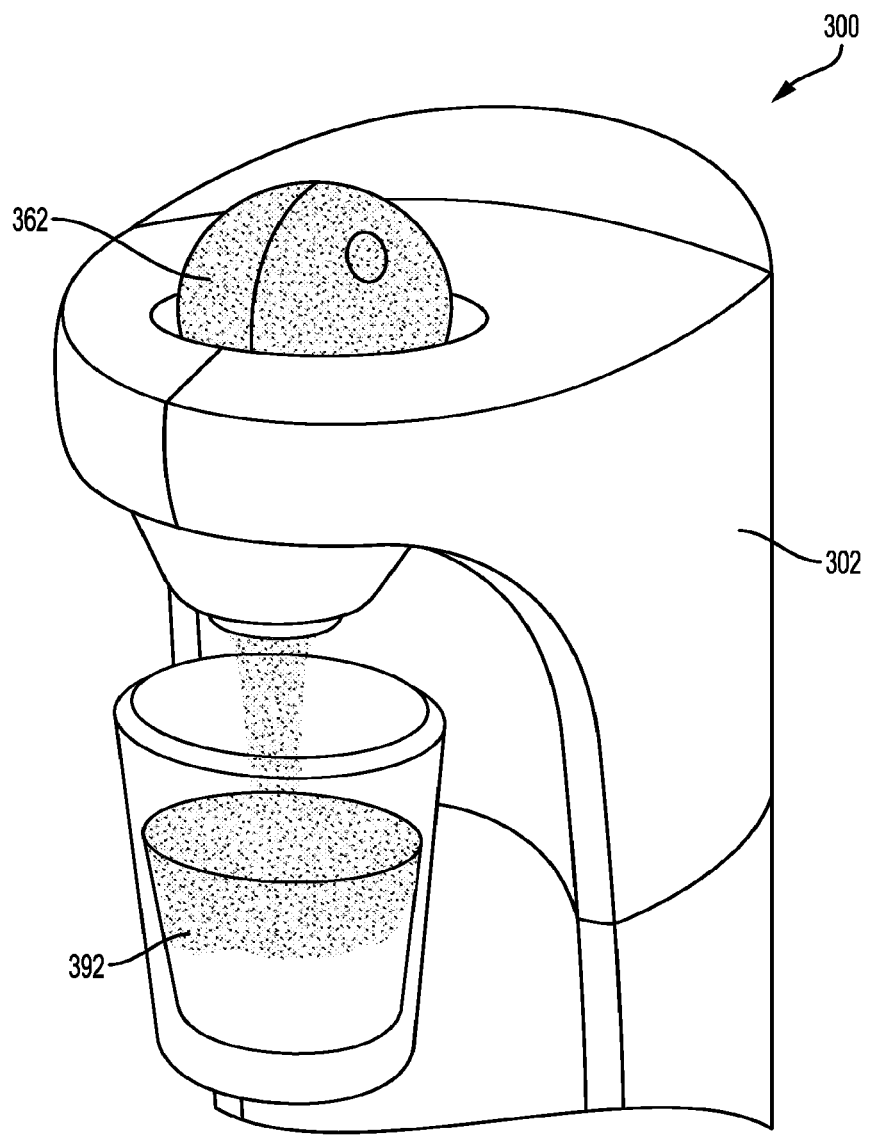
FIG. 34 shows a perspective view of a carbonated beverage maker according to some embodiments.

In some embodiments, as shown, for example, in FIG. 34, carbonated beverage maker 300 is configured to receive flavor source 362 as a pod that is visible to a user during the beverage creation process. For example, flavor source 362 may be a clear pod partially disposed in a top of housing 302. As concentrate from flavor source 362 is flushed out and mixed with carbonated water, the user may see the mixing process through the clear pod. In some embodiments, inserting flavor source 362 into housing 302 may automatically begin the process of creating the beverage.

In some embodiments, carbonated beverage maker 300 includes a user interface. For example, user interface may include touch screen 390. Features of the user interface of carbonated beverage maker 300 may be the same as or similar to those described for the user interface of carbonated beverage maker 100. In some embodiments, the user interface may be a button 394 (see FIG. 33) that allows a user to select a carbonation level and/or begin the beverage creation process. In some embodiments, carbonated beverage maker 300 may include a memory that stores recipes for producing particular beverages. For example, the recipe for low carbonation may be stored in memory such that when a user selects low carbonation on the user interface, control unit controls the functions of carbonated beverage maker 300 based on the recipe stored in the memory. In some embodiments, a recipe may be associated with flavor source 362 that is inserted into carbonated beverage maker 300. In some embodiments, carbonated beverage maker 300 is configured to identify flavor source 362 and use the corresponding recipe.

Figure 35:
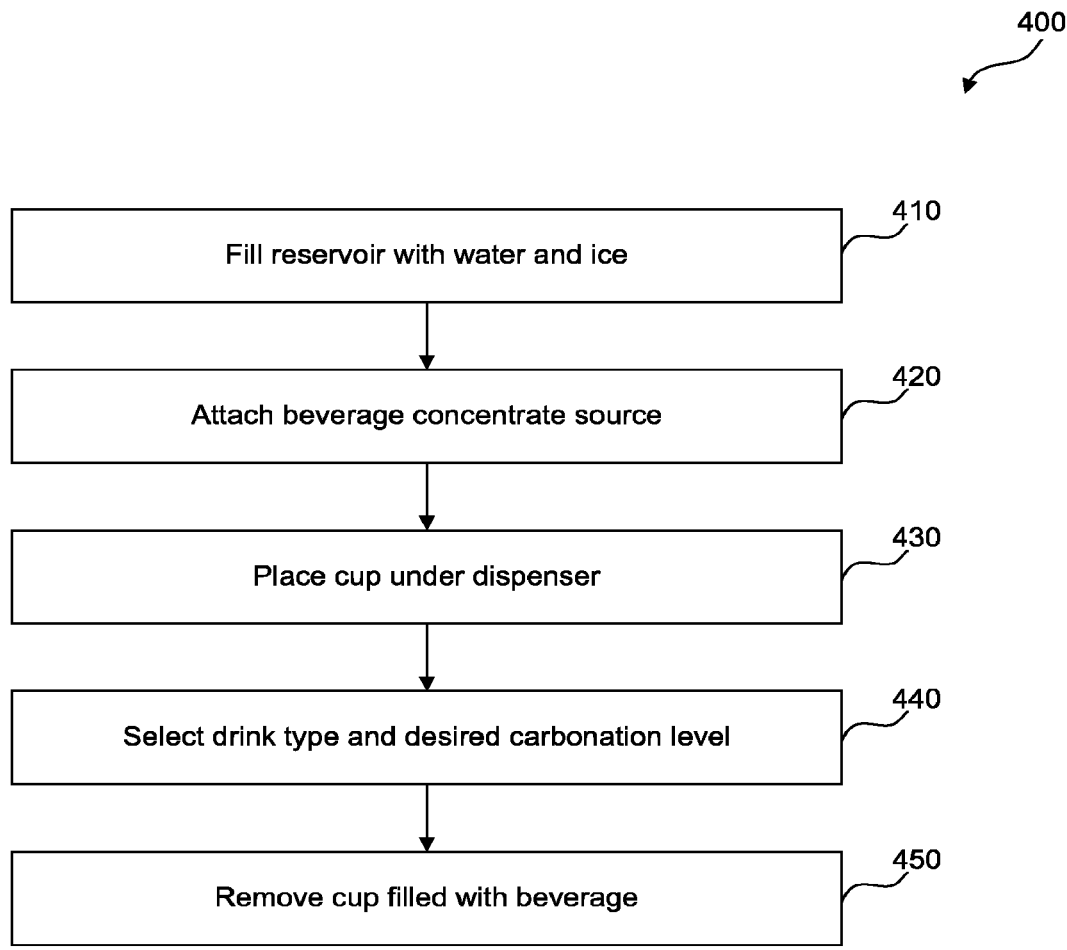
FIG. 35 shows a method of using a carbonated beverage maker according to some embodiments.
Figure 36:
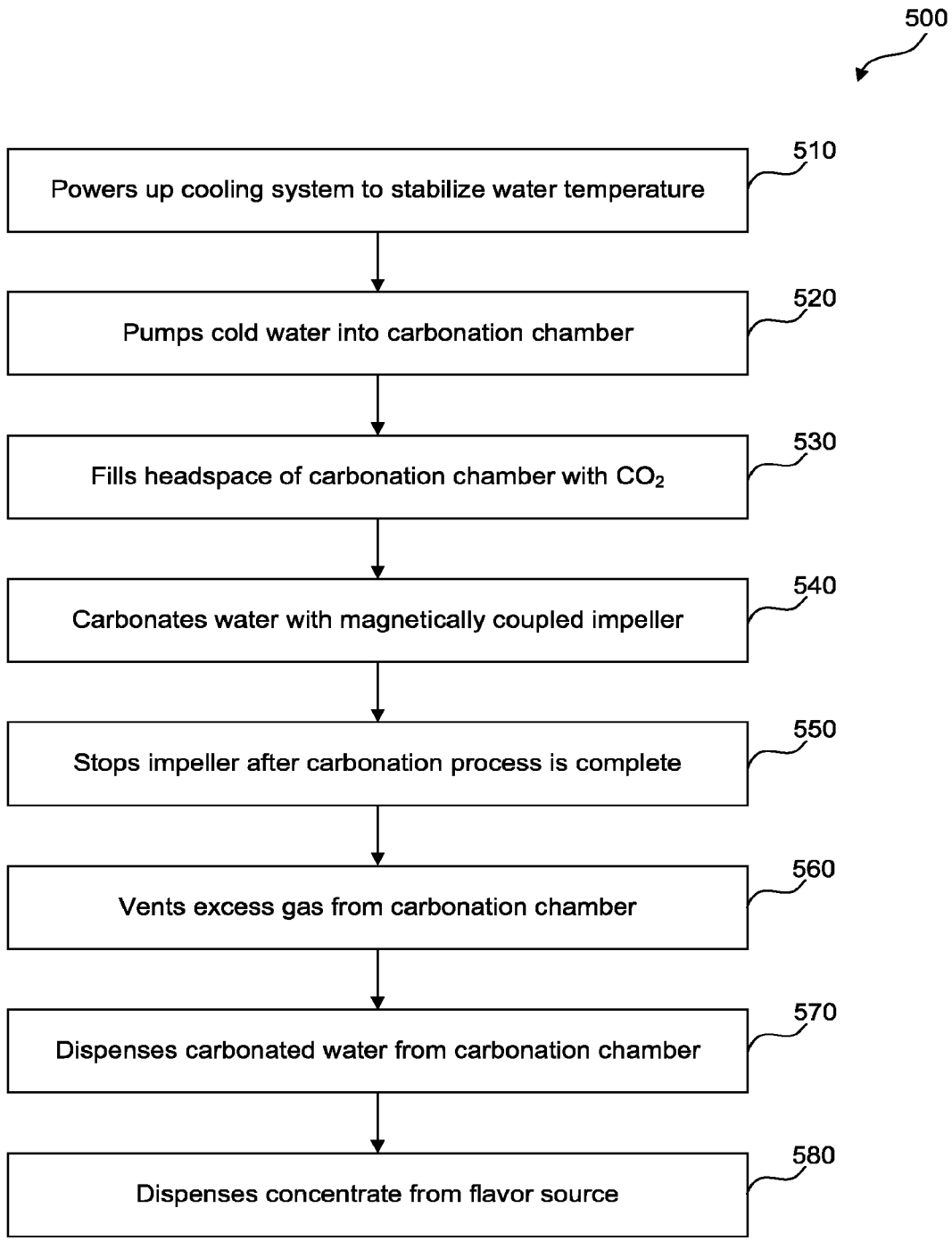
FIG. 36 shows a process of a carbonated beverage maker according to some embodiments.
Figure 37:
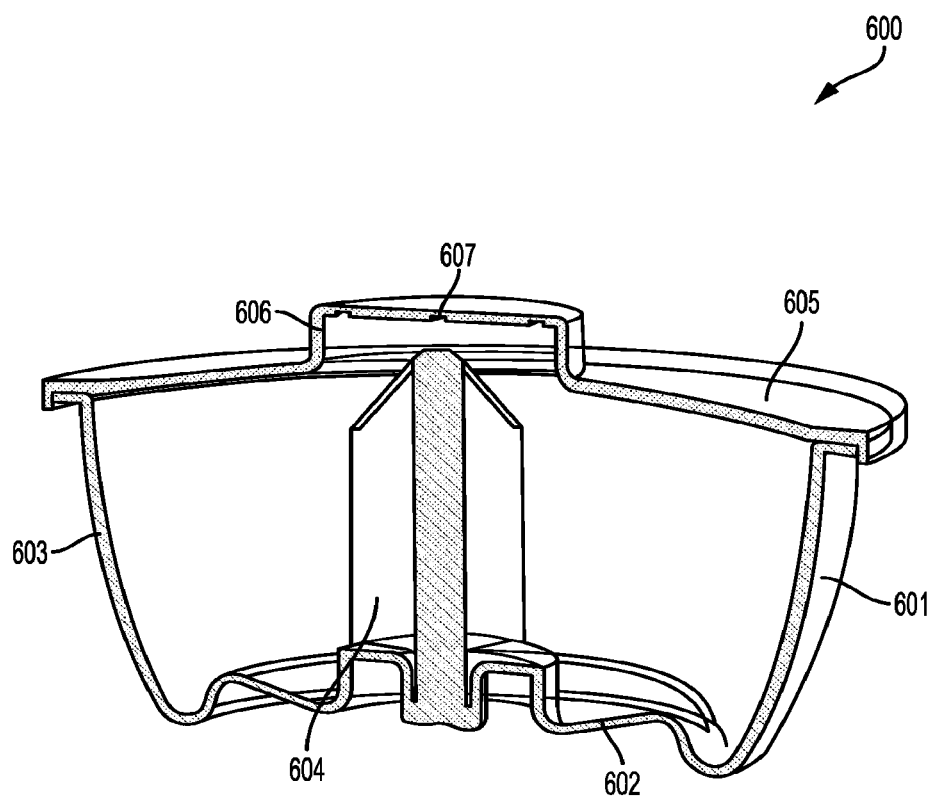
FIG. 37 shows a cross-sectional perspective view of a pod for a carbonated beverage maker according to some embodiments.
Figure 38:
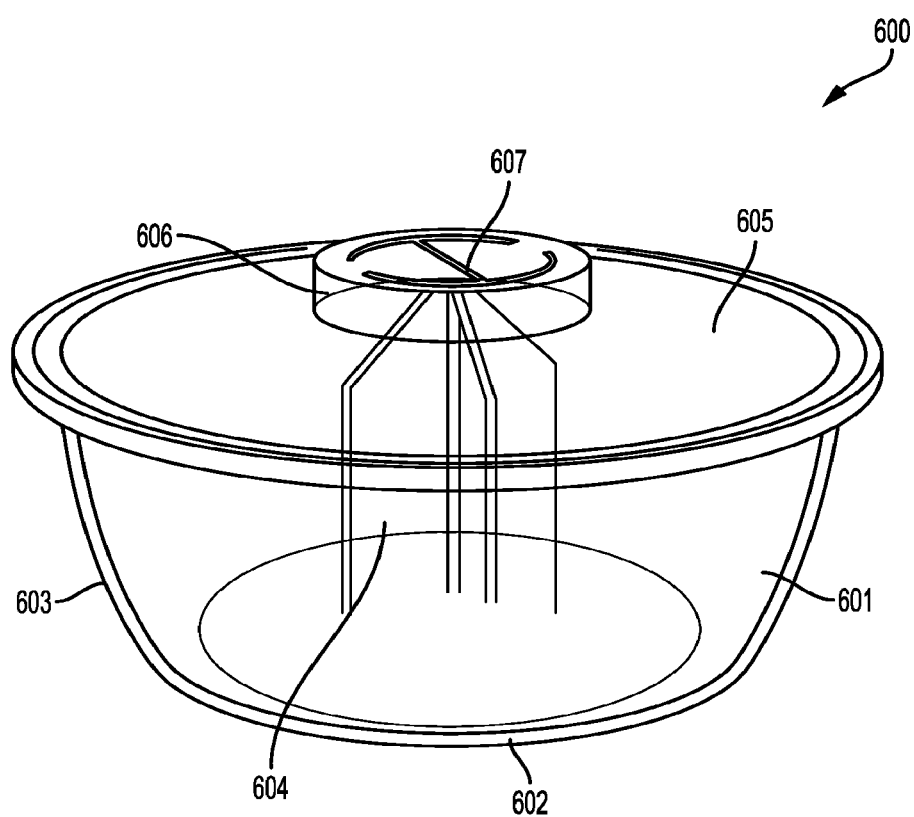
FIG. 38 shows a perspective view of a pod for a carbonated beverage maker according to some embodiments.
Figure 39:
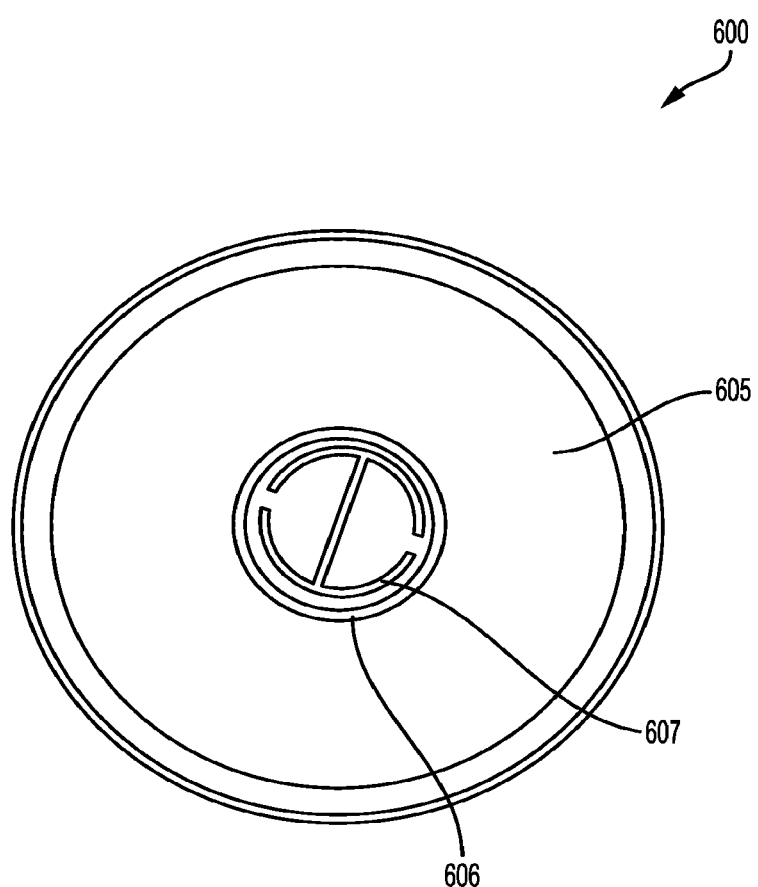
FIG. 39 shows a top view of a pod for a carbonated beverage maker according to some embodiments.
Figure 40:
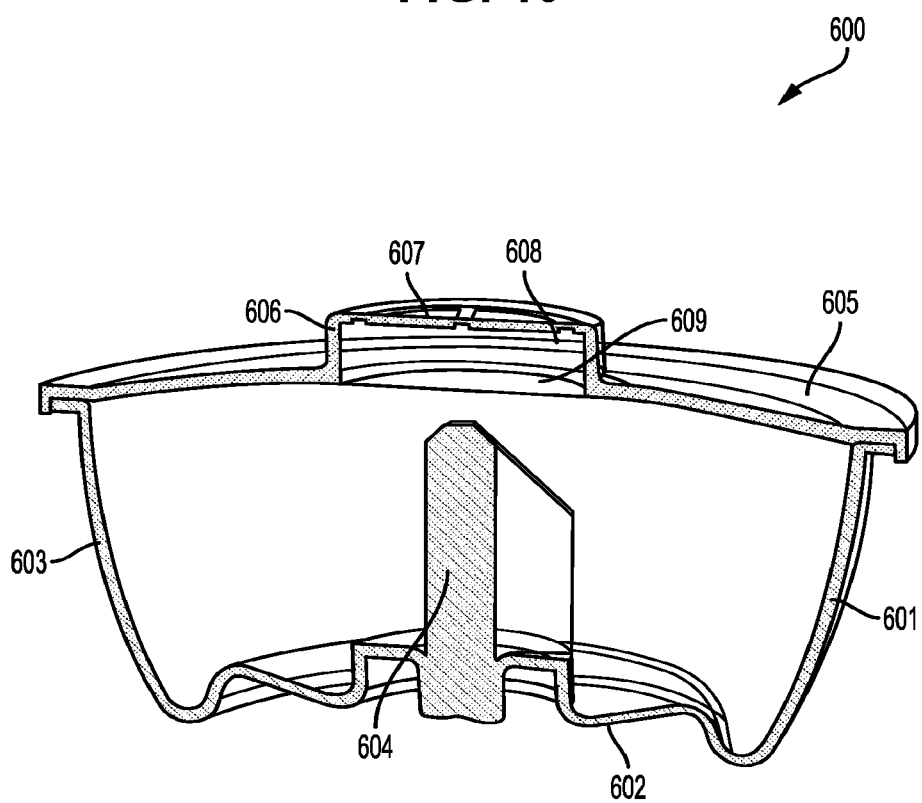
FIG. 40 shows a cross-sectional perspective view of a pod for a carbonated beverage maker according to some embodiments.
Figure 41A:
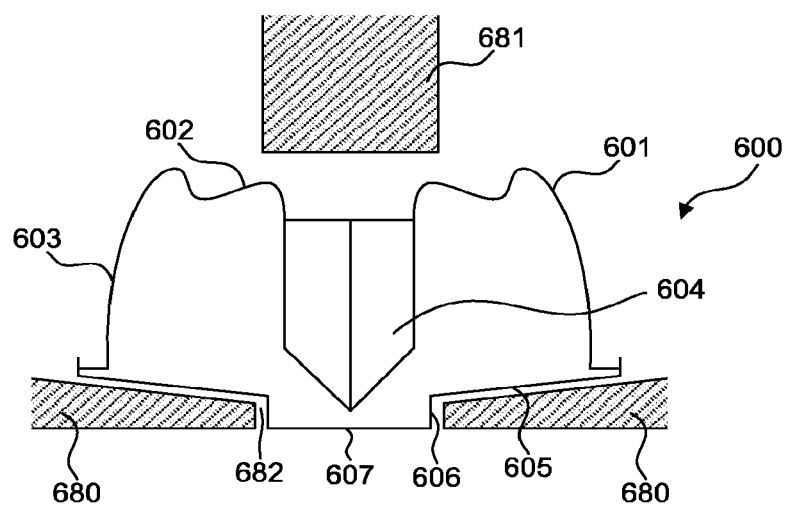
FIGS. 41A and 41B show a cross-sectional view of a method of opening a pod in a carbonated beverage maker according to some embodiments.
Figure 41B:
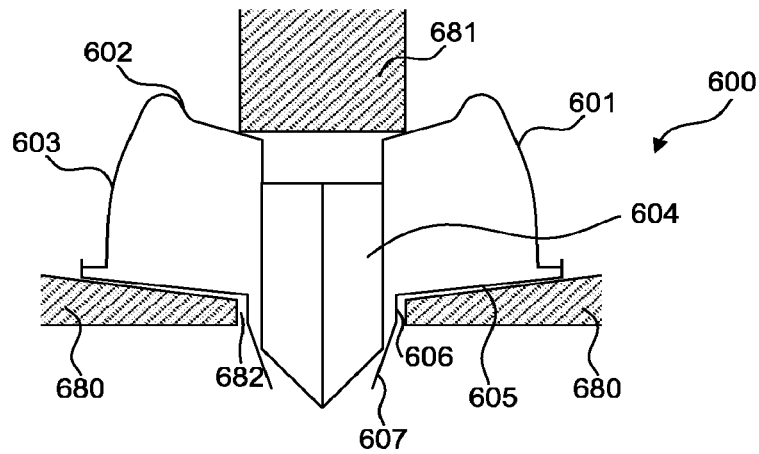
Figure 42:
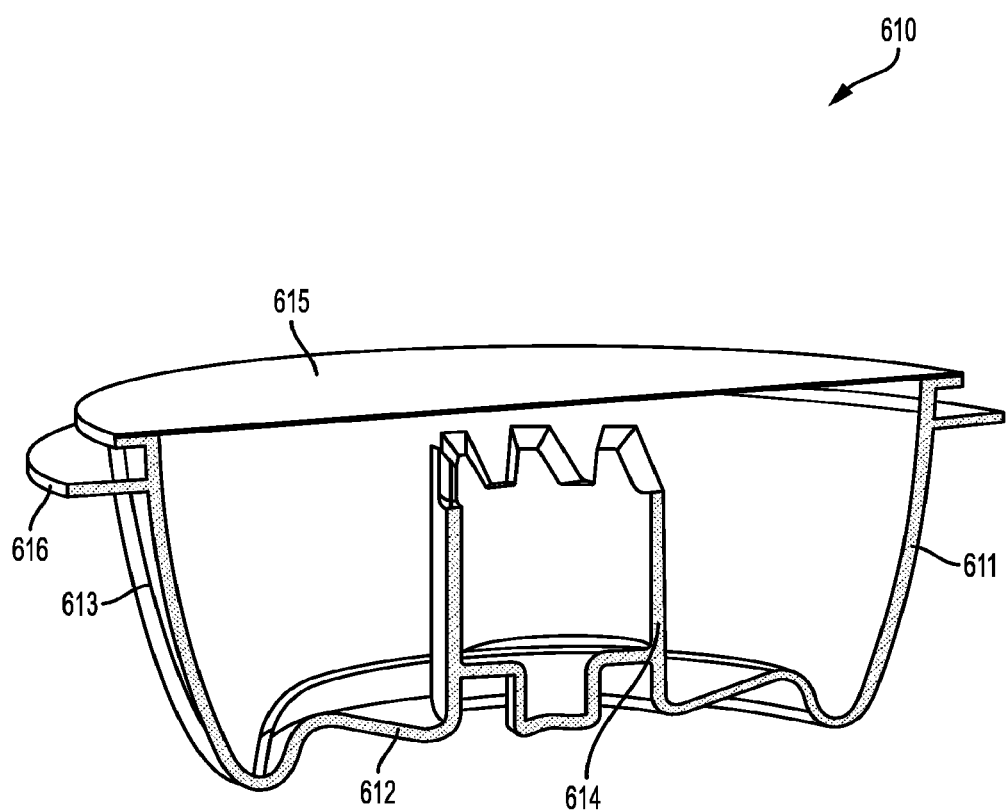
FIG. 42 shows a cross-sectional perspective view of a pod for a carbonated beverage maker according to some embodiments.
Figure 43:
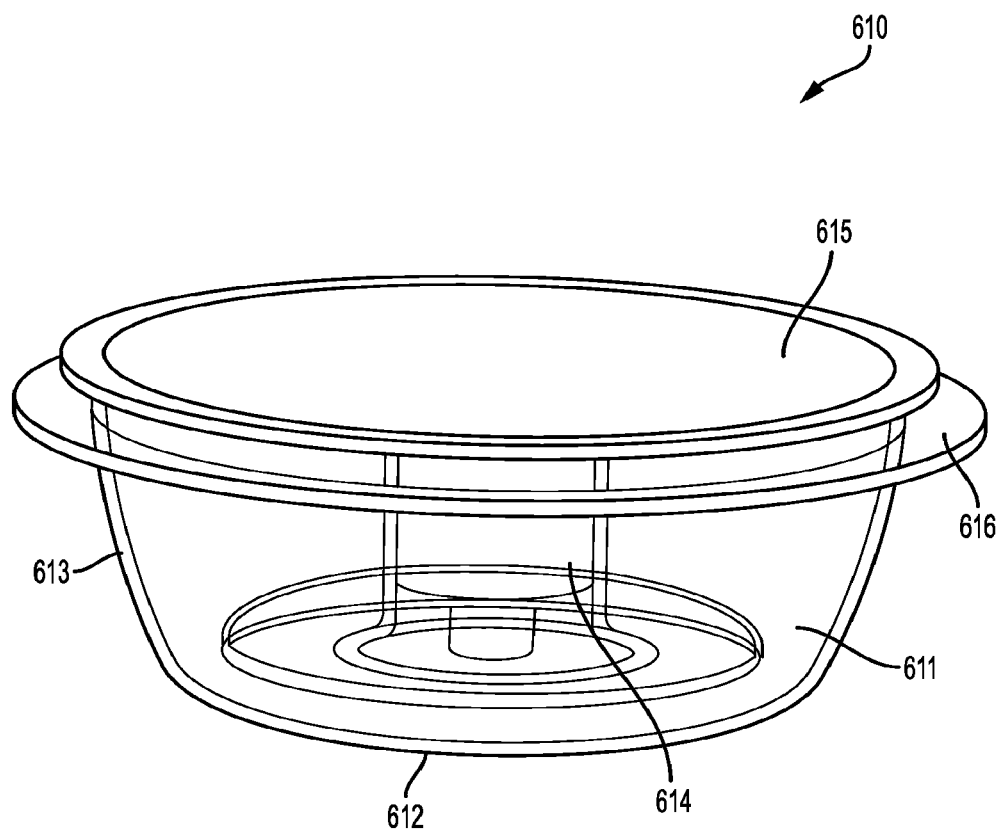
FIG. 43 shows a perspective view of a pod for a carbonated beverage maker according to some embodiments.
Figure 44A:
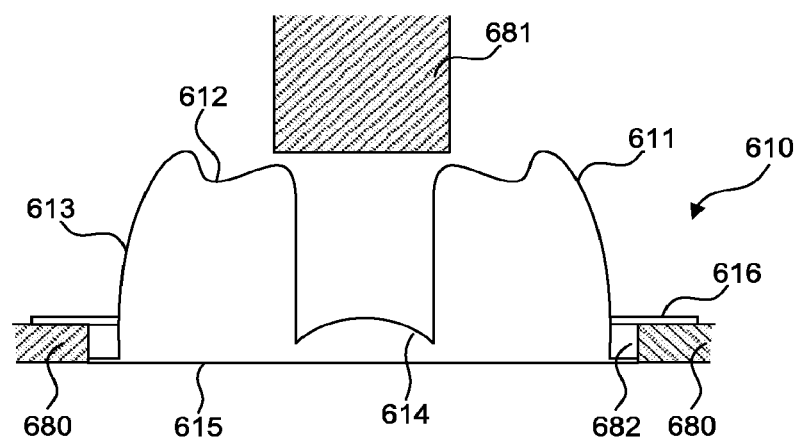
FIGS. 44A and 44B show a cross-sectional view of a method of opening a pod in a carbonated beverage maker according to some embodiments.
Figure 44B:
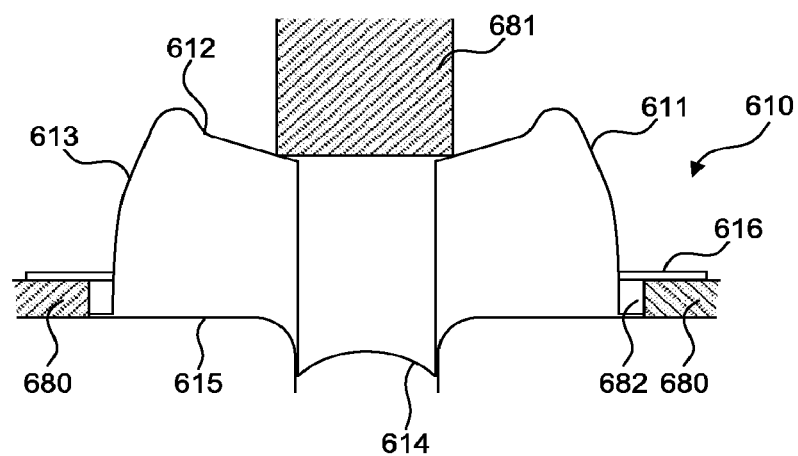
Figure 45:
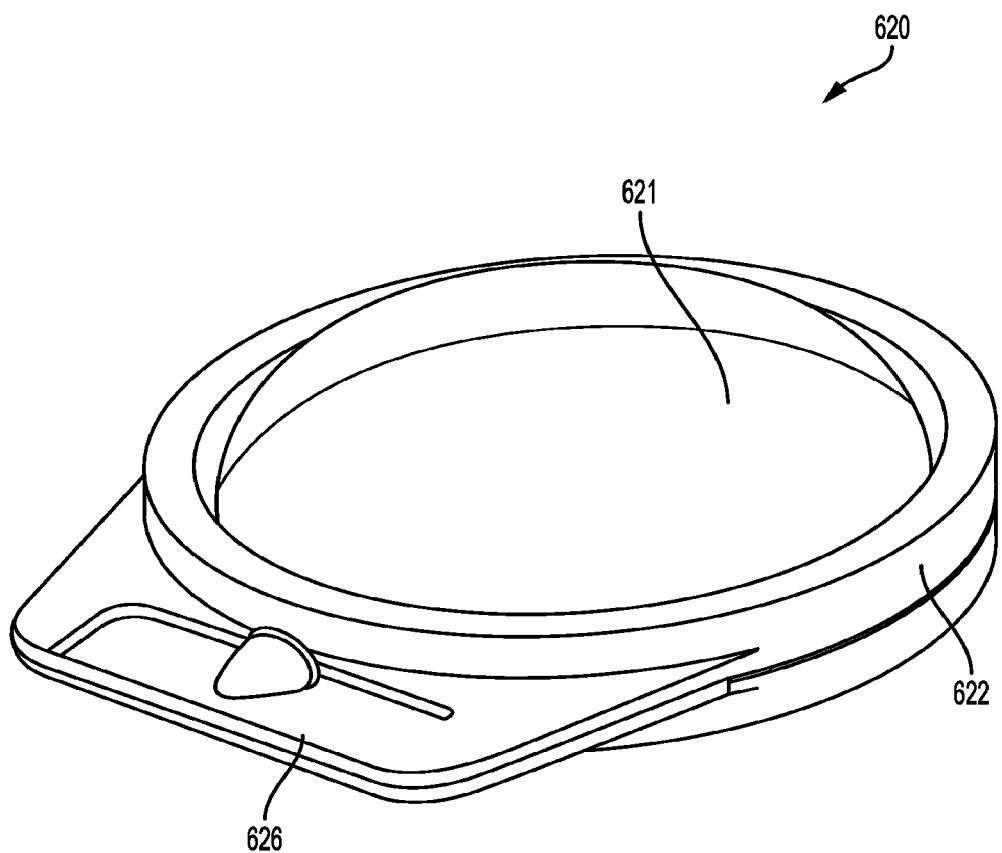
FIG. 45 shows a perspective view of a pod for a carbonated beverage maker according to some embodiments.
Figure 46:
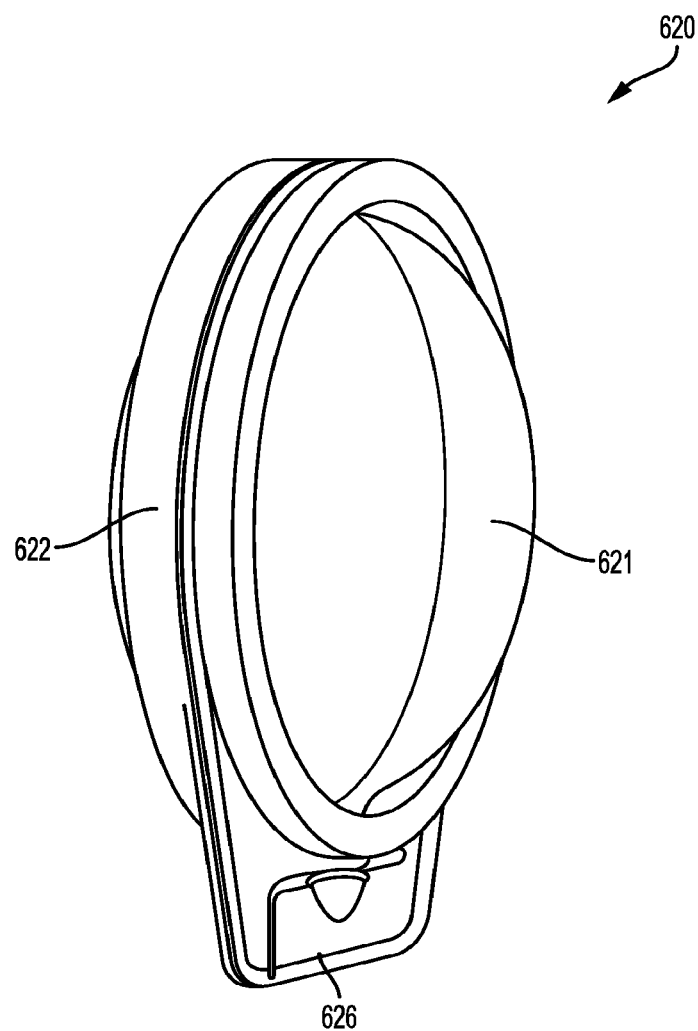
FIG. 46 shows a perspective view of a pod for a carbonated beverage maker according to some embodiments.

A method 400 of using carbonated beverage maker 300, as shown, for example, in FIG. 35, will now be described in more detail. At operation 410, water reservoir 312 is filled with water and ice. In some embodiments, a user removes water reservoir 312 from carbonated beverage maker 300 to fill it with water and ice. After water reservoir 312 is filled, the user may reattach water reservoir 312 to carbonated beverage maker 300. In some embodiments, a user fills water reservoir 312 as it remains attached to carbonated beverage maker 300. In some embodiments, before carbonated beverage maker 300 can operate, the water temperature in water reservoir 312 stabilizes. In some embodiments, the water temperature stabilizes in less than twenty minutes. In some embodiments, the water temperature stabilizes in less than ten minutes. In some embodiments, the water temperature stabilizes in less than five minutes.

At operation 420, concentrate may be added to carbonated beverage maker 300. In some embodiments, concentrate is added by attaching a beverage concentrate source (e.g., flavor source 362) to carbonated beverage maker 300. In some embodiments, carbonated beverage maker 300 includes a receptacle for directly containing concentrate. The concentrate may be in the form of powder, liquid, gel, syrup, or beads, for example. After flavor source 362 is attached to carbonated beverage maker 300, micro switch 369 will be in a closed position, thus allowing carbonated beverage maker 300 to operate.

At operation 430, a cup (e.g., drinking cup 392) is placed at carbonated beverage maker 300 where the carbonated beverage will dispense.

At operation 440, a drink type and/or desired carbonation level are selected. In some embodiments, a user may select the drink type and/or desired carbonation level via the user interface (e.g., touch screen 390 or button 394). In some embodiments, a user may also start the carbonated beverage maker 300 using the user interface. For example, the user may select the carbonation level and push start. In some embodiments, selecting the carbonation level may simultaneously start carbonated beverage maker 300.

Once the drink type and/or desired carbonation level are selected and the process (as described, for example, in FIG. 36 in relation to process 500) started, a user will wait until the process of carbonated beverage maker 300 is complete. At operation 450, a user may remove the dispensing cup 392, which is now filled with carbonated beverage.

Although the operations of method 400 have been described in a particular order, the order is not essential to method 400. In addition, some of the described operations are not necessary. For example, in some embodiments, a user may desire to simply carbonate water, or some other diluent, in which case, there may not be a need to attach beverage concentrate source, as described for operation 420. Finally, there may be additional operations not described here that may constitute part of method 400.

In some embodiments, process 500 of carbonated beverage maker 300 operates in parallel with method 400 to create a carbonated beverage. At operation 510, carbonated beverage maker 300 powers up cooling system 310 to stabilize the water temperature in water reservoir 312. In some embodiments, operation 510 occurs after a user fills water reservoir 312 with water and ice (i.e., operation 410 of method 400). In some embodiments, operation 510 takes less than twenty minutes, less than ten minutes, or less than five minutes.

In some embodiments, the remainder of the operations of process 500 may occur after operation 440 and before operation 450 of method 400. At operation 520, carbonated beverage maker 300 pumps cold water into carbonation chamber 332. In some embodiments, water fill pump 340 operates to pump cold water into carbonation chamber 332. In some embodiments, water fill pump 340 pumps cold water into carbonation chamber 332 until level sensor 382 determines that the appropriate amount of water is in carbonation chamber 332.

At operation 530, carbonated beverage maker 300 fills headspace 346 of carbonation chamber 332 with $CO_2$ gas from carbonation source 350. In some embodiments, $CO_2$ supply solenoid valve 354 opens to release pressurized $CO_2$ gas from carbonation source 350 into carbonation chamber 332 to fill headspace 346. In some embodiments, operation 530 and operation 520 occur at least partially simultaneously.

At operation 540, carbonated beverage maker 300 carbonates water with impeller 370. In some embodiments, impeller 370 is magnetically coupled to impeller motor 380 to avoid compromising the pressure envelope of carbonation chamber 332. Impeller 370 may be activated at operation 540 so that as it rotates, it creates a low pressure region 379, which draws the pressurized $CO_2$ gas to the bottom of carbonation chamber 332 and entrains it into the water, thus producing carbonated water. In some embodiments, operation 540 and operation 530 occur at least partially simultaneously.

At operation 550, carbonated beverage maker 300 stops impeller 370 after the carbonation process is complete. In some embodiments, carbonated beverage maker 300 stops impeller 370 after a certain amount of time has passed. In some embodiments, carbonated beverage maker 300 stops impeller 370 after the pressure in carbonation chamber 332 has stabilized. In some embodiments, impeller 370 runs for less than one minute. In some embodiments, impeller 370 runs for less than forty-five seconds. In some embodiments, impeller 370 runs for less than thirty seconds. In some embodiments, the amount of time that impeller 370 runs depends on the selected carbonation level.

At operation 560, carbonated beverage maker 300 vents excess gas from carbonation chamber 332. In some embodiments, $CO_2$ supply solenoid valve 354 closes during operation 560, thus shutting off carbonation source 350. In some embodiments, solenoid vent valve 348 opens to vent excess gas from carbonation chamber 332. In some embodiments, the carbonated water settles as excess gas is vented.

At operation 570, carbonated beverage maker 300 dispenses carbonated water from carbonation chamber 332. In some embodiments, air pump 338 pumps carbonated water out of carbonation chamber 332 and dispenses it into drinking cup 392.

At operation 580, carbonated beverage maker 300 dispenses concentrate from flavor source 362. In some embodiments, air pump 366 pumps concentrate out of flavor source 362 and dispenses it into drinking cup 392. In some embodiments, air pump 366 pumps concentrate out of flavor source 362 simultaneously and synchronously with air pump 338 pumping carbonated water out of carbonation chamber 332. Thus, operation 580 and operation 570 may occur simultaneously.

Although the operations of process 500 have been described in a particular order, the order is not essential to process 500. In addition, some of the described operations are not necessary. Finally, there may be additional operations not described here that may constitute part of process 500. For example, in some embodiments, carbonated beverage maker 300 performs an operation to cool carbonation chamber 332. Specifically, carbonation chamber 332 can be filled with water from water reservoir 312 to cool carbonation chamber 332. This water can then be emptied from carbonation chamber 332 back into water reservoir 312. This operation allows the carbonation cycle (i.e., operation 540) to occur in a pre-chilled vessel, for example, to reach desired carbonation levels.

As noted above, flavor sources 160 and 362 may comprise a pod. A variety of configurations of pods may be used as flavor source 160, flavor source 362, and the flavor source for other embodiments of carbonated beverage makers. In some embodiments, a pod may be single-chambered. In some embodiments, a pod may have two chambers. For example, a pod may include a chamber for concentrate and another chamber for a carbonation source. In some embodiments, a pod may include structure to assist in opening the pod for dispensing concentrate into the systems of a carbonated beverage maker. For example, a pod may include a piercer configured to puncture a portion of the pod. Several variations of pods are discussed below. However, these variations only provide examples and other pods or flavor sources may also be used with carbonated beverage makers in some embodiments. Furthermore, characteristics of the embodiments discussed below may be utilized in other embodiments discussed below, even if not expressly described with respect to a particular embodiment.

In some embodiments, a pod 600, as shown, for example, in FIGS. 37-41B, includes a container 601 and a lid 605. In some embodiments, container 601 includes a base 602 and a side 603. In some embodiments, container 601 and lid 605 are circular. In some embodiments, pod 600 may be made of a material that provides a long shelf life for concentrate within pod 600. In some embodiments, pod 600 may be made of a material that is recyclable. For example, pod 600 may be made of a recyclable plastic. For example, pod 600, including container 601 and lid 605, may be made of polyethylene terephthalate (PET). In some embodiments, container 601 and lid 605 are welded together.

In some embodiments, a piercer 604 is disposed within container 601 extending from base 602. In some embodiments, piercer 604 extends from base 602 and ends in a tip near lid 605 that is sharp enough to pierce lid 605. In some embodiments, the sharp tip of piercer 604 is disposed on a central axis of piercer 604. The sharp tip may alternatively be disposed on an edge of piercer 604. In some embodiments, there may be multiple sharp tips along the edge of piercer 604 (see FIGS. 42-44B). In some embodiments, piercer 604 is made of the same material as container 601. For example, piercer 604 may be made of PET. In some embodiments, container 601, lid 605, and piercer 604 are injection molded.

In some embodiments, base 602 is configured to allow extension of piercer 604. For example, base 602 may be an uneven surface, thus forming a rolling diaphragm. In some embodiments, base 602 is thin in some portions to add flexibility to base 602. In some embodiments, when piercer 604 is extended, piercer 604 may pierce through lid 605. In some embodiments, lid 605 includes a projection 606 in its center. Projection 606 may help prevent contamination of a dispensing location of carbonated beverage makers. In some embodiments, projection 606 includes a thin section 607. Thin section 607 may enable a controlled breakthrough when piercer 604 pierces lid 605. In some embodiments, as shown, for example, in FIG. 39, thin section 607 extends across the middle of projection 606 and substantially around the circumference of projection 606. Thus, when piercer 604 contacts lid 605 in the middle of projection 606, lid 605 is designed to break along thin section 607, allowing concentrate to flow out of pod 600. In some embodiments, pod 600 further includes a powder chamber 608 disposed within projection 606, as shown, for example, in FIG. 40. In some embodiments, a film 609 separates powder chamber 608 from the rest of pod 600. In some embodiments, piercer 604 pierces through film 609 and lid 605.

In some embodiments, portions of a carbonated beverage maker may contribute to opening of the pod (e.g., pod 600). For example, a carbonated beverage maker may include a pod support 680. In some embodiments, pod support 680 may define an aperture 682. As shown, for example, in FIGS. 41A and 41B, pod 600 may rest on pod support 680. In some embodiments, projection 606 is sized to fit through aperture 682. Thus, when lid 605 is pierced, the concentrate within pod 600 will not contaminate the dispense location of the carbonated beverage maker. In some embodiments, a push rod 681 is disposed above base 602. Push rod 681 may extend, as shown, for example, in FIG. 41B, to push base 602, which in turn extends piercer 604 to pierce lid 605. In some embodiments, push rod 681 is actuated by a manual operation, such as inserting pod 600 or closing a portion of a carbonated beverage maker around pod 600. In some embodiments, push rod 681 is actuated by a solenoid when a user interacts with a user interface of a carbonated beverage maker, such as pressing a start button. After lid 605 is pierced, concentrate from pod 600 is delivered by gravity into, for example, a drinking cup or other chamber.

In some embodiments, a pod 610, as shown, for example, in FIGS. 42-44B, includes a container 611 and a film 615. In some embodiments, container 611 includes a base 612 and a side 613. In some embodiments, container 611 and film 615 are circular. In some embodiments, pod 610 may be made of a material that is recyclable. For example, pod 610 may be made of a recyclable plastic. For example, pod 610, including container 611 and film 615, may be made of PET. Film 615 may be a thin layer of PET. In some embodiments, film 615 may be easier to pierce and cheaper than lid 605 of pod 600. But film 615 may cause pod 610 to have a lower shelf life than pod 600. In some embodiments, film 615 is welded to container 611.

In some embodiments, a piercer 614 is disposed within container 611 extending from base 612. In some embodiments, piercer 614 extends from base 612 and ends in multiple tips near film 615 that are sharp enough to pierce film 615. In some embodiments, the multiple sharp tips of piercer 614 are disposed around the circumference of piercer 614. In some embodiments, piercer 614 is made of the same material as container 611. For example, piercer 614 may be made of PET. In some embodiments, container 601 and piercer 604 are injection molded. For example, container 601 and piercer 604 may be injection molded as a single part.

In some embodiments, base 612 is configured to allow extension of piercer 614. For example, base 612 may be an uneven surface, thus forming a rolling diaphragm. In some embodiments, base 612 is thin in some portions to add flexibility to base 612. In some embodiments, when piercer 614 is extended, piercer 614 may pierce through film 615. In some embodiments, container 611 includes a flange 616 disposed on side 613. In some embodiments, flange 616 is disposed near film 615. Flange 616 may completely surround pod 610.

In some embodiments, flange 616 interacts with pod support 680 in carbonated beverage makers. In some embodiments, pod support 680 may define aperture 682. As shown, for example, in FIGS. 44A and 44B, pod 610 may rest on pod support 680. In some embodiments, flange 616 rests on pod support 680. Thus, in some embodiments, film 615 is sized to fit through aperture 682. Thus, when film 615 is pierced, the concentrate within pod 610 will not contaminate the dispense location of the carbonated beverage maker. In some embodiments, a push rod 681 is disposed above base 612. Push rod 681 may extend, as shown, for example, in FIG. 44B, to push base 612, which in turn extends piercer 614 to pierce film 615. In some embodiments, push rod 681 is actuated by a manual operation, such as inserting pod 610 or closing a portion of a carbonated beverage maker around pod 610. In some embodiments, push rod 681 is actuated by a solenoid when a user interacts with a user interface of a carbonated beverage maker, such as pressing a start button. After film 615 is pierced, concentrate from pod 610 is delivered by gravity into, for example, a drinking cup or other chamber.

Figure 47:
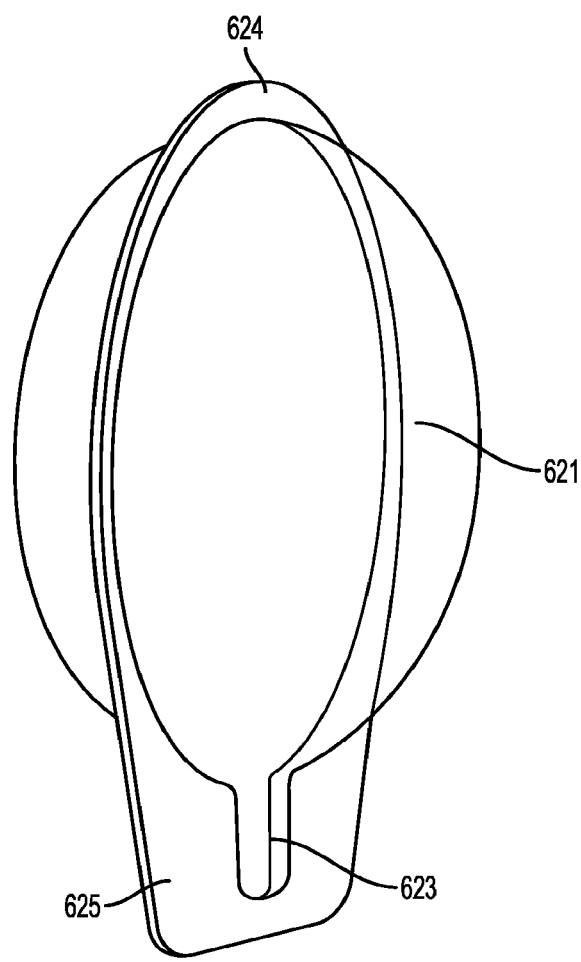
FIG. 47 shows a perspective view of a pod for a carbonated beverage maker according to some embodiments.
Figure 48:
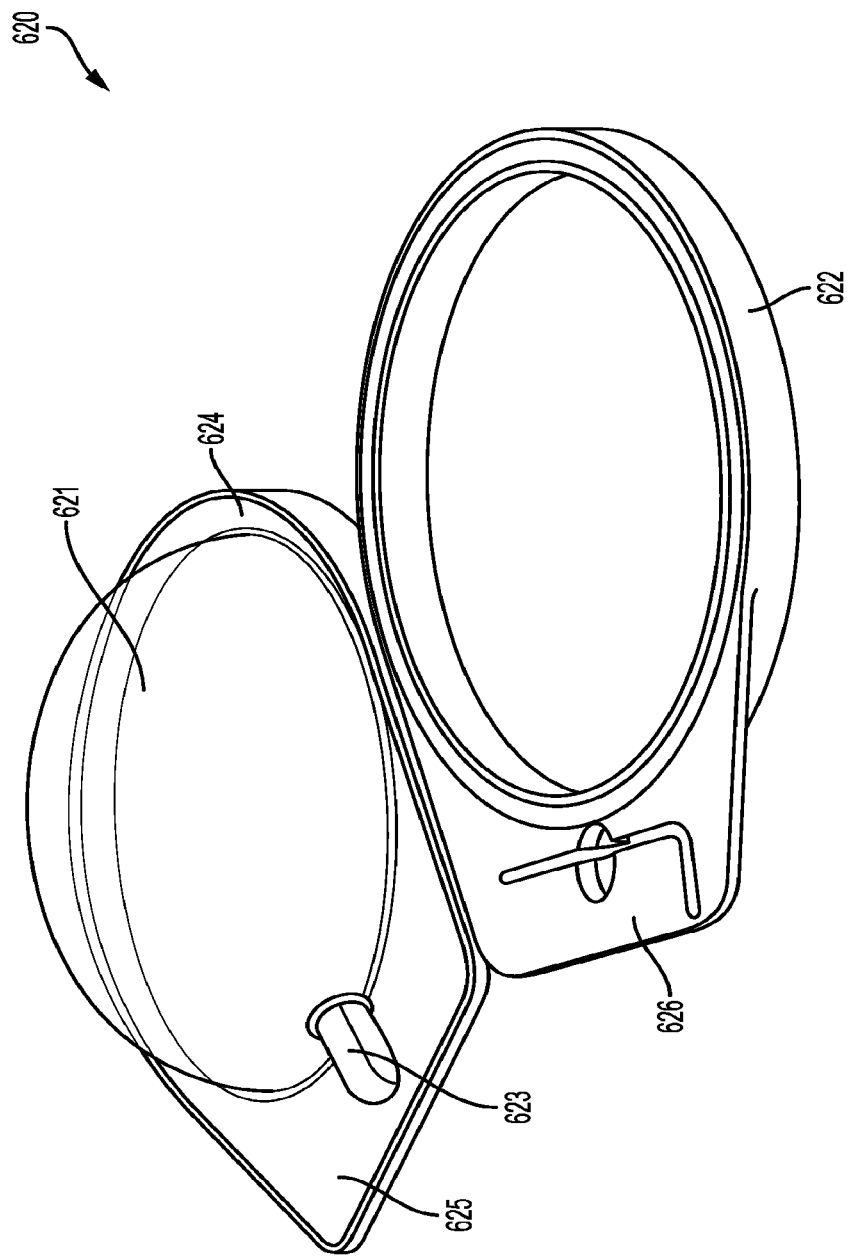
FIG. 48 shows a perspective view of a pod for a carbonated beverage maker according to some embodiments.
Figure 49A:
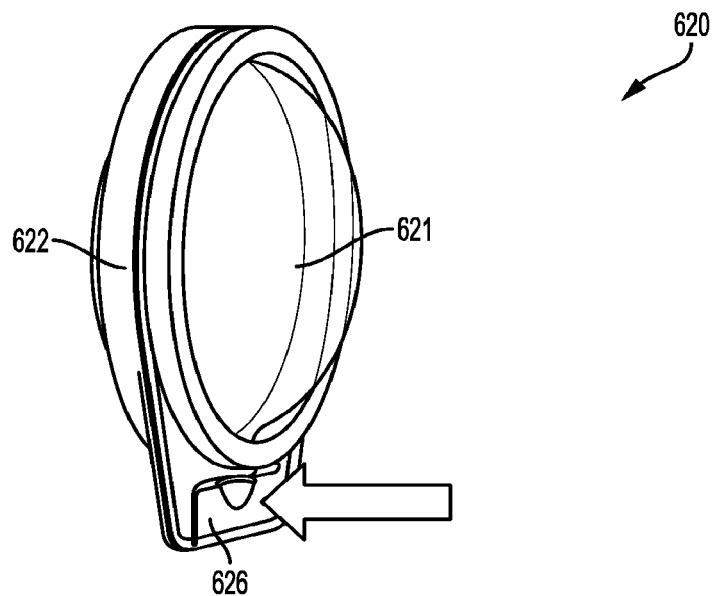
FIGS. 49A and 49B show a perspective view of a method of opening a pod in a carbonated beverage maker according to some embodiments.
Figure 49B:
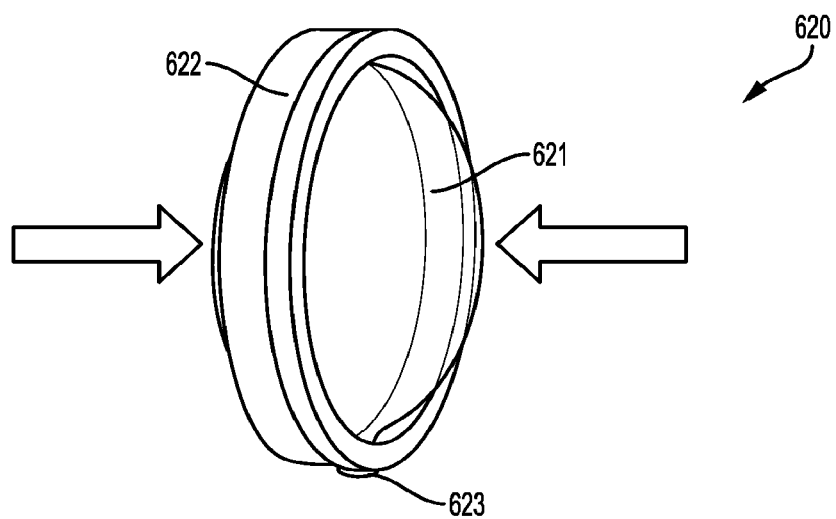

In some embodiments, a pod 620, as shown, for example, in FIGS. 45-49B, includes a pouch 621 and a frame 622. In some embodiments, pouch 621, as shown, for example, in FIG. 47, is semi rigid. For example, pouch 621 may be made of two thin PET shells welded together. In some embodiments, the two thin PET shells are vacuum formed. In some embodiments, pouch 621 may be made as one part in a blow-fill-seal process. In some embodiments, pouch 621 includes a nozzle 623 for filling pouch 621 with concentrate. In some embodiments, nozzle 621 may also operate as the fluid outlet to dispense concentrate from within pouch 621. In some embodiments, nozzle 621 is heat sealed.

In some embodiments, pouch 621 includes a peripheral edge 624. In some embodiments, peripheral edge 624 is where the two thin PET shells may be welded together. In some embodiments, pouch 621 includes a tip 625. Tip 625 may be a wider portion of peripheral edge 624. In some embodiments, tip 625 is disposed adjacent to nozzle 623. In some embodiments, tip 625 is configured to detach from pouch 621, thus opening nozzle 623 for dispensing of concentrate within pouch 621.

In some embodiments, frame 622 surrounds peripheral edge 624 and other portions of pouch 621. In some embodiments, frame 622 is rigid. In some embodiments, frame 622 is made of a rigid plastic. Frame 622 may include a break-off portion 626. In some embodiments, break-off portion 626 is disposed at tip 625 and nozzle 623. In some embodiments, break-off portion 626 is configured to detach from the rest of frame 622, thus opening nozzle 623 by breaking off tip 625 from pouch 621. For example, break-off portion may be perforated or be otherwise partially delineated from the rest of frame 622 with a slot.

In some embodiments, a carbonated beverage maker may operate to open pod 620. In some embodiments, as shown, for example, in FIG. 49A, carbonated beverage makers may snap break-off portion 626 off of frame 622. This may be done, for example, with a push rod. After break-off portion 626 has been removed, concentrate from within pod 620 may dispense. In some embodiments, concentrate dispenses based on gravity. In some embodiment, a carbonated beverage maker may assist in dispensing concentrate from pod 620, as shown, for example, in FIG. 49B. For example, carbonated beverage makers may use air pressure to squeeze concentrate out of pod 620, such as with air pump 162 or air pump 166. Alternatively, carbonated beverage makers may use mechanical force to squeeze concentrate out of pod 620, such as with a push rod on one or both sides of pod 620.

Figure 50:
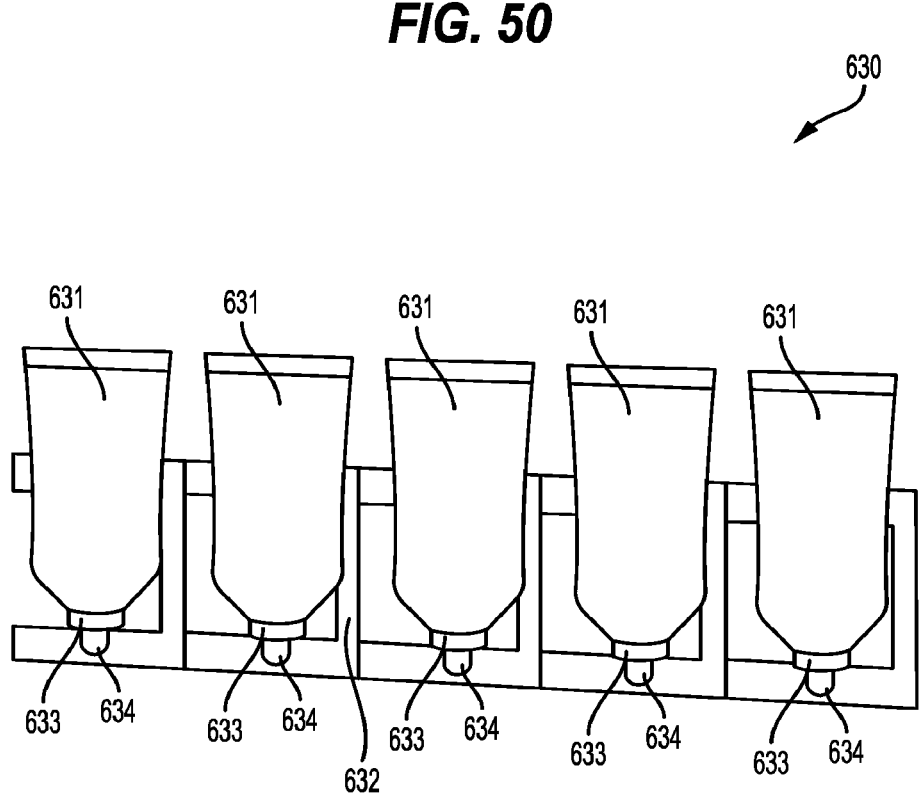
FIG. 50 shows a perspective view of a pod for a carbonated beverage maker according to some embodiments.
Figure 51:
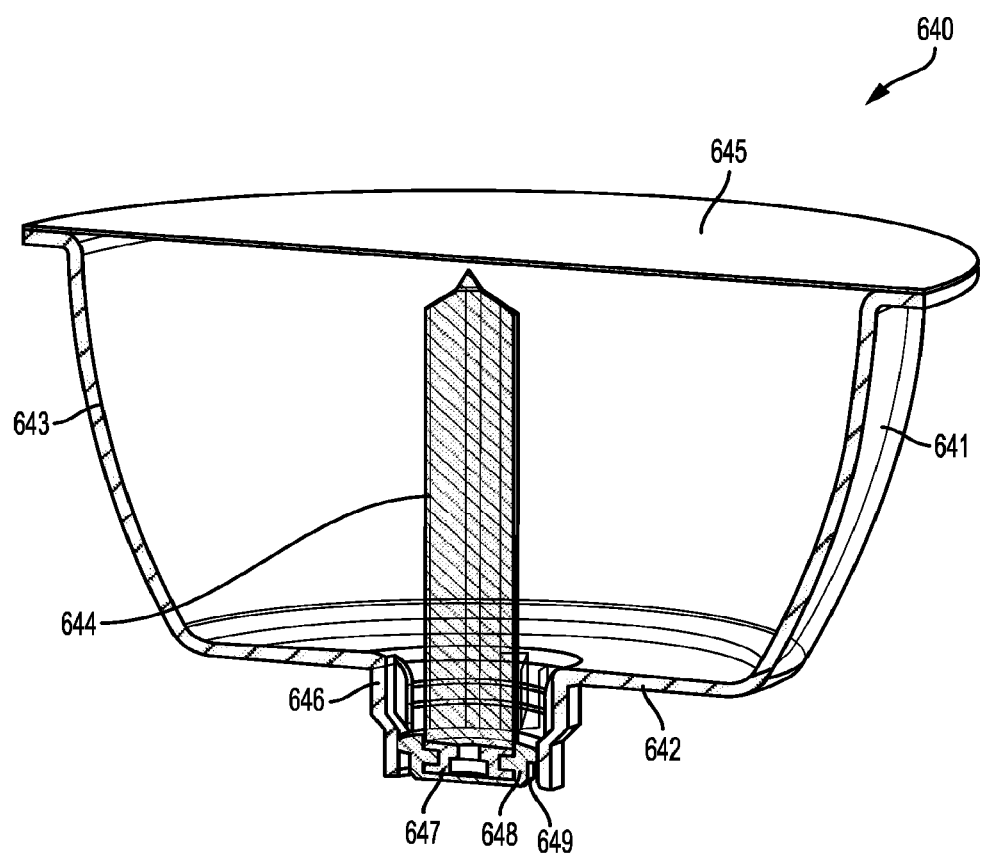
FIG. 51 shows a cross-sectional perspective view of a pod for a carbonated beverage maker according to some embodiments.
Figure 52:
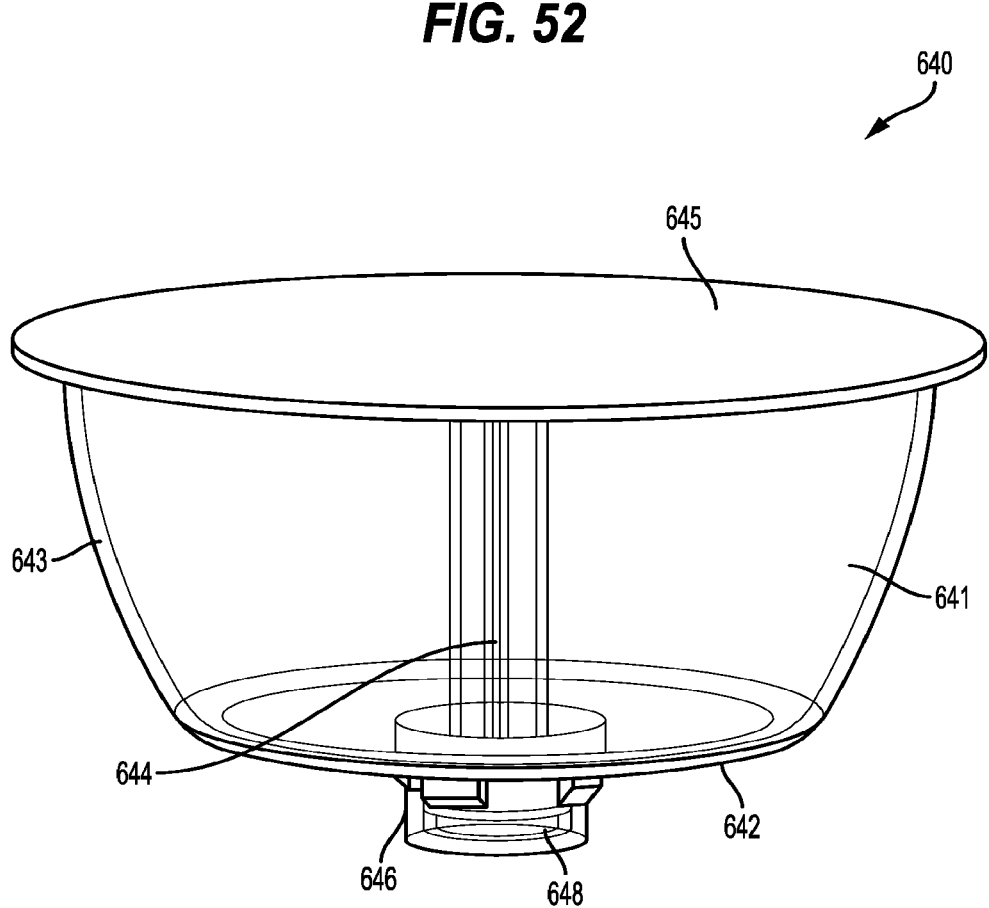
FIG. 52 shows a perspective view of a pod for a carbonated beverage maker according to some embodiments.

In some embodiments, a pod 630, as shown, for example, in FIG. 50, includes a plurality of tubes 631. In some embodiments, pod 630 includes at least three tubes 631. In some embodiments, pod 630 includes at least five tubes 631. In some embodiments, each tube 631 may contain an amount of concentrate equal to a single serving. In some embodiments, tubes 631 may be connected to each other via links 632. In some embodiments, each tube 631 includes a nozzle 633. Links 632 may have a break-off portion 634. In some embodiments, break-off portion 634 is disposed at nozzle 633. Thus, when break-off portion 634 is snapped away from tube 631, nozzle 633 is opened for dispensing of concentrate from within tube 631. In some embodiments, links 632 hold break-off portion 634 after it is snapped off to prevent break-off portion from falling into a drink with the concentrate. In some embodiments, pod 630 is molded through a blow-fill-seal process.

In some embodiments, a carbonated beverage maker may operate to open each tube 631 of pod 630. In some embodiments, carbonated beverage makers may snap break-off portion 634 off of tube 631. This may be done, for example, with a push rod or a clamping and pulling mechanism. After break-off portion 634 has been removed, concentrate from within pod 630 may dispense. In some embodiments, concentrate dispenses based on gravity. In some embodiment, a carbonated beverage maker may assist in dispensing concentrate from pod 630. For example, carbonated beverage makers may use air pressure to squeeze concentrate out of pod 630, such as with air pump 162 or air pump 166. Alternatively, carbonated beverage makers may use mechanical force to squeeze concentrate out of pod 630, such as with a push rod on one or both sides of pod 630. In some embodiments, a user may separate one tube 631 from the other tubes 631 for insertion into a carbonated beverage maker. In some embodiments, a user may insert an entire pod 630 into a carbonated beverage maker, which may automatically cycle through each tube 631 in preparing beverages. When all tubes 631 have been consumed, a carbonated beverage maker may alert a user to insert another pod 630.

In some embodiments, a pod 640, as shown, for example, in FIGS. 51-53B, includes a container 641 and a film 645. In some embodiments, container 641 includes a base 642 and a side 643. In some embodiments, container 641 and film 645 are circular. In some embodiments, pod 640 may be made of a material that is recyclable. For example, pod 640 may be primarily made of a recyclable plastic. For example, pod 640, including container 641 and film 645, may be primarily made of PET. Film 645 may be a thin layer of PET. In some embodiments, film 645 may be easier to pierce and cheaper than lid 605 of pod 600. But film 645 may cause pod 640 to have a lower shelf life than pod 600. In some embodiments, film 645 is welded to container 641.

In some embodiments, a piercer 644 is disposed within container 641 extending from a projection 646 in base 642. For example, piercer 644 may be disposed within projection 646 starting lower than base 642. In some embodiments, piercer 644 extends from projection 646 in base 642 and ends in a tip near film 645 that is sharp enough to pierce film 645. In some embodiments, the sharp tip of piercer 644 is disposed on a central axis of piercer 644. The sharp tip may alternatively be disposed on an edge of piercer 644. In some embodiments, there may be multiple sharp tips along the edge of piercer 644 (see FIGS. 42-44B). In some embodiments, piercer 644 is made of the same material as container 641. For example, piercer 644 may be made of PET. In some embodiments, container 641 and piercer 644 are injection molded.

In some embodiments, projection 646 contains a portion of piercer 644 (as noted above), a metal piece 647, and a seal 648. In some embodiments, metal piece 647 is part of piercer 644. In some embodiments, metal piece 647 is magnetic. For example, metal piece 647 may be a ferrite metal. In some embodiments, the magnetic properties of metal piece 647 may cause piercer 644 to move upwards and pierce film 645. In some embodiments, seal 648 seals pod 640. For example, seal 648 may seal an outlet 649 at the bottom of projection 646. In some embodiments, seal 648 surrounds metal piece 647. In some embodiments, seal 648 is part of piercer 644. In some embodiments, seal 648, metal piece 647, and piercer 644 are fixed relative to each other and may move together relative to container 641. In some embodiments, seal 648 is rubber.

Figure 53A:
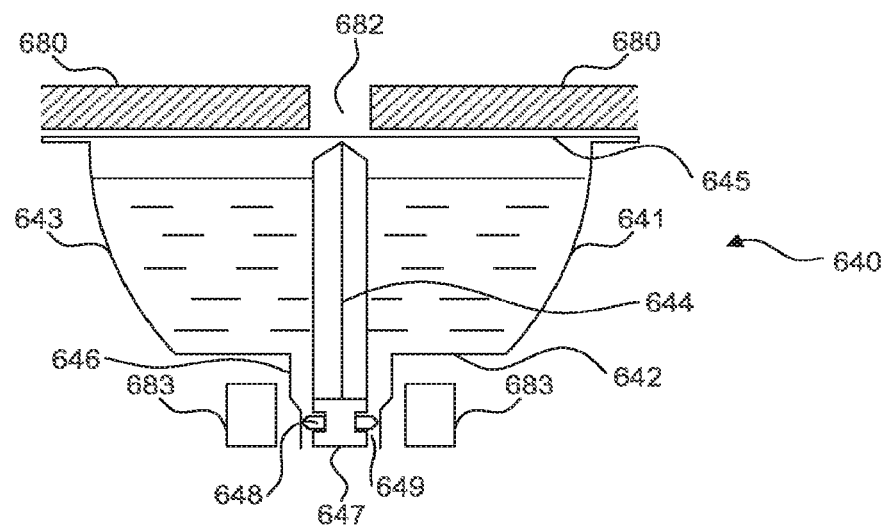
FIGS. 53A and 53B show a cross-sectional view of a method of opening a pod in a carbonated beverage maker according to some embodiments.
Figure 53B:
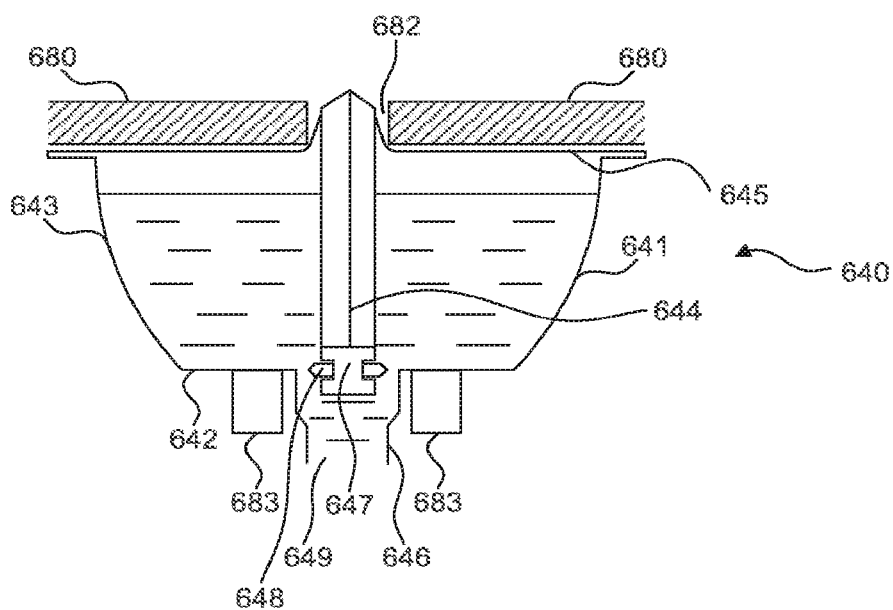
Figure 54:
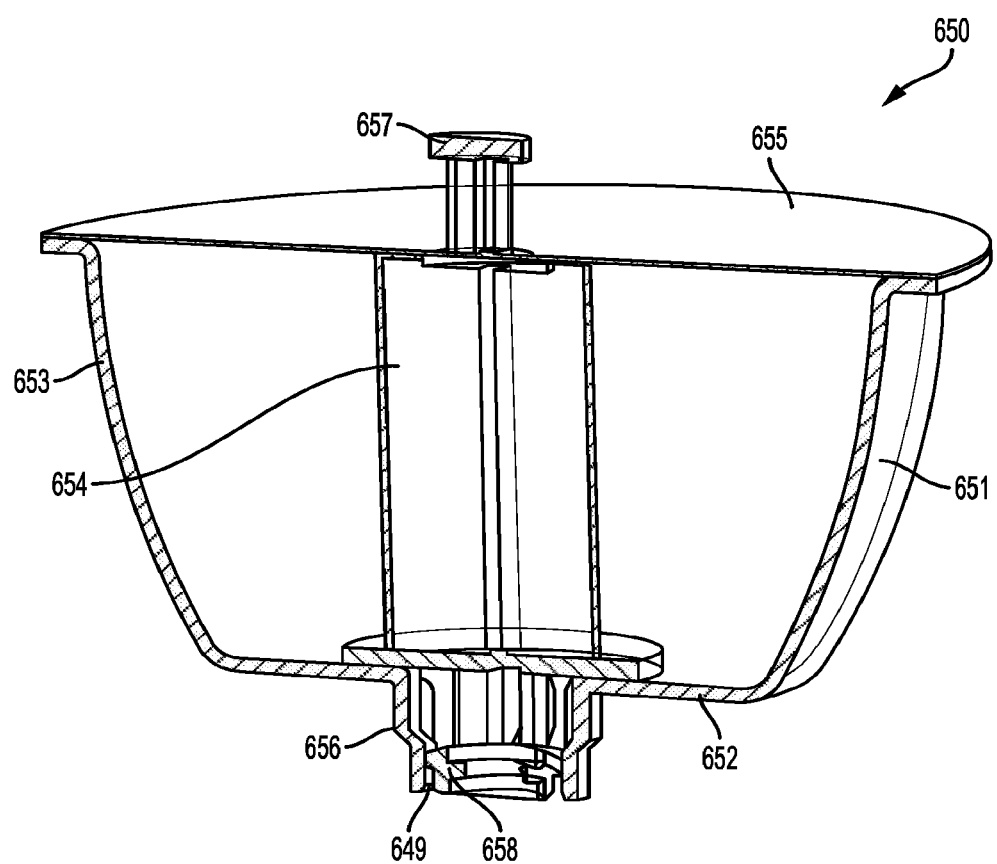
FIG. 54 shows a cross-sectional perspective view of a pod for a carbonated beverage maker according to some embodiments.
Figure 55:
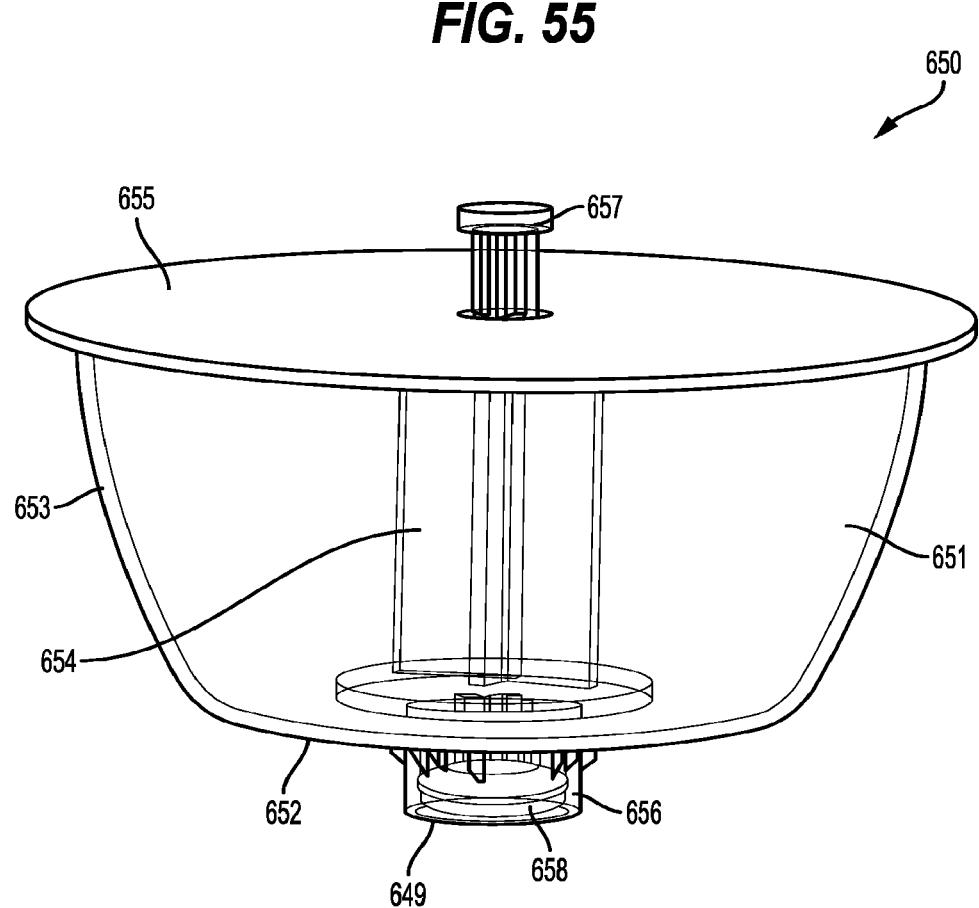
FIG. 55 shows a perspective view of a pod for a carbonated beverage maker according to some embodiments.

In some embodiments, pod 640 is disposed below a portion of pod support 680 in carbonated beverage makers, as shown, for example, in FIGS. 53A and 53B. In some embodiments, pod support 680 may define aperture 682. In some embodiments, aperture 682 aligns with piercer 644. In some embodiments, aperture 682 assists in regulating the cutting pattern of film 645. In some embodiments, carbonated beverage makers may include a magnet 683. In some embodiments, magnet 683 comprises a magnet ring. Magnet 683 may surround projection 646, as shown, for example, in FIGS. 53A and 53B. In some embodiments, magnet ring 683 drives metal piece 647 upwards, thus driving piercer 644 upwards to pierce film 645 and removing seal 648 from outlet 649, as shown, for example, in FIG. 53B. After film 645 is pierced and outlet 649 is unsealed, concentrate from pod 640 is delivered by air pressure (e.g., from an air pump) through the cut film 645 to dispense through outlet 649 into, for example, a drinking cup or other chamber.

In some embodiments, a pod 650, as shown, for example, in FIGS. 54-58B, includes a container 651 and a film 655. In some embodiments, container 651 includes a base 652 and a side 653. In some embodiments, container 651 and film 655 are circular. In some embodiments, pod 650 may be made of a material that is recyclable. For example, pod 650 may be primarily made of a recyclable plastic. For example, pod 650, including container 651 and film 655, may be primarily made of PET. Film 655 may be a thin layer of PET. In some embodiments, film 655 may be easier to pierce and cheaper than lid 605 of pod 600. But film 655 may cause pod 650 to have a lower shelf life than pod 600. In some embodiments, film 655 is welded to container 651.

Figure 56:
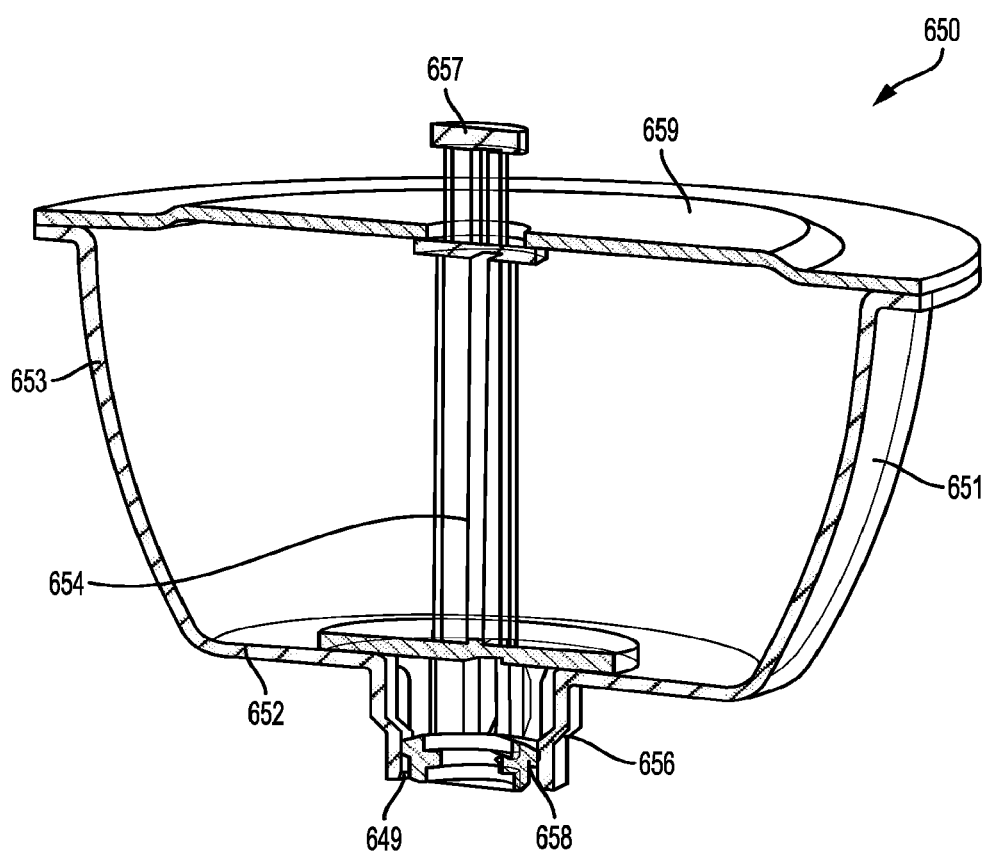
FIG. 56 shows a cross-sectional perspective view of a pod for a carbonated beverage maker according to some embodiments.
Figure 57:
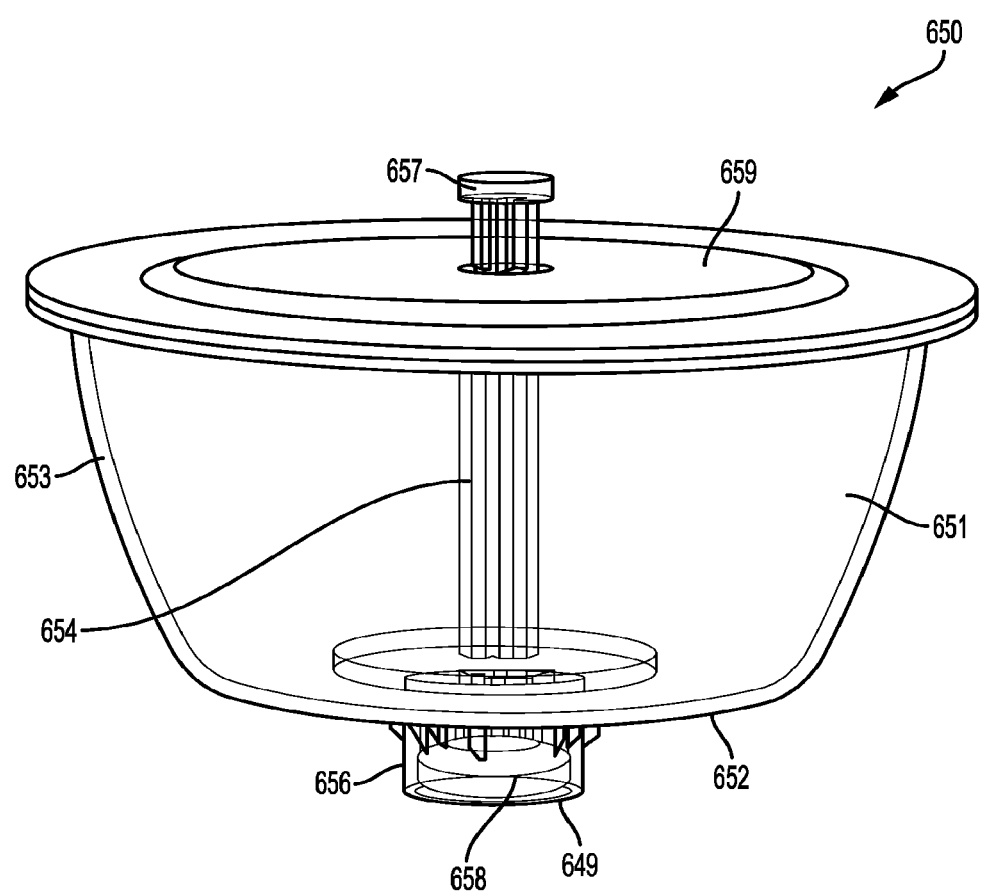
FIG. 57 shows a perspective view of a pod for a carbonated beverage maker according to some embodiments.

As an alternative to film 655, pod 650 may have a lid 659, as shown, for example, in FIGS. 56 and 57. Lid 659 may be welded to container 651. In some embodiments, lid 659 may be made of PET. In some embodiments, lid 659 is injection molded. In some embodiments, lid 659 may include weak points to aid in piercing lid 659. While the remainder of the description discuss film 655, the same principles may be applied when pod 650 utilizes lid 659.

In some embodiments, a piercer 654 is disposed within container 651 extending from a projection 656 in base 652. For example, piercer 654 may be disposed within projection 656 starting lower than base 652. In some embodiments, piercer 654 extends from projection 656 in base 652 to film 655. In some embodiments, piercer 654 is welded to film 655. In some embodiments, piercer 654 includes sharp blades to pierce film 655. In some embodiments, piercer 654 is made of the same material as container 651. For example, piercer 654 may be made of PET. In some embodiments, container 651 and piercer 654 are injection molded.

In some embodiments, pod 650 includes a pull feature 657 disposed on an outside of film 655. In some embodiments, pull feature 657 is operatively connected to piercer 654. For example, pull feature 657 may be a part of piercer 654. In some embodiments, pull feature 657 comprises a projection that rises above film 655. Pull feature 657 may be configured such that a portion of a carbonated beverage maker can secure and pull upwards on pull feature 657 to cause the blades of piercer 654 to cut film 655.

In some embodiments, projection 646 contains a portion of piercer 654 (as noted above) and a seal 658. In some embodiments, seal 658 seals pod 650. For example, seal 658 may seal an outlet 649 at the bottom of projection 656. In some embodiments, seal 658 is part of piercer 654. In some embodiments, seal 658 and piercer 654 are fixed relative to each other and may move together relative to container 651. In some embodiments, seal 658 is rubber.

Figure 58A:
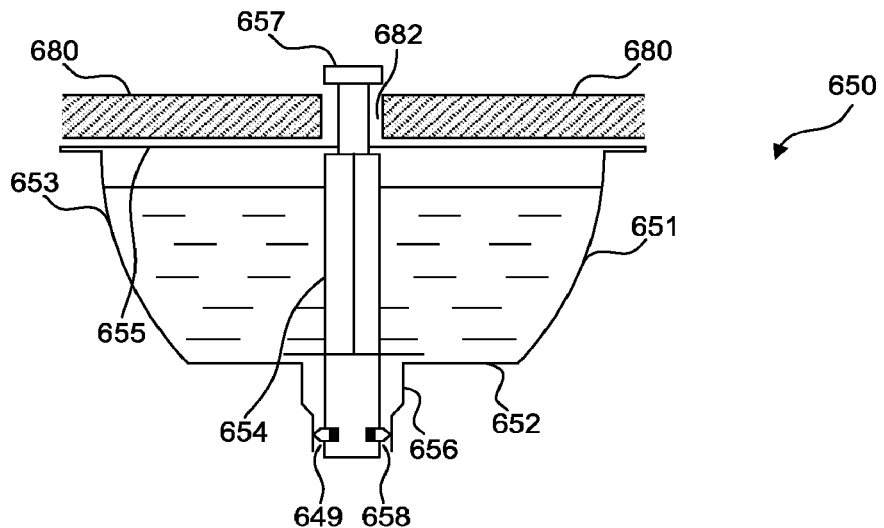
FIGS. 58A and 58B show a cross-sectional view of a method of opening a pod in a carbonated beverage maker according to some embodiments.
Figure 58B:
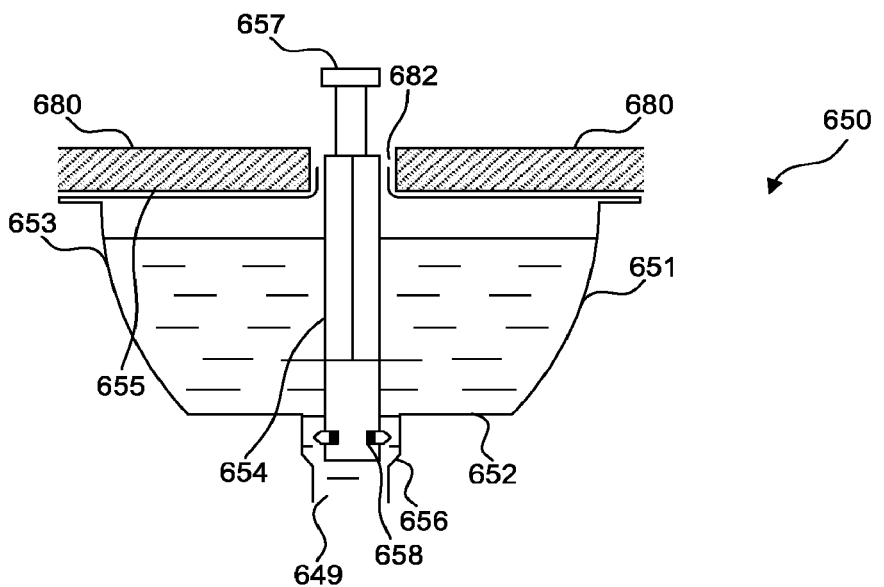
Figure 59:
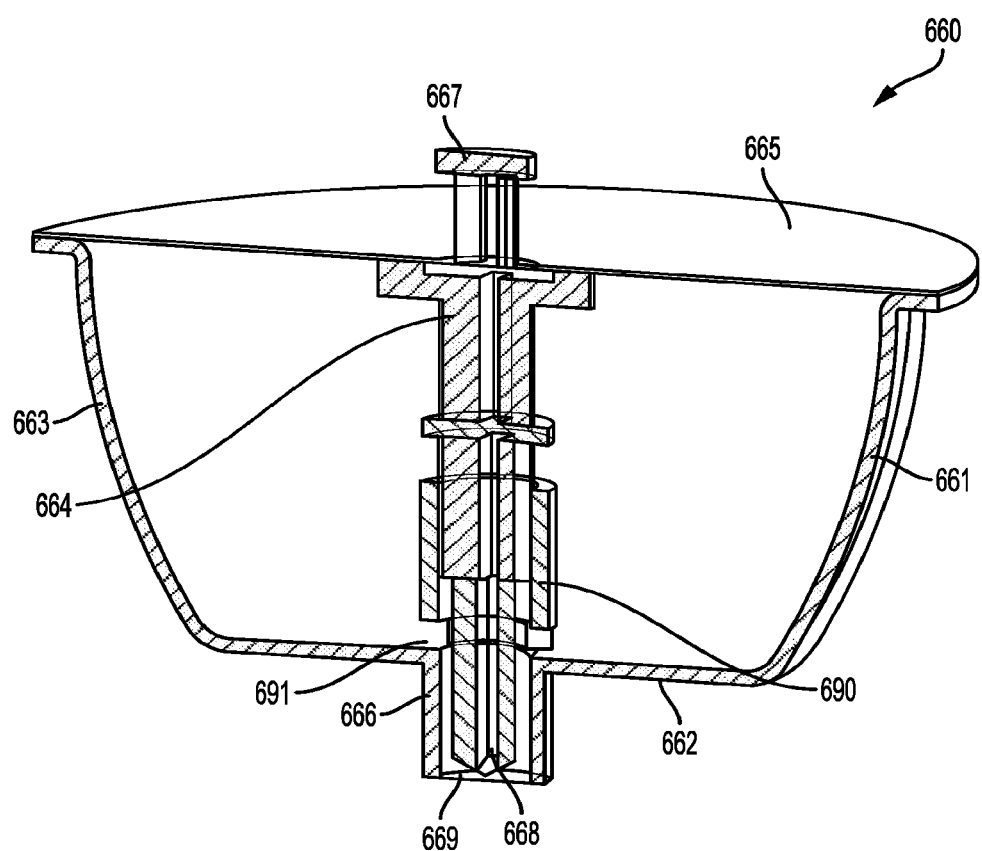
FIG. 59 shows a cross-sectional perspective view of a pod for a carbonated beverage maker according to some embodiments.
Figure 60:
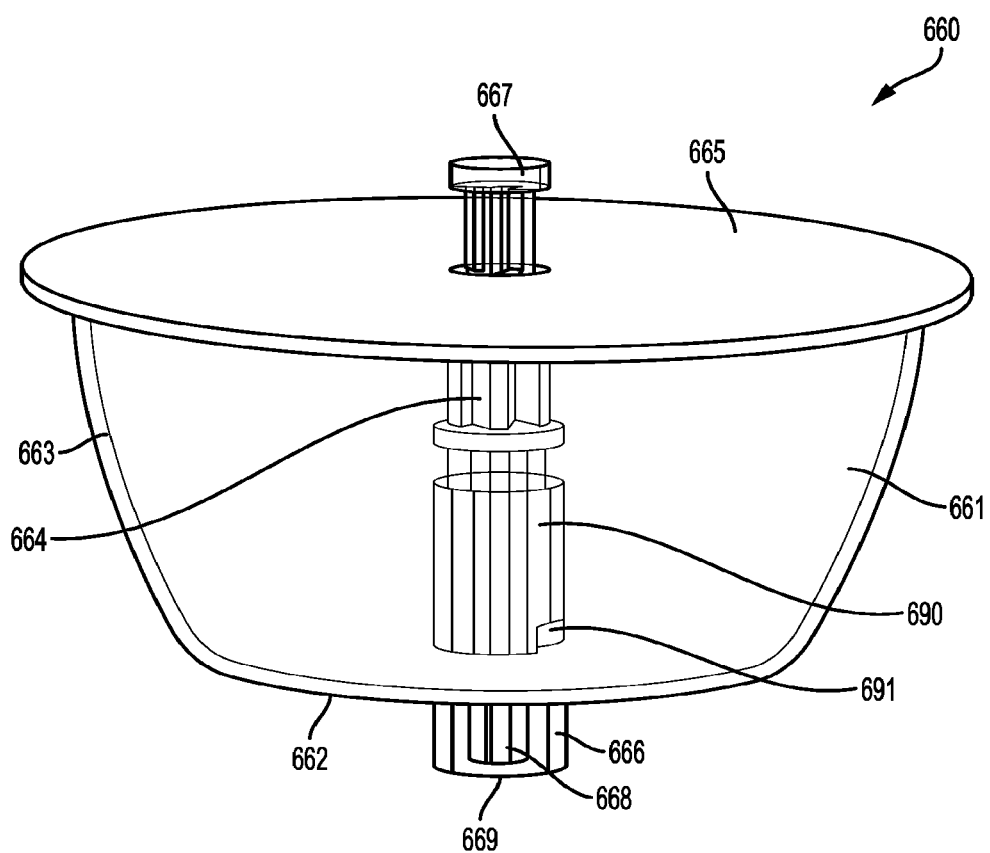
FIG. 60 shows a perspective view of a pod for a carbonated beverage maker according to some embodiments.

In some embodiments, pod 650 is disposed below a portion of pod support 680 in carbonated beverage makers, as shown, for example, in FIGS. 58A and 58B. In some embodiments, pod support 680 may define aperture 682. In some embodiments, aperture 682 aligns with piercer 644. In some embodiments, pull feature 657 extends through aperture 682, as shown, for example, in FIG. 58A. In some embodiments, aperture 682 assists in regulating the cutting pattern of film 655. In some embodiments, carbonated beverage makers may include a mechanism, such as a movable clamp, to secure and pull upwards on pull feature 657, thus pulling piercer 654 upwards to pierce film 655 and remove seal 658 from outlet 649, as shown, for example, in FIG. 58B. After film 655 is pierced and outlet 649 is unsealed, concentrate from pod 650 is delivered by air pressure (e.g., from an air pump) through the cut film 655 to dispense through outlet 649 into, for example, a drinking cup or other chamber.

In some embodiments, a pod 660, as shown, for example, in FIGS. 59-61C, includes a container 661 and a first film 665. In some embodiments, container 661 includes a base 662 and a side 663. In some embodiments, container 661 and first film 665 are circular. In some embodiments, pod 660 may be made of a material that is recyclable. For example, pod 660 may be primarily made of a recyclable plastic. For example, pod 660, including container 661 and first film 665, may be primarily made of PET. First film 665 may be a thin layer of PET. In some embodiments, first film 665 may be easier to pierce and cheaper than lid 605 of pod 600. But first film 665 may cause pod 660 to have a lower shelf life than pod 600. In some embodiments, first film 665 is welded to container 661.

In some embodiments, a first piercer 664 is disposed within container 661 extending from a projection 666 in base 662. For example, first piercer 664 may be disposed within projection 666 lower than base 662. In some embodiments, first piercer 664 extends from projection 666 in base 662 to first film 665. In some embodiments, first piercer 664 is welded to first film 665. In some embodiments, first piercer 664 includes sharp blades to pierce first film 665. In some embodiments, first piercer 664 is made of the same material as container 661. For example, first piercer 664 may be made of PET. In some embodiments, container 661 and first piercer 664 are injection molded.

In some embodiments, pod 660 includes a pull feature 667 disposed on an outside of first film 665. In some embodiments, pull feature 667 is operatively connected to first piercer 664. For example, pull feature 667 may be a part of first piercer 664. In some embodiments, pull feature 667 comprises a projection that rises above first film 665. Pull feature 667 may be configured such that a portion of a carbonated beverage maker can secure and pull upwards on pull feature 667 to cause the blades of first piercer 664 to cut first film 665.

In some embodiments, projection 666 includes a second film 669 disposed at its bottom surface. In some embodiments, second film 669 is made of PET. In some embodiments, second film 669 is a thin layer of PET. In some embodiments, second film 669 is welded to projection 666. In some embodiments, projection 666 contains a portion of first piercer 664 (as noted above). In some embodiments, the portion of first piercer 664 in projection 666 includes a second piercer 668. In some embodiments, second piercer 668 comprises a sharp tip configured to pierce second film 669. In some embodiments, the sharp tip of second piercer 668 is located on a central axis of second piercer 668. In some embodiments, second piercer 668 is part of first piercer 664. In some embodiments, second piercer 668 and first piercer 664 are fixed relative to each other and may move together relative to container 661.

In some embodiments, pod 660 includes a casing 690 disposed within container 661. In some embodiments, casing 690 surrounds a portion of first piercer 664 and second piercer 668. In some embodiments, casing 690 is fixed relative to container 661. In some embodiments, casing 690 includes holes 691 disposed at base 662. In some embodiments, holes 691 allow concentrate to flow out of pod 660 when pod 660 is opened.

Figure 61A:
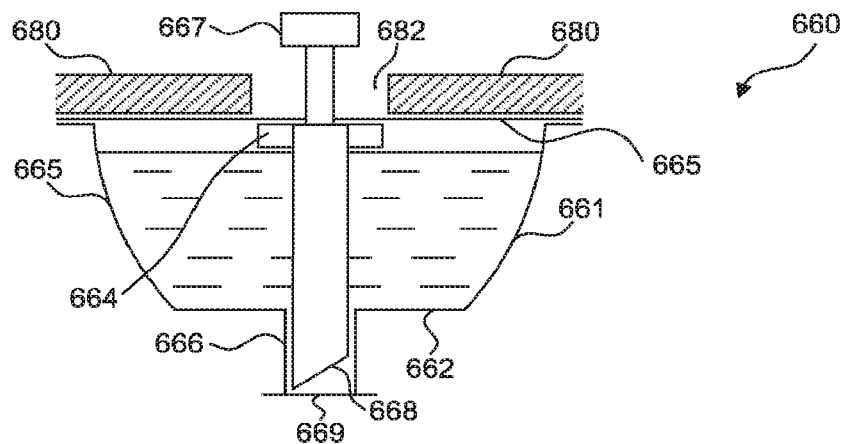
FIGS. 61A, 61B, and 61C show a cross-sectional view of a method of opening a pod in a carbonated beverage maker according to some embodiments.
Figure 61B:
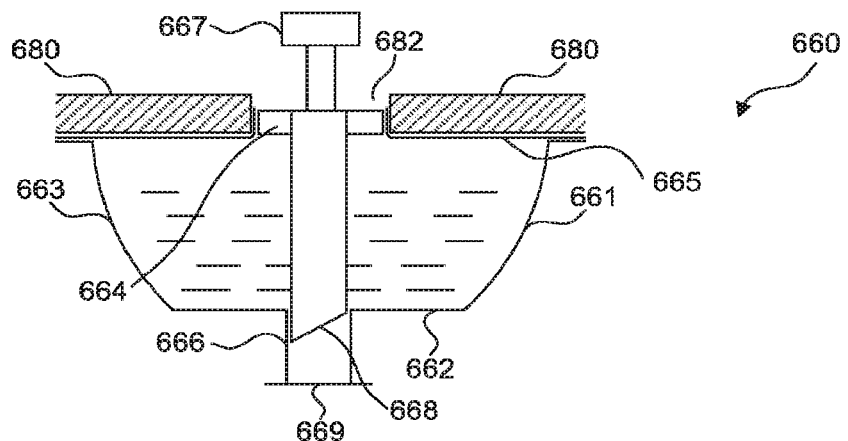
Figure 61C:
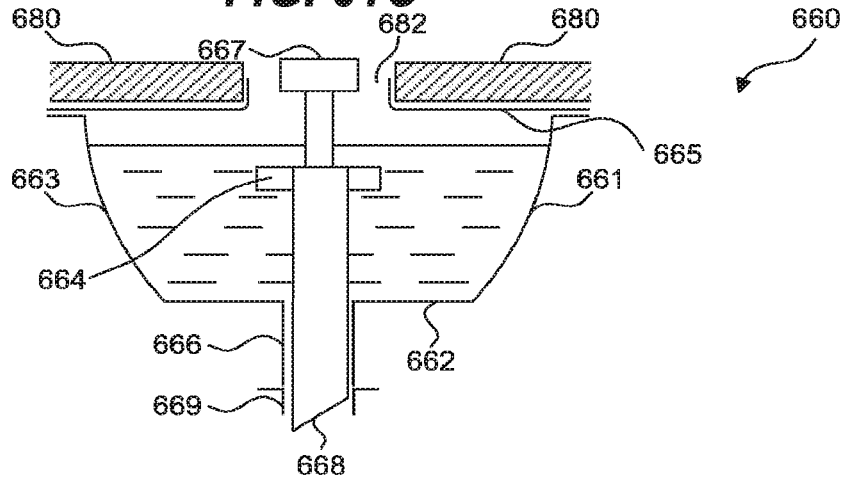
Figure 62:
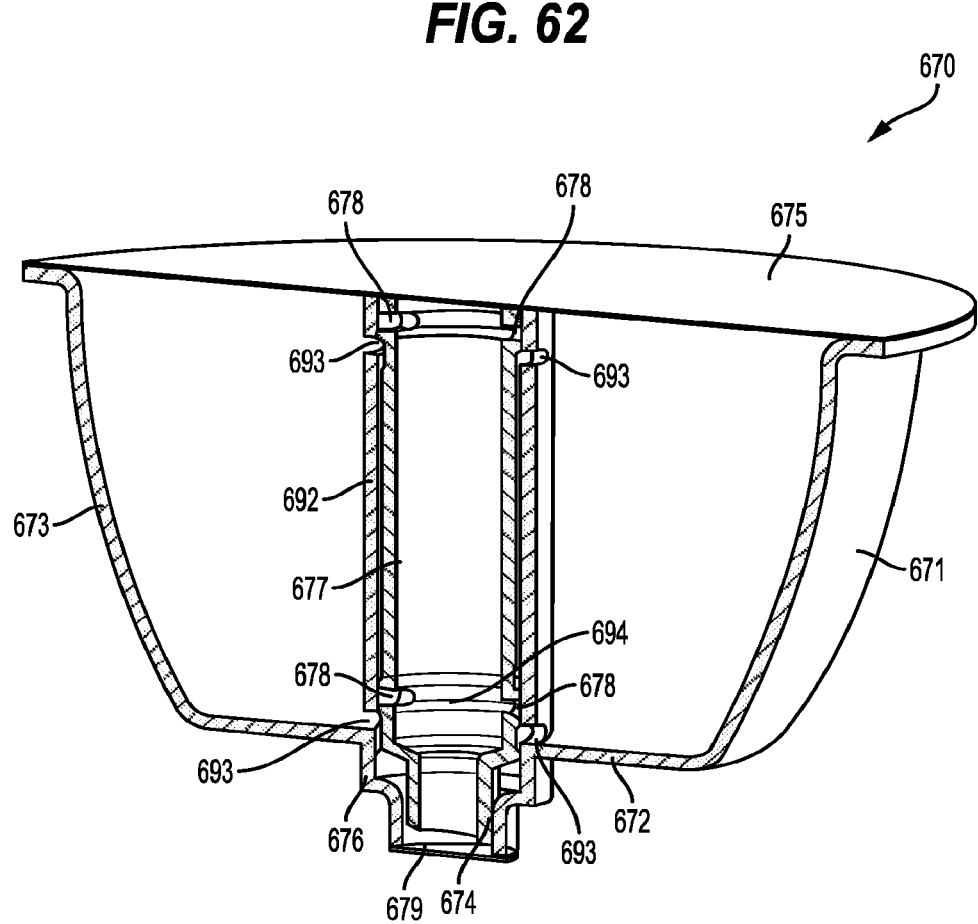
FIG. 62 shows a cross-sectional perspective view of a pod for a carbonated beverage maker according to some embodiments.
Figure 63:
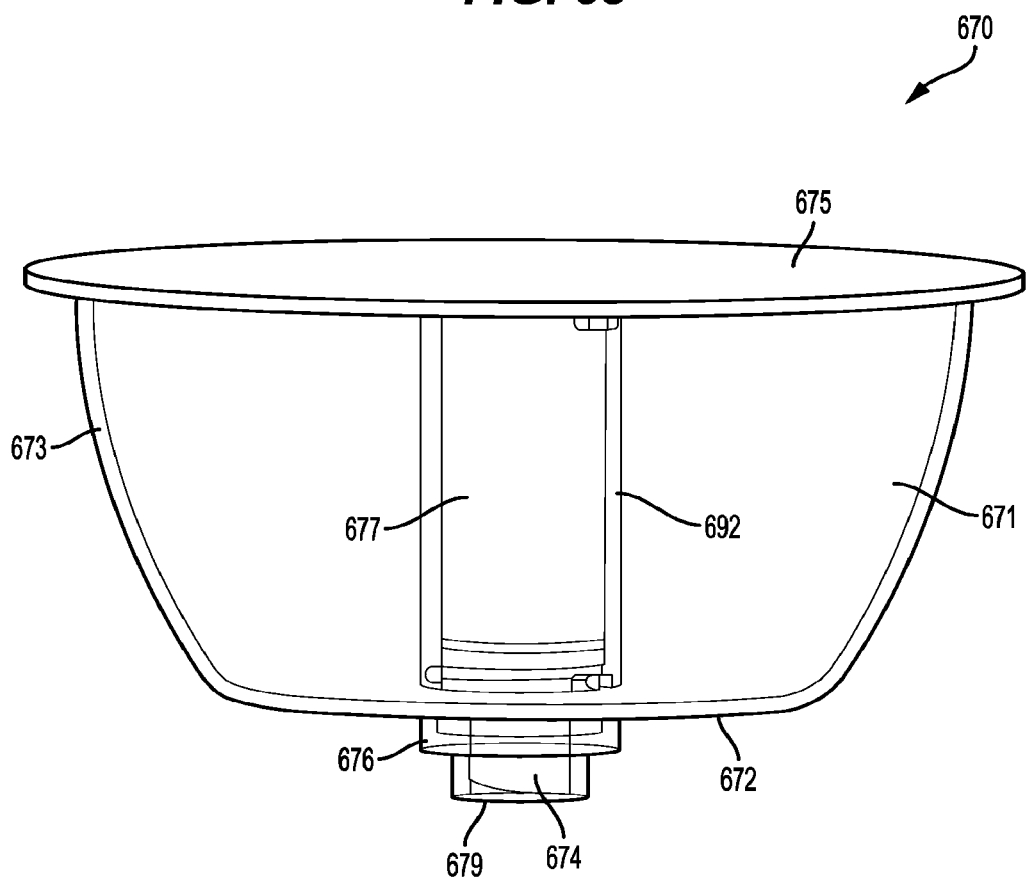
FIG. 63 shows a perspective view of a pod for a carbonated beverage maker according to some embodiments.

In some embodiments, pod 660 is disposed below a portion of pod support 680 in carbonated beverage makers, as shown, for example, in FIGS. 61A-61C. In some embodiments, pod support 680 may define aperture 682. In some embodiments, aperture 682 aligns with first piercer 664. In some embodiments, pull feature 667 extends through aperture 682, as shown, for example, in FIG. 61A. In some embodiments, aperture 682 assists in regulating the cutting pattern of first film 665. In some embodiments, carbonated beverage makers may include a mechanism, such as a movable clamp, to secure and pull upwards on pull feature 667, thus pulling first piercer 664 upwards to pierce first film 665, as shown, for example, in FIG. 61B. In some embodiments, carbonated beverage makers may include a mechanism, such as a movable clamp or a push rod, to push pull feature 667 down, thus pushing second piercer 668 downwards to pierce second film 669, as shown, for example, in FIG. 61C. After first film 665 and second film 669 are pierced, concentrate from pod 650 is delivered by air pressure (e.g., from an air pump) through the cut first film 665 to dispense through holes 691 of casing 690 and through the cut second film 669 into, for example, a drinking cup or other chamber.

In some embodiments, a pod 670, as shown, for example, in FIGS. 62-64B, includes a container 671 and a first film 675. In some embodiments, container 671 includes a base 672 and a side 673. In some embodiments, container 671 and first film 675 are circular. In some embodiments, pod 670 may be made of a material that is recyclable. For example, pod 670 may be primarily made of a recyclable plastic. For example, pod 670, including container 671 and first film 675, may be primarily made of PET. First film 675 may be a thin layer of PET. In some embodiments, first film 675 may be easier to pierce and cheaper than lid 605 of pod 600. But first film 675 may cause pod 670 to have a lower shelf life than pod 600. In some embodiments, first film 675 is welded to container 671.

In some embodiments, a piercer 674 is disposed within container 661 extending from a projection 676 in base 672. For example, piercer 674 may be disposed within projection 676 lower than base 672. In some embodiments, piercer 674 extends from projection 676 in base 672 to first film 675. In some embodiments, piercer 674 includes a sharp tip in projection 676. In some embodiments, piercer 674 is made of the same material as container 671. For example, piercer 674 may be made of PET. In some embodiments, container 671 and piercer 674 are injection molded.

In some embodiments, projection 676 includes a second film 679 disposed at its bottom surface. In some embodiments, second film 679 is made of PET. In some embodiments, second film 679 is a thin layer of PET. In some embodiments, second film 679 is welded to projection 676. In some embodiments, projection 676 contains a portion of piercer 674, including a sharp tip (as noted above). In some embodiments, the sharp tip of piercer 674 is configured to pierce second film 679. In some embodiments, the sharp tip of piercer 674 is located on an edge of piercer 674.

In some embodiment, piercer 674 is hollow. For example, piercer 674 may include an air pipe 677 that extends through its length. In some embodiments, piercer 674 includes a plurality of holes 678. For example, piercer 674 may include two holes 678 near first film 675 and two holes 678 near base 672. In some embodiments, pod 670 includes a casing 692 that surrounds piercer 674. In some embodiments, casing 692 is fixed relative to container 671. In some embodiments, casing 692 includes holes 693. For example, casing 692 may include two holes 693 near first film 675 and two holes 693 near base 672. In some embodiments, holes 678 do not align with holes 693. This may prevent concentrate from entering air pipe 677. In some embodiments, casing 692 includes one or more seals 694 disposed between casing 692 and piercer 674. Seals 694 may prevent concentrate from entering between casing 692 and piercer 674.

Figure 64A:
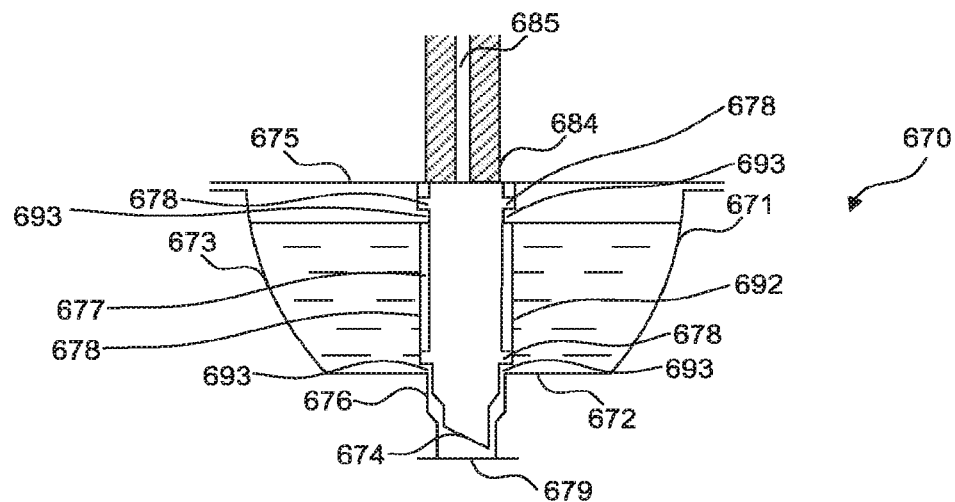
FIGS. 64A and 64B show a cross-sectional view of a method of opening a pod in a carbonated beverage maker according to some embodiments.
Figure 64B:
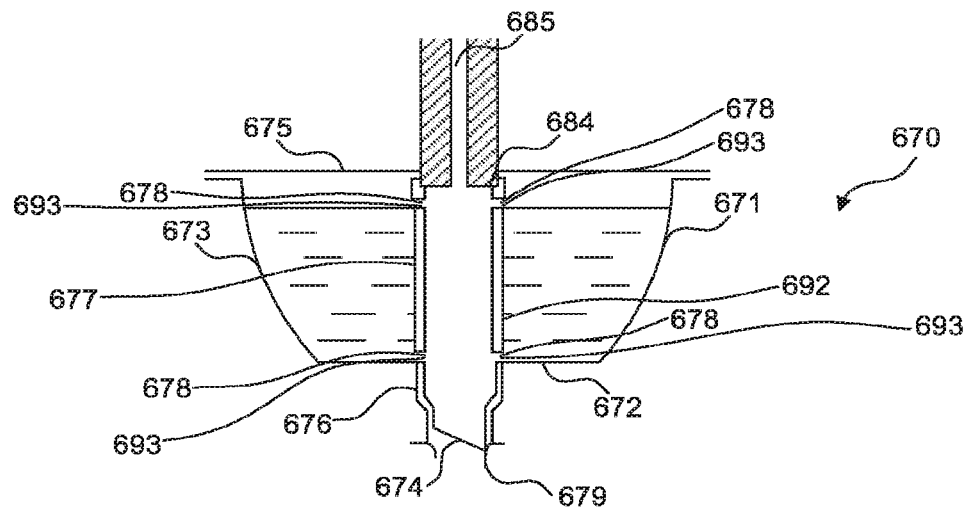
Figure 65:
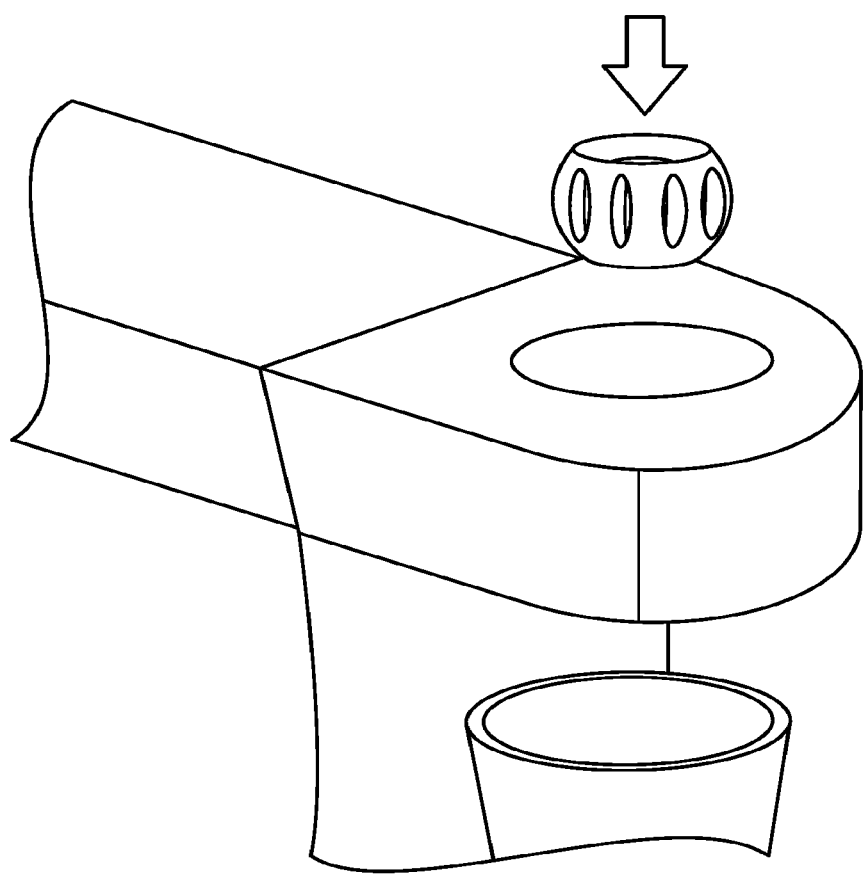
FIG. 65 shows a perspective view of a pod in a carbonated beverage maker according to some embodiments.
Figure 66:
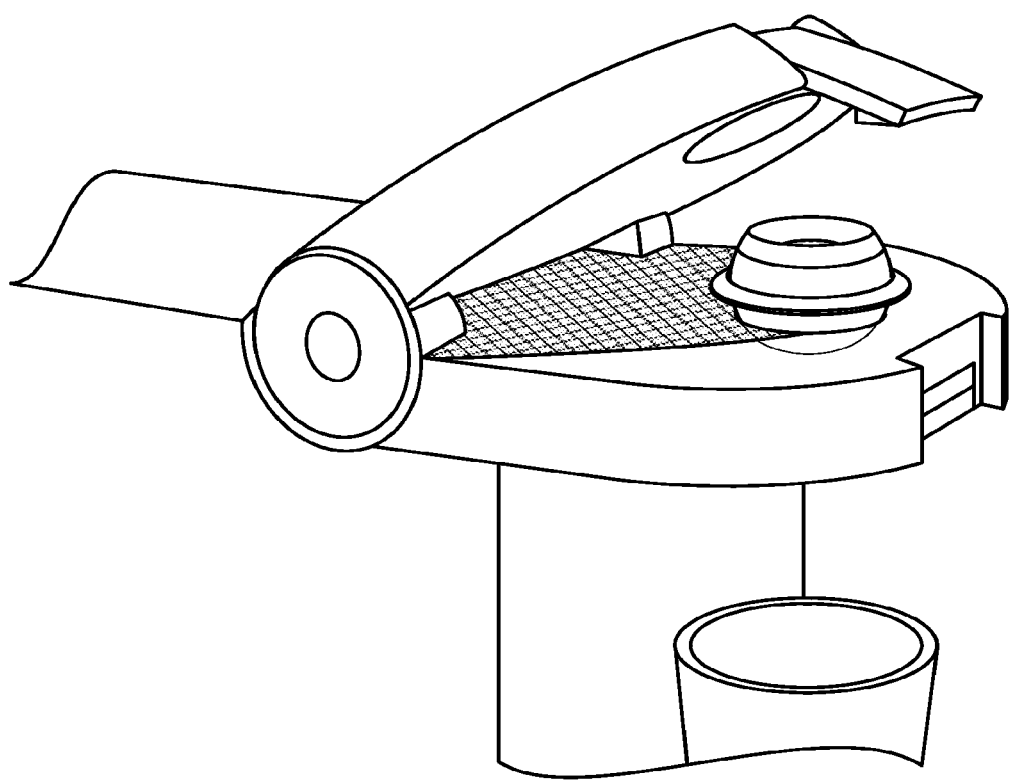
FIG. 66 shows a perspective view of a pod in a carbonated beverage maker according to some embodiments.
Figure 67:
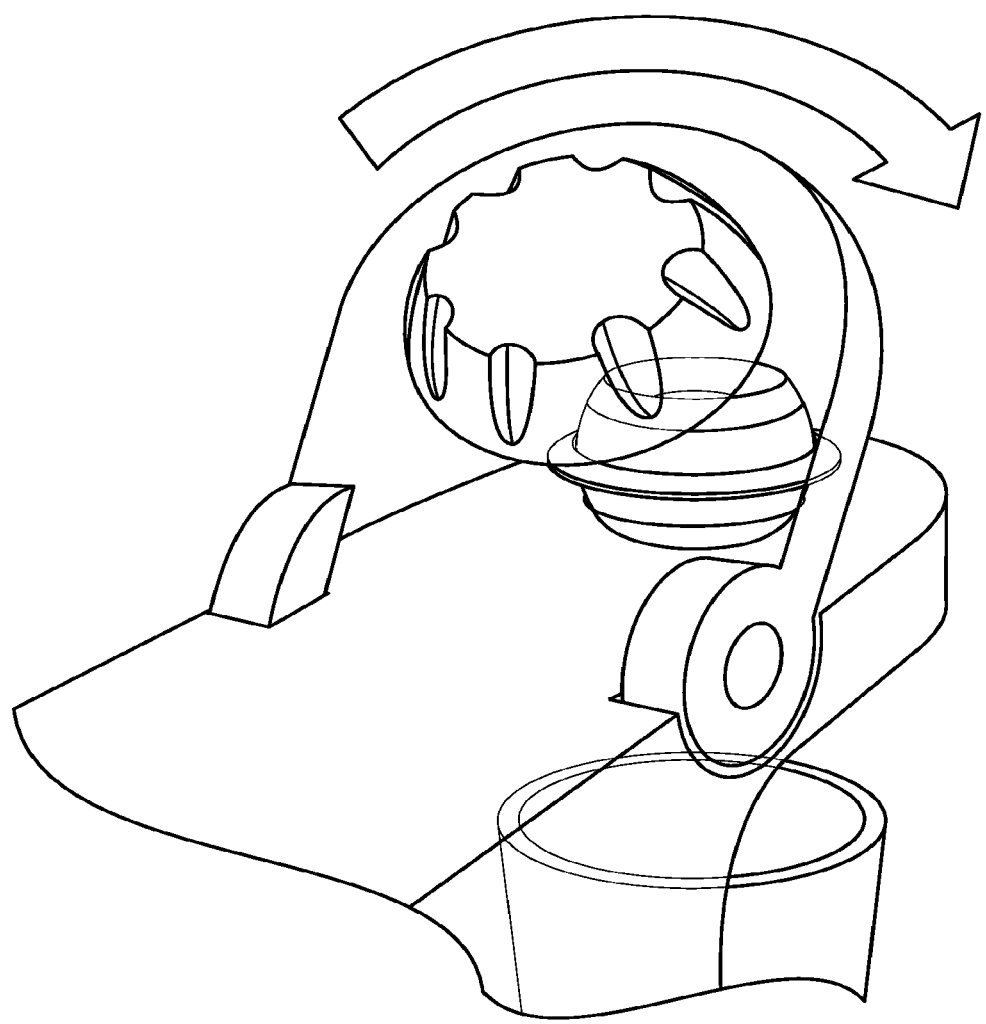
FIG. 67 shows a perspective view of a pod in a carbonated beverage maker according to some embodiments.
Figure 68:
FIG. 68 shows a perspective view of a pod in a carbonated beverage maker according to some embodiments.
Figure 69:
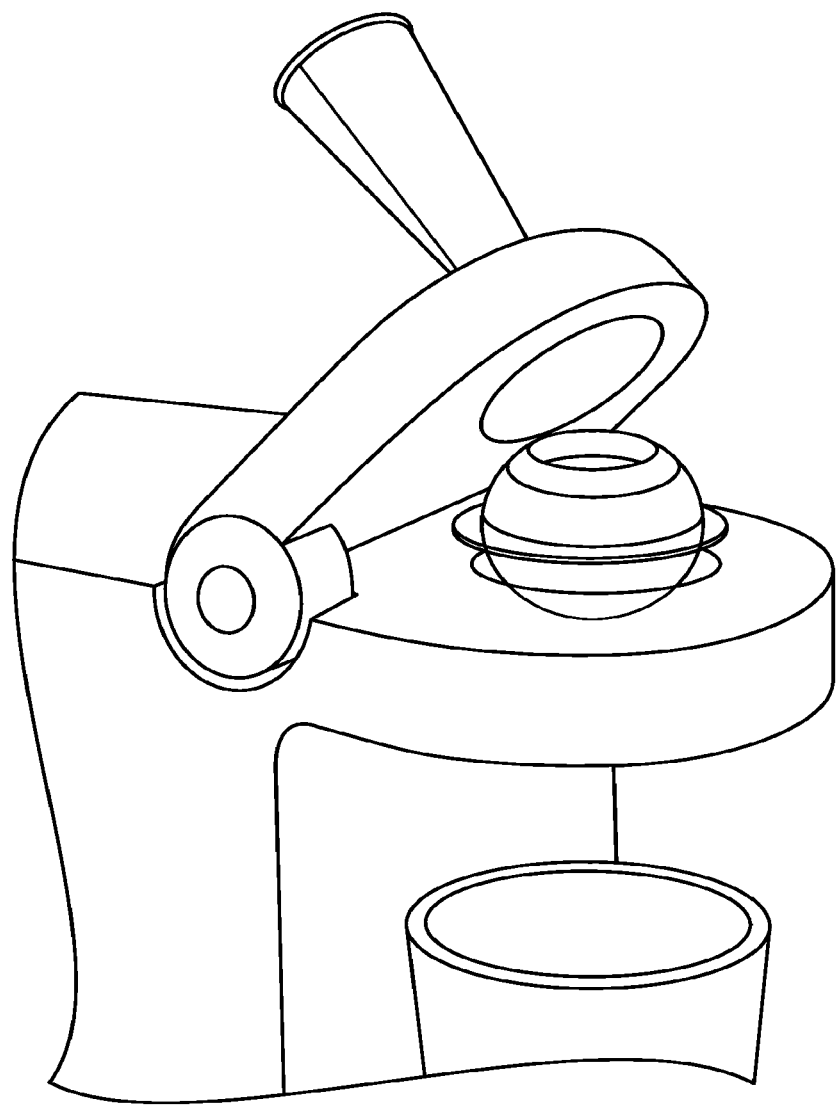
FIG. 69 shows a perspective view of a pod in a carbonated beverage maker according to some embodiments.
Figure 70:
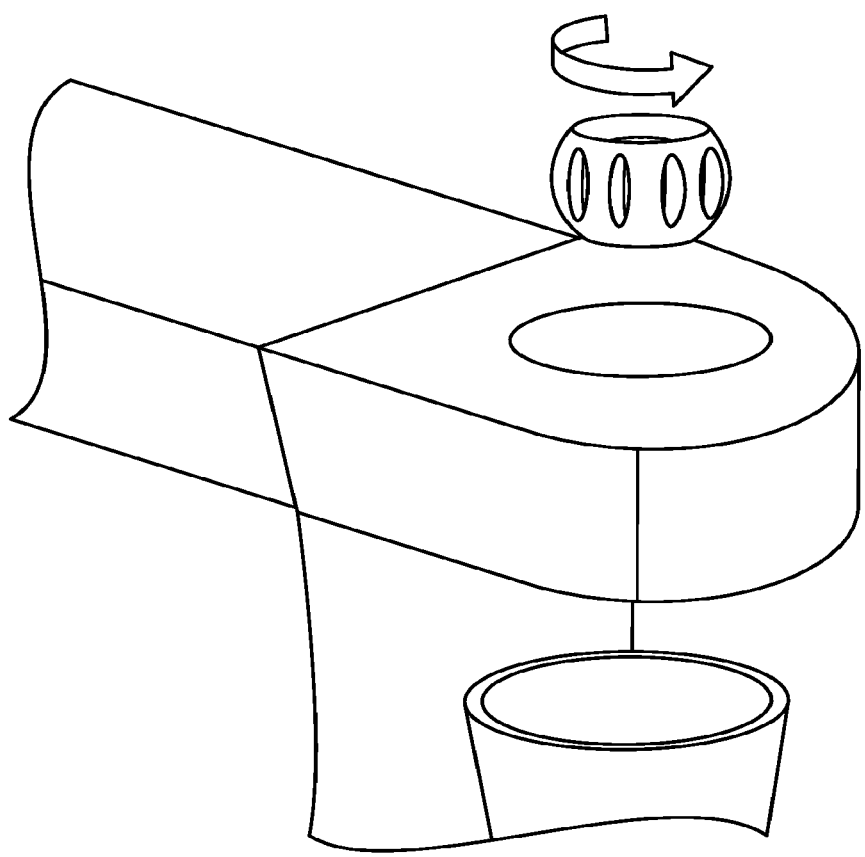
FIG. 70 shows a perspective view of a pod in a carbonated beverage maker according to some embodiments.
Figure 71:
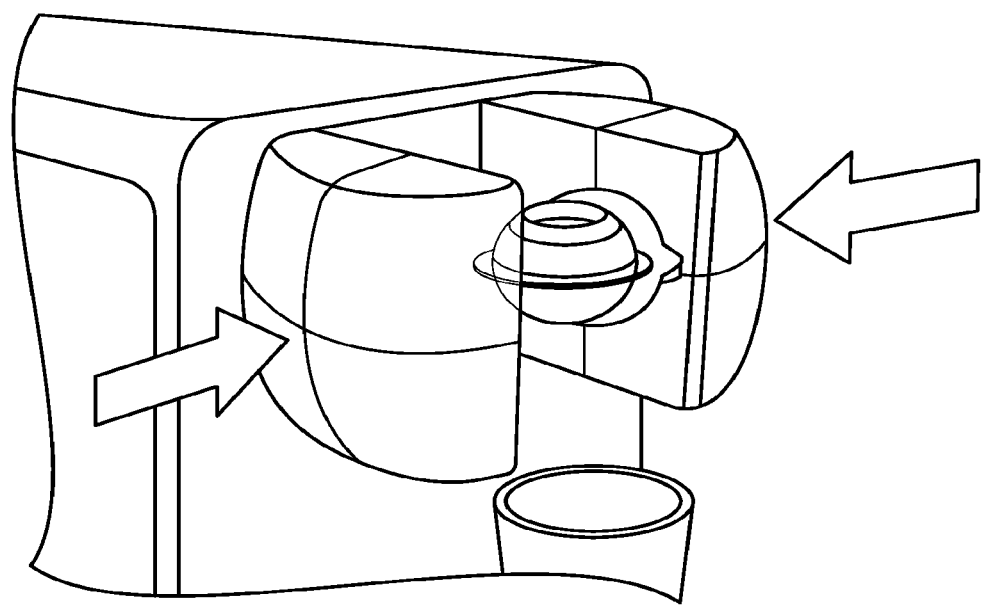
FIG. 71 shows a perspective view of a pod in a carbonated beverage maker according to some embodiments.
Figure 72:
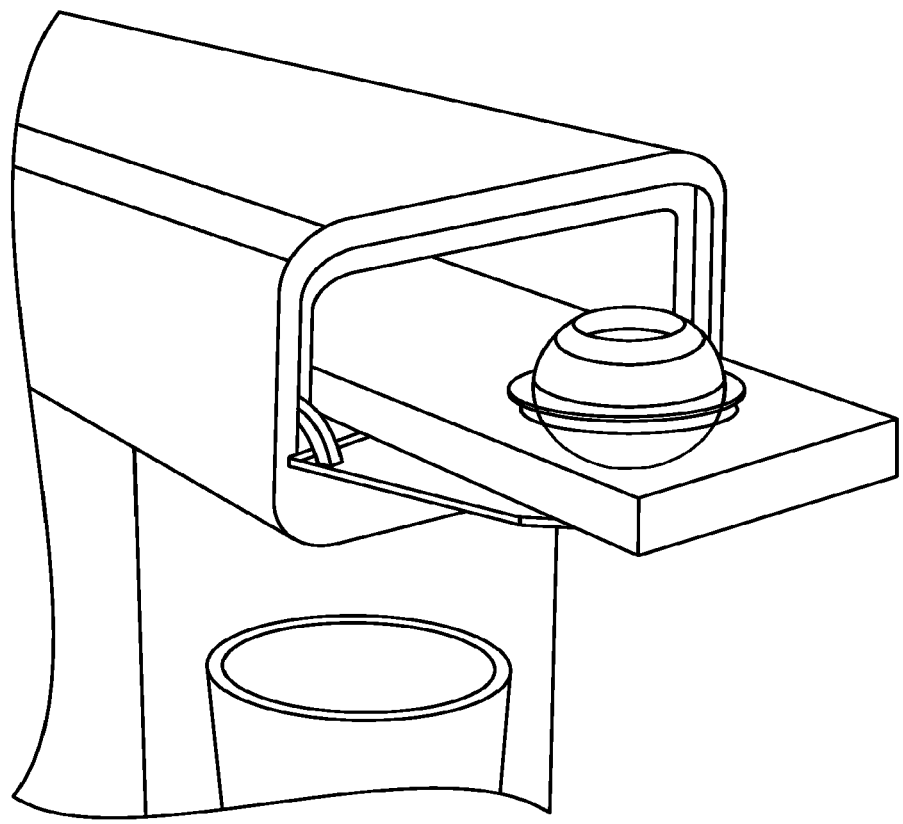
FIG. 72 shows a perspective view of a pod in a carbonated beverage maker according to some embodiments.
Figure 73:
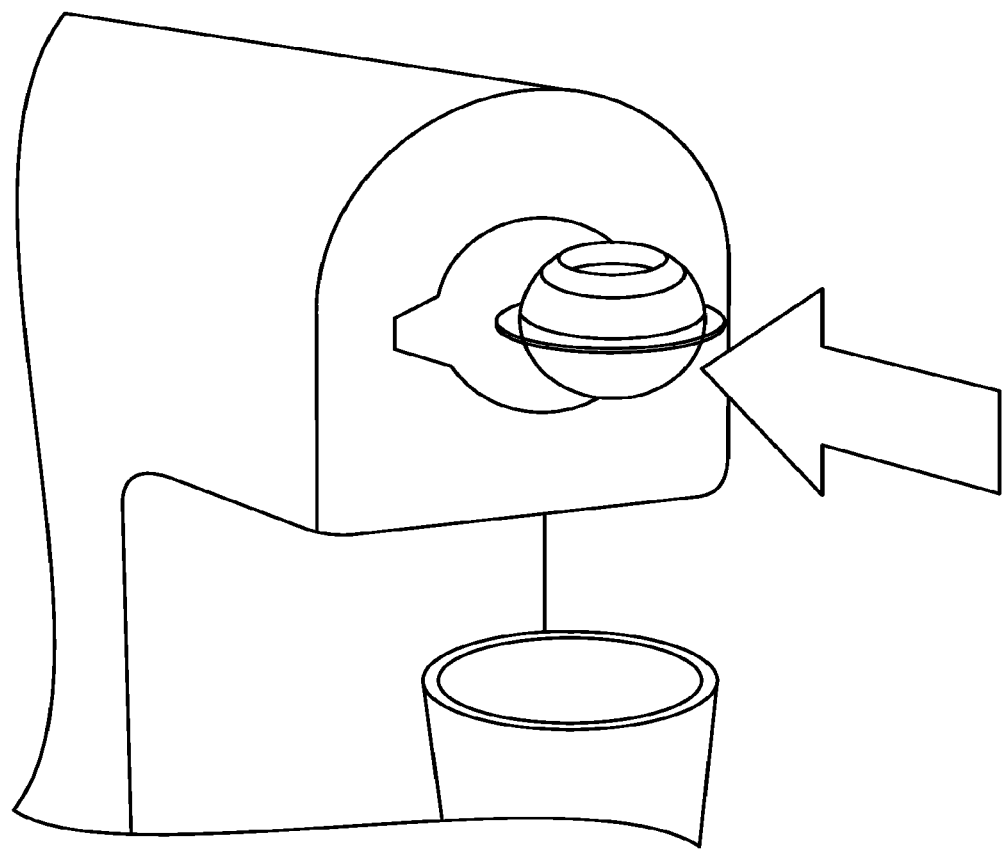
FIG. 73 shows a perspective view of a pod in a carbonated beverage maker according to some embodiments.
Figure 74:
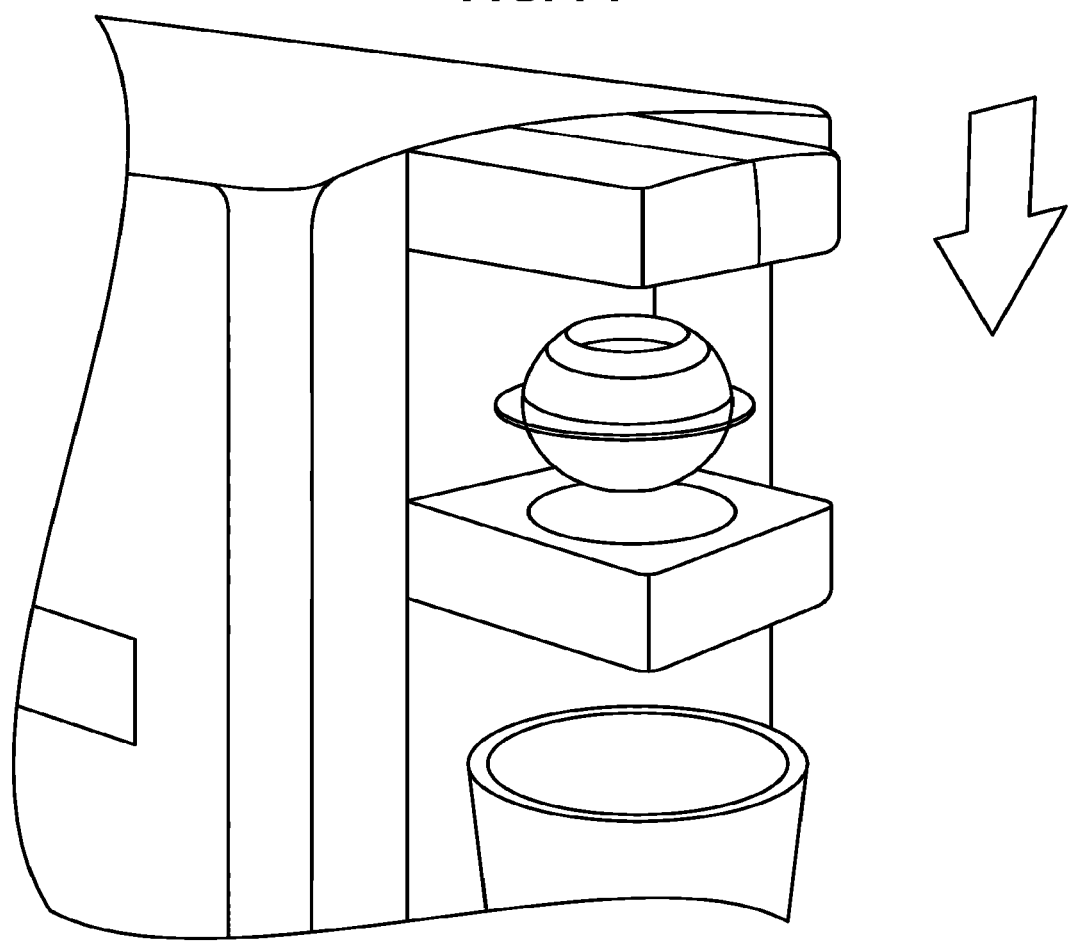
FIG. 74 shows a perspective view of a pod in a carbonated beverage maker according to some embodiments.
Figure 75:
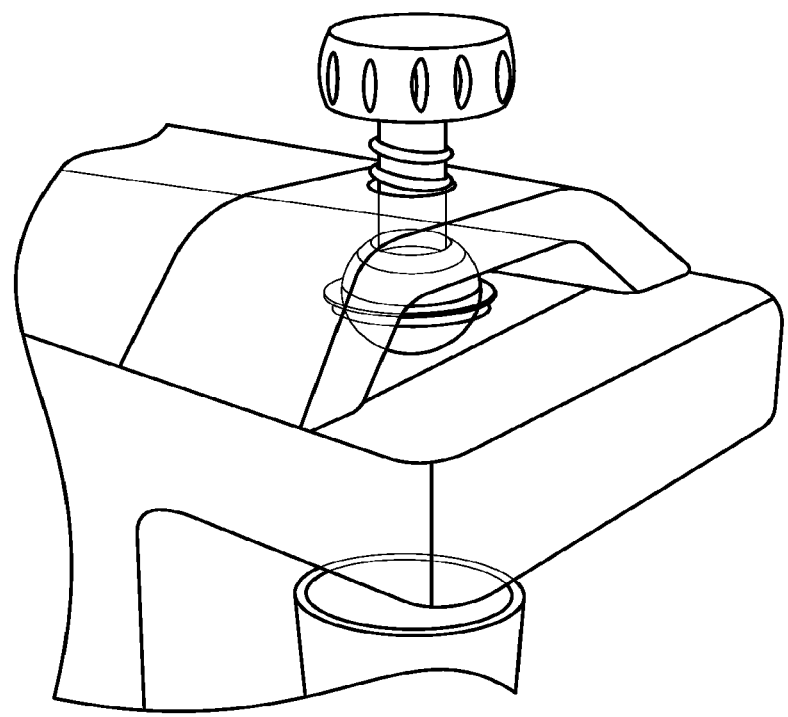
FIG. 75 shows a perspective view of a pod in a carbonated beverage maker according to some embodiments.
Figure 76:
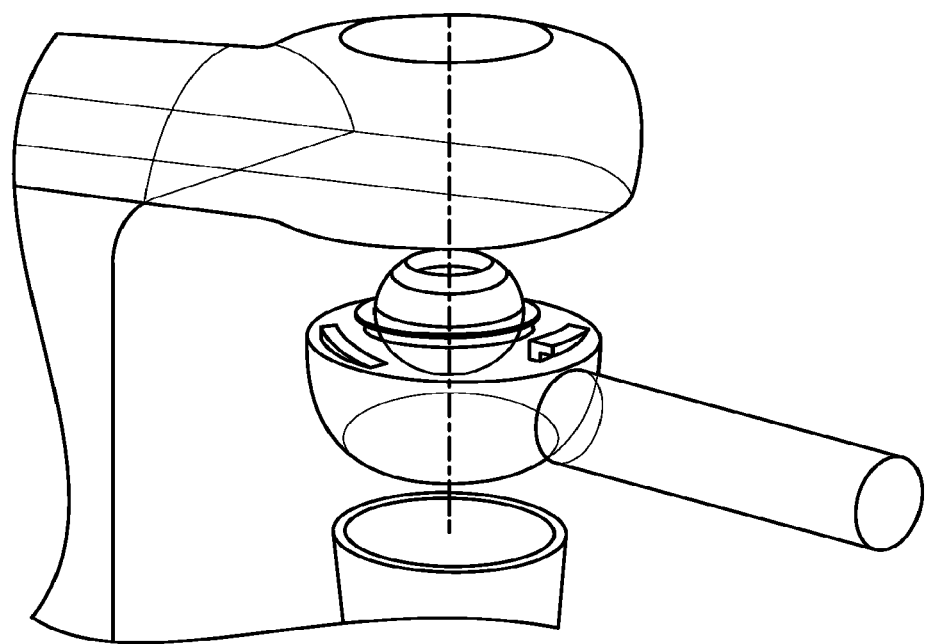
FIG. 76 shows a perspective view of a pod in a carbonated beverage maker according to some embodiments.
Figure 77:
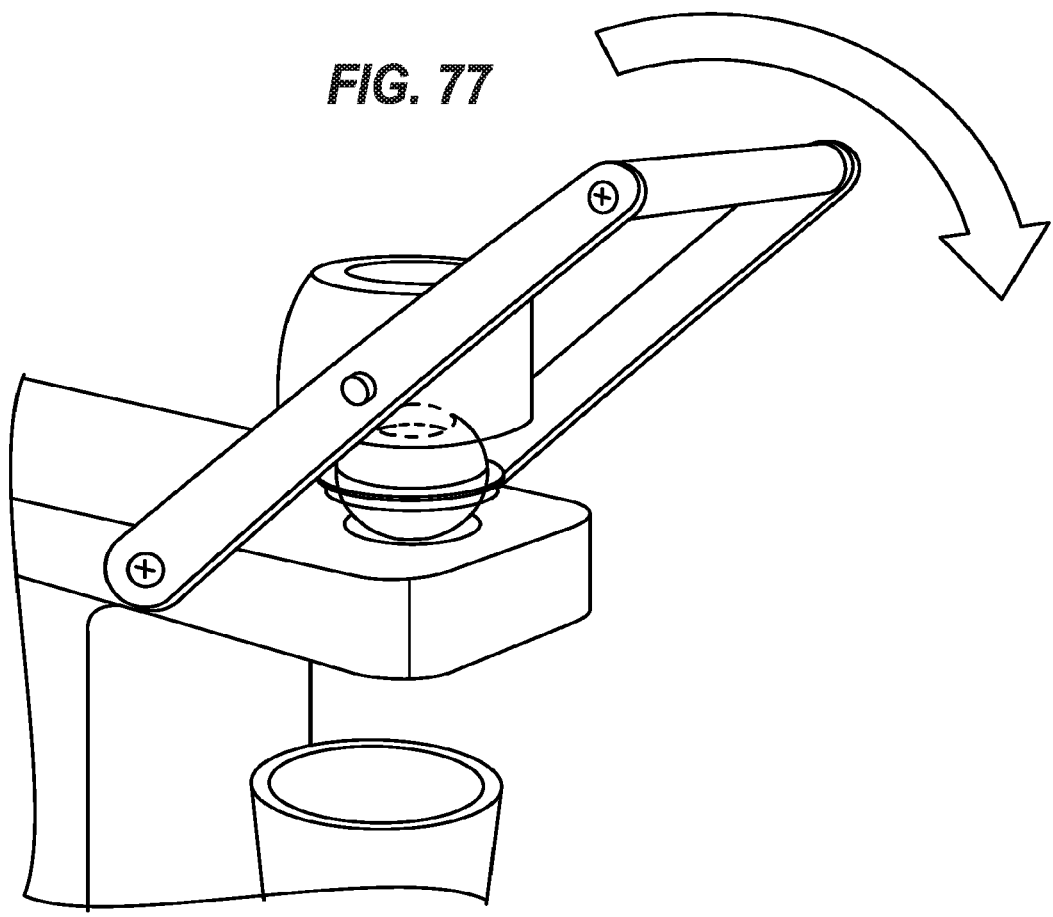
FIG. 77 shows a perspective view of a pod in a carbonated beverage maker according to some embodiments.
Figure 78:
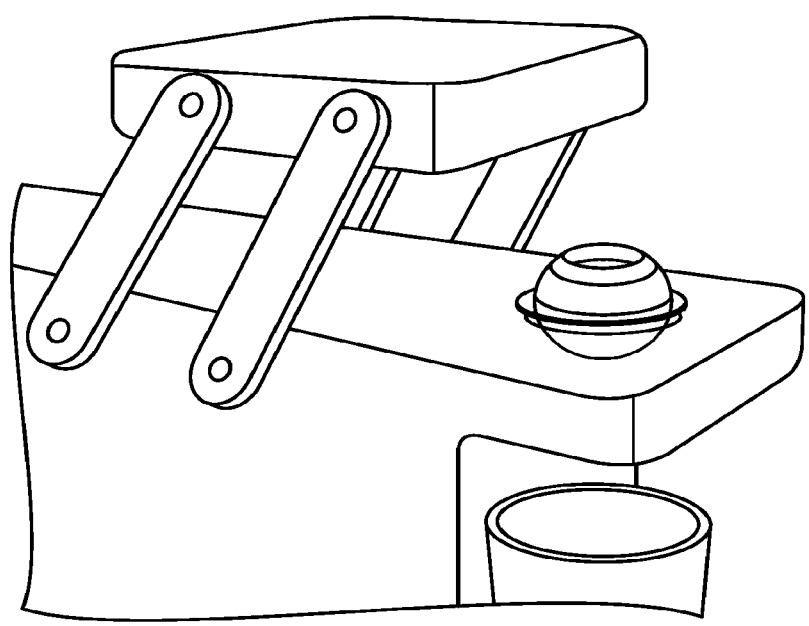
FIG. 78 shows a perspective view of a pod in a carbonated beverage maker according to some embodiments.
Figure 79:
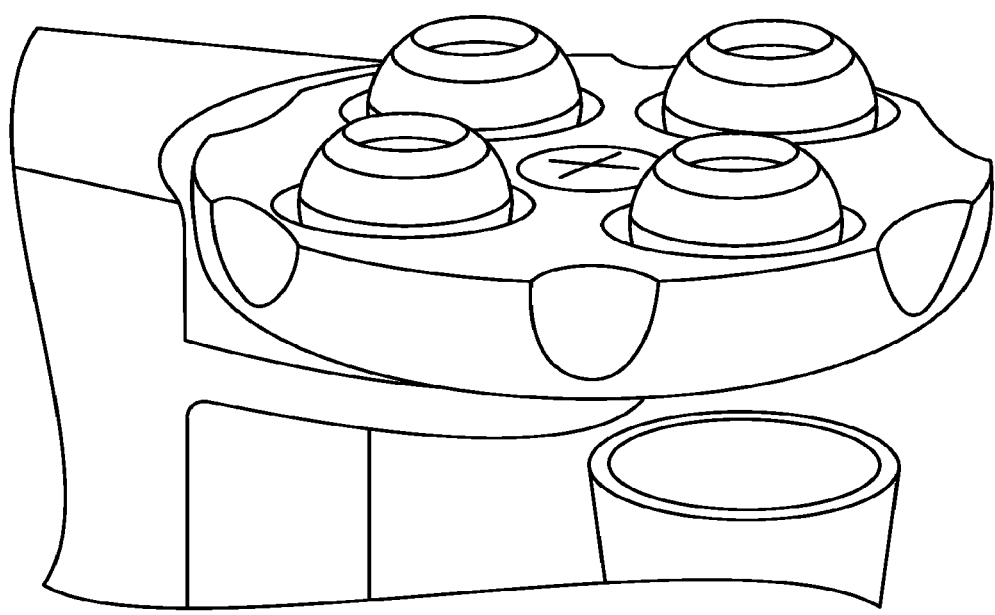
FIG. 79 shows a perspective view of a pod in a carbonated beverage maker according to some embodiments.
Figure 80:
FIG. 80 shows a perspective view of a pod in a carbonated beverage maker according to some embodiments.
Figure 81:
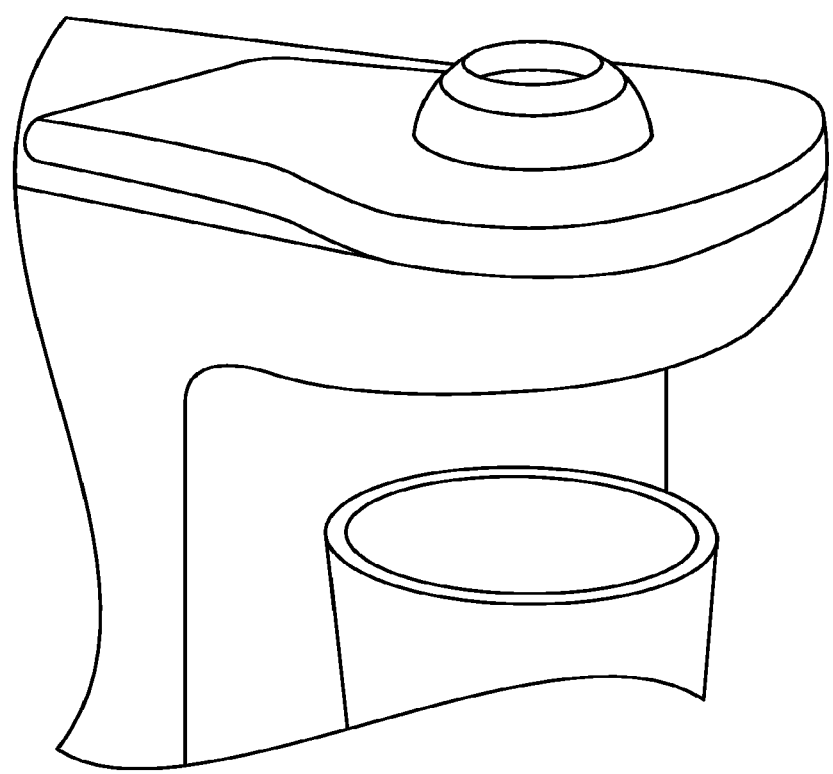
FIG. 81 shows a perspective view of a pod in a carbonated beverage maker according to some embodiments.
Figure 82:
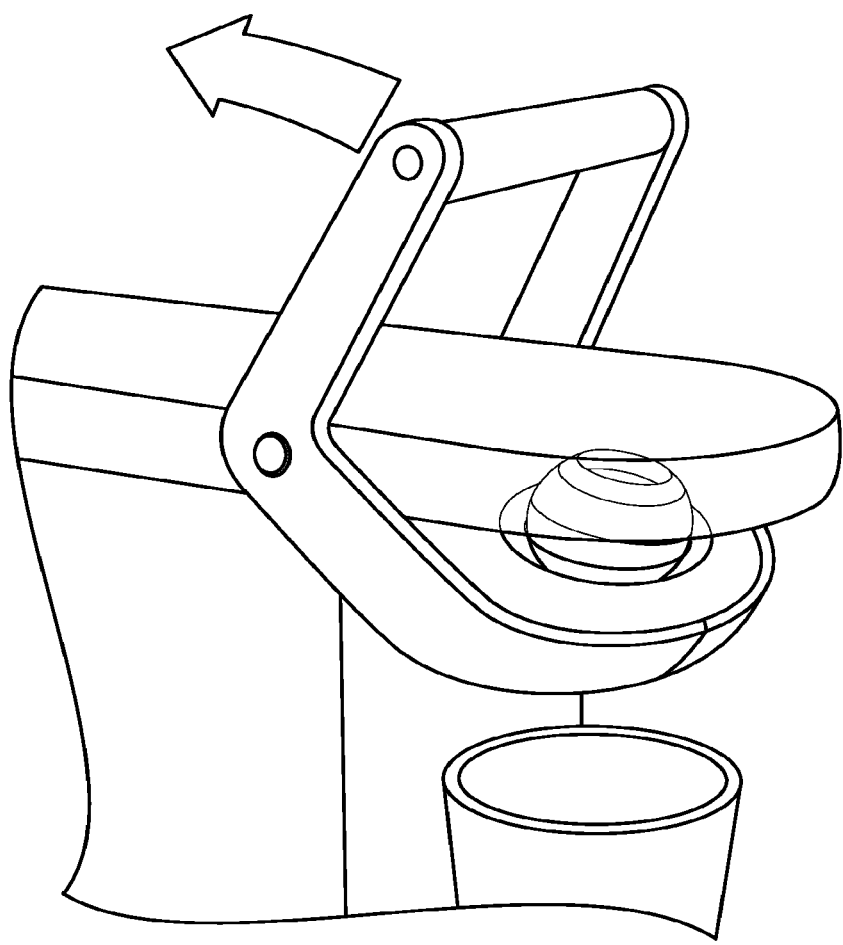
FIG. 82 shows a perspective view of a pod in a carbonated beverage maker according to some embodiments.
Figure 83:
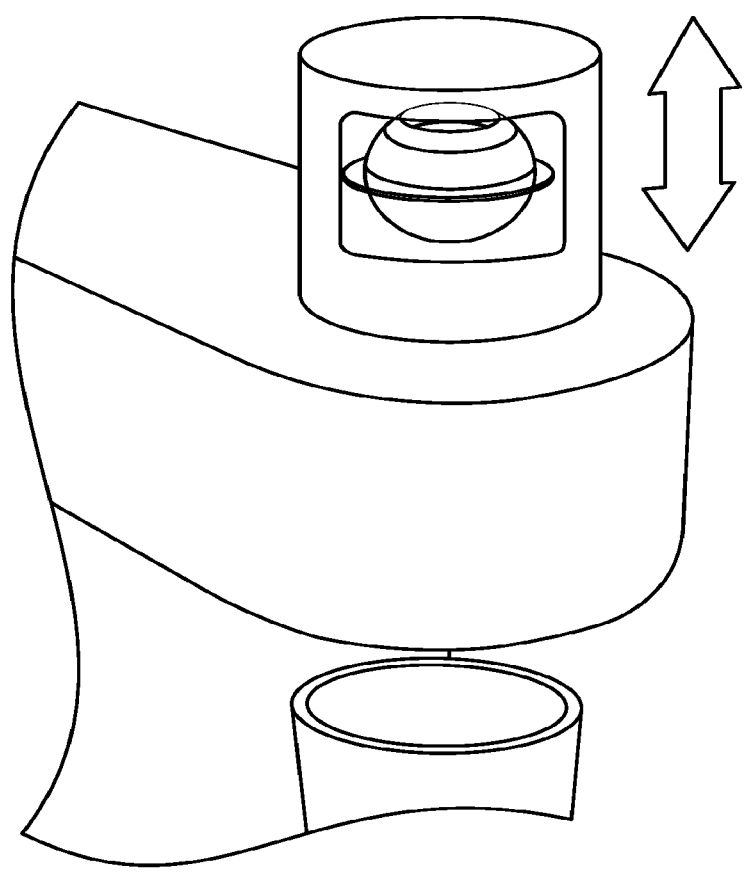
FIG. 83 shows a perspective view of a pod in a carbonated beverage maker according to some embodiments.
Figure 84:
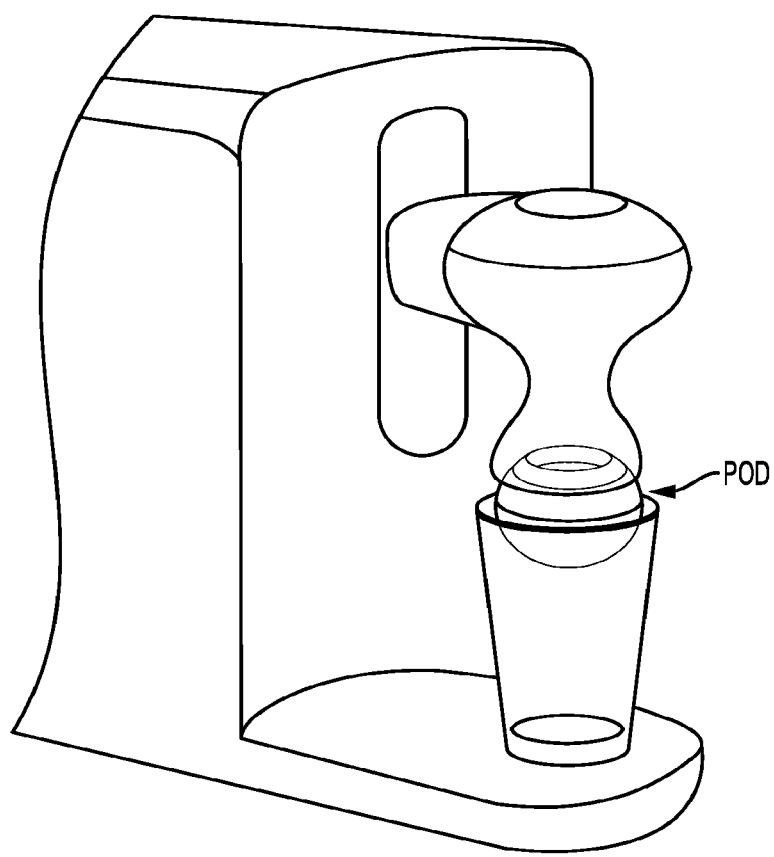
FIG. 84 shows a perspective view of a pod in a carbonated beverage maker according to some embodiments.
Figure 85:
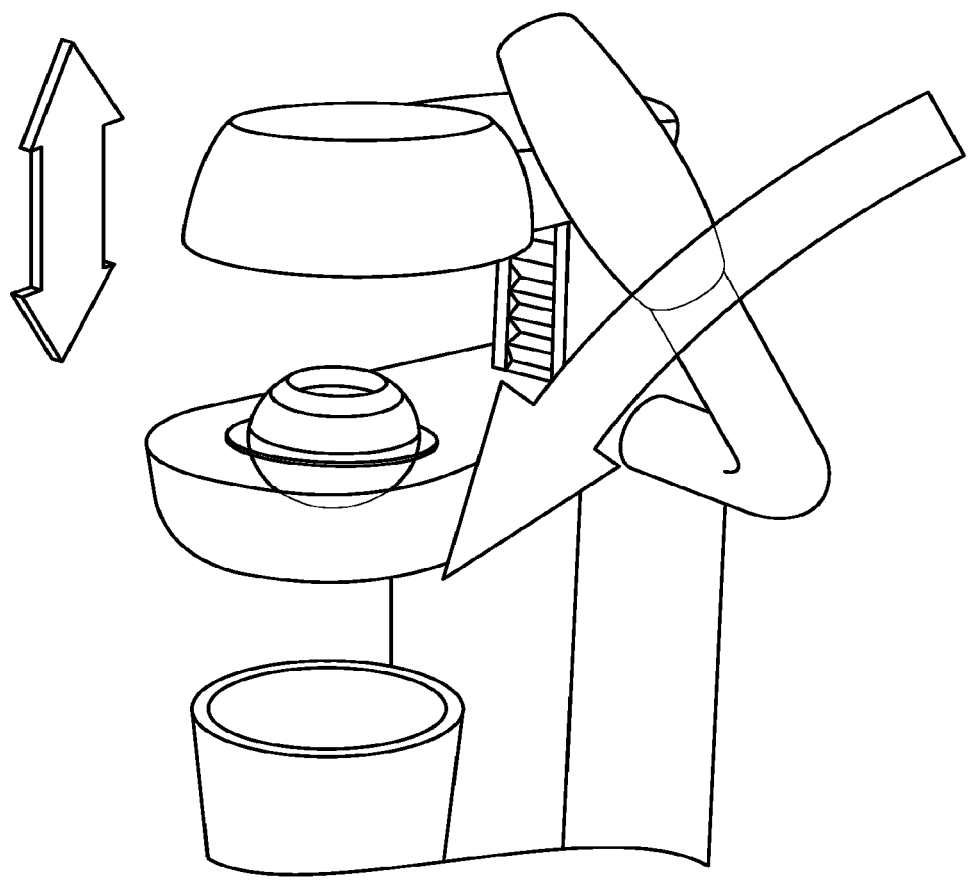
FIG. 85 shows a perspective view of a pod in a carbonated beverage maker according to some embodiments.

In some embodiments, pod 670 is disposed within carbonated beverage makers. In some embodiments, carbonated beverage makers include piercer 684 as shown, for example, in FIGS. 64A-64B. Thus, piercer 684 is external to pod 670. In some embodiments, piercer 684 is hollow. For example, piercer 684 may include an air pipe 685. In some embodiments, air pipe 685 is operably connected to an air pump. In some embodiments, pod 670 is disposed adjacent to piercer 684, as shown, for example in FIG. 64A. In some embodiments, piercer 684 extends downward to pierce through first film 675 and simultaneously push down on piercer 674, which in turn pierces through second film 679, as shown, for example, in FIG. 64B. As also seen in FIG. 64B, the movement of piercer 674 aligns holes 678 with holes 693. After first film 675 and second film 679 are pierced and holes 678 align with holes 693, concentrate from pod 650 is delivered by air pressure (e.g., from an air pump) which flows through air pipe 685, into air pipe 677, through holes 678 and 693 near first film 675, and into pod 670 to dispense concentrate through holes 678 and 693 near base 672, into air pipe 677 and through the cut second film 679 into, for example, a drinking cup or other chamber.

While several embodiments of pods have been described, other variations and embodiments are also within the scope of and may be used with carbonated beverage makers described herein. In addition, while some interactions between carbonated beverage makers and pods have been described, other interactions are also within the scope of this disclosure. For example, FIGS. 65-85 illustrate example embodiments of pods being inserted into carbonated beverage makers.

Figure 86:
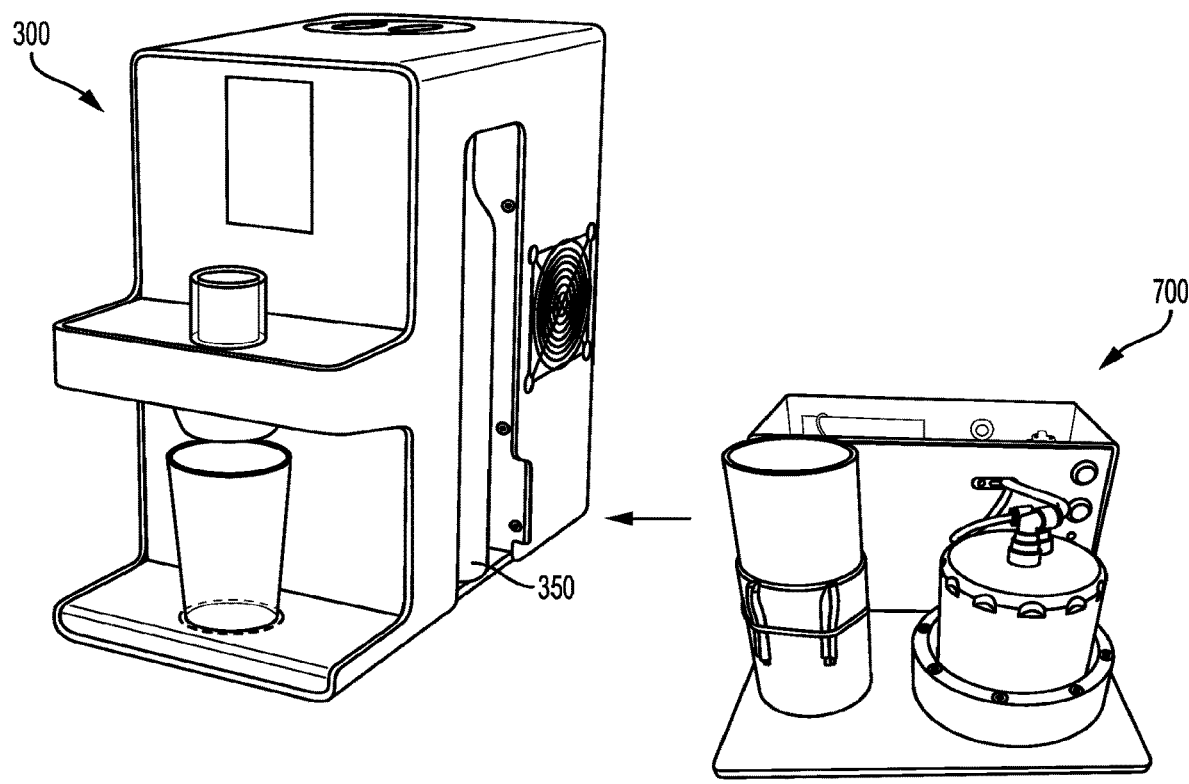
FIG. 86 shows a carbonated beverage maker in which a $CO_2$ generation system may be utilized according to some embodiments.

As noted above, carbonated beverage makers as described herein may include a carbonation source. In some embodiments, the carbonation source may be a $CO_2$ cylinder or tank. For example, as shown in FIG. 86, carbonated beverage maker 300 uses carbonation source 350 that is a $CO_2$ tank. In some embodiments, the $CO_2$ tank may hold up to 425 grams of $CO_2$. $CO_2$ tanks contain $CO_2$ in a pressurized condition, which can require special handling, transport, refill, and delivery. These requirements can be costly and inconvenient for a consumer. For example, $CO_2$ tanks may not be shipped directly to a consumer. Disposal of the $CO_2$ tank may also be inconvenient for the consumer. Accordingly, in some embodiments, carbonated beverage makers utilize other sources of carbonation.

In some embodiments, carbonated beverage maker 300 (or carbonated beverage maker 100) may include a $CO_2$ generation system, such as $CO_2$ generation system 700, in place of a $CO_2$ tank, as shown, for example, in FIG. 86. Incorporating a $CO_2$ generation system into a carbonated beverage maker eliminates the need to transport $CO_2$ and the special requirements for doing so. Thus, the elements used in $CO_2$ generation system 700 may be elements that can safely be delivered to a consumer (e.g., shipped) and that can safely be disposed of after being used to generate or create $CO_2$ in carbonated beverage maker 300. In other words, the raw materials or reactants may be elements that can be safely shipped and the byproducts may be byproducts that can be safely disposed of.

In some embodiments, the elements may be chemical elements that react to create $CO_2$ as a product of the reaction. In some embodiments, the elements may be dry chemical elements. Dry chemical elements may be provided for $CO_2$ generation system 700 in various forms.

In some embodiments, carbonated beverage makers may use tablets containing dry chemical elements as a carbonation source. In some embodiments, pods may include a carbonation source, for example, in the form of beads, loose powder, or tablets. In some embodiments, the elements may be wet chemical elements.

In some embodiments, tablets may comprise sodium bicarbonate. In some embodiments, heat may be applied to a sodium bicarbonate tablet, such as through microwave radiation, which may produce gases to carbonate beverages.

In some embodiments, carbonated beverage makers may use effervescent technologies (i.e., the evolution of bubbles from a liquid due to a chemical reaction) to provide carbonation in beverages. In some embodiments, the gas is carbon dioxide which may be liberated by the reaction between a food grade acid (e.g., citric, tartaric, oxalic acid, etc., or a combination of these acids) and a source of carbonate (such as sodium carbonate, sodium bicarbonate, potassium carbonate, potassium bicarbonate, or a mixture thereof). In some embodiments, the acid and the carbonate are combined dry, such as in a loose powder form or in a tablet form. In some embodiments, the acid and carbonate mixture is formed into granules, which may comprise particles ranging in size from about 4 to about 10 mesh. The granules may be made by blending the powders together and moistening the mixture to form a pasty mass, which may be passed through a sieve and dried in open air or in an oven. In some embodiments, the granules may be used as an intermediate step in preparing capsules or tablets because granules may flow more smoothly and predictably than small powder particles. In some embodiments, water is added to the acid and carbonate mixture in, for example, a tablet form, which causes production of effervescence.

In some embodiments, the acid used to produce effervescence is based on how soluble the acid is in water. The more soluble the acid is in water, the faster $CO_2$ will be produced. For example, the solubility of citric acid in water at 20° C. is 1.5 g/ml of water while the solubility of tartaric acid and oxalic acid are 1.3 and 0.14 g/ml of water, respectively. Furthermore, the molar ratio of acid to carbonate will also affect the reaction rate and yield. In general, the higher ratios of acid to carbonate will yield faster reactions. Also, higher ratios of acid will assure that the carbonate is completely reacted.

As an example, in some embodiments, potassium carbonate and citric acid are combined, such as in a powder or a tablet form, in a reaction chamber. As dry elements, the potassium carbonate and citric acid do not react with each other. In some embodiments, water may be added to the potassium carbonate and citric acid to initiate a reaction between them. The potassium carbonate and citric acid may react to generate $CO_2$, as shown below. The other products of the chemical reaction are water and potassium citrate in the aqueous phase. The $CO_2$ may then be provided to a carbonation chamber of the carbonated beverage maker to carbonate the beverage.

In some embodiments, the reaction between elements (e.g., potassium carbonate and citric acid) may produce $CO_2$ that is at or near room temperature. In some embodiments, the reaction is isolated from the beverage that will be consumed. In some embodiments, the reaction may be accelerated by adding heated water. In some embodiments, the reaction may be accelerated by including dehydrated zeolite with the other chemical elements. In some embodiments, the reaction may be accelerated by including a chemical source of heat.

In some embodiments, tablets may include coating to reduce the effect of water in the atmosphere from initiating a reaction between the elements. In some embodiments, the coating comprises a sugar. In some embodiments, the coating comprises polyvinyl acetate. In some embodiments, the coating comprises polylactic acid.

In some embodiments, tablets may rely on the heat generated from other chemical reactions to decompose carbonate or bicarbonate salt(s) and/or accelerate the effervescent reaction(s). For example, in some embodiments, a tablet may comprise alkaline earth metal oxides, sodium bicarbonate, and dehydrated zeolites. In some embodiments, a metal oxide (e.g., calcium oxide) is combined with dehydrated zeolites, but is isolated from sodium bicarbonate. When water is added, heat is produced and the sodium bicarbonate reacts with the heat to produce $CO_2$. In some embodiments, a tablet may comprise dehydrated zeolites, an acid-base composition, and sodium bicarbonate. In some embodiments, the acid-base composition allows for less water consumption because the acid-base reaction generates water itself. This then leads to an exothermic reaction of dehydrated zeolites. Thus, heat is produced and the sodium bicarbonate reacts with the heat to produce $CO_2$. Other embodiments may utilize other chemical reactions to produce carbonation for beverages.

In some embodiments, instead of adding water to a mixture of acid and carbonate, water may be added to an acid (e.g., citric acid) and a carbonate powder (e.g., potassium carbonate) may be subsequently added.

Figure 87:
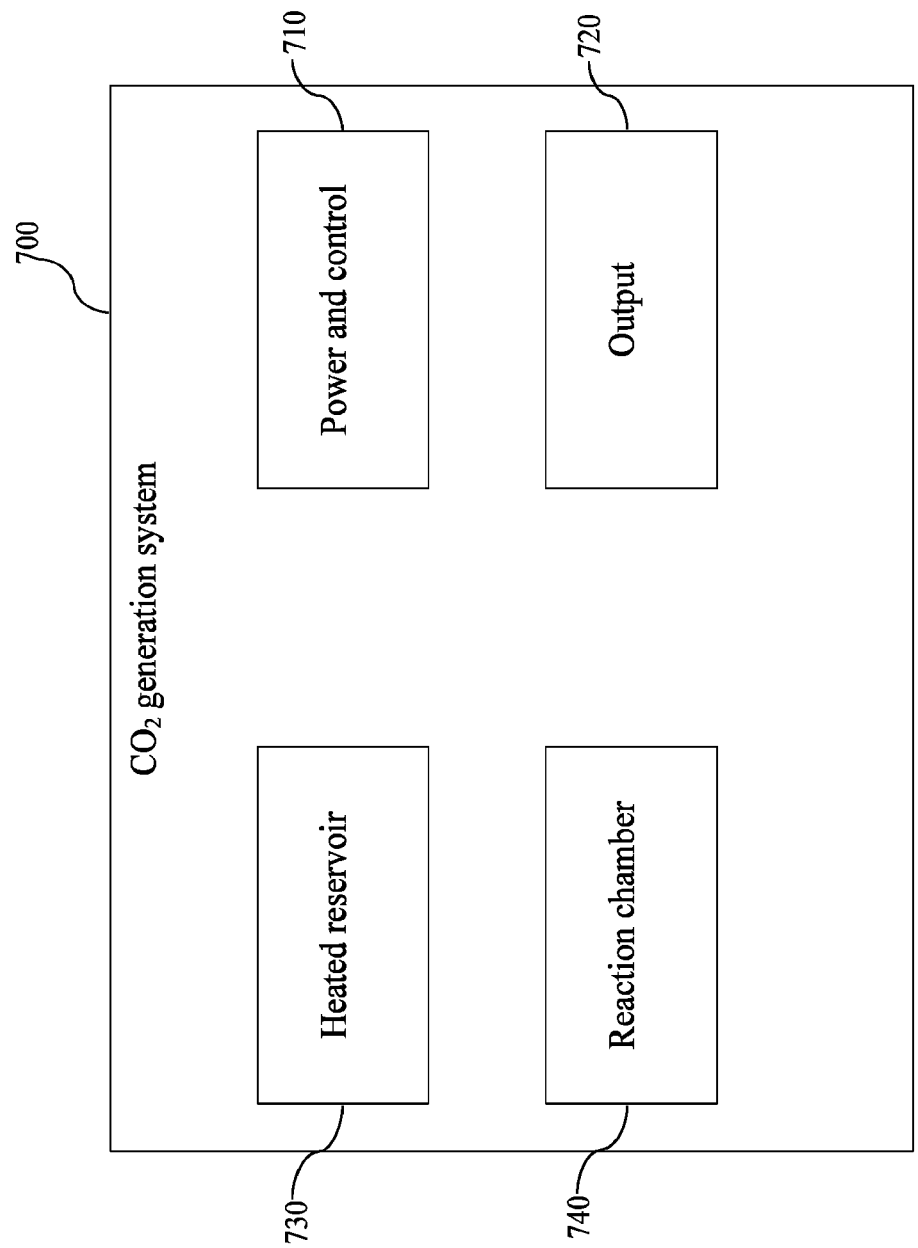
FIG. 87 shows a schematic of a $CO_2$ generation system according to some embodiments.
Figure 88:
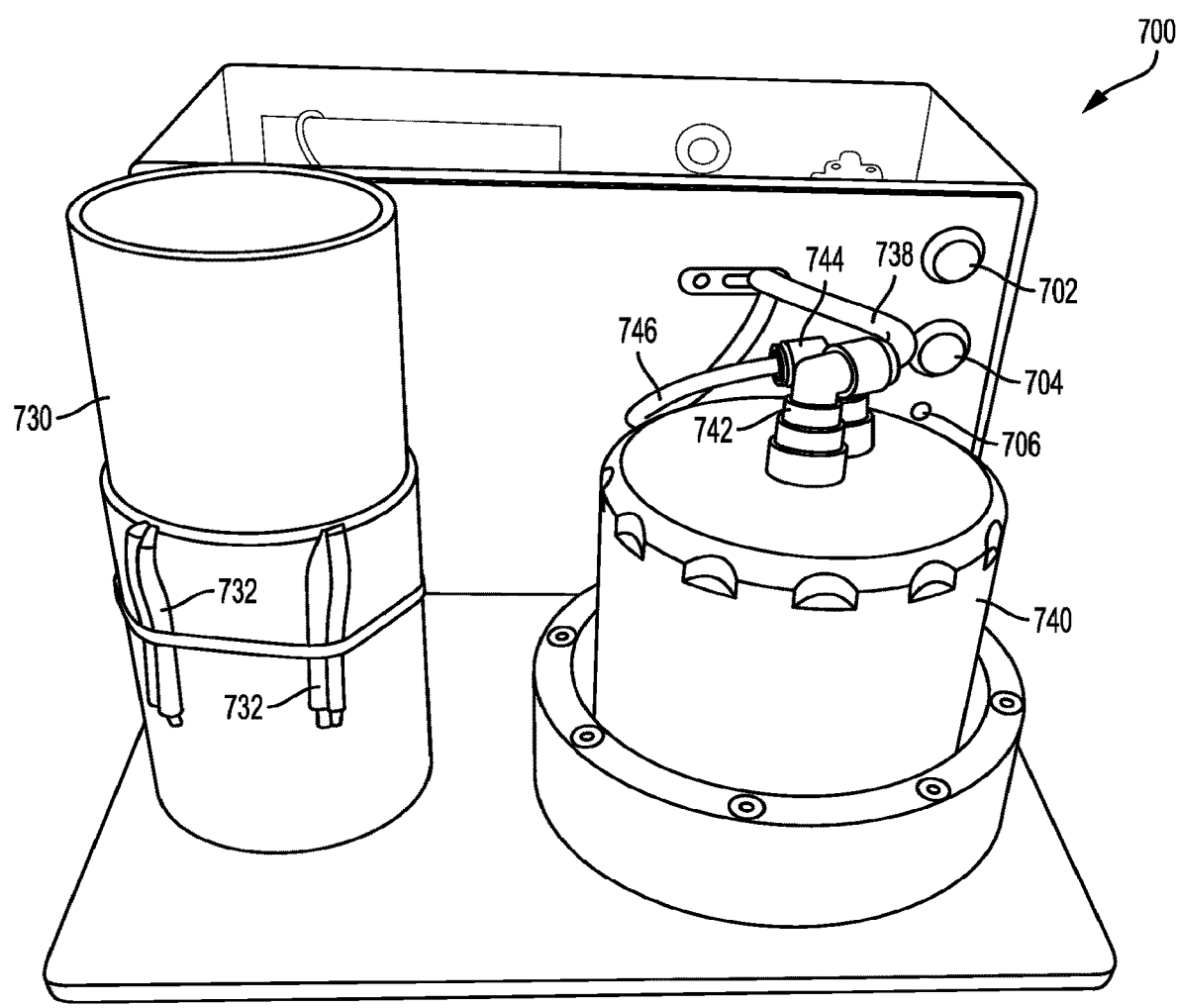
FIG. 88 shows a $CO_2$ generation system according to some embodiments.
Figure 89:
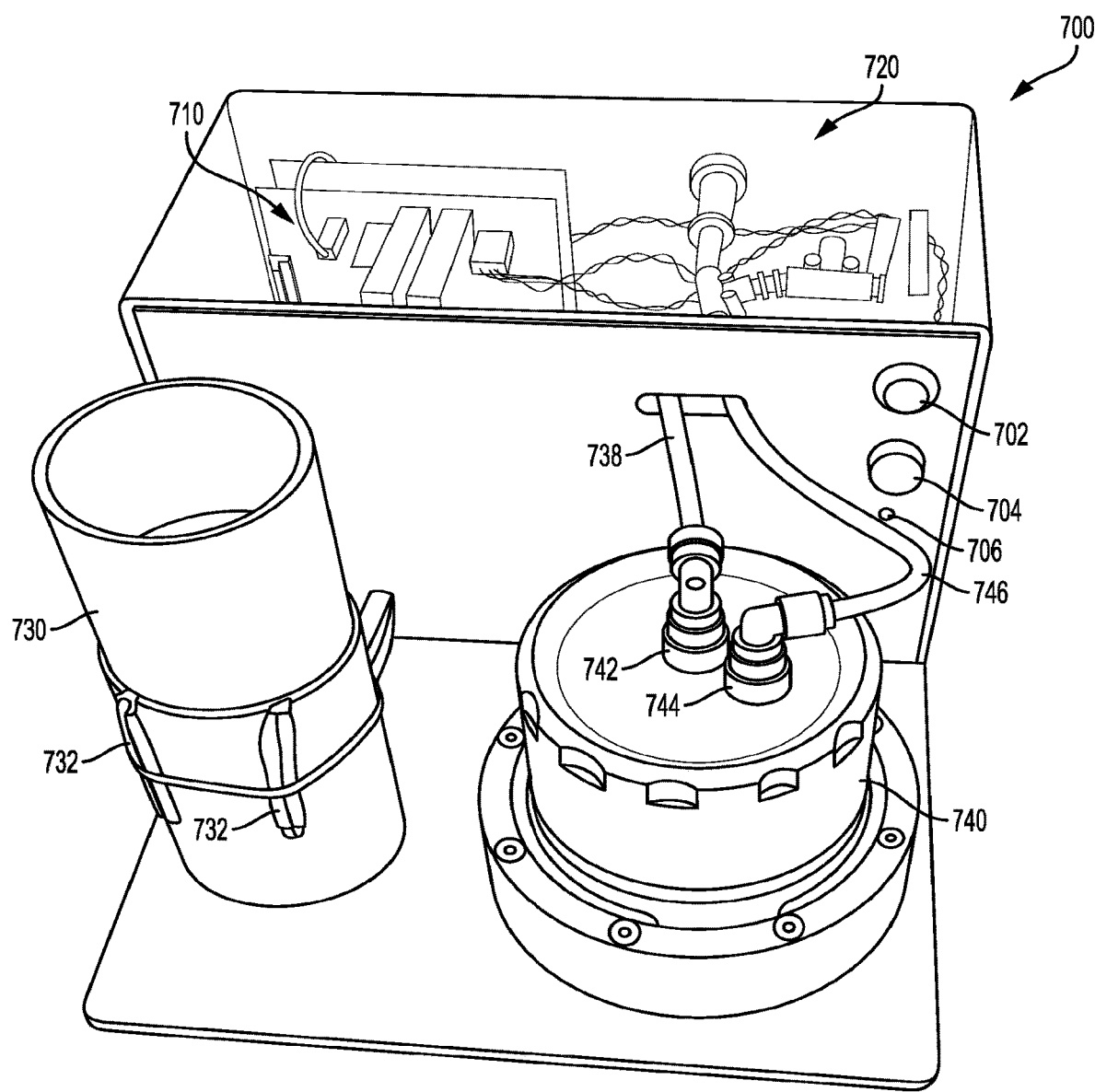
FIG. 89 shows a $CO_2$ generation system according to some embodiments.

In some embodiments, $CO_2$ generation system 700 facilitates the chemical reaction that produces $CO_2$. In some embodiments, $CO_2$ generation system 700, as shown, for example, in FIG. 87, comprises a power and control system 710, an output system 720, a reservoir 730, and a reaction chamber 740. In some embodiments, $CO_2$ generation system 700, as shown, for example, in FIGS. 88 and 89, comprises an activation button 702, a pressure indicator 704, and an activity indicator 706 to facilitate use of $CO_2$ generation system 700. In some embodiments, activation button 702 turns $CO_2$ generation system 700 on. In some embodiments, instead of activation button 702, $CO_2$ generation system 700 may be turned on by receiving a signal from carbonated beverage maker 300 that it is time to generate $CO_2$. In some embodiments, pressure indicator 704 indicates the current pressure within reaction chamber 740 to ensure safe operation of $CO_2$ generation system 700. In some embodiments, activity indicator 706 indicates when $CO_2$ generation system 700 is actively generating $CO_2$. In some embodiments, activity indicator 706 comprises an LED.

In some embodiments, reservoir 730 stores water to be added to the chemicals (e.g., potassium carbonate and citric acid in powder form) to initiate the chemical reaction between the chemicals. In some embodiments, the chemicals may be added to reservoir 730 instead of the water from reservoir 730 being added to the chemicals. In some embodiments, reservoir 730 includes one or more cartridge heaters 732 to heat the water in reservoir 730. In some embodiments, reservoir 730 includes four cartridge heaters 732. In some embodiments, cartridge heaters 732 may bring the water stored in reservoir 730 to a temperature of 55-60 degrees Celsius. In some embodiments, cartridge heaters 732 constantly heat the water stored in reservoir 730. In some embodiments, reservoir 730 is not always heated. In some embodiments, cartridge heaters 732 only heat the water stored in reservoir 730 when a signal is received. In some embodiments, reservoir 730 holds enough water for several cycles of $CO_2$ generation. For example, reservoir 730 may hold enough water for three cycles of $CO_2$ generation (i.e., to produce $CO_2$ for three beverages).

In some embodiments, a water exit passageway 734 (see FIG. 91), a pump 736 (see FIG. 91), and water delivery tubing 738 are configured to deliver water from reservoir 730 to reaction chamber 740. In some embodiments, water exit passageway 734 is connected to reservoir 730. In some embodiments, pump 736 is operably connected to water exit passageway 734. Pump 736 is configured to pump water from reservoir 730 through water exit passageway 734 and into water delivery tubing 738. In some embodiments, pump 736 comprises a high pressure solenoid pump.

Figure 98:
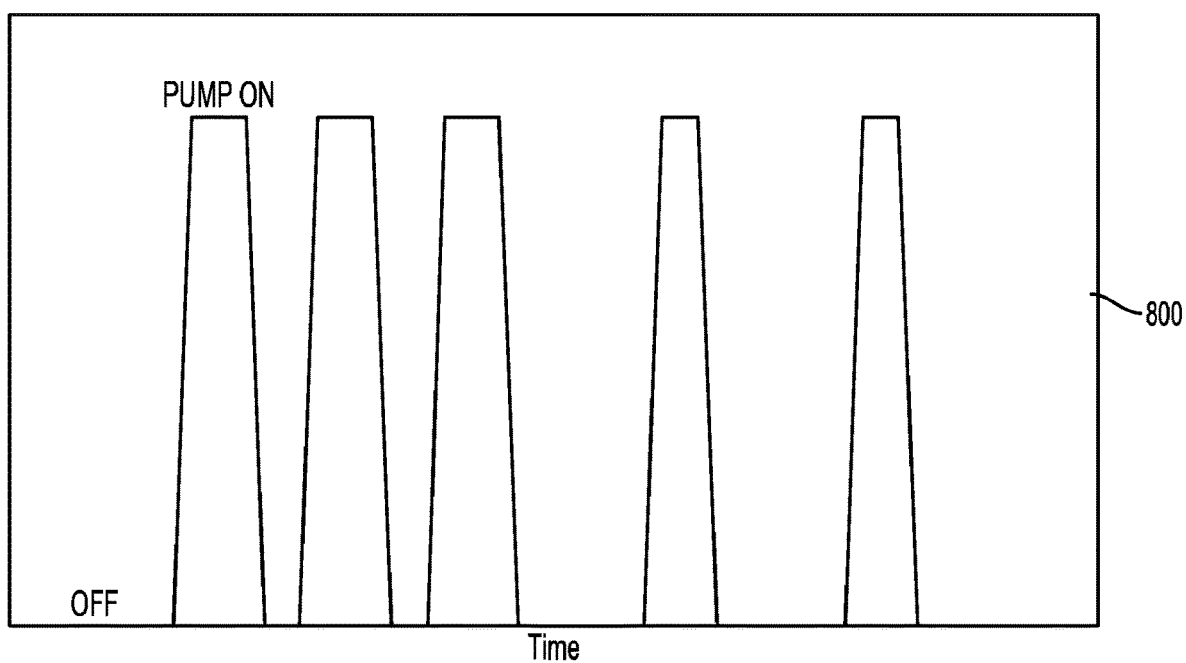
FIG. 98 shows a graph for operating a pump in a $CO_2$ generation system according to some embodiments.

In some embodiments, pump 736 operates intermittently to introduce water into reaction chamber 740. For example, as shown in FIG. 98, pump profile 800 may include pulses in which pump 736 turns on and off several times. In some embodiments, pump profile 800 affects the generation rate of $CO_2$ gas. Thus, a desired generation rate can be achieved by modifying pump profile 800. In some embodiments, pump profile 800 prevents over-foaming in reaction chamber 740. In some embodiments, pump profile 800 is configured to correspond the $CO_2$ generation with the carbonation process. In some embodiments, pump profile 800 may include a delay so that $CO_2$ is not generated too early.

In some embodiments, pump profile 800 may include a few medium length pulses to deliver a bulk of the water to be used to activate the reaction between the dry elements within reaction chamber 740. In some embodiments, pump profile 800 may include one or two shorter pulses after the medium length pulses. The shorter pulses may facilitate continued mixing of the dry chemical elements towards the end of $CO_2$ generation. Other pump profiles are also possible.

In some embodiments, reaction chamber 740 comprises a water connection 742 and a gas connection 744. In some embodiments, water delivery tubing 738 brings water to water connection 742, which introduces the water into reaction chamber 740. Chemical elements may be disposed within reaction chamber 740. In some embodiments, the water initiates a reaction to produce $CO_2$, which may exit reaction chamber 740 through gas connection 744. In some embodiments, gas connection 744 is connected to gas delivery tubing 746. In some embodiments, gas delivery tubing 746 delivers the gas to output system 720.

Figure 90:
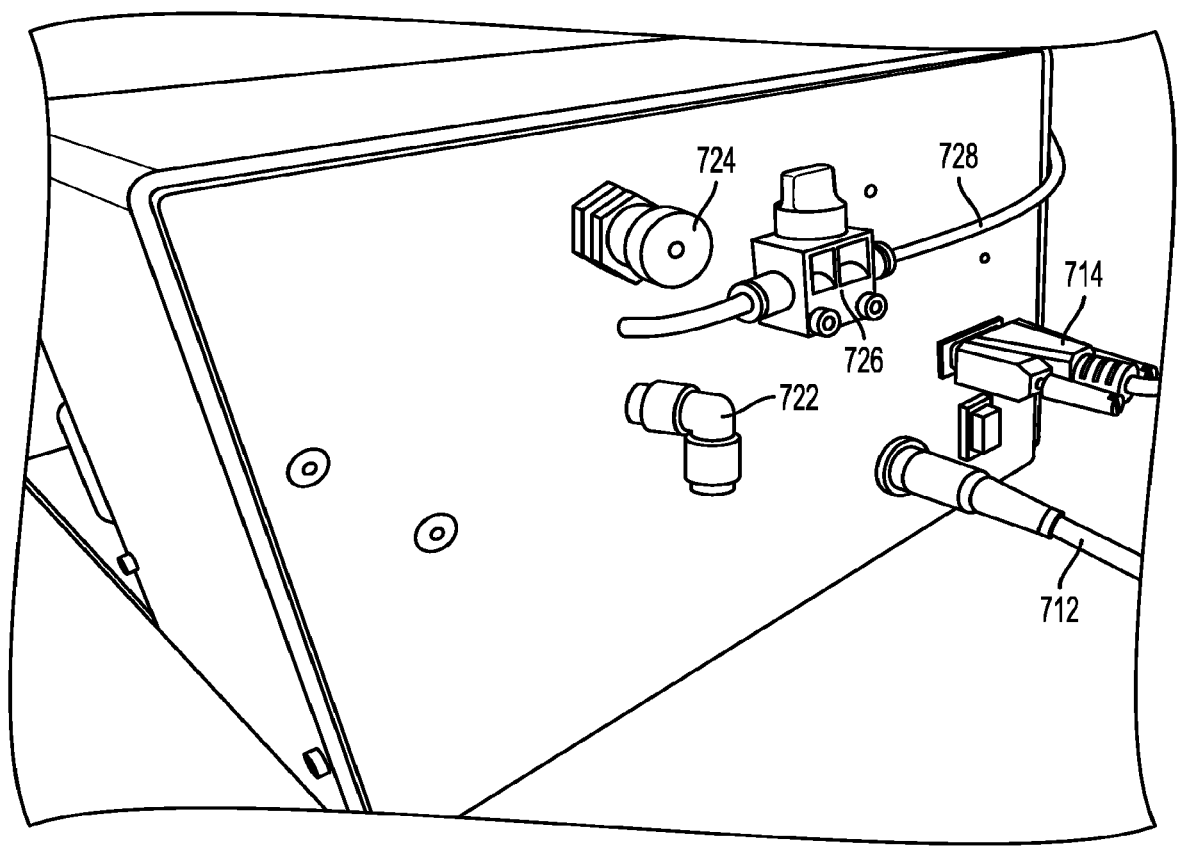
FIG. 90 shows a portion of a $CO_2$ generation system according to some embodiments.

In some embodiments, power and control system 710 for $CO_2$ generation system 700 comprises a power connector 712 and a control connector 714, as shown, for example, in FIG. 90. In some embodiments, power connector 712 supplies power to the components of $CO_2$ generation system 700 in need of power. In some embodiments, control connector 714 connects the components of $CO_2$ generation system 700 to a main controller. In some embodiments, power and control system 710 is a power and control system for all of carbonated beverage maker 300, rather than just $CO_2$ generation system 700. In other words, $CO_2$ generation system 700 can share some components with other systems within carbonated beverage maker 300.

In some embodiments, output system 720 comprises a manual vent outlet 722, a pressure relief valve 724, an exit solenoid valve 726, and exit tubing 728. In some embodiments, manual vent outlet 722 allows a user to manually vent $CO_2$ generation system 700. In some embodiments, pressure relief valve 724 helps regulate the pressure in $CO_2$ generation system 700. For example, if the pressure in $CO_2$ generation system 700 exceeds a pre-determined pressure, pressure relief valve 724 will open to release some of the pressure. In some embodiments, exit solenoid valve 726 and exit tubing 728 facilitate the transport of generated $CO_2$ from $CO_2$ generation system 700 to a carbonation tank in carbonated beverage maker 300. As will be discussed in more detail below, carbonated beverage maker 300 may communicate with exit solenoid valve 726 for the timing of opening and closing of exit solenoid valve 726 so that carbonated beverage maker 300 gets the right amount of $CO_2$ and at the right time.

In some embodiments, output system 720 may be used for other aspects of carbonated beverage maker 300, rather than just $CO_2$ generation system 700. For example, manual vent outlet 722 may allow a user to manually vent carbonated beverage maker 300 as a whole. Similarly, pressure relief valve 724 may help regulate the pressure of carbonated beverage maker 300 as a whole. Because $CO_2$ generation system 700 can share some components with other systems within carbonated beverage maker 300, the addition of $CO_2$ generation system 700 into carbonated beverage maker 300 does not require as many additional components and the size of carbonated beverage maker 300 can be kept to a minimum. In some embodiments, other components of $CO_2$ generation system 700, such as reservoir 730, may also be shared with other aspects of carbonated beverage maker 300.

In some embodiments, reaction chamber 740 is configured to hold dry chemical elements. In some embodiments, reaction chamber 740 is configured to receive a chemical pod 760, as shown, for example, in FIGS. 91 and 92. In some embodiments, chemical pod 760 is a reusable pod. In some embodiments, chemical pod 760 is a disposable pod. In some embodiments, chemical pod 760 holds the mixture of dry chemical elements (e.g., potassium carbonate and citric acid).

In some embodiments, water from reservoir 730 may be delivered into chemical pod 760 to initiate the chemical reaction between the chemical elements. In some embodiments, water from reservoir 730 is delivered into chemical pod 760 via water delivery tubing 738 through water connection 742. In some embodiments, a needle 750 is inserted into chemical pod 760 to inject the water into chemical pod 760. In some embodiments, needle 750 may protrude from water connection 742 into reaction chamber 740. For example, needle 750 may protrude into chemical pod 760.

In some embodiments, needle 750 operates as a water distribution needle. For example, needle 750 may spray water directly into the chemical elements (e.g., potassium carbonate and citric acid). In some embodiments, needle 750 may be configured to assist in ensuring that all chemical elements are wetted to increase the reaction between the chemical elements. In some embodiments, needle 750 may be configured to provide agitation to better mix the chemical elements and water. For example, needle 750 may be provided with holes (e.g., water injection holes) to contribute to wetting and agitation of chemical elements. In addition, pulses of water from pump 736 according to pump profile 800, as discussed above, may also contribute to wetting and agitation of chemical elements.

In some embodiments, the pulses of water through needle 750 may contribute to preventing over-foaming within reaction chamber 740. In some embodiments, greater quantities of water help collapse bubbles generated in the effervescent reaction. In some embodiments, when more hot water is added into reaction chamber 740, the chemical reaction is faster and less foam and bubbles are generated. In some embodiments, other ways of managing foam and bubbles generated by the effervescent reaction may be used (e.g., glass beads, plastic beads, silicon oil, chemical de-foamers, mechanical foam breakers, etc.). In some embodiments, managing foam and bubbles generated by the effervescent reaction allows for faster generation of $CO_2$.

Figure 93:
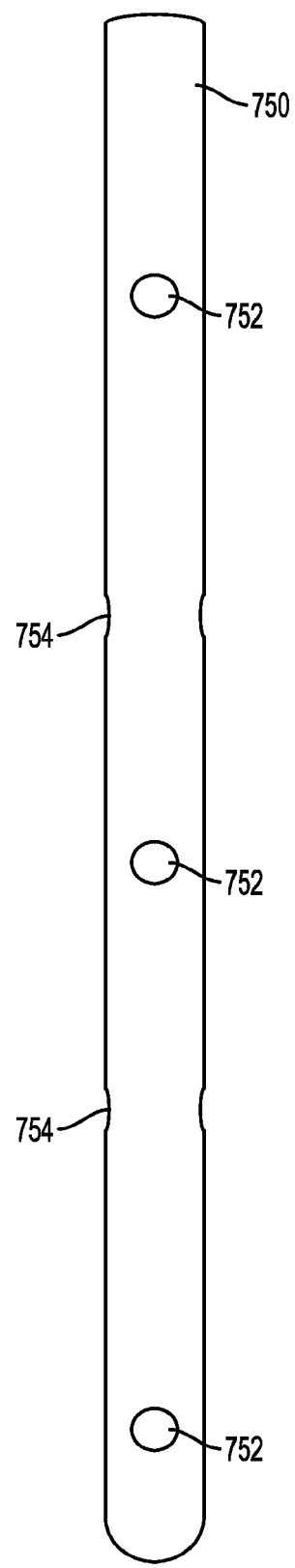
FIG. 93 shows a needle for use in a reaction chamber of a $CO_2$ generation system according to some embodiments.
Figure 94:
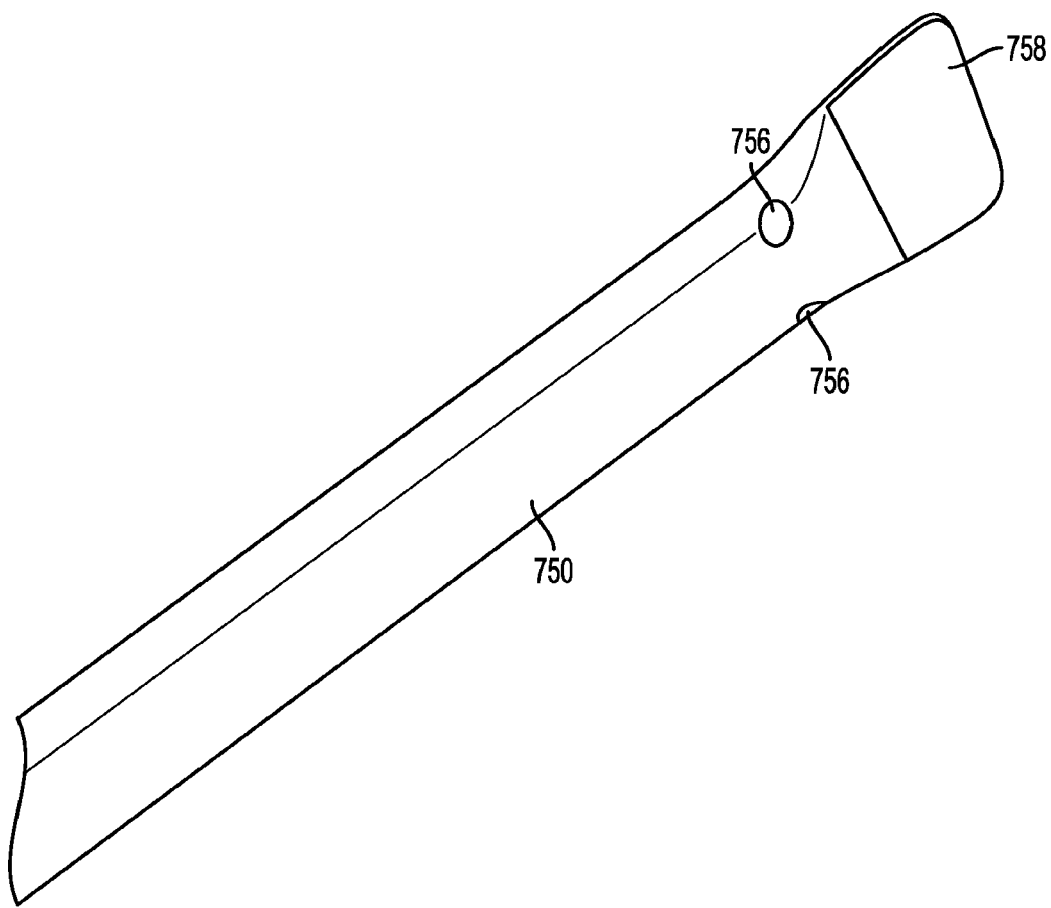
FIG. 94 shows a needle for use in a reaction chamber of a $CO_2$ generation system according to some embodiments.

In some embodiments, needle 750 comprises a plurality of holes, as shown, for example, in FIGS. 93 and 94. In some embodiments, needle 750 comprises a plurality of holes 752 disposed in a line along a length of needle 750. In some embodiments, holes 752 are disposed in an alternating fashion with a second plurality of holes 754, as shown in FIG. 93. In some embodiments, the placement of holes, such as holes 752 and holes 754 encourages the mixing of water with the dry chemical elements, which may help generate $CO_2$ more efficiently. In some embodiments, needle 750 includes holes 756 at a bottom part of needle 750, for example, near a piercer 758, as shown in FIG. 94. In some embodiments, needle 750 comprises four holes 756. In some embodiments, holes 756 spray water in four directions near the bottom of chemical pod 760 to maximize reaction between the chemical elements. For example, this configuration may keep the chemical elements moving.

In some embodiments, holes 752, holes 754, and/or holes 756 have a diameter of 1 millimeter. In some embodiments, holes 752, holes 754, and/or holes 756 have a diameter of 0.5 millimeters. In some embodiments, holes 752, holes 754, and holes 756 may have different diameters. In some embodiments, holes 752, holes 754, and holes 756 may have the same diameter. Holes 752, holes 754, and holes 756 have other diameters (e.g., greater than 1 millimeter, between 0.5 and 1 millimeter, or less than 0.5 millimeters). In some embodiments, needle 750 comprises six holes. In some embodiments, each hole has a diameter of 0.3 millimeters. In some embodiments, the diameter size ensures proper velocity and flow rate to dose the water in a desired amount of time (e.g., 10 seconds). The design of needle 750 may be different for different chemical elements disposed in reaction chamber 740. In some embodiments, needle 750 is configured to provide continuous mixing throughout the pumping period.

In some embodiments, needle 750 injects 70 milliliters of water into reaction chamber 740. In some embodiments, needle 750 injects water into reaction chamber 740 at a rate of 5.5 milliliters per second.

Figure 91:
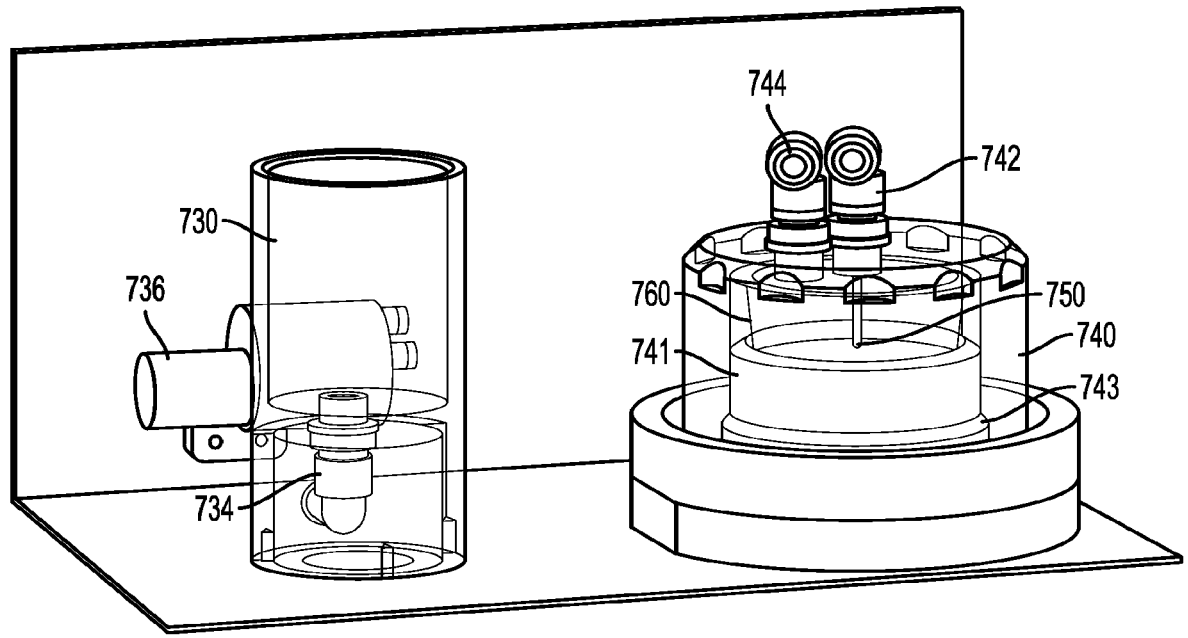
FIG. 91 shows a $CO_2$ generation system according to some embodiments.
Figure 92:
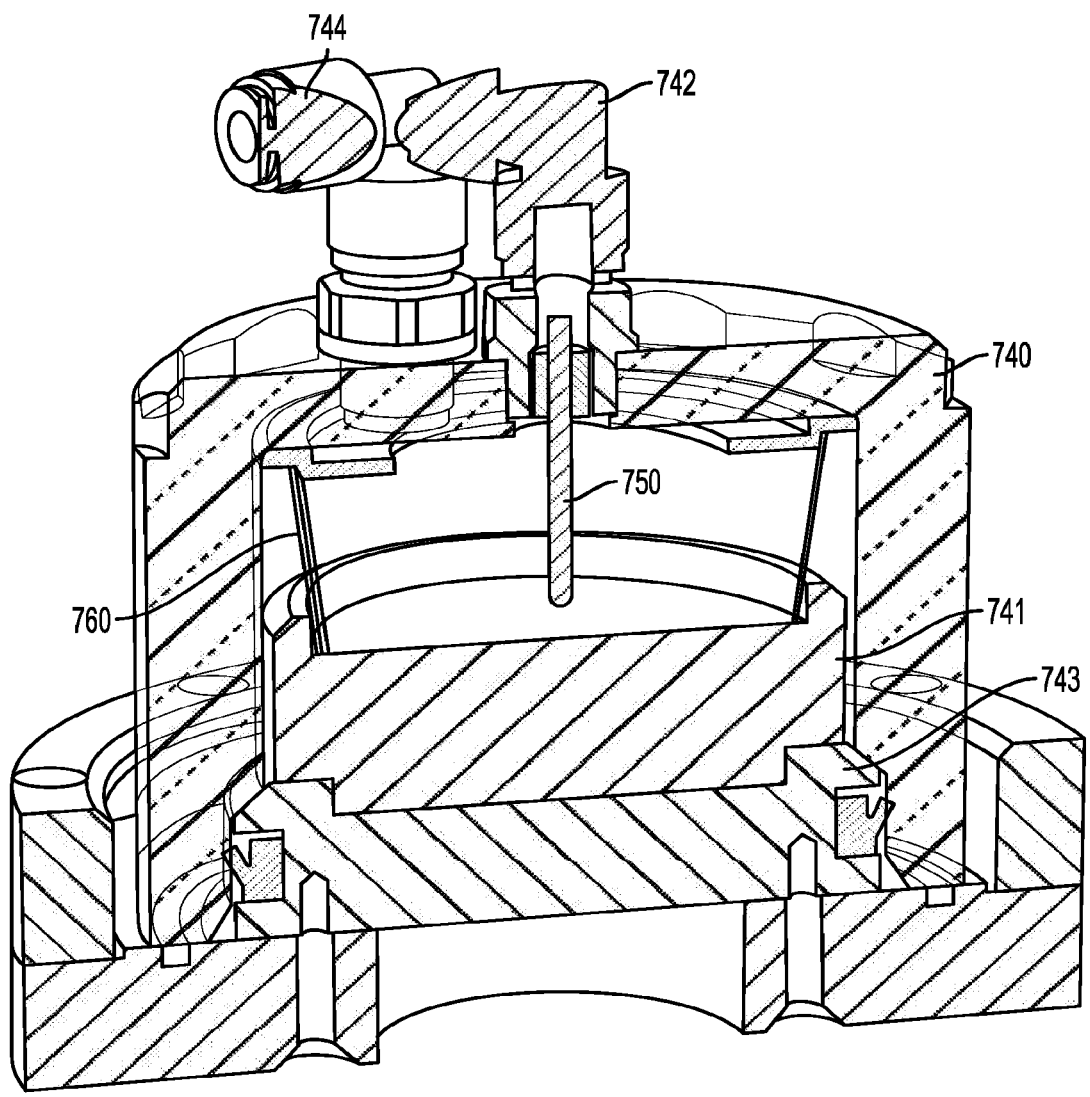
FIG. 92 shows a cross-sectional view of a reaction chamber for a $CO_2$ generation system according to some embodiments.

In some embodiments, reaction chamber 740 may be configured to receive chemical pods 760 of different sizes. For example, reaction chamber 740 may include a spacer 741 to accommodate chemical pods 760 of different sizes, as shown in FIGS. 91 and 92. In some embodiments, reaction chamber 740 may be sized to accommodate more than one chemical pod 760 or tablet at a time. In some embodiments, the number of chemical pods 760 or tablets inserted into reaction chamber 740 may affect the amount of carbonation in the carbonated beverage. For example, one chemical pod 760 or tablet may equate to low carbonation, two chemical pods 760 or tablets may equate to medium carbonation, and three chemical pods 760 or tablets may equate to high carbonation.

In some embodiments, reaction chamber 740 comprises a pressure vessel. In some embodiments, reaction chamber 740 can be opened and sealed reliably. In some embodiments, reaction chamber 740 is sealed to other portions of carbonated beverage maker 300 to allow for reaction chamber 740 to be pressurized. In some embodiments, reaction chamber 740 comprises a chamber seal 743. In some embodiments, chamber seal 743 comprises the same locking mechanisms as described above relating to the connection of a carbonation cup to a carbonated beverage maker.

In some embodiments, after water is introduced into reaction chamber 740, $CO_2$ gas is produced. As the $CO_2$ gas is produced it is delivered through gas connection 744 and gas delivery tubing 746 to output system 720, as described above, which will deliver $CO_2$ gas to a carbonation chamber to carbonate a beverage. The remaining products remain in chemical pod 760 and/or reaction chamber 740. In some embodiments, the remaining products are safe for disposal without special treatment (e.g., the remaining products may be poured down the drain in a consumer's home).

Figure 95:
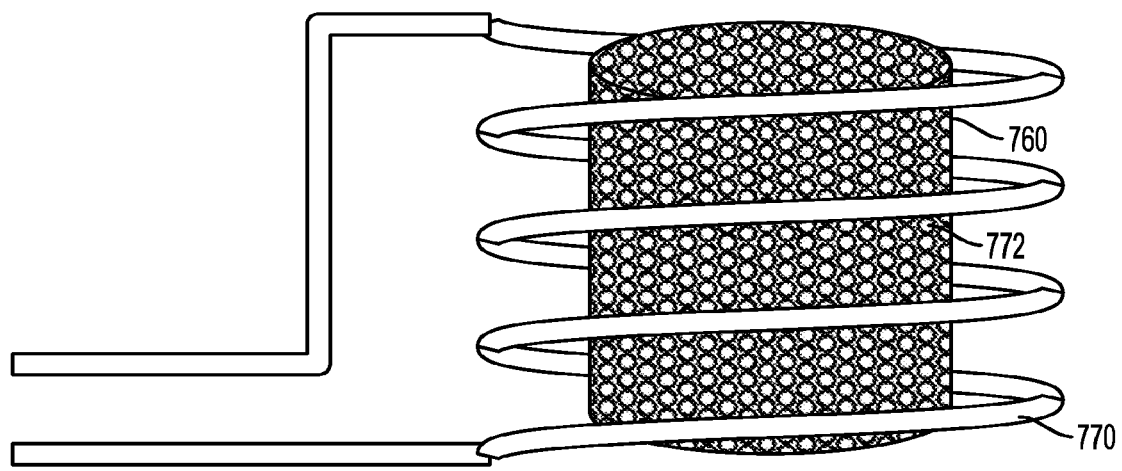
FIG. 95 shows a chemical pod of a $CO_2$ generation system according to some embodiments.
Figure 96:
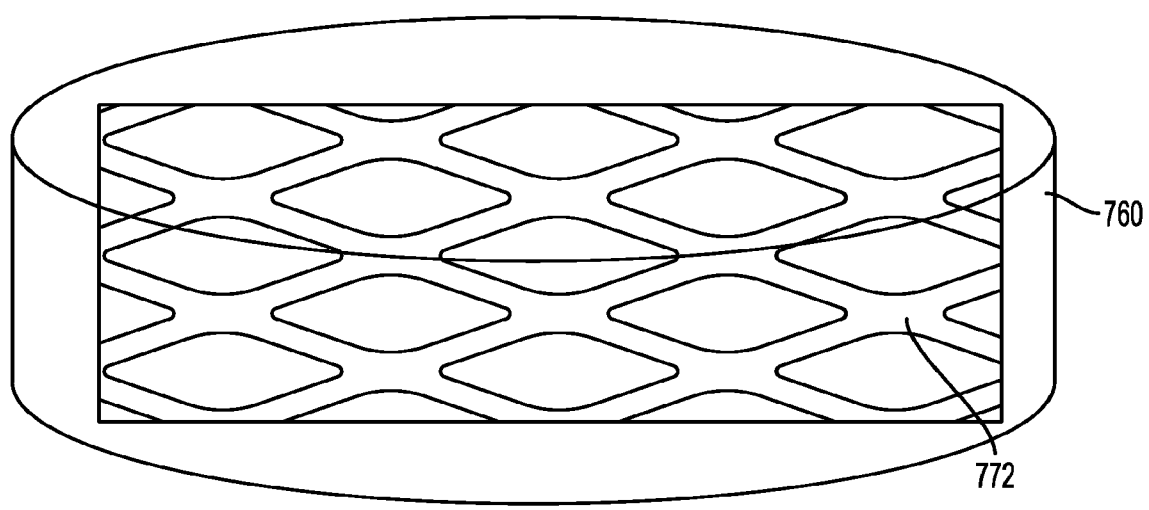
FIG. 96 shows a chemical pod of a $CO_2$ generation system according to some embodiments.

In some embodiments, the water that is delivered to chemical pod 760 is heated. In some embodiments, the water that is delivered to chemical pod 760 is between 40 and 90 degrees Celsius (i.e., warm water; as used herein, warm water includes hot water). For example, the water that is delivered to chemical pod 760 may be between 55 and 60 degrees Celsius. In some embodiments, additional heating may facilitate the reaction within chemical pod 760. In some embodiments, inductive heating may be used to heat chemical pod 760. For example, as shown in FIG. 95, a primary coil 770 may surround chemical pod 760. In some embodiments, chemical pod 760 contains susceptors 772 that are heated by induction caused by primary coil 770. In some embodiments, the inductive heating may be affected by the geometry of susceptor 772, the geometry of primary coil 770, the associated magnetic circuit, and the apparatus used for removing heat from primary coil 770. In some embodiments, susceptor 772 comprises metal particles (e.g., rings, discs, hollow cylinders, spheres, etc.). In some embodiments, the metal particles have a diameter that is less than four times of their skin depth. In some embodiments, susceptor 772 comprises a mesh, as shown in FIG. 96. In some embodiments, the mesh is irregular.

Figure 97:
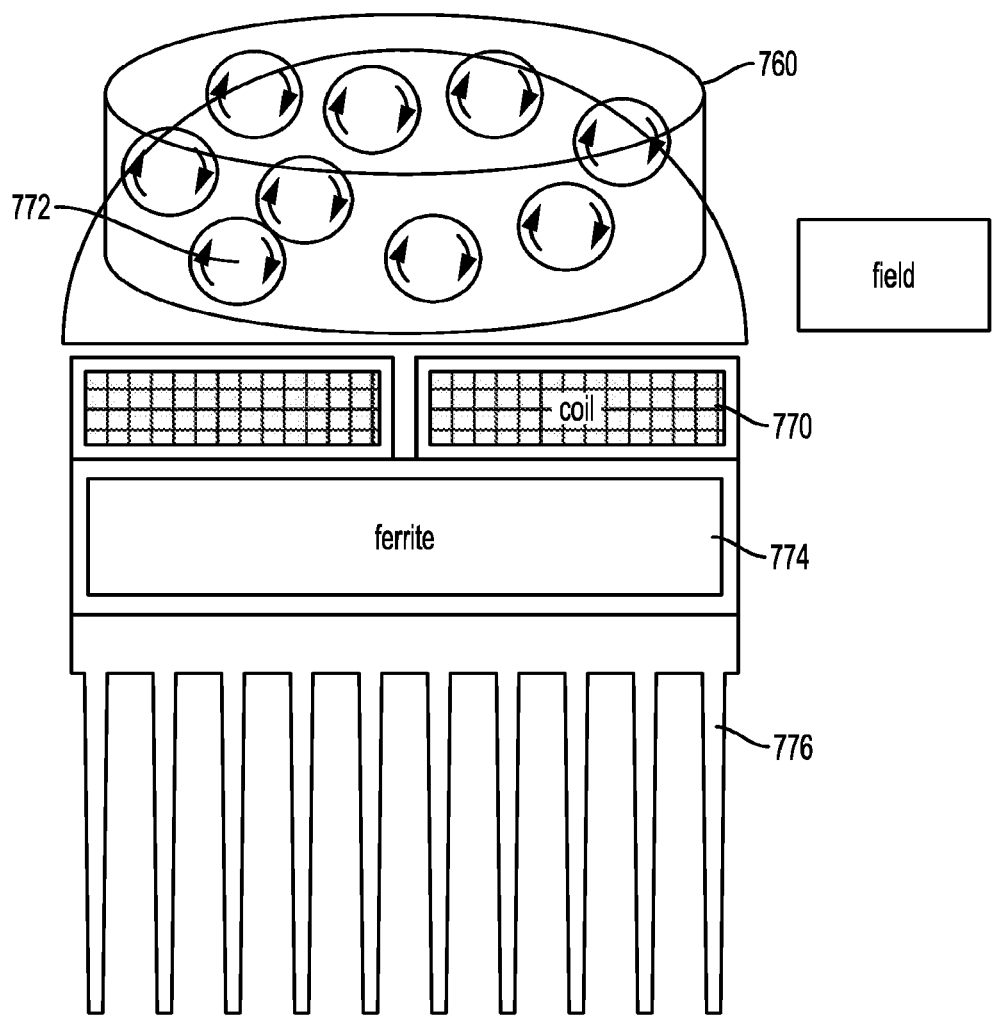
FIG. 97 shows a chemical pod of a $CO_2$ generation system according to some embodiments.

In some embodiments, the primary field created by primary coil 770 is primarily disposed in chemical pod 760 to interact with susceptors 772. In some embodiments, a magnetic circuit 774 ensures that the primary field is disposed in chemical pod 760. In some embodiments, magnetic circuit 774 is made of ferrite. In some embodiments, the geometry of primary coil 770 may also influence the primary field to be disposed in chemical pod 760. In some embodiments, primary coil 770 comprises a pancake coil, as shown in FIG. 97. In some embodiments, magnetic circuit 774 provides a ferrite backing for primary coil 770.

In some embodiments, a heat exchanger 776 is included with primary coil 770. In some embodiments, heat exchanger 776 keeps primary coil 770 from getting too hot. In some embodiments, heat exchanger 776 transfers heat to surrounding air by convection. For example, heat exchanger 776 may comprise a finned heat exchanger.

In some embodiments, carbonated beverage maker 300 utilizes $CO_2$ generation system 700 instead of a $CO_2$ tank. In some embodiments, $CO_2$ generation system 700 is modular. Thus, carbonated beverage maker 300 may receive either $CO_2$ tank or $CO_2$ generation system 700 without modifying carbonated beverage maker 300.

Figure 99:
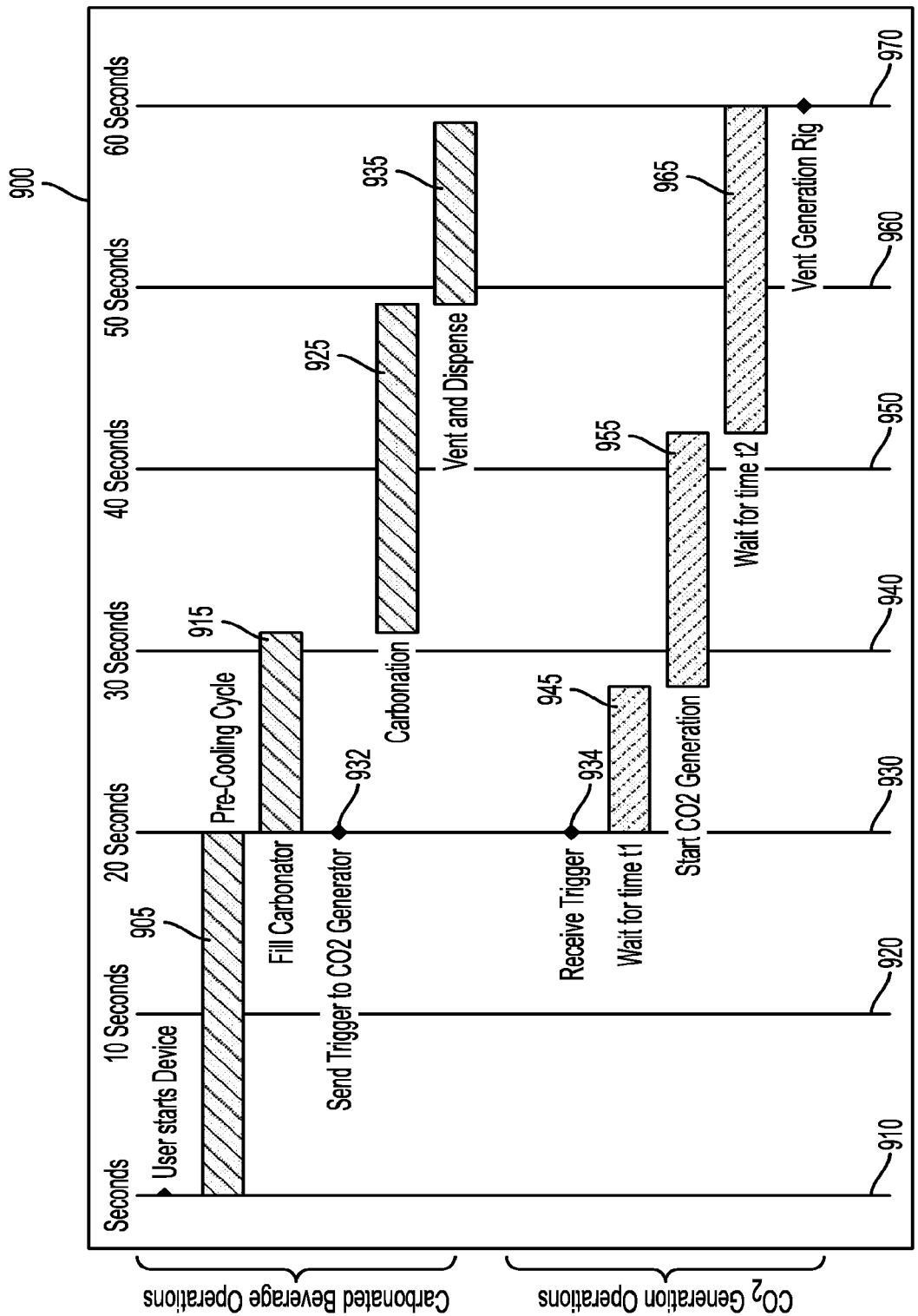
FIG. 99 shows a graph for operating a carbonated beverage maker according to some embodiments.

In some embodiments, carbonated beverage maker 300 may utilize $CO_2$ generation system 700 to produce a carbonated beverage as shown, for example, in diagram 900 of FIG. 99. Diagram 900 illustrates the operations of $CO_2$ generation system 700 in some embodiments at the bottom portion of diagram 900. Diagram 900 illustrates the operations of other portions of carbonated beverage maker 300 at the top portion of diagram 900.

In some embodiments, a user starts carbonated beverage maker 300 at a first time 910. In some embodiments, when the user starts carbonated beverage maker 300, a pre-cooling cycle 905 begins. In some embodiments, pre-cooling cycle 905 comprises cycling cold water from a cold water reservoir through a carbonation chamber to cool the carbonation chamber. In some embodiments, pre-cooling cycle 905 continues through a second time 920 and ends at a third time 930. In some embodiments, for example, pre-cooling cycle 905 lasts for 20 seconds. In some embodiments, at third time 930, carbonated beverage maker 300 begins to fill the carbonation chamber with water to be carbonated in operation 915. In some embodiments, carbonated beverage maker 300 fills the carbonation chamber in operation 915 from third time 930 through a fourth time 940 (e.g., just beyond fourth time 940). For example, carbonated beverage maker 300 may fill the carbonation chamber for 10-12 seconds.

In some embodiments, at third time 930 carbonated beverage maker 300 also sends a signal to $CO_2$ generation system 700 in operation 932 and $CO_2$ generation system 700 receives the signal from carbonated beverage maker 300 in operation 934. In some embodiments, in response to the signal from carbonated beverage maker 300, $CO_2$ generation system 700 starts a first delay 945. In some embodiments, first delay 945 begins at third time 930 and ends before fourth time 940. In some embodiments, first delay 945 lasts between five and ten seconds. In some embodiments, at the end of first delay 945, $CO_2$ generation system 700 begins the $CO_2$ generation process 955. In some embodiments, $CO_2$ generation process 955 is the process of using $CO_2$ generation system 700 as described above. In some embodiments, $CO_2$ generation process 955 begins before fourth time 940 and ends after a fifth time 950. In some embodiments, $CO_2$ generation process 955 lasts for 12-20 seconds.

In some embodiments, during $CO_2$ generation process 955, carbonated beverage maker 300 begins carbonation process 925. Carbonation process 925 begins after $CO_2$ generation process 955 begins so that enough $CO_2$ has been generated to begin carbonating the beverage. For example, $CO_2$ generation process 955 may begin before fourth time 940 while carbonation process 925 may begin after fourth time 940. In some embodiments, carbonation process 925 begins 5 seconds after $CO_2$ generation process 955 begins.

In some embodiments, after $CO_2$ generation process 955 ends, $CO_2$ generation system 700 starts a second delay 965. In some embodiments, second delay 965 begins after fifth time 950. In some embodiments, second delay 965 extends through sixth time 960 and ends at seventh time 970. In some embodiments, seventh time 970 ends all operations for carbonated beverage maker 300 and $CO_2$ generation system 700. In some embodiments, $CO_2$ generation system 700 is vented at seventh time 970. In some embodiments, second delay 965 lasts for 15-20 seconds.

In some embodiments, carbonation process 925 ends during second delay 965. In some embodiments, carbonation process 925 ends just before sixth time 960. In some embodiments, once carbonation process 925 is complete, carbonated beverage maker 300 vents the carbonation chamber and dispenses a carbonated beverage at operation 935. In some embodiments, operation 935 of venting and dispensing lasts for ten seconds. In some embodiments, operation 935 of venting and dispensing begins and ends during second delay 965. The timing of the operations shown in diagram 900 of FIG. 99 may facilitate optimum $CO_2$ generation and carbonation.

Figure 100:
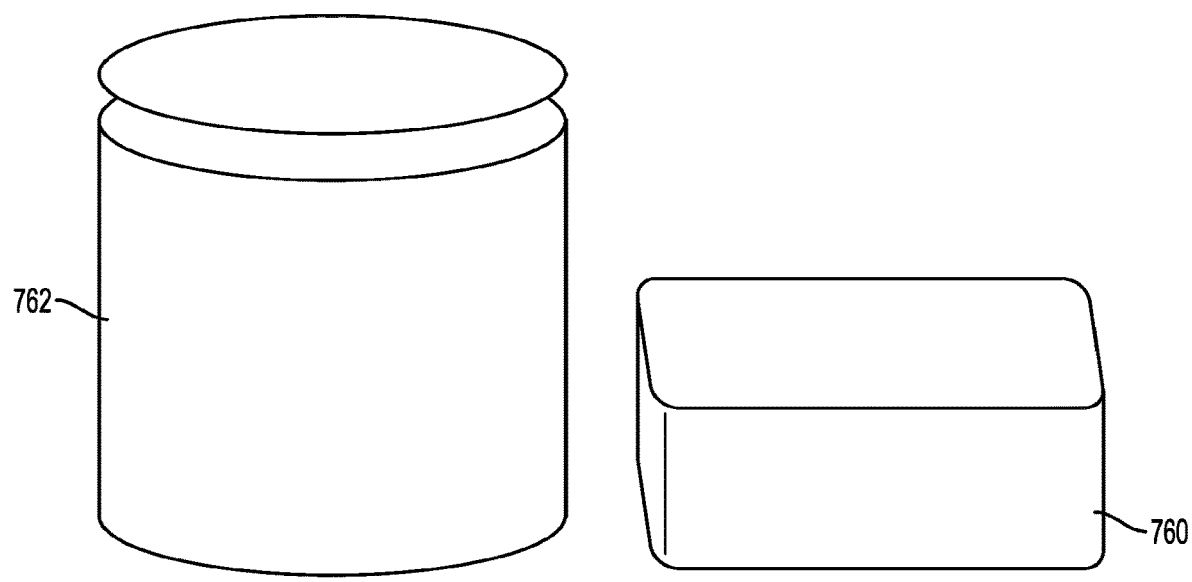
FIG. 100 shows a chemical pod and a flavor pod for a carbonated beverage maker according to some embodiments.
Figure 101:
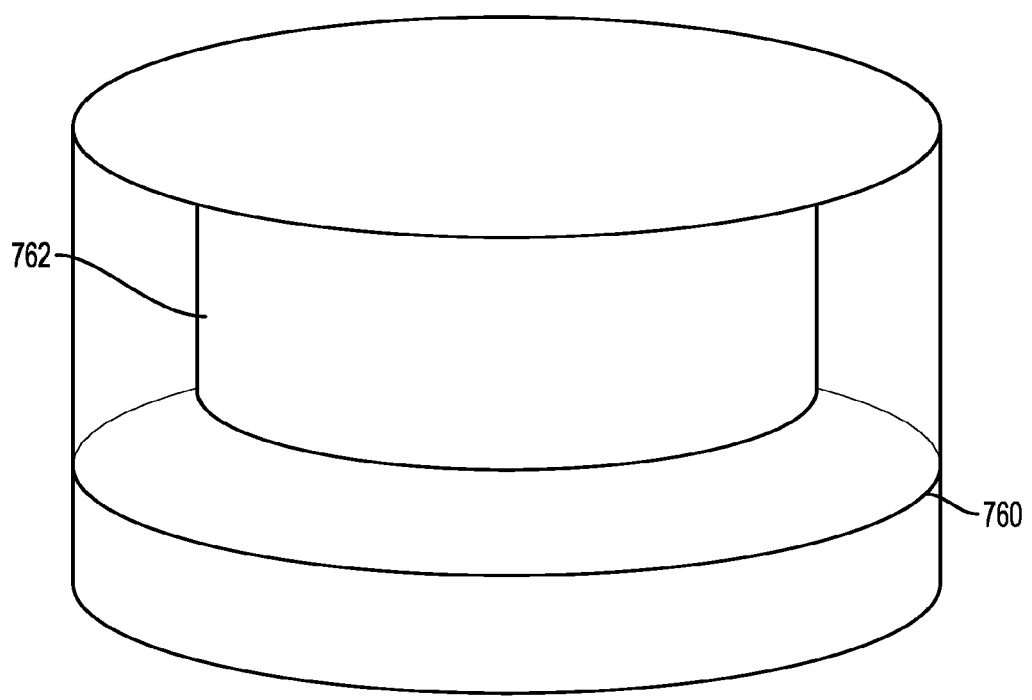
FIG. 101 shows a chemical pod and a flavor pod for a carbonated beverage maker according to some embodiments.
Figure 102:
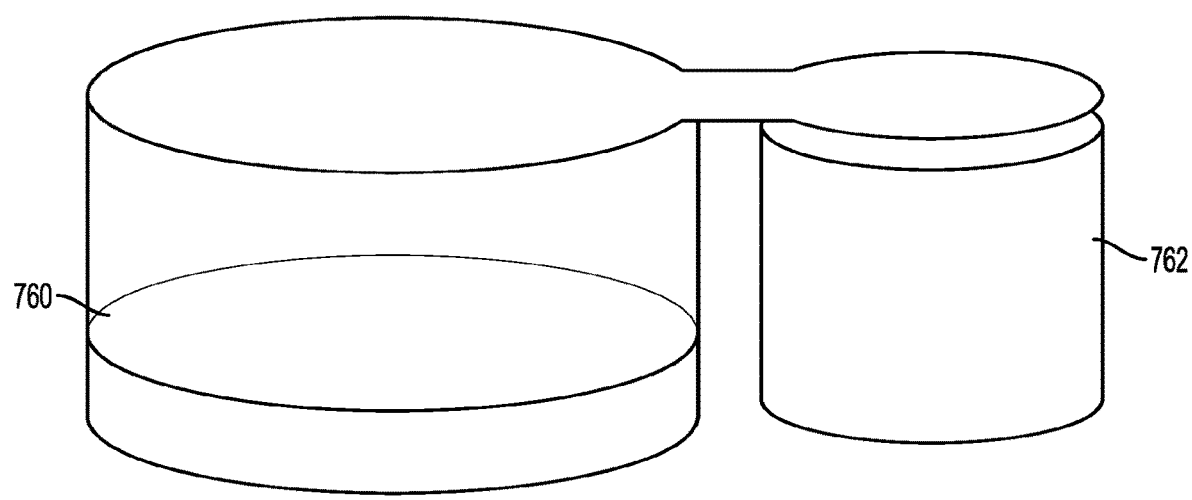
FIG. 102 shows a chemical pod and a flavor pod for a carbonated beverage maker according to some embodiments.
Figure 103:
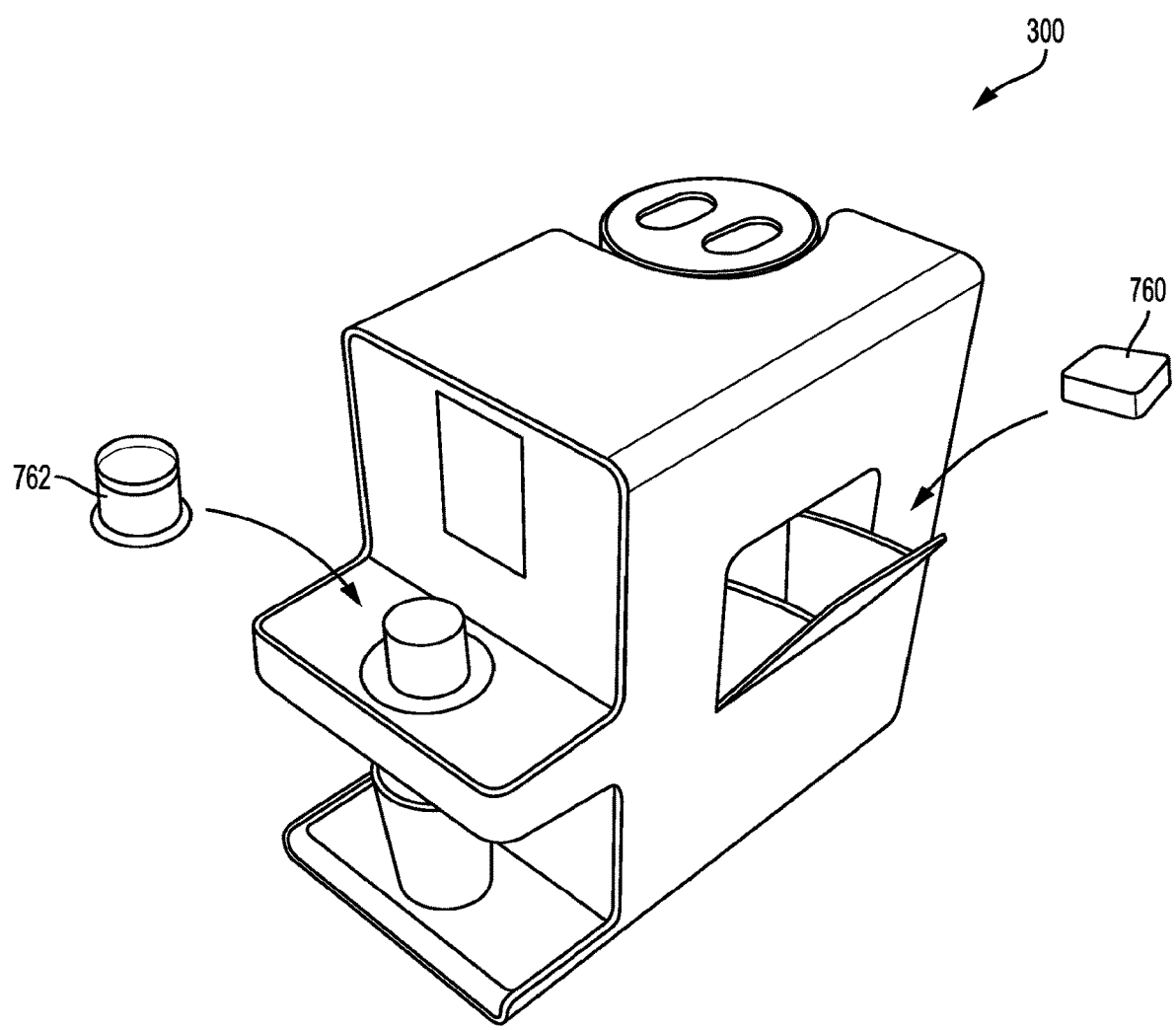
FIG. 103 shows a chemical pod and a flavor pod being inserted into a carbonated beverage maker according to some embodiments.

A variety of chemical pods 760 may be utilized for $CO_2$ generation system 700. In some embodiments, as shown, for example, in FIGS. 100-103, chemical pod 760 may be coupled with a flavor pod 762 containing a flavor source (e.g., a powder, syrup, etc.). In some embodiments, as shown in FIG. 100, chemical pod 760 may be a tablet made up of the dry chemical elements and flavor pod 762 may be a separate pod. In some embodiments, as shown in FIG. 101, flavor pod 762 may be embedded within chemical pod 760. The dry chemical elements may be in loose powder form within chemical pod 760 (e.g., underneath flavor pod 762). In some embodiments, as shown in FIG. 102, flavor pod 762 may be linked to chemical pod 760. In some embodiments, as shown in FIG. 103, flavor pod 762 may be separated from chemical pod 760. Flavor pod 762 may be disposed in a portion of carbonated beverage maker 300 associated with dispensing. Chemical pod 760 may be disposed in a portion of carbonated beverage maker 300 associated with $CO_2$ generation (i.e., in reaction chamber 740 of $CO_2$ generation system 700).

Carbonated beverage makers may have one or more of the features disclosed above. Moreover, any of the carbonated beverage makers described herein may utilize the $CO_2$ generation system described herein.

As noted above, in some embodiments, carbonated beverage makers are configured to identify a flavor source that will be used in the carbonated beverage maker. For example, in some embodiments, pods containing a flavor source may be provided with an RFID tag or identifier. In some embodiments, the RFID tag may contain information regarding the pod, such as flavor, size, expiration date, and other product information. In some embodiments, carbonated beverage makers may include an RFID reader positioned to read the information from the RFID tag on the pod when the pod is inserted into the carbonated beverage maker.

In some embodiments, the carbonated beverage maker operates differently based on information from the RFID tag. For example, certain flavors may be associated with a carbonation level. When the carbonated beverage maker reads information from the RFID tag, it may automatically operate at the associated carbonation level. Alternatively, the carbonated beverage maker may display a message to the user based on information from the RFID tag, such as providing the suggested carbonation level. As another example, in some embodiments, the carbonated beverage maker may display a message that the pod has expired.

In some embodiments, other types of identification may be included on the pods. These other types of identification may include, for example, barcodes, QR codes, or mechanical identification means.

In some embodiments, carbonated beverage makers may be equipped with smart technology that allows for transmission and reception of data. In some embodiments, carbonated beverage makers may wirelessly communicate with other devices, such as smart phones, personal computers, tablets, or other electronic devices. In some embodiments, carbonated beverage makers may wirelessly communicate with other household appliances. In some embodiments, carbonated beverage makers may connect to the internet, for example, via a wireless local area network (e.g., a home network). For example, carbonated beverage makers may include a wireless network interface controller. In some embodiments, carbonated beverage makers may communicate with other devices over a personal area network (e.g., via the Bluetooth protocol).

In some embodiments, carbonated beverage makers may be controlled remotely, for example, via an electronic device. For example, there may be an app associated with the carbonated beverage maker. The app may allow a user to customize or start the beverage making process remotely. In some embodiments, the user may select a flavor, carbonation level, and other settings remotely. For example, in some embodiments, carbonated beverage makers may have a plurality of pods of different flavors pre-loaded into a storage chamber of the carbonated beverage maker. The process of loading the selected flavor into a dispensing position may be automated. In some embodiments, disposable cups may also be pre-loaded into the carbonated beverage maker. The process of positioning a disposable cup into a beverage receiving position may be automated. Accordingly, the entire beverage making process may be controlled remotely so that the beverage is ready for consumption when the user enters the room.

In some embodiments, carbonated beverage makers may provide information to a remote device. For example, carbonated beverage makers can send usage data, such as preferred settings, number of drinks, top flavors, etc. to a remote device. In some embodiments, carbonated beverage makers may notify the user via a remote device that a beverage is ready for consumption.

In some embodiments, carbonated beverage makers may send other alerts to users. For example, carbonated beverage makers may send an alert that it is time to fill up a water reservoir, replenish the $CO_2$ source, or purchase more flavor pods. As another example, the carbonated beverage maker may send an alert that maintenance is required. Other types of alerts may also be sent to a user via a remote device. In addition to or as an alternative to alerts to a remote device, carbonated beverage makers may also provide visual and/or audible alerts on the carbonated beverage maker itself, such as lights, text, voice messages, bells, beeps, and so on.

In some embodiments, carbonated beverage makers may receive information from a remote device. After tasting a beverage created with the carbonated beverage maker, a user may use a remote device (e.g., through an app on a smartphone) to send information to the carbonated beverage maker. For example, if the user created a new beverage and particularly enjoyed the beverage, the user may send instructions via a remote device to the carbonated beverage maker to store the recipe for the last-made drink in the carbonated beverage maker's memory. The user may also use a remote device to send instructions to the carbonated beverage maker to delete a recipe from its memory. Other types of information may also be sent to the carbonated beverage maker.

In some embodiments, carbonated beverage makers may include features of the beverage dispensing systems disclosed in U.S. application Ser. No. 12/982,374 filed Dec. 30, 2010, now U.S. Pat. No. 9,272,827, which is incorporated herein in its entirety by reference. For example, carbonated beverage makers may include a needle at the end of a water supply line for piercing a cartridge and introducing water (carbonated or non-carbonated) into the cartridge. As another example, carbonated beverage makers may include a button or switch to activate the carbonated beverage maker. Other features disclosed in U.S. application Ser. No. 12/982,374, although not specifically discussed here, may be included in carbonated beverage makers.

It is to be appreciated that the Detailed Description section, and not the Summary and Abstract sections, is intended to be used to interpret the claims. The Summary and Abstract sections may set forth one or more but not all exemplary embodiments of the present invention(s) as contemplated by the inventor(s), and thus, are not intended to limit the present invention(s) and the appended claims in any way.

The present invention(s) have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention(s) that others can, by applying knowledge within the skill of the art, readily modify and/or adapt for various applications such specific embodiments, without undue experimentation, without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention(s) should not be limited by any of the above-described exemplary embodiments, but should be defined only in accordance with the following claims and their equivalents.

What is claimed is:

1. A carbonation cup comprising:
a transparent plastic layer forming a base and a cylinder;
a metal sheath disposed outside the transparent plastic layer, the metal sheath defining a plurality of holes so that a portion of the transparent plastic layer is visible from outside the carbonation cup;
a magnetically-driven impeller disposed at an inner side of the base of the transparent plastic layer; and
an attachment member disposed at an end of the cylinder opposite the base, the attachment member configured to seal the carbonation cup when attached to a carbonated beverage maker having a carbonation source.

2. The carbonation cup of claim 1, further comprising a fill line indicator to suggest a fill line of a diluent.

3. The carbonation cup of claim 1, wherein the transparent plastic layer comprises a thermal insulating material.

4. The carbonation cup of claim 1, wherein the carbonation cup is a pressure vessel, and the metal sheath is configured to maintain a pressure at which a beverage is carbonated.

5. The carbonation cup of claim 1, wherein the attachment member comprises an attachment projection to support the carbonation cup within the carbonated beverage maker.

6. The carbonation cup of claim 1, wherein the attachment member comprises a lip seal to seal the carbonation cup with the carbonated beverage maker.

7. The carbonation cup of claim 1, wherein the impeller is removably attached to the transparent plastic layer at a spindle protruding from the base of the transparent plastic layer.

8. The carbonation cup of claim 1, wherein the impeller is configured to be magnetically-driven by an impeller motor outside of the carbonation cup.

9. The carbonation cup of claim 1, wherein the impeller is configured to create a vortex that draws carbon dioxide from the carbonation source near the base of the carbonation cup.

10. The carbonation cup of claim 1, wherein the impeller comprises:
a base;
blades protruding from the base; and
a ring attached to the blades and disposed above the blades.

* * * * *